US010338968B2

(12) United States Patent
Bequet et al.

(10) Patent No.: US 10,338,968 B2
(45) Date of Patent: *Jul. 2, 2019

(54) DISTRIBUTED NEUROMORPHIC PROCESSING PERFORMANCE ACCOUNTABILITY

(71) Applicant: SAS Institute Inc., Cary, NC (US)

(72) Inventors: Henry Gabriel Victor Bequet, Cary, NC (US); Huina Chen, III, Chapel Hill, NC (US); Juan Du, Cary, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/039,863

(22) Filed: Jul. 19, 2018

(65) Prior Publication Data

US 2019/0012403 A1    Jan. 10, 2019

Related U.S. Application Data

(63) Continuation of application No. 16/039,745, filed on Jul. 19, 2018, which is a continuation-in-part of (Continued)

(51) Int. Cl.
*G06F 9/46* (2006.01)
*G06F 9/50* (2006.01)
(Continued)

(52) U.S. Cl.
CPC .......... *G06F 9/5027* (2013.01); *G06F 9/4843* (2013.01); *G06F 16/9014* (2019.01);
(Continued)

(58) Field of Classification Search
CPC ...... G06F 9/485; G06F 9/5083; G06F 9/4881; G06F 9/5094; G06F 9/46; G06F 9/3005;
(Continued)

(56) References Cited

U.S. PATENT DOCUMENTS 6,119,112 A * 9/2000 Bush ................. G06N 3/08
 706/25
6,134,535 A 10/2000 Belzberg
(Continued)

OTHER PUBLICATIONS

Foster et al., "Cloud Computing and Grid Computing 360-Degree Compared" Jan. 6, 2009, IEEE.
(Continued)

*Primary Examiner* — Hiren P Patel

(57) ABSTRACT

An apparatus includes a processor to: receive a request to repeat an earlier performance of a first job flow described in a job flow definition; analyze the job flow definition to determine whether the first job flow uses a neural network; in response to a determination that the first job flow uses a neural network, analyze an object associated with the first job flow to determine whether the neural network was trained using training data from a second job flow that does not use a neural network; and in response to a determination that such training data was so used, repeat the earlier performance of the first job flow, perform the second job flow with the same input data values as used in the repeated performance of the first job flow, and analyze corresponding output data values of both performances to determine a degree of accuracy of the neural network.

30 Claims, 94 Drawing Sheets

Related U.S. Application Data application No. 15/897,723, filed on Feb. 15, 2018, which is a continuation-in-part of application No. 15/896,613, filed on Feb. 14, 2018, now Pat. No. 10,002,029, which is a continuation-in-part of application No. 15/851,869, filed on Dec. 22, 2017, now Pat. No. 10,078,710, which is a continuation of application No. 15/613,516, filed on Jun. 5, 2017, now Pat. No. 9,852,013, which is a continuation of application No. 15/425,886, filed on Feb. 6, 2017, now Pat. No. 9,684,544, which is a continuation of application No. 15/425,749, filed on Feb. 6, 2017, now Pat. No. 9,684,543.

(60) Provisional application No. 62/560,506, filed on Sep. 19, 2017, provisional application No. 62/534,678, filed on Jul. 19, 2017, provisional application No. 62/460,000, filed on Feb. 16, 2017, provisional application No. 62/297,454, filed on Feb. 19, 2016, provisional application No. 62/292,078, filed on Feb. 5, 2016.

(51) Int. Cl.

| | | |
|---|---|---|
| *H04L 29/08* | (2006.01) | |
| *G06F 16/901* | (2019.01) | |
| *G06F 16/903* | (2019.01) | |
| *G06N 20/00* | (2019.01) | |
| *G06F 9/48* | (2006.01) | |
| *G06K 9/62* | (2006.01) | |
| *G06N 3/04* | (2006.01) | |
| *G06N 3/063* | (2006.01) | |

(52) U.S. Cl.
CPC ..... *G06F 16/90344* (2019.01); *G06K 9/6262* (2013.01); *G06N 3/04* (2013.01); *G06N 3/063* (2013.01); *G06N 20/00* (2019.01); *H04L 67/10* (2013.01)

(58) Field of Classification Search
CPC .................. G06F 8/41; G06F 17/30949; G06F 17/30985; H04L 67/10; H04L 67/1097
See application file for complete search history.

(56) References Cited

U.S. PATENT DOCUMENTS

| | | | |
|---|---|---|---|
| 6,151,583 A | 11/2000 | Ohmura et al. | |
| 6,438,565 B1 | 8/2002 | Ammirato et al. | |
| 8,140,591 B2* | 3/2012 | Purcell | G06Q 10/103 705/301 |
| 8,285,681 B2 | 10/2012 | Prahlad et al. | |
| 9,026,577 B1* | 5/2015 | Johnston | G06Q 10/103 709/202 |
| 9,208,475 B2* | 12/2015 | Agarwal | G06Q 10/107 |
| 9,430,290 B1 | 8/2016 | Gupta et al. | |
| 9,684,543 B1* | 6/2017 | Bequet | H04L 67/10 |
| 9,684,544 B1* | 6/2017 | Bequet | H04L 67/10 |
| 9,852,013 B2* | 12/2017 | Bequet | H04L 67/10 |
| 9,946,970 B2* | 4/2018 | Gilad-Bachrach | G06N 3/08 |
| 10,002,029 B1* | 6/2018 | Bequet | G06F 9/5083 |
| 10,013,656 B1* | 7/2018 | Ciarlini | G06N 5/04 |
| 10,033,816 B2* | 7/2018 | Rehaag | H04L 67/02 |
| 10,078,710 B2* | 9/2018 | Bequet | H04L 67/10 |
| 10,095,552 B2* | 10/2018 | Bequet | G06F 9/5083 |
| 10,095,553 B2* | 10/2018 | Bequet | G06F 9/5083 |
| 10,095,554 B2* | 10/2018 | Bequet | G06F 9/5083 |
| 2002/0184250 A1 | 12/2002 | Kern et al. | |
| 2005/0131941 A1* | 6/2005 | Dettinger | G06F 17/30286 |
| 2005/0198639 A1 | 9/2005 | Matsui | |
| 2008/0120129 A1 | 5/2008 | Seubert et al. | |
| 2008/0229307 A1 | 9/2008 | Maeda et al. | |
| 2008/0300851 A1 | 12/2008 | Chakrabarti et al. | |
| 2011/0016379 A1 | 1/2011 | McColl et al. | |
| 2011/0131448 A1 | 6/2011 | Vasil et al. | |
| 2011/0179058 A1 | 7/2011 | Purcell et al. | |
| 2011/0225484 A1 | 9/2011 | Lotan-Bolotnikoff et al. | |
| 2012/0117570 A1 | 5/2012 | Ozaki et al. | |
| 2013/0110884 A1 | 5/2013 | Eakins | |
| 2013/0124957 A1 | 5/2013 | Oppenheimer et al. | |
| 2013/0138810 A1 | 5/2013 | Binyamin et al. | |
| 2013/0253977 A1 | 9/2013 | Vibhor et al. | |
| 2014/0196001 A1 | 7/2014 | Ioannou et al. | |
| 2014/0214936 A1 | 7/2014 | Abraham et al. | |
| 2015/0154012 A1 | 6/2015 | Wolfram | |
| 2015/0160974 A1 | 6/2015 | Kishore et al. | |
| 2015/0195375 A1 | 7/2015 | Danziger et al. | |
| 2015/0205847 A1 | 7/2015 | Gloski et al. | |
| 2015/0324241 A1 | 11/2015 | Curbera et al. | |
| 2016/0019281 A1 | 1/2016 | Hariharan et al. | |
| 2016/0063145 A1* | 3/2016 | Chang | H04L 65/403 703/6 |
| 2016/0155049 A1* | 6/2016 | Choi | G06N 3/082 706/16 |
| 2016/0350160 A1 | 12/2016 | Hamway et al. | |
| 2016/0358073 A1* | 12/2016 | Desjardins | G06N 3/04 |
| 2016/0358103 A1* | 12/2016 | Bowers | G06N 99/005 |
| 2016/0378785 A1 | 12/2016 | Liu et al. | |
| 2017/0017912 A1* | 1/2017 | Teraguchi | G06Q 10/06313 |
| 2017/0090989 A1* | 3/2017 | van Velzen | G06F 9/5038 |
| 2017/0093988 A1* | 3/2017 | Rehaag | H04L 67/02 |
| 2017/0220543 A1 | 8/2017 | Canton et al. | |
| 2017/0269970 A1* | 9/2017 | Bequet | H04L 67/10 |
| 2018/0011867 A1* | 1/2018 | Bowman | G06F 21/602 |
| 2018/0276231 A1* | 9/2018 | Bowman | G06F 21/602 |

OTHER PUBLICATIONS

Katz et al., "Many-Task Computing and Blue Waters" arXiv:1202.3943v1 cs.DC Feb. 17, 2012.

Raicu, Ioan, "Many-task Computing: Bridging the Gap between High-Throughput Computing and High-Performance computing" Department of Computer Science-Colorado State University—Mar. 2, 2009.

Raicu, Ioan & Foster, Ian & Zhao, Yuanze. (2012). Towards Data Intensive Many-Task Computing. Proc of the 1st ACM SIGMOD Workshop on Scalable Workflow Execution Engines and Technologies. 28-73.

Eddelbuettel, Dirk, "CRAN Task View: High-Performance and Parallel Computing With R" Oct. 30, 2018.

Author Unknown, "HPE Message Passing Interface (MPI)" Hewlett Packard Enterprise Development LP—2018.

Chatterjee et al., "Integrating Asynchronous Task Parallelism with MPI" Jul. 30, 2013—IEEE Explore Digital Library.

Subramoni et al., Designing Dynamic and Adaptive MPI Point-to-point Communication Protocols for Efficient Overlap of Computation and Communication. 334-354. 10.1007/978-3-319-58667-0_18.

Author Unknown, "Stress Testing and Scenario Analysis" Jul. 2013—International Actuarial Association.

Gropp et al., "A high-performance, portable implementation of the MPI message passing interface standard", Elsevier—Parallel Computing 22 (1996) 789-828.

Lu et al., "Data MPI: Extending MPI to Hadoop-like Big Data Computing" —2014 IEEE 28th International Parallel and Distributed Processing Symposium.

Raicu, Ioan, "Many-Task Computing: Bridging the Gap between High-Throughput Computing and High-Performance computing" Department of Computer Science-Colorado State University—Mar. 2009—Dissertation.

Masuoka R., Parsia B., Labrou Y. (2003) Task Computing — The Semantic Web Meets Pervasive Computing. In: Fensel D., Sycara K., Mylopoulos J. (eds) The Semantic Web—ISWC 2003. ISWC 2003. Lecture Notes in Computer Science, vol. 2870. Springer Verlag, Berlin, Heidelberg.

(56) References Cited

OTHER PUBLICATIONS

Hwang, Soonwook, "MOHA: Many-Task Computing Framework on Hadoop" Korea Institute of Science and Technology Information—May 18, 2017.
Author Unknown, "Developing Parallel Programs—A Discussion of Popular Models" Oracle—May 2016.
Zhang, Zhao & Katz, Daniel S. & Ripeanu, Matei & Wilde, Michael & Foster, Ian. (2011). AME: An Anyscale Many-Task Computing Engine, Works'11—Proceedings of the 6th Workshop on Workflows in Support of Large-Scale Science, Co-located with SC'11. 10.114512110497.2110513.
Author Unknown, "Run tasks concurrently to maximize usage of Batch compute nodes" Microsoft—May 21, 2017.
Pendergrass, Jerry, "The Architecture of the SAS® Cloud Analytic Services in SAS® Viya™" SAS Institute 2017.
Raicu et al., "Many-Task Computing for Grids and Supercomputers" Feb. 6, 2009—2008 Workshop on Many-Task Computing on Grids and Supercomputers—IEEE.
Author Unknown, "About-Microsoft MakeCode" Microsoft—Retrieved Feb. 5, 2019.
Author Unknown, "About Us" Code.org—Retrieved Feb. 5, 2019.
Author Unknown, "What will you create?" Code.org—Retrieved Feb. 5, 2019.
Author Unknown, "FAQ: Changes to Touch Develop" —Microsoft MakeCode—Retrieved Feb. 5, 2019.
Author Unknown, "MakeCode Arcade: Retro Gaming, Modern Programming", Jan. 18, 2019—Microsoft.
Author Unknown, "About Scratch" Scratch—Retrieved Feb. 5, 2019.
Author Unknown, "Attach to Process" Pycharm—Retrieved Aug. 12, 2018.
Author Unknown, "Keras: The Python Deep Learning library" Keras—Retrieved Aug. 12, 2018.
Robinson, David, "The Incredible Growth of Python" Stack Overflow—Sep. 6, 2017.
Frank, R.J., et al., (2001). Time Series Prediction and Neural Networks. Journal of Intelligent and Robotic Systems. 31.91-103. 10.1023/A:1012074215150.
Pant, Neelabh, "A Guide for Time Series Prediction Using Recurrent Neural networks (LSTMs)" Sep. 7, 2017—Stats and Bots—Medium.
Author Unknown, "How to apply Neural Network to time series forecasting?" Stack Exchange—Aug. 30, 2018.
Nguyen, Hanh H. and Chan, Christine W., "Multiple neural networks for a long term time seris forecast" Neural computing & Applications—Apr. 2004, vol. 13, Issue 1, pp. 90-98.
Clark, Shannon D., PhD., "Fast Implementation of State Transition Models" SAS 2017.
Chollet, Francois and Allaire, J.J., "Time Series Forecasting with Recurrent Neural Networks" TensorFlow for R Blog—Dec. 20, 2017.
Brownlee, Jason, "Time Series prediction with LSTM Recurrent Neural Networks in Python with Keras" Deep Learning for Time Series—Jul. 21, 2016.
Touretzky, Dave and Laskowski, Kornel, "Neural Networks for Time Series Prediction" 15-486/782: Artificial Neural Networks—Fall 2006.
Ruder, Sebastian, "Transfer Learning—Machine Learning's Next Frontier" Mar. 21, 2017.
Author Unknown, "A Sound Capital Planning Process: Fundamental Elements" Jan. 2014—Bank for International Settlements.
Armbrust et al., "Above the Clouds: A Berkeley View of Cloud Computing" Technical Report No. UCB/EECS-2009-28, Feb. 10, 2009.
Ambrust et al., "A View of Cloud Computing" Communications of the AMC—Apr. 2010 | vol. 53 | No. 4.
Mancuso et al., "Building a Bridge between Risk and Finance to Address IFRS 9 and CECL" SAS 2017.
Kowalik, Janusz, "Efficiency and Scalability in High Performance Computing" Apr. 18, 2008-HPC Wire.
Jin et al., "Capital Planning with SAS® Infrastructure for Risk Management and SAS® Risk and Finance Workbench" SAS 2018.
"Furlani et al., "Performance metrics and auditing framework using application kernels for high-performance computer systems" Concurrency Computation: Practice and Experience 2013; 25:918-931—Published online Jun. 14, 2012 in Wiley Online Library".

* cited by examiner

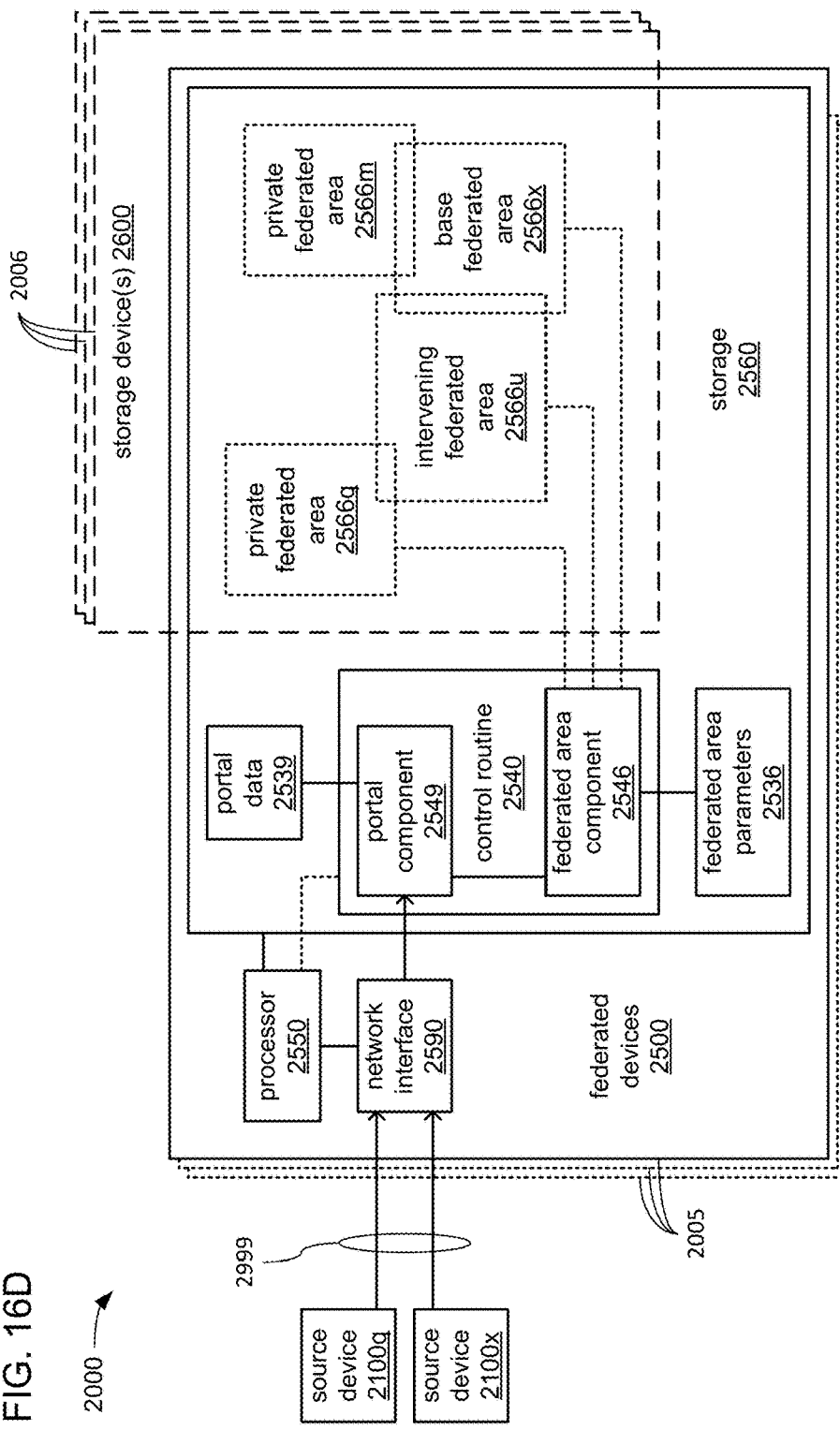

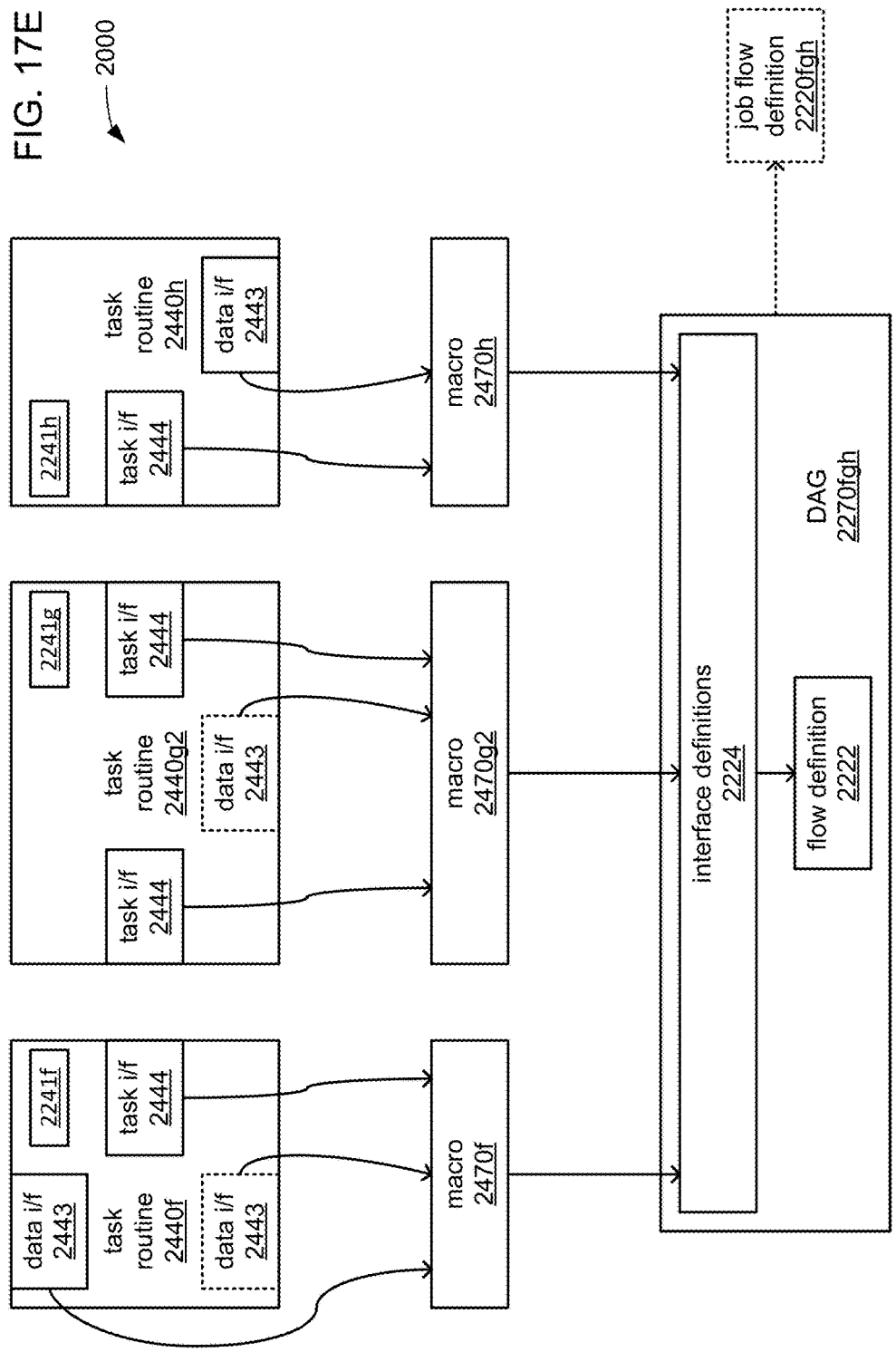

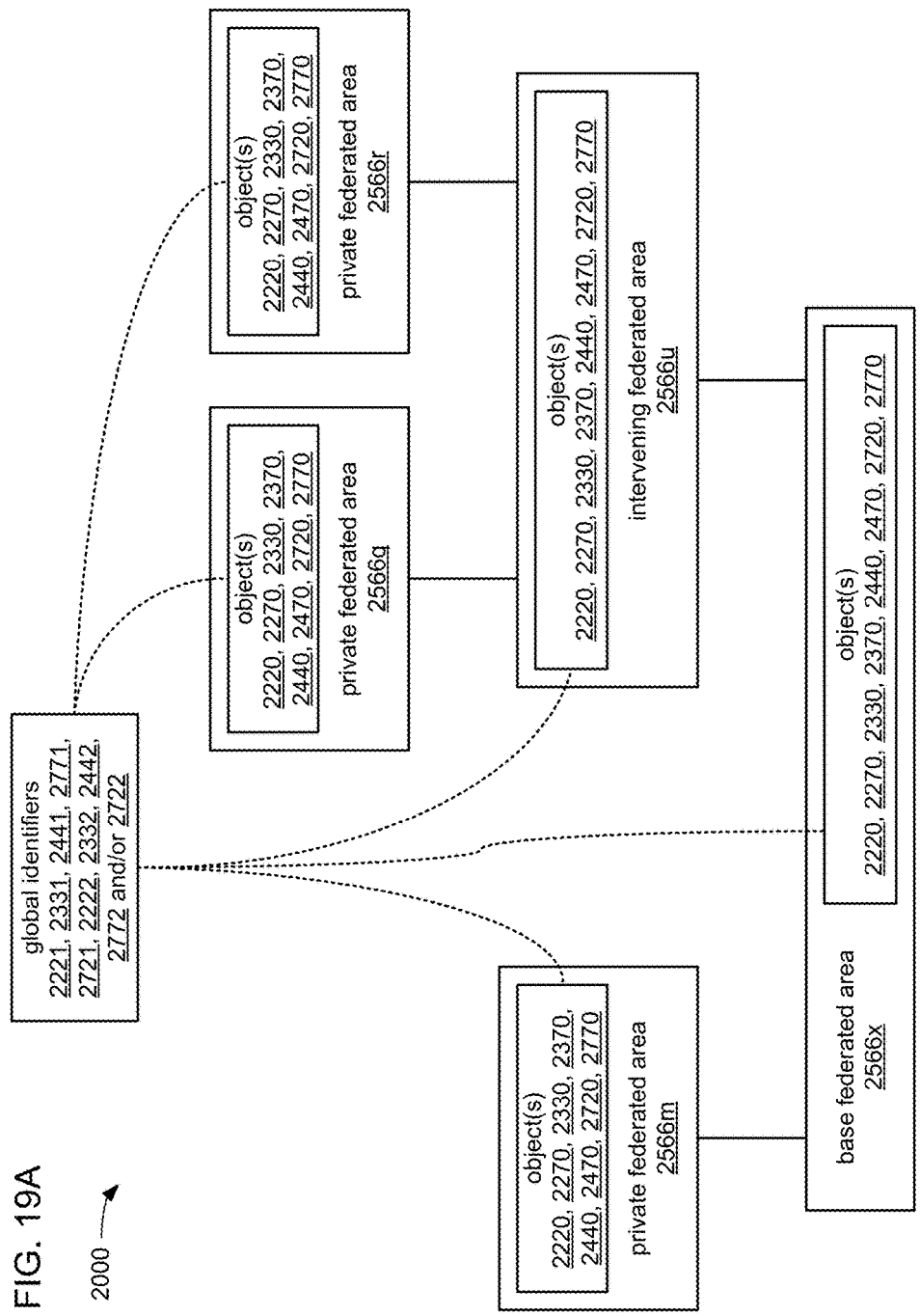

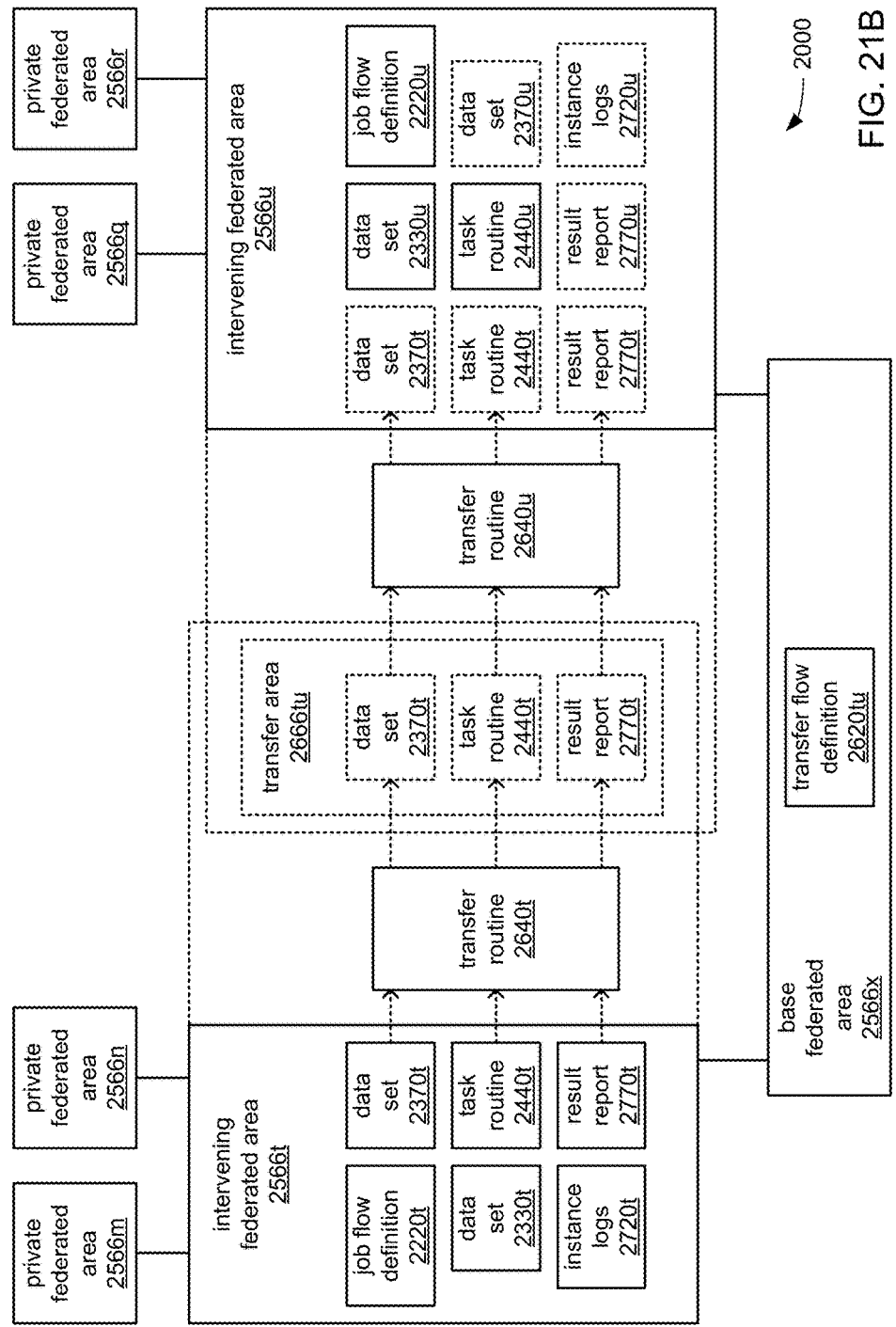

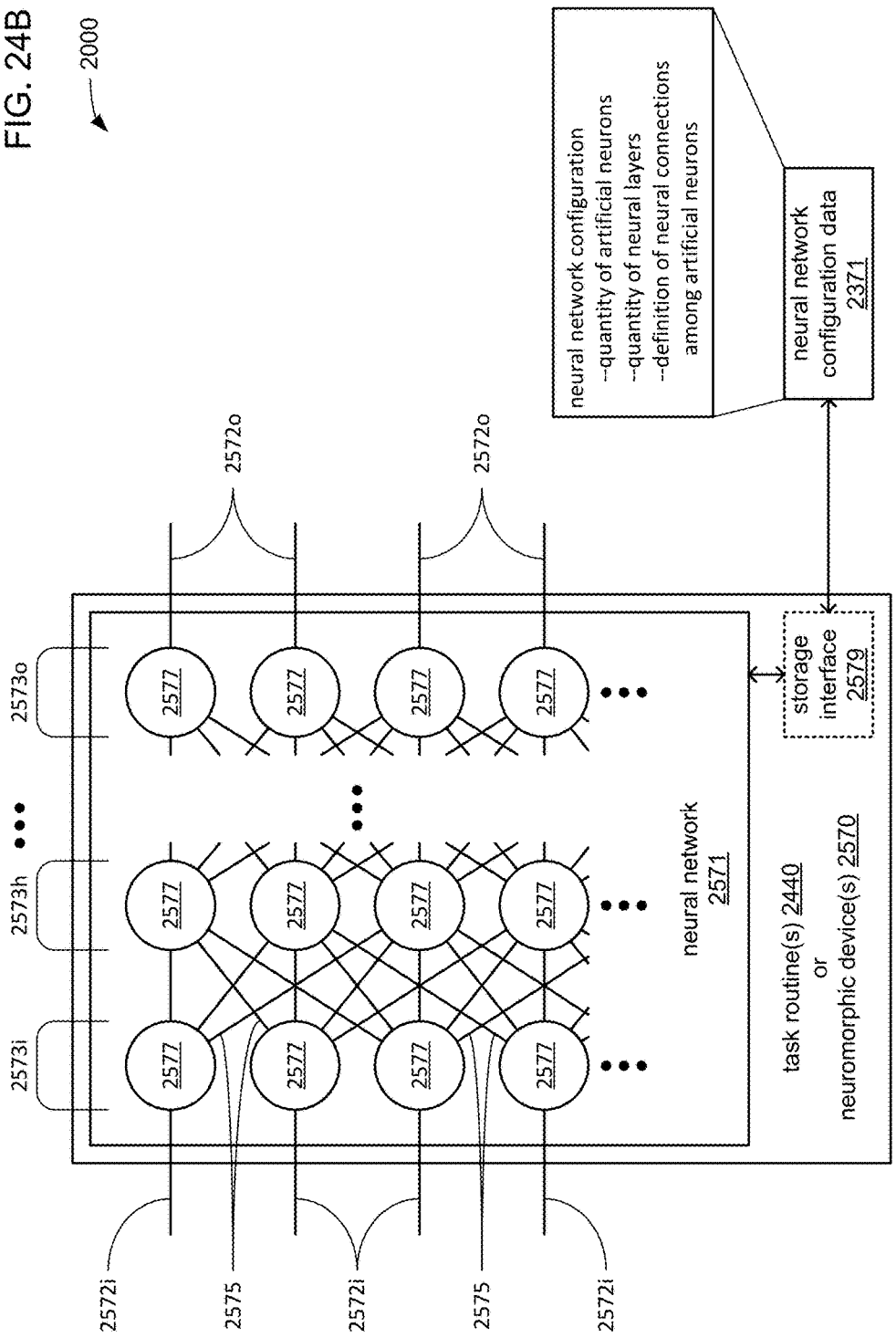

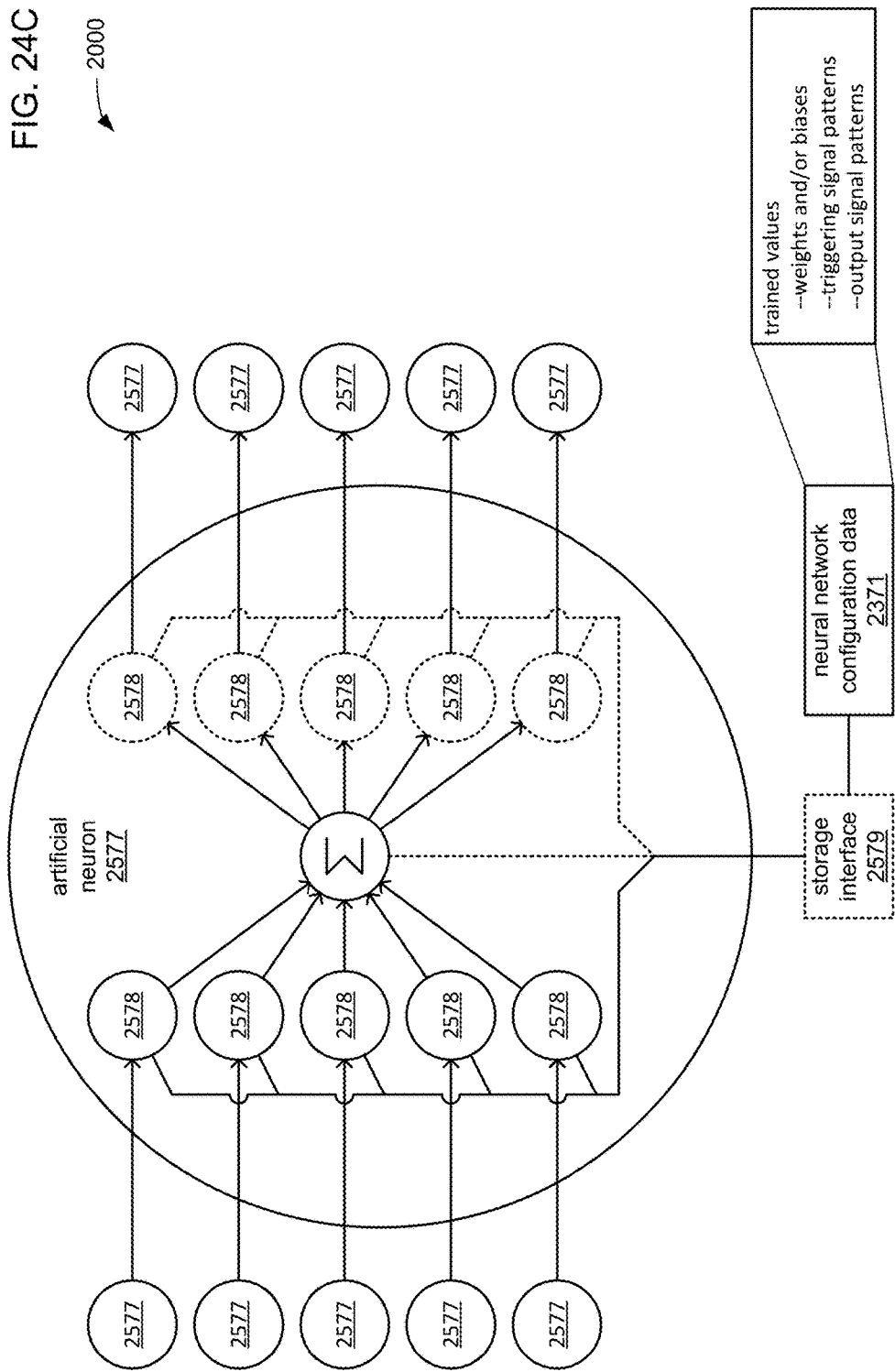

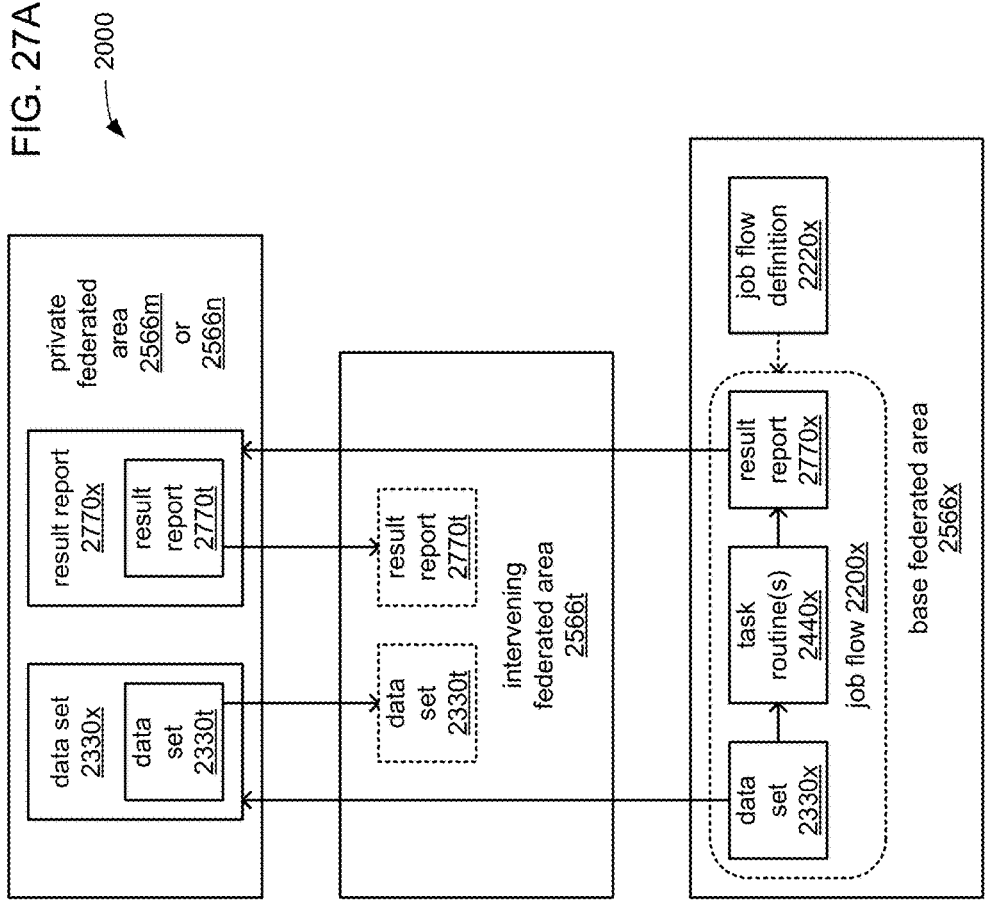

3100

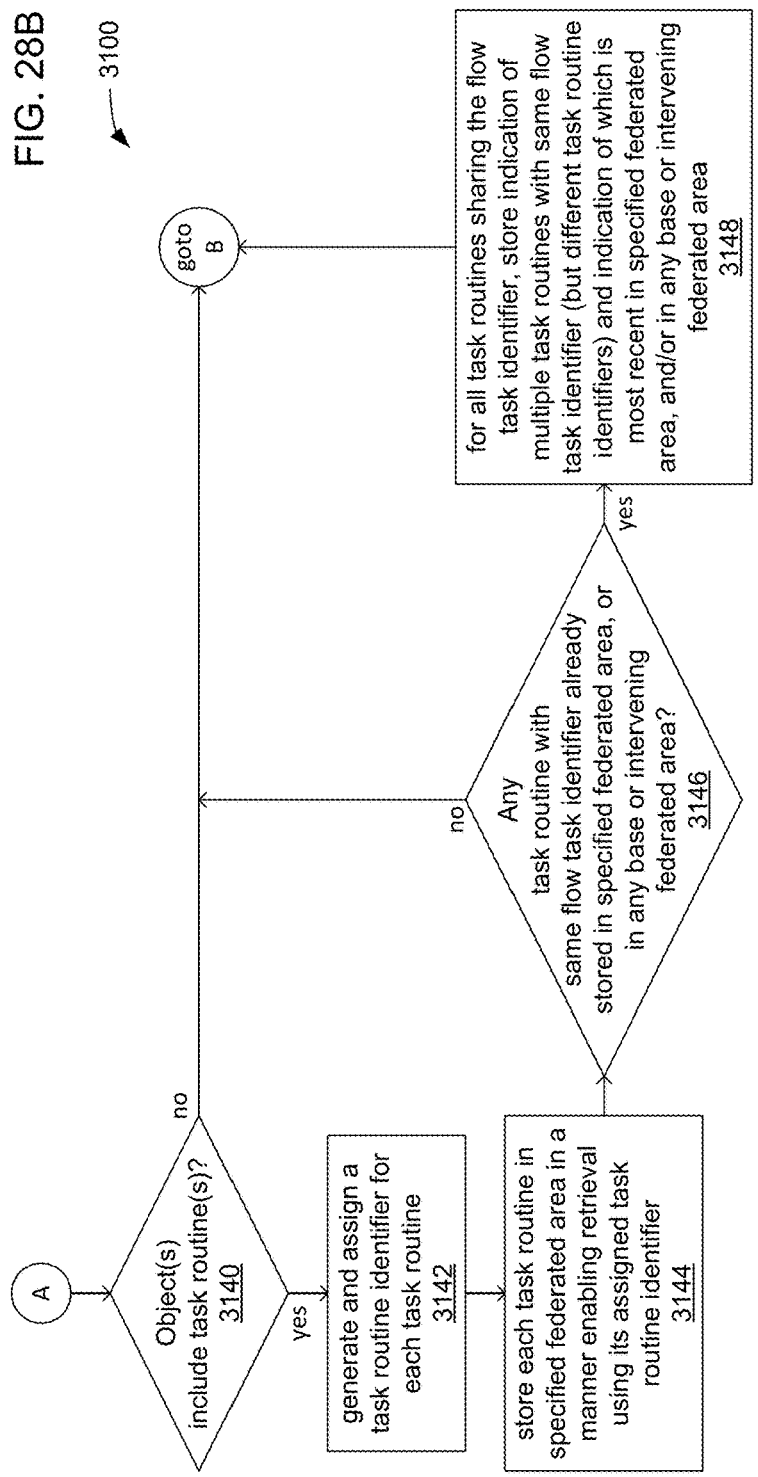

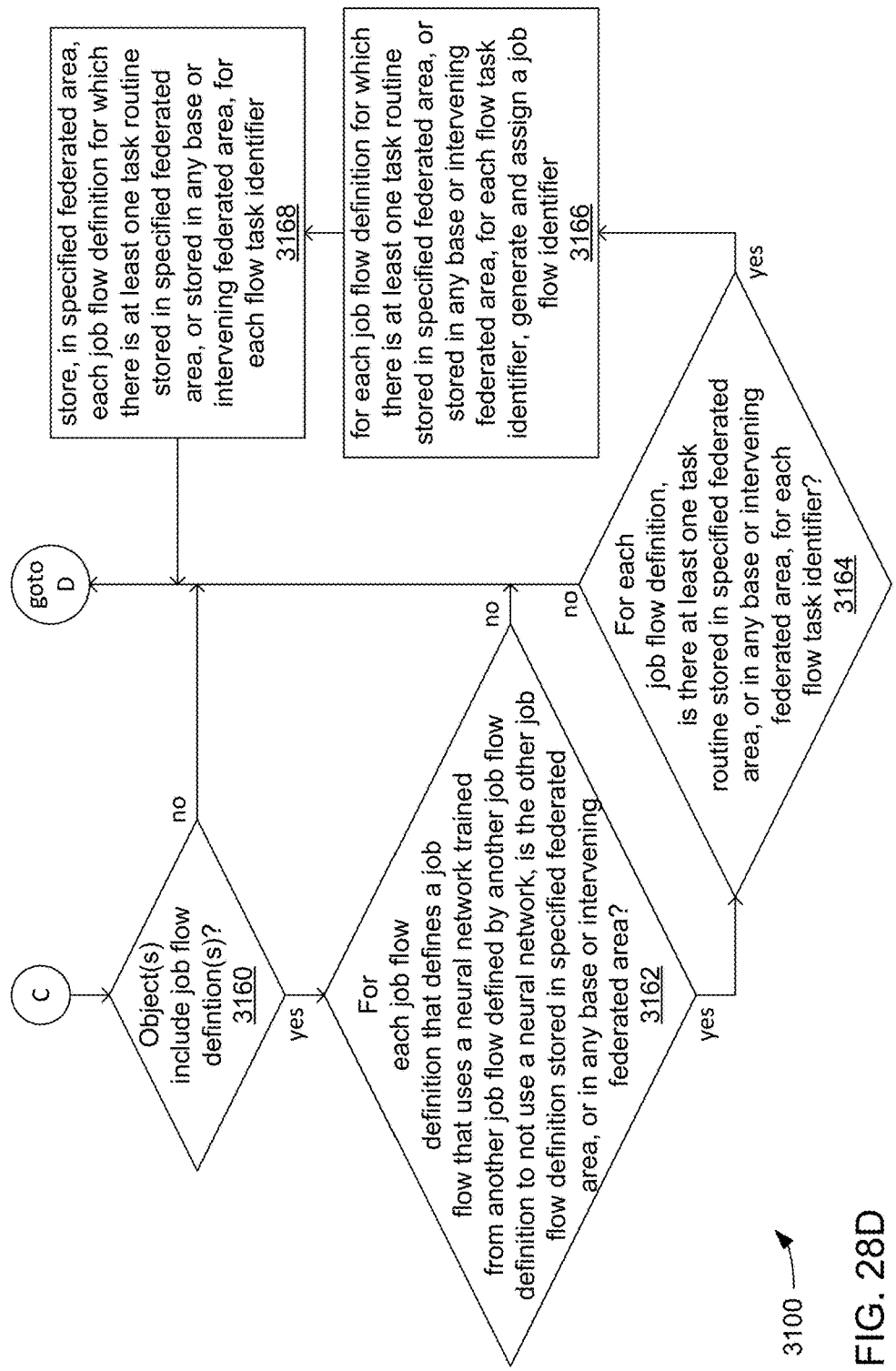

3100

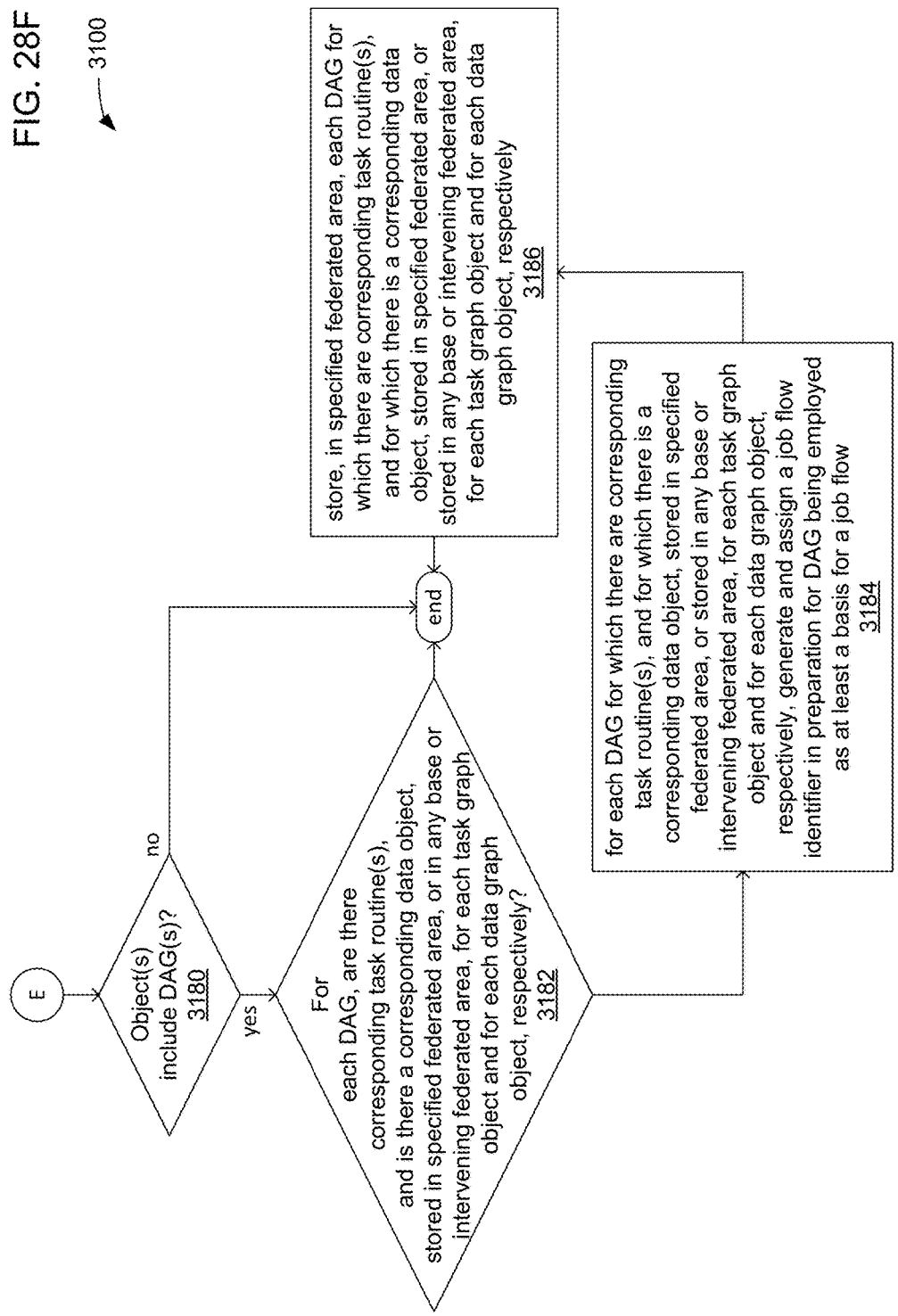

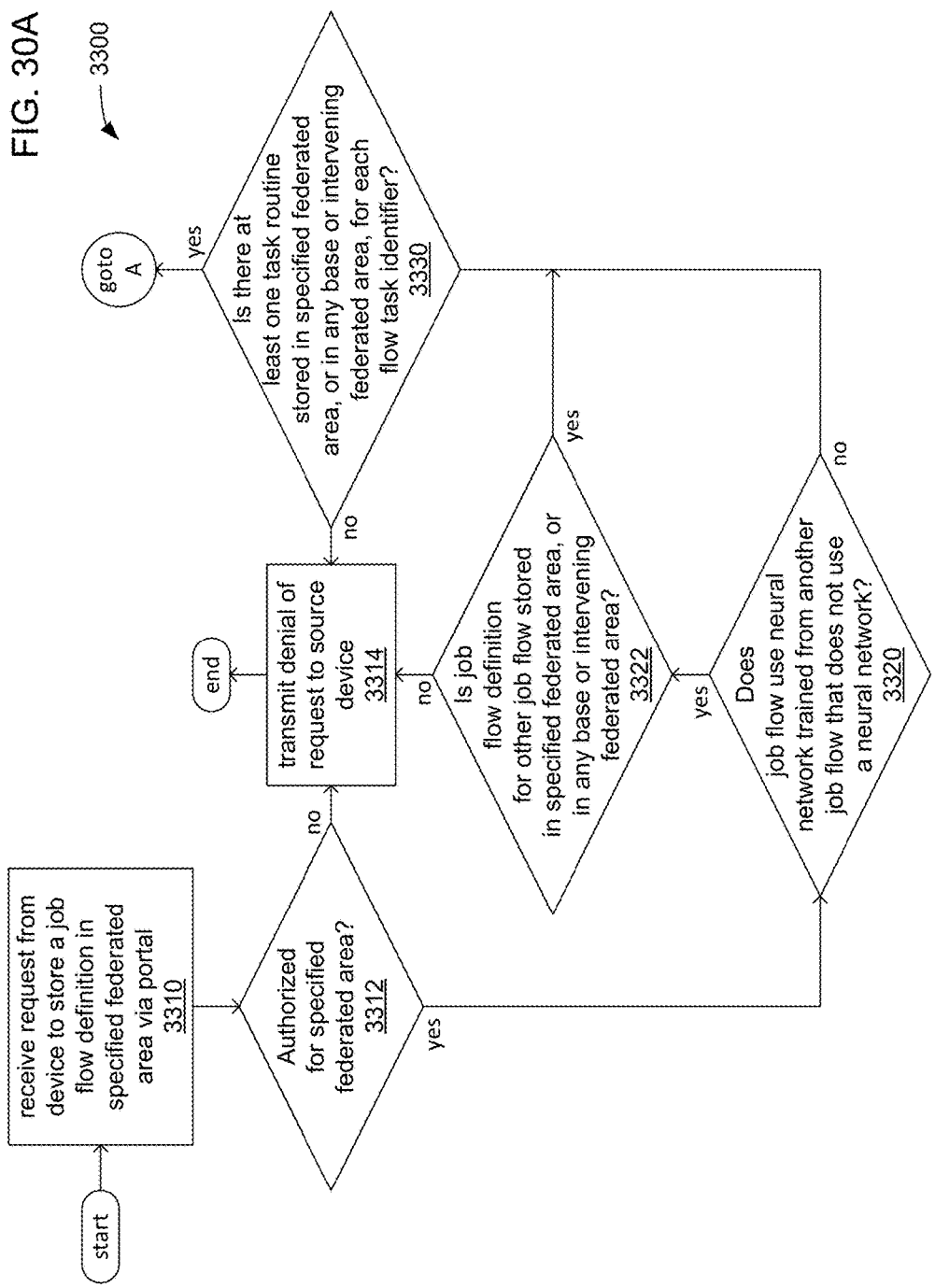

3400

3500

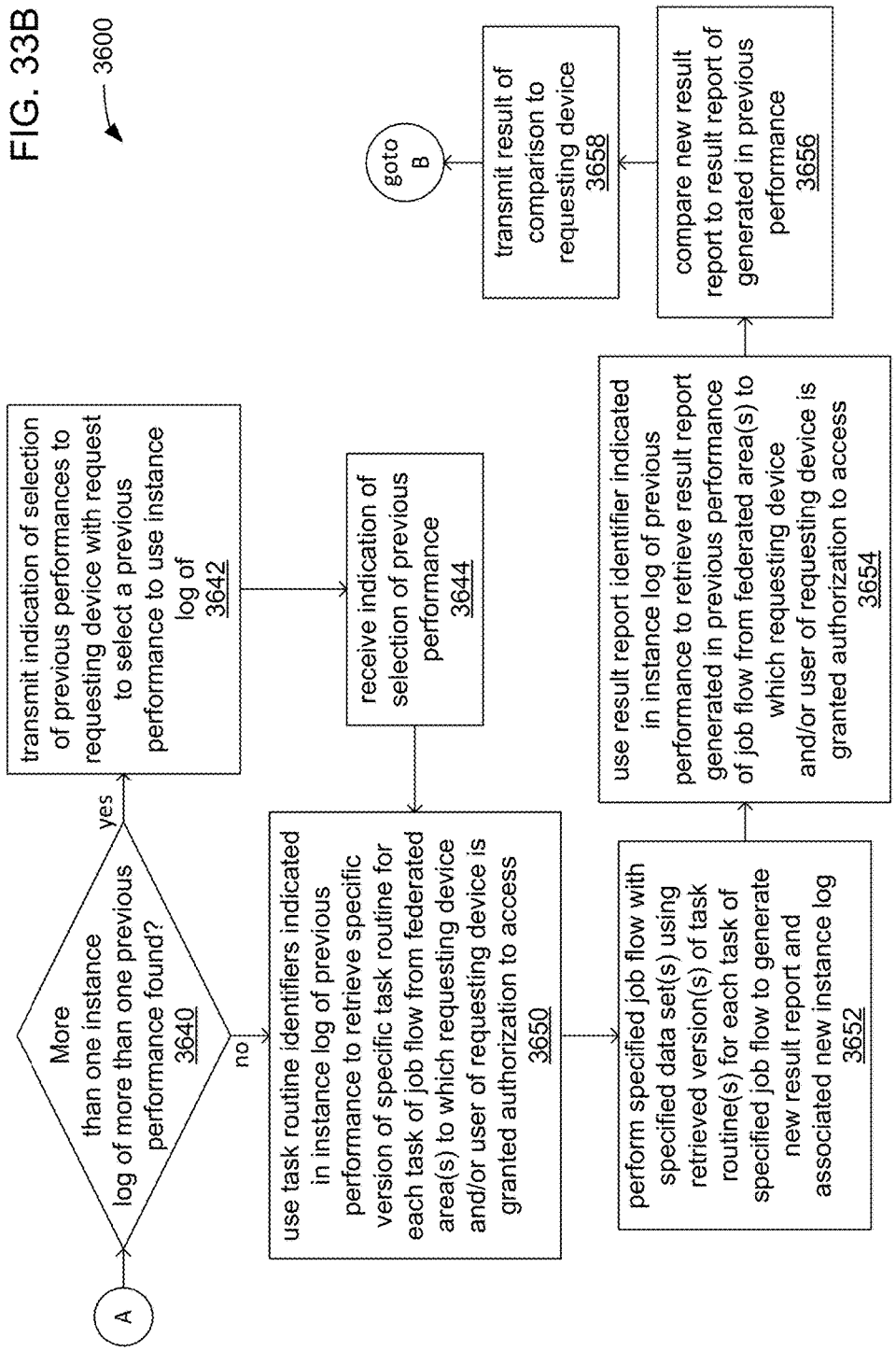

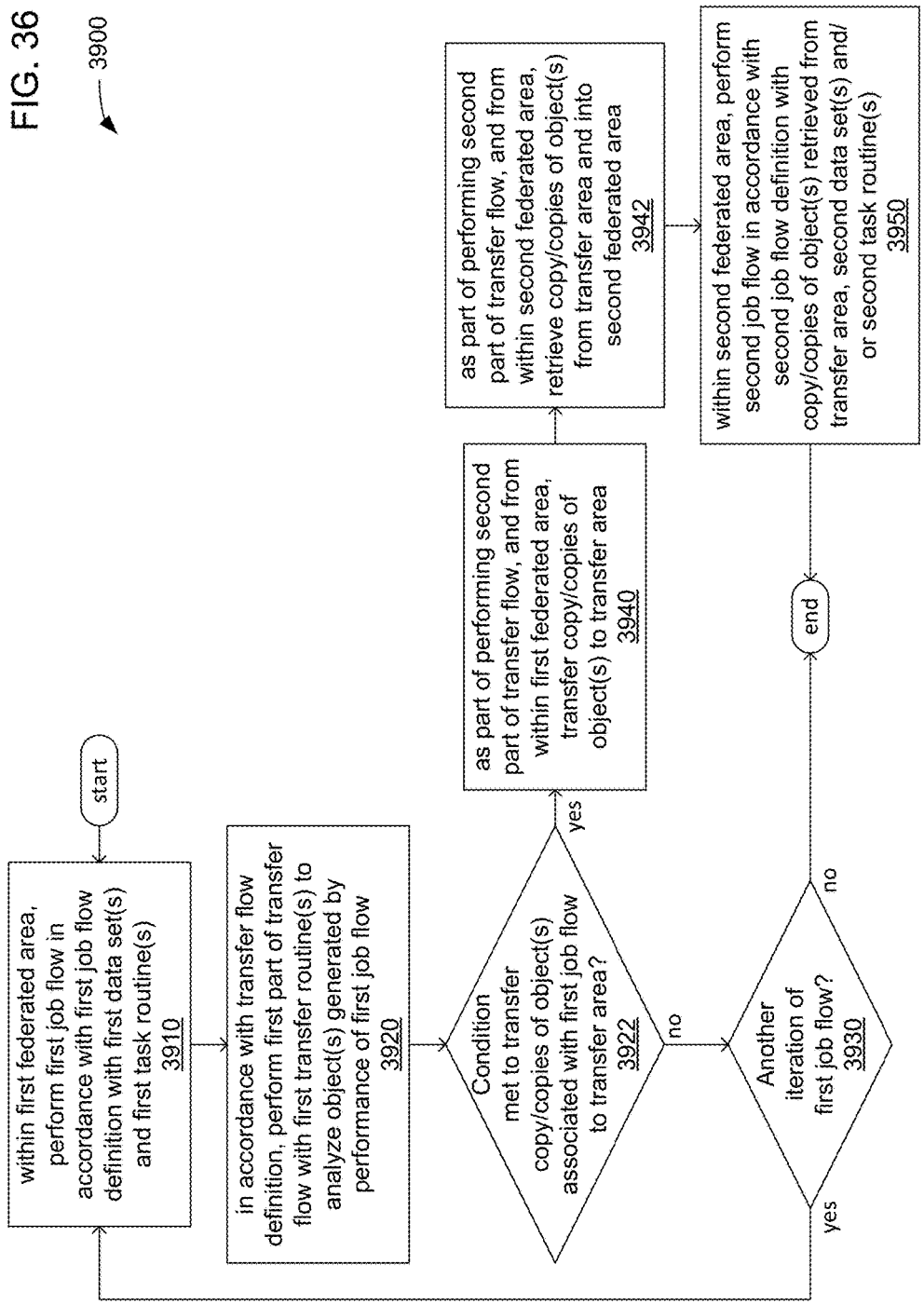

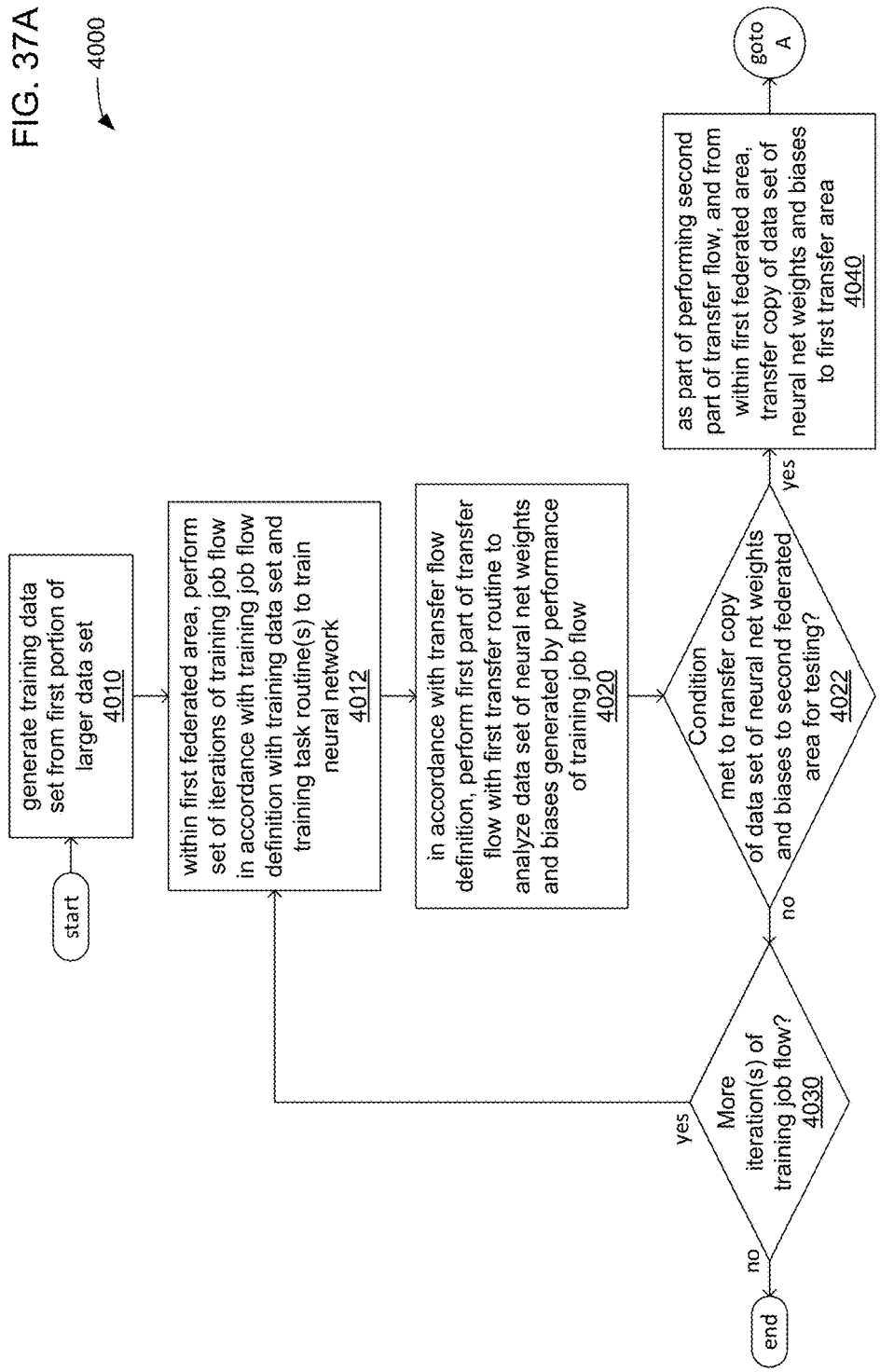

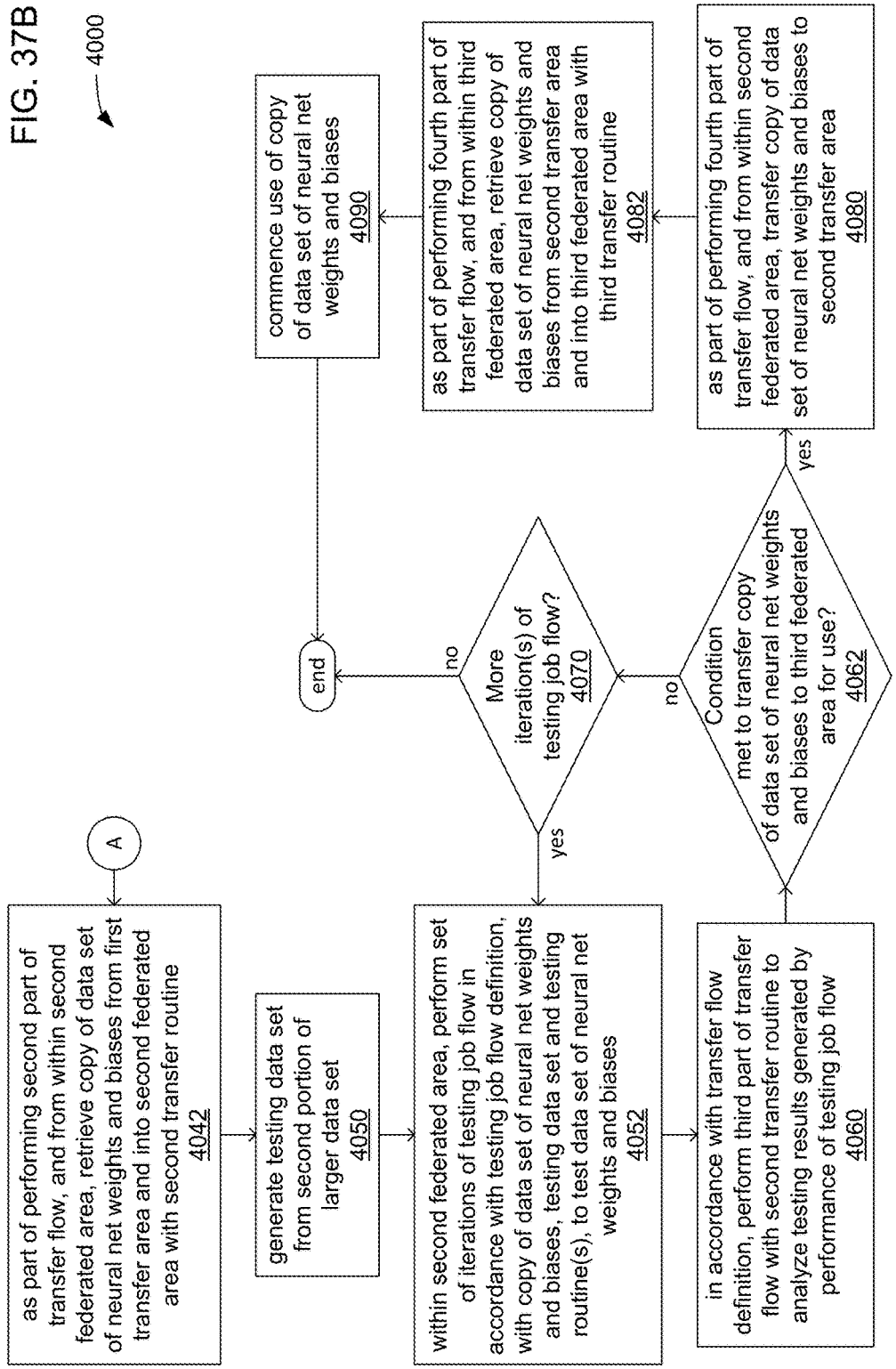

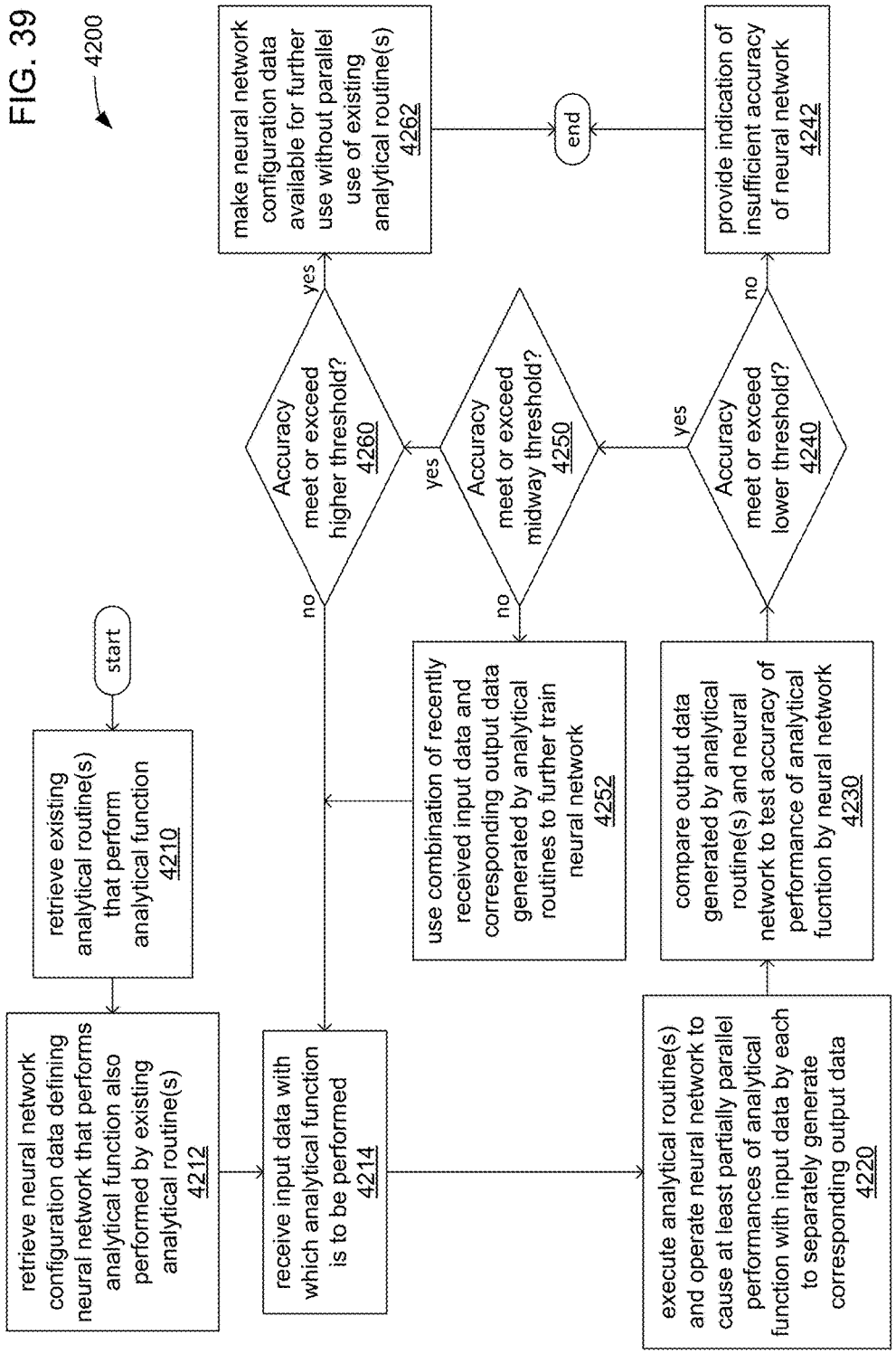

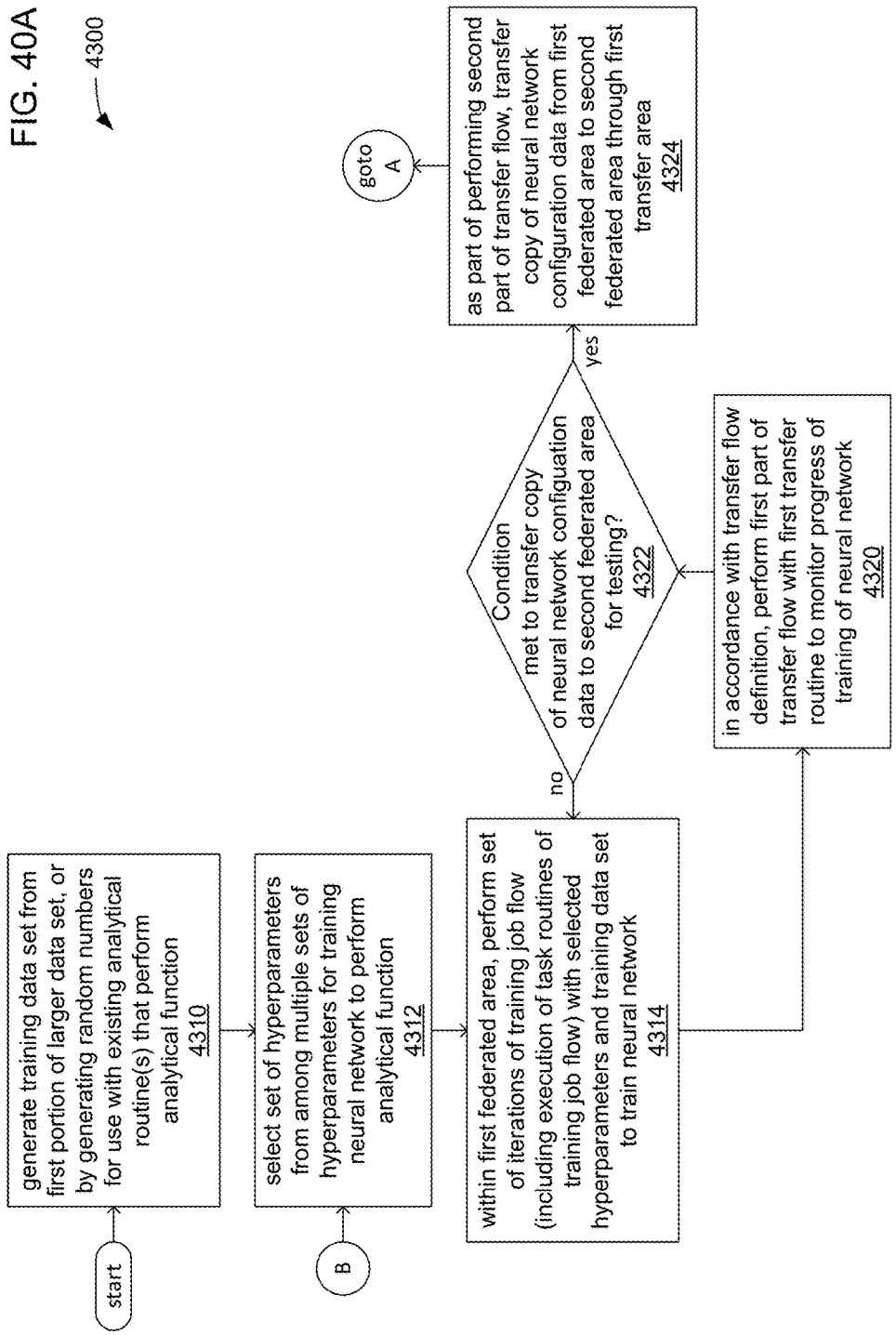

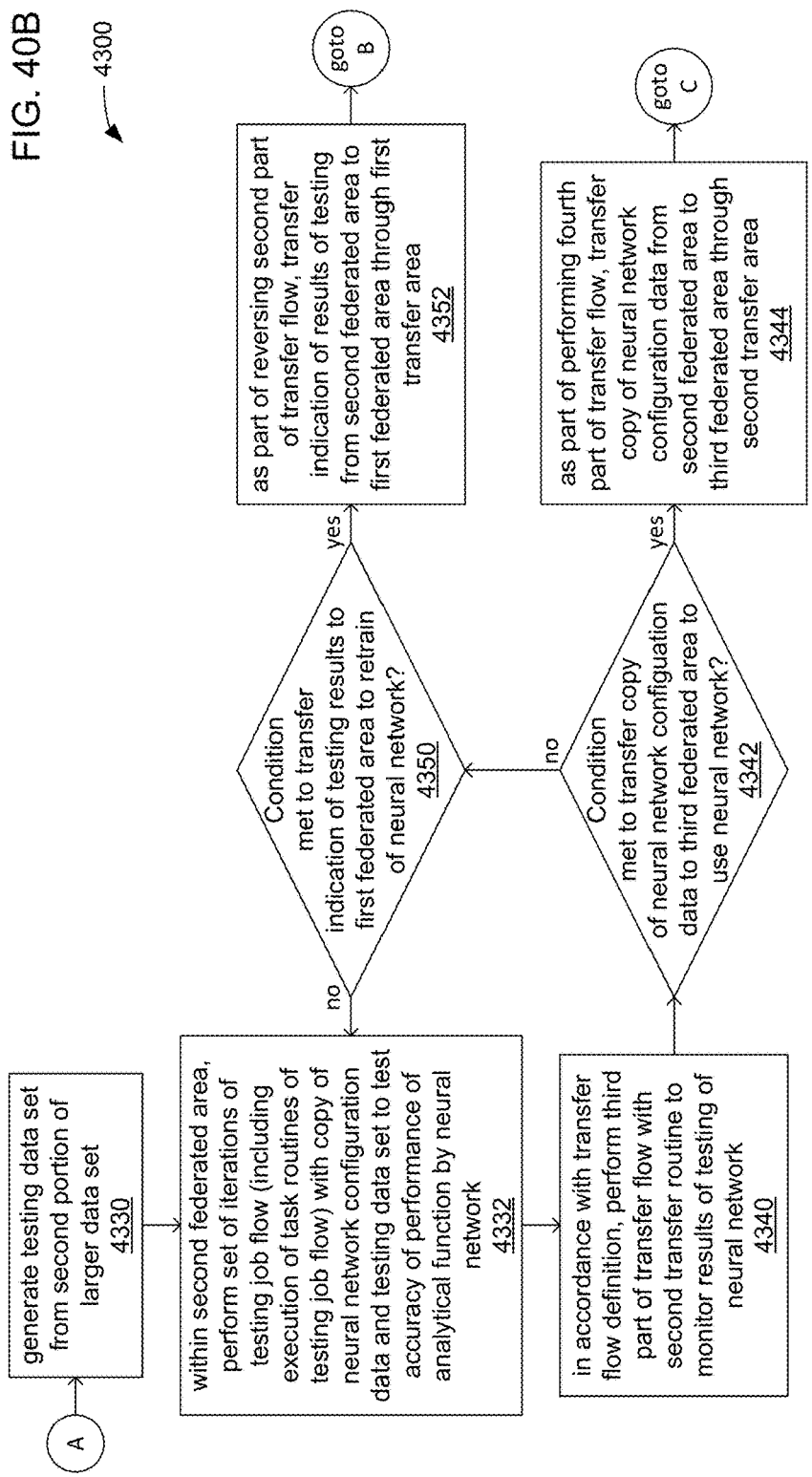

DISTRIBUTED NEUROMORPHIC PROCESSING PERFORMANCE ACCOUNTABILITY

CROSS-REFERENCE TO RELATED APPLICATIONS

This application is a continuation of, and claims the benefit of priority under 35 U.S.C. § 120 to, U.S. patent application Ser. No. 16/039,745 filed Jul. 19, 2018; which is a continuation-in-part of, and claims the benefit of priority under 35 U.S.C. § 120 to, U.S. patent application Ser. No. 15/897,723 filed Feb. 15, 2018; which is a continuation-in-part of, and claims the benefit of priority under 35 U.S.C. § 120 to, U.S. patent application Ser. No. 15/896,613 filed Feb. 14, 2018 (since issued as U.S. Pat. No. 10,002,029); which is a continuation-in-part of, and claims the benefit of priority under 35 U.S.C. § 120 to, U.S. patent application Ser. No. 15/851,869 filed Dec. 22, 2017; which is a continuation of, and claims the benefit of priority under 35 U.S.C. § 120 to, U.S. patent application Ser. No. 15/613,516 filed Jun. 5, 2017 (since issued as U.S. Pat. No. 9,852,013); which is a continuation of, and claims the benefit of priority under 35 U.S.C. § 120 to, U.S. patent application Ser. No. 15/425,886 filed Feb. 6, 2017 (since issued as U.S. Pat. No. 9,684,544); which is a continuation of, and claims the benefit of priority under 35 U.S.C. § 120 to, U.S. patent application Ser. No. 15/425,749 also filed on Feb. 6, 2017 (since issued as U.S. Pat. No. 9,864,543), all of which are incorporated herein by reference in their respective entireties for all purposes.

U.S. patent application Ser. No. 16/039,745 also claims the benefit of priority under 35 U.S.C. § 119(e) to U.S. Provisional Application Ser. No. 62/560,506 filed Sep. 19, 2017, and to U.S. Provisional Application Ser. No. 62/534,678 filed Jul. 19, 2017, both of which are incorporated herein by reference in their respective entireties for all purposes. U.S. patent application Ser. No. 15/896,613 also claims the benefit of priority under 35 U.S.C. § 119(e) to U.S. Provisional Application Ser. No. 62/460,000 filed Feb. 16, 2017, which is incorporated herein by reference in its entirety for all purposes. U.S. patent application Ser. No. 15/425,749 also claims the benefit of priority under 35 U.S.C. § 119(e) to U.S. Provisional Application Ser. No. 62/292,078 filed Feb. 5, 2016, and to U.S. Provisional Application Ser. No. 62/297,454 filed Feb. 19, 2016, both of which are incorporated herein by reference in their respective entireties for all purposes.

BACKGROUND

Neuromorphic processing has advanced sufficiently to enable its cost-effective use in performing routine tasks that were once solely addressed by non-neuromorphic instruction-based processing based on the execution of a series of instructions, rather than through use of a neural network. In various areas in which some minimal degree of inaccuracy in the results of processing large amounts of data is deemed acceptable, the use of neural networks of sufficient size and complexity to perform a function may enable one or more orders of magnitude in improvement of processing speed.

Distributed development of task routines and the performance of analysis tasks using pooled task routines with pooled data has advanced to an extent that the addition of mechanisms for organization of development and to provide oversight for reproducibility and accountability have become increasingly desired. In various scientific, technical and other areas, the quantities of data employed in performing analysis tasks have become ever larger, thereby making desirable the pooling of data objects to enable collaboration, share costs and/or improve access. Also, such large quantities of data, by virtue of the amount and detail of the information they contain, have become of such value that it has become desirable to find as many uses as possible for such data in peer reviewing and in as wide a variety of analysis tasks. Thus, the pooling of components of analysis routines to enable reuse, oversight and error checking has also become desirable.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes a first processor and a first storage to store first instructions that, when executed by the first processor, cause the first processor to perform operations including, perform a testing job flow with a testing data set at least partly within a testing federated area to test a neural network trained to perform an analytical function, wherein: the neural network is defined by neural network configuration data that specifies a hyperparameter comprising at least one of a quantity of artificial neurons within the neural network or a quantity of rows of the artificial neurons into which the artificial neurons are organized within the neural network; the neural network configuration data also specifies a trained parameter comprising at least one of weight values of the artificial neurons, bias values of the artificial neurons or firing patterns of the artificial neurons; the testing data set comprises multiple sets of input values and corresponding multiple sets of output values generated from a previous performance of the analytical function with the multiple sets of input values; the performance of the testing job flow comprises multiple iterations of execution, by the first processor, of instructions of at least one testing routine; during each iteration of execution of at least one testing routine, the first processor is caused to provide a set of input values of the testing data set to the neural network, and to analyze an output of the neural network generated from the set of input values relative to the corresponding set of output values of the testing data to determine a degree of accuracy of the performance of the analytical function by the neural network; and the testing federated area is maintained within one or more storage devices to store at least one of the at least one testing routine, the testing data set or a testing job flow definition that defines the testing job flow. The first processor is also caused to perform a transfer flow to transfer an object indicative of results of the testing of the neural network from the testing federated area to another federated area, wherein the performance of the transfer flow comprises at least one iteration of execution, by the first processor, of instructions of at least one transfer routine that causes the first processor to: in response to the degree of accuracy falling below a predetermined minimum threshold, select a training federated area that is maintained by the one or more storage devices, and in which the neural network was at least partly trained, to be the other federated area to which the object is to be transferred, and transfer the object to the selected other federated area, wherein the object comprises at least one of a data value that specifies the degree of accuracy, at least one set of input values of the testing data set associated with inaccurate output, at least one set of output values of the testing data set associated with inaccurate output, or inaccurate output generated from at least one set of input values of the testing data set; and in response to the degree of accuracy exceeding a predetermined maximum threshold, select a usage federated area that is maintained by the one or more storage devices, and in which the neural network is to be made available for use, and transfer the object to the selected other federated area, wherein the object comprises a copy of the neural network configuration data.

During performance of the transfer flow, the first processor is caused, by execution of the at least one transfer routine, to receive the neural network configuration data from the training federated area after completion of the training of the neural network at partly within the training federated area; and during performance of the testing job flow, the first processor is caused, by execution of at least one testing setup routine of the testing job flow, to use the neural network configuration data to instantiate the neural network in preparation for the multiple iterations of execution of the at least one testing routine. The apparatus may further include a graphics processing unit (GPU) that comprises multiple processing cores that are programmable to operate as the artificial neurons, wherein the first processor is caused by execution of the at least one testing setup routine to use the neural network configuration data to instantiate the neural network among the artificial neurons of the multiple processing cores of the GPU. The apparatus may further include a field-programmable gate array (FPGA) or an application-specific integrated circuit (ASIC) to implement the artificial neurons with hardware components, wherein the first processor is caused by execution of the at least one testing setup routine to load the neural network configuration data into the FPGA or the ASIC to instantiate the neural network therein. The apparatus may further include a second processor and a second storage to store second instructions that, when executed by the second processor, cause the second processor to perform operations including: perform a training job flow with a training data set to train the neural network at least partly within the training federated area; and cooperate with the first processor to perform the transfer flow, wherein the cooperation comprises performing operations including monitor the training of the neural network, and in response to completion of the training, transfer the neural network configuration data from the training federated area to the testing federated area. During performance of the training job flow, the second processor may be caused, by execution of at least one training setup routine of the training job flow, to select a first set of hyperparameters to define the neural network; and in response to the transfer of the object from the testing federated area to the training federated area in response to the degree of accuracy falling below the minimum threshold, the second processor is caused, by execution of the at least one training setup routine to select a second set of hyperparameters to define the neural network that differs from the first set of hyperparameters.

During performance of the transfer flow, the first processor may be caused, by execution of the at least one transfer routine, and in response to the degree of accuracy falling between the minimum threshold and the maximum threshold, to perform operations including: cease performance of the testing job flow; use backpropagation and at least a portion of the testing data set to further train the neural network; and recommence performance of the testing job flow following the further training. The first processor may be caused, by execution of the at least one transfer routine, and in response to the degree of accuracy falling below the minimum threshold, to perform operations including: perform a regression analysis of at least a portion of the testing data set associated with inaccurate output by the neural network; and select data generated by the regression analysis as the object to be transmitted to the training federated area. The one or more storage devices may maintain a tree of federated areas that comprises the training federated area, the testing federated area and the usage federated area; the training federated area may be located within a first branch of the tree; the testing federated area may be located within a second branch of the tree; the usage federated area may be located within one of a third branch of the tree, and a base federated area of the tree or an intermediate federated area of the tree from which the first branch and the second branch extend; and access to the usage federated area is less restricted than to the training federated area and the testing federated area. The first processor may be caused, by each iteration of execution of the at least one testing routine, to derive a least mean square (LMS) error during the analysis of an output of the neural network relative to a corresponding set of output values of the testing data.

A computer-program product tangibly embodied in a non-transitory machine-readable storage medium, the computer-program product including first instructions operable to cause a first processor to perform operations including perform a testing job flow with a testing data set at least partly within a testing federated area to test a neural network trained to perform an analytical function, wherein: the neural network is defined by neural network configuration data that specifies a hyperparameter comprising at least one of a quantity of artificial neurons within the neural network or a quantity of rows of the artificial neurons into which the artificial neurons are organized within the neural network; the neural network configuration data also specifies a trained parameter comprising at least one of weight values of the artificial neurons, bias values of the artificial neurons or firing patterns of the artificial neurons; the testing data set comprises multiple sets of input values and corresponding multiple sets of output values generated from a previous performance of the analytical function with the multiple sets of input values; the performance of the testing job flow comprises multiple iterations of execution, by the first processor, of instructions of at least one testing routine; during each iteration of execution of at least one testing routine, the first processor is caused to provide a set of input values of the testing data set to the neural network, and to analyze an output of the neural network generated from the set of input values relative to the corresponding set of output values of the testing data to determine a degree of accuracy of the performance of the analytical function by the neural network; and the testing federated area is maintained within one or more storage devices to store at least one of the at least one testing routine, the testing data set or a testing job flow definition that defines the testing job flow. The first processor is further caused to: perform a transfer flow to transfer an object indicative of results of the testing of the neural network from the testing federated area to another federated area, wherein the performance of the transfer flow comprises at least one iteration of execution, by the first processor, of instructions of at least one transfer routine that causes the first processor to: in response to the degree of accuracy falling below a predetermined minimum threshold, select a training federated area that is maintained by the one or more storage devices, and in which the neural network was at least partly trained, to be the other federated area to which the object is to be transferred, and transfer the object to the selected other federated area, wherein the object comprises at least one of a data value that specifies the degree of accuracy, at least one set of input values of the testing data set associated with inaccurate output, at least one set of output values of the testing data set associated with inaccurate output, or inaccurate output generated from at least one set of input values of the testing data set; and in response to the degree of accuracy exceeding a predetermined maximum threshold, select a usage federated area that is maintained by the one or more storage devices, and in which the neural network is to be made available for use, and transfer the object to the selected other federated area, wherein the object comprises a copy of the neural network configuration data.

During performance of the transfer flow, the first processor may be caused, by execution of the at least one transfer routine, to receive the neural network configuration data from the training federated area after completion of the training of the neural network at partly within the training federated area; and during performance of the testing job flow, the first processor is caused, by execution of at least one testing setup routine of the testing job flow, to use the neural network configuration data to instantiate the neural network in preparation for the multiple iterations of execution of the at least one testing routine. The first processor may be caused, by execution of the at least one testing setup routine, to use the neural network configuration data to instantiate the neural network among the artificial neurons provided by multiple processing cores of a graphics processing unit (GPU) that are programmable to operate as the artificial neurons. A field-programmable gate array (FPGA) or an application-specific integrated circuit (ASIC) may implement the artificial neurons with hardware components; and the first processor may be caused by execution of the at least one testing setup routine to load the neural network configuration data into the FPGA or the ASIC to instantiate the neural network therein. The computer-program product may further include second instructions that, when executed by a second processor, cause the second processor to perform operations including: perform a training job flow with a training data set to train the neural network at least partly within the training federated area; and cooperate with the first processor to perform the transfer flow, wherein the cooperation comprises performing operations including monitor the training of the neural network, and in response to completion of the training, transfer the neural network configuration data from the training federated area to the testing federated area. During performance of the training job flow, the second processor may be caused, by execution of at least one training setup routine of the training job flow, to select a first set of hyperparameters to define the neural network; and in response to the transfer of the object from the testing federated area to the training federated area in response to the degree of accuracy falling below the minimum threshold, the second processor may be caused, by execution of the at least one training setup routine to select a second set of hyperparameters to define the neural network that differs from the first set of hyperparameters.

During performance of the transfer flow, the first processor may be caused, by execution of the at least one transfer routine, and in response to the degree of accuracy falling between the minimum threshold and the maximum threshold, to perform operations including: cease performance of the testing job flow; use backpropagation and at least a portion of the testing data set to further train the neural network; and recommence performance of the testing job flow following the further training. The first processor may be caused, by execution of the at least one transfer routine, and in response to the degree of accuracy falling below the minimum threshold, to perform operations including: perform a regression analysis of at least a portion of the testing data set associated with inaccurate output by the neural network; and select data generated by the regression analysis as the object to be transmitted to the training federated area. The one or more storage devices may maintain a tree of federated areas that includes the training federated area, the testing federated area and the usage federated area; the training federated area is located within a first branch of the tree; the testing federated area is located within a second branch of the tree; the usage federated area is located within one of a third branch of the tree, and a base federated area of the tree or an intermediate federated area of the tree from which the first branch and the second branch extend; and access to the usage federated area is less restricted than to the training federated area and the testing federated area. The first processor may be caused, by each iteration of execution of the at least one testing routine, to derive a least mean square (LMS) error during the analysis of an output of the neural network relative to a corresponding set of output values of the testing data.

A computer-implemented method includes performing, by a first processor, a testing job flow with a testing data set at least partly within a testing federated area to test a neural network trained to perform an analytical function, wherein: the neural network is defined by neural network configuration data that specifies a hyperparameter comprising at least one of a quantity of artificial neurons within the neural network or a quantity of rows of the artificial neurons into which the artificial neurons are organized within the neural network; the neural network configuration data also specifies a trained parameter comprising at least one of weight values of the artificial neurons, bias values of the artificial neurons or firing patterns of the artificial neurons; the testing data set comprises multiple sets of input values and corresponding multiple sets of output values generated from a previous performance of the analytical function with the multiple sets of input values; the performance of the testing job flow comprises executing multiple iterations, by the first processor, of instructions of at least one testing routine; the method further comprises, during each iteration of execution of at least one testing routine, providing a set of input values of the testing data set to the neural network, and analyzing an output of the neural network generated from the set of input values relative to the corresponding set of output values of the testing data to determine a degree of accuracy of the performance of the analytical function by the neural network; and the testing federated area is maintained within one or more storage devices to store at least one of the at least one testing routine, the testing data set or a testing job flow definition that defines the testing job flow. The method also includes performing, by the first processor, a transfer flow to transfer an object indicative of results of the testing of the neural network from the testing federated area to another federated area, wherein the performance of the transfer flow comprises executing at least one iteration, by the first processor, of instructions of at least one transfer routine, wherein the method further includes: in response to the degree of accuracy falling below a predetermined minimum threshold, selecting a training federated area that is maintained by the one or more storage devices, and in which the neural network was at least partly trained, to be the other federated area to which the object is to be transferred, and transferring the object to the selected other federated area, wherein the object comprises at least one of a data value that specifies the degree of accuracy, at least one set of input values of the testing data set associated with inaccurate output, at least one set of output values of the testing data set associated with inaccurate output, or inaccurate output generated from at least one set of input values of the testing data set; or in response to the degree of accuracy exceeding a predetermined maximum threshold, selecting a usage federated area that is maintained by the one or more storage devices, and in which the neural network is to be made available for use, and transferring the object to the selected other federated area, wherein the object comprises a copy of the neural network configuration data.

The computer-implemented method may further include: during performance of the transfer flow, executing by the first processor, the at least one transfer routine to receive the neural network configuration data from the training federated area after completion of the training of the neural network at partly within the training federated area; and during performance of the testing job flow, executing by the first processor, at least one testing setup routine of the testing job flow to use the neural network configuration data to instantiate the neural network in preparation for the multiple iterations of execution of the at least one testing routine. The computer-implemented method may further include executing, by the first processor, the at least one testing setup routine to use the neural network configuration data to instantiate the neural network among the artificial neurons provided by multiple processing cores of a graphics processing unit (GPU) that are programmable to operate as the artificial neurons. A field-programmable gate array (FPGA) or an application-specific integrated circuit (ASIC) may implement the artificial neurons with hardware components; and the method may further include executing, by the first processor, the at least one testing setup routine to load the neural network configuration data into the FPGA or the ASIC to instantiate the neural network therein. The computer-implemented method may further include: performing, by a second processor, a training job flow with a training data set to train the neural network at least partly within the training federated area; and cooperating, by the second processor, with the first processor to perform the transfer flow, wherein the cooperation may include monitoring, by the second processor, the training of the neural network, and in response to completion of the training, transferring, by the second processor, the neural network configuration data from the training federated area to the testing federated area. The computer-implemented method may further include: during performance of the training job flow, executing by the second processor, at least one training setup routine of the training job flow to select a first set of hyperparameters to define the neural network; and in response to the transfer of the object from the testing federated area to the training federated area in response to the degree of accuracy falling below the minimum threshold, executing by the second processor, the at least one training setup routine to select a second set of hyperparameters to define the neural network that differs from the first set of hyperparameters.

The computer-implemented method may further include, during performance of the transfer flow, executing by the first processor the at least one transfer routine, and in response to the degree of accuracy falling between the minimum threshold and the maximum threshold, performing operations, by the first processor, including ceasing performance of the testing job flow; using backpropagation and at least a portion of the testing data set to further train the neural network; and recommencing performance of the testing job flow following the further training. The computer-implemented method may further include executing, by the first processor, the at least one transfer routine, and in response to the degree of accuracy falling below the minimum threshold, performing operations including: performing, by the first processor, a regression analysis of at least a portion of the testing data set associated with inaccurate output by the neural network; and selecting data generated by the regression analysis as the object to be transmitted to the training federated area. The one or more storage devices may maintain a tree of federated areas that comprises the training federated area, the testing federated area and the usage federated area; the training federated area may be located within a first branch of the tree; the testing federated area may be located within a second branch of the tree; the usage federated area may be located within one of a third branch of the tree, and a base federated area of the tree or an intermediate federated area of the tree from which the first branch and the second branch extend; and access to the usage federated area may be less restricted than to the training federated area and the testing federated area. The computer-implemented method may further include, during each iteration of execution of the at least one testing routine, deriving by the first processor, a least mean square (LMS) error during the analysis of an output of the neural network relative to a corresponding set of output values of the testing data.

An apparatus includes a processor and a storage to store instructions that, when executed by the processor, cause the processor to perform operations including receive, at a portal, and from a remote device via a network, a request to repeat an earlier performance, described in a first instance log stored in one or more federated areas, of a first job flow defined in a first job flow definition stored in the one or more federated areas, or to provide objects to the remote device to enable the remote device to repeat the earlier performance, wherein: the portal is provided on the network to control access by the remote device to the one or more federated areas via the network; the one or more federated areas are maintained within one or more storage devices to store multiple data sets, multiple job flow definitions, multiple task routines, multiple result reports or multiple instance logs; and the request specifies a first instance log identifier of the first instance log. The processor is also caused to perform operations including: use the first instance log identifier to retrieve the first instance log from among the multiple instance logs stored in the one or more federated areas, wherein the first instance log comprises a first job flow identifier of the first job flow definition, a task routine identifier for each task routine used to perform a task specified in the first job flow definition, and a data object identifier for each data object associated with the earlier performance of the first job flow; and analyze the first job flow definition to determine whether performances of the first job flow comprise use of a neural network. The processor is further caused to perform operations including, in response to a determination that performances of the first job flow do comprise use of a neural network, analyze an object associated with the first job flow to determine whether the neural network was trained to perform an analytical function using a training data set derived from at least one performance of a second job flow defined by a second job flow definition stored in the one or more federated areas, wherein: the object associated with the first job flow comprises at least one of the first job flow definition, the first instance log, or a task routine executed during the earlier performance of the first job flow; and performances of the second job flow comprise performances of the analytical function in a manner that does not use a neural network. The processor is still further caused to perform operations including, in response to the request comprising a request to repeat the earlier performance, in response to a determination that performances of the first job flow do comprise use of a neural network, and in response to a determination that the neural network was trained using a training data set derived from at least one performance of the second job flow, the processor is caused to perform operations including: repeat the earlier performance of the first job flow with one or more data sets associated with the earlier performance of the first job flow, wherein the repetition of the earlier performance of the first job flow comprises execution, by the processor, of each task routine identified by a task routine identifier in the first instance log; perform the second job flow with the one or more data sets associated with the earlier performance of the first job flow, wherein the performance of the second job flow comprises execution, by the processor, of a most recent version of a task routine to perform each task identified by a flow task identifier in the second job flow definition; analyze an output of the repetition of the earlier performance of the first job flow relative to a corresponding output of the performance of the second job flow to determine a degree of accuracy in performing the analytical function; and transmit at least the output of the repetition of the earlier performance of the first job flow and an indication of the degree of accuracy to the requesting device.

The processor may be further caused to perform operations including: use the first job flow identifier within the first instance log to retrieve the first job flow definition from the one or more federated areas; for each task routine executed during the earlier performance of the first job flow to perform a corresponding task specified in the first job flow definition, use the corresponding task routine identifier within the first instance log to retrieve the task routine from the one or more federated areas; and for each data object employed as an input to the earlier performance of the first job flow, use the corresponding data object identifier within the first instance log to retrieve the data object from the one or more federated areas. The processor may be further caused to, in response to the request comprising a request to provide objects to the remote device to enable the remote device to repeat the earlier performance, transmit, to the requesting device, at least the first job flow definition, each task routine executed during the earlier performance of the first job flow, and each data object employed as an input to the earlier performance of the first job flow. The processor may be further caused to, in response to the request comprising a request to repeat the earlier performance of the first job flow, perform operations including: for each data object generated during the earlier performance of the first job flow, use the corresponding data object identifier within the first instance log to retrieve the data object from the one or more federated areas, and analyze a corresponding data object generated during the repetition of the earlier performance relative to a corresponding data object generated during the earlier performance; and transmit, to the requesting device, an indication of results of the analysis of at least one data object generated during the repetition of the earlier performance relative to at least one corresponding data object generated during the earlier performance. The processor may be further caused, in response to the determination that performances of the first job flow do comprise use of a neural network, and in response to a determination that the neural network was trained using a training data set derived from at least one performance of the second job flow, to perform operations including: use a second job flow identifier provided within the selected object associated with the first job flow to retrieve the second job flow definition from the one or more federated areas; for each task specified by a corresponding flow task identifier in the second job flow definition, use the corresponding flow task identifier to retrieve a most recent version of a corresponding task routine from the one or more federated areas; and in response to the request comprising a request to provide objects to the remote device to enable the remote device to repeat the earlier performance, transmit, to the requesting device, at least the second job flow definition and the most recent version of task routine corresponding to each task specified in the second job flow definition. The processor may be further caused, in response to the determination that performances of the first job flow do comprise use of a neural network, and in response to a determination that the neural network was trained using a training data set derived from at least one performance of the second job flow, to perform operations including: use a second instance log identifier provided within the selected object associated with the first job flow to retrieve a second instance log that describes the at least one performance of the second job flow from the one or more federated areas; use a second job flow identifier provided within the second instance log to retrieve the second job flow definition from the one or more federated areas; for each task routine executed during the at least one performance of the second job flow to perform a corresponding task specified in the second job flow definition, use the corresponding task routine identifier within the second instance log to retrieve the task routine from the one or more federated areas; and in response to the request comprising a request to provide objects to the remote device to enable the remote device to repeat the earlier performance, transmit, to the requesting device, at least the second job flow definition and each task routine executed during the at least one performance of the second job flow. The processor may be further caused, in response to the request comprising a request to repeat the earlier performance, in response to a determination that performances of the first job flow do comprise use of a neural network, and in response to a determination that the neural network was trained using a training data set derived from at least one performance of the second job flow, to perform operations including: for each data object associated with the at least one performance of the second job flow and that became part of the training data set used to train the neural network of the first job flow, use the corresponding data object identifier within the second instance log to retrieve the data object from the one or more federated areas; perform a regression analysis of the training data set to identify one or more characteristics of the training data set; and transmit an indication of the identified one or more characteristics to the requesting device.

The processor may be further caused, in response to the determination that performances of the first job flow do comprise use of a neural network, to perform operations including: perform a regression analysis with a first one of the one or more data sets associated with the earlier performance of the first job flow that was employed as an input to the earlier performance, and with a second one of the one or more data sets associated with the earlier performance that was generated during the earlier performance to identify one or more characteristics of the combination of the first and second ones of the one or more data sets; and transmit an indication of the identified one or more characteristics to the requesting device. At least one data set associated with the earlier performance of the first job flow may include neural network configuration data that comprises at least one of a hyperparameter or a trained parameter; and in response to the determination that performances of the first job flow do comprise use of a neural network, the processor may be caused to transmit the neural network configuration data to the requesting device.

The processor may be caused, in response to a determination that performances of the first job flow do include use of a neural network, and in response to a determination that the neural network of the first job flow was trained using a training data set derived from at least one performance of the second job flow, to perform operations including: use a third job flow identifier provided within the selected object associated with the first job flow to retrieve, from the one or more federated areas, a third job flow definition that defines a third job flow to test the neural network or a third instance log identifier that identifies an instance log that describes a performance of the third job flow to test the neural network; retrieve, from the one or more storage devices, data objects associated with the performance of the third job flow and that became part of a testing data set used to test the neural network; and transmit, to the requesting device, the testing data set or an indication of one or more characteristics of the testing set that are identified in a regression analysis of the testing data set.

A computer-program product tangibly embodied in a non-transitory machine-readable storage medium, the computer-program product including instructions operable to cause a processor to perform operations including receive, at a portal, and from a remote device via a network, a request to repeat an earlier performance, described in a first instance log stored in one or more federated areas, of a first job flow defined in a first job flow definition stored in the one or more federated areas, or to provide objects to the remote device to enable the remote device to repeat the earlier performance, wherein: the portal is provided on the network to control access by the remote device to the one or more federated areas via the network; the one or more federated areas are maintained within one or more storage devices to store multiple data sets, multiple job flow definitions, multiple task routines, multiple result reports or multiple instance logs; and the request specifies a first instance log identifier of the first instance log. The processor is also caused to: use the first instance log identifier to retrieve the first instance log from among the multiple instance logs stored in the one or more federated areas, wherein the first instance log comprises a first job flow identifier of the first job flow definition, a task routine identifier for each task routine used to perform a task specified in the first job flow definition, and a data object identifier for each data object associated with the earlier performance of the first job flow; and analyze the first job flow definition to determine whether performances of the first job flow comprise use of a neural network. The processor is further caused to, in response to a determination that performances of the first job flow do comprise use of a neural network, analyze an object associated with the first job flow to determine whether the neural network was trained to perform an analytical function using a training data set derived from at least one performance of a second job flow defined by a second job flow definition stored in the one or more federated areas, wherein: the object associated with the first job flow comprises at least one of the first job flow definition, the first instance log, or a task routine executed during the earlier performance of the first job flow; and performances of the second job flow comprise performances of the analytical function in a manner that does not use a neural network. The processor is still further caused to, in response to the request comprising a request to repeat the earlier performance, in response to a determination that performances of the first job flow do comprise use of a neural network, and in response to a determination that the neural network was trained using a training data set derived from at least one performance of the second job flow, the processor is caused to perform operations including: repeat the earlier performance of the first job flow with one or more data sets associated with the earlier performance of the first job flow, wherein the repetition of the earlier performance of the first job flow comprises execution, by the processor, of each task routine identified by a task routine identifier in the first instance log; perform the second job flow with the one or more data sets associated with the earlier performance of the first job flow, wherein the performance of the second job flow comprises execution, by the processor, of a most recent version of a task routine to perform each task identified by a flow task identifier in the second job flow definition; analyze an output of the repetition of the earlier performance of the first job flow relative to a corresponding output of the performance of the second job flow to determine a degree of accuracy in performing the analytical function; and transmit at least the output of the repetition of the earlier performance of the first job flow and an indication of the degree of accuracy to the requesting device.

The processor may be caused to perform operations including: use the first job flow identifier within the first instance log to retrieve the first job flow definition from the one or more federated areas; for each task routine executed during the earlier performance of the first job flow to perform a corresponding task specified in the first job flow definition, use the corresponding task routine identifier within the first instance log to retrieve the task routine from the one or more federated areas; and for each data object employed as an input to the earlier performance of the first job flow, use the corresponding data object identifier within the first instance log to retrieve the data object from the one or more federated areas. The processor may be caused to, in response to the request comprising a request to provide objects to the remote device to enable the remote device to repeat the earlier performance, transmit, to the requesting device, at least the first job flow definition, each task routine executed during the earlier performance of the first job flow, and each data object employed as an input to the earlier performance of the first job flow. The processor may be caused to, in response to the request comprising a request to repeat the earlier performance of the first job flow, perform operations including: for each data object generated during the earlier performance of the first job flow, use the corresponding data object identifier within the first instance log to retrieve the data object from the one or more federated areas, and analyze a corresponding data object generated during the repetition of the earlier performance relative to a corresponding data object generated during the earlier performance; and transmit, to the requesting device, an indication of results of the analysis of at least one data object generated during the repetition of the earlier performance relative to at least one corresponding data object generated during the earlier performance. The processor may be caused, in response to the determination that performances of the first job flow do comprise use of a neural network, and in response to a determination that the neural network was trained using a training data set derived from at least one performance of the second job flow, to perform operations including: use a second job flow identifier provided within the selected object associated with the first job flow to retrieve the second job flow definition from the one or more federated areas; for each task specified by a corresponding flow task identifier in the second job flow definition, use the corresponding flow task identifier to retrieve a most recent version of a corresponding task routine from the one or more federated areas; and in response to the request comprising a request to provide objects to the remote device to enable the remote device to repeat the earlier performance, transmit, to the requesting device, at least the second job flow definition and the most recent version of task routine corresponding to each task specified in the second job flow definition. The processor may be caused, in response to the determination that performances of the first job flow do comprise use of a neural network, and in response to a determination that the neural network was trained using a training data set derived from at least one performance of the second job flow, to perform operations including: use a second instance log identifier provided within the selected object associated with the first job flow to retrieve a second instance log that describes the at least one performance of the second job flow from the one or more federated areas; use a second job flow identifier provided within the second instance log to retrieve the second job flow definition from the one or more federated areas; for each task routine executed during the at least one performance of the second job flow to perform a corresponding task specified in the second job flow definition, use the corresponding task routine identifier within the second instance log to retrieve the task routine from the one or more federated areas; and in response to the request comprising a request to provide objects to the remote device to enable the remote device to repeat the earlier performance, transmit, to the requesting device, at least the second job flow definition and each task routine executed during the at least one performance of the second job flow. The processor may be caused, in response to the request comprising a request to repeat the earlier performance, in response to a determination that performances of the first job flow do include use of a neural network, and in response to a determination that the neural network was trained using a training data set derived from at least one performance of the second job flow, to perform operations including: for each data object associated with the at least one performance of the second job flow and that became part of the training data set used to train the neural network of the first job flow, use the corresponding data object identifier within the second instance log to retrieve the data object from the one or more federated areas; perform a regression analysis of the training data set to identify one or more characteristics of the training data set; and transmit an indication of the identified one or more characteristics to the requesting device.

The processor may be caused, in response to the determination that performances of the first job flow do comprise use of a neural network, to perform operations including: perform a regression analysis with a first one of the one or more data sets associated with the earlier performance of the first job flow that was employed as an input to the earlier performance, and with a second one of the one or more data sets associated with the earlier performance that was generated during the earlier performance to identify one or more characteristics of the combination of the first and second ones of the one or more data sets; and transmit an indication of the identified one or more characteristics to the requesting device. At least one data set associated with the earlier performance of the first job flow may include neural network configuration data that comprises at least one of a hyperparameter or a trained parameter; and in response to the determination that performances of the first job flow do comprise use of a neural network, the processor may be caused to transmit the neural network configuration data to the requesting device. The processor may be caused, in response to a determination that performances of the first job flow do comprise use of a neural network, and in response to a determination that the neural network of the first job flow was trained using a training data set derived from at least one performance of the second job flow, to perform operations including: use a third job flow identifier provided within the selected object associated with the first job flow to retrieve, from the one or more federated areas, a third job flow definition that defines a third job flow to test the neural network or a third instance log identifier that identifies an instance log that describes a performance of the third job flow to test the neural network; retrieve, from the one or more storage devices, data objects associated with the performance of the third job flow and that became part of a testing data set used to test the neural network; and transmit, to the requesting device, the testing data set or an indication of one or more characteristics of the testing set that are identified in a regression analysis of the testing data set.

A computer-implemented method includes receiving, by a processor at a portal, and from a remote device via a network, a request to repeat an earlier performance, described in a first instance log stored in one or more federated areas, of a first job flow defined in a first job flow definition stored in the one or more federated areas, or to provide objects to the remote device to enable the remote device to repeat the earlier performance, wherein: the portal is provided on the network to control access by the remote device to the one or more federated areas via the network; the one or more federated areas are maintained within one or more storage devices to store multiple data sets, multiple job flow definitions, multiple task routines, multiple result reports or multiple instance logs; and the request specifies a first instance log identifier of the first instance log. The method also includes using the first instance log identifier to retrieve the first instance log from among the multiple instance logs stored in the one or more federated areas, wherein the first instance log comprises a first job flow identifier of the first job flow definition, a task routine identifier for each task routine used to perform a task specified in the first job flow definition, and a data object identifier for each data object associated with the earlier performance of the first job flow; and analyzing, by the processor, the first job flow definition to determine whether performances of the first job flow comprise use of a neural network. The method further includes in response to a determination that performances of the first job flow do comprise use of a neural network, analyzing, by the processor, an object associated with the first job flow to determine whether the neural network was trained to perform an analytical function using a training data set derived from at least one performance of a second job flow defined by a second job flow definition stored in the one or more federated areas, wherein: the object associated with the first job flow comprises at least one of the first job flow definition, the first instance log, or a task routine executed during the earlier performance of the first job flow; and performances of the second job flow comprise performances of the analytical function in a manner that does not use a neural network. The method still further includes in response to the request comprising a request to repeat the earlier performance, in response to a determination that performances of the first job flow do comprise use of a neural network, and in response to a determination that the neural network was trained using a training data set derived from at least one performance of the second job flow, performing operations including: repeating, by the processor, the earlier performance of the first job flow with one or more data sets associated with the earlier performance of the first job flow, wherein the repetition of the earlier performance of the first job flow comprises execution, by the processor, of each task routine identified by a task routine identifier in the first instance log; performing, by the processor, the second job flow with the one or more data sets associated with the earlier performance of the first job flow, wherein the performance of the second job flow comprises execution, by the processor, of a most recent version of a task routine to perform each task identified by a flow task identifier in the second job flow definition; analyzing, by the processor, an output of the repetition of the earlier performance of the first job flow relative to a corresponding output of the performance of the second job flow to determine a degree of accuracy in performing the analytical function; and transmitting, from the processor, at least the output of the repetition of the earlier performance of the first job flow and an indication of the degree of accuracy to the requesting device.

The method may include: using the first job flow identifier within the first instance log to retrieve the first job flow definition from the one or more federated areas; for each task routine executed during the earlier performance of the first job flow to perform a corresponding task specified in the first job flow definition, using the corresponding task routine identifier within the first instance log to retrieve the task routine from the one or more federated areas; and for each data object employed as an input to the earlier performance of the first job flow, using the corresponding data object identifier within the first instance log to retrieve the data object from the one or more federated areas. The method may include, in response to the request comprising a request to provide objects to the remote device to enable the remote device to repeat the earlier performance, transmitting, from the processor and to the requesting device, at least the first job flow definition, each task routine executed during the earlier performance of the first job flow, and each data object employed as an input to the earlier performance of the first job flow. The method may include, in response to the request comprising a request to repeat the earlier performance of the first job flow, performing operations including: for each data object generated during the earlier performance of the first job flow, using the corresponding data object identifier within the first instance log to retrieve the data object from the one or more federated areas, and analyzing, by the processor, a corresponding data object generated during the repetition of the earlier performance relative to a corresponding data object generated during the earlier performance; and transmitting, from the processor and to the requesting device, an indication of results of the analysis of at least one data object generated during the repetition of the earlier performance relative to at least one corresponding data object generated during the earlier performance. The method may further include, in response to the determination that performances of the first job flow do comprise use of a neural network, and in response to a determination that the neural network was trained using a training data set derived from at least one performance of the second job flow, performing operations including: using a second job flow identifier provided within the selected object associated with the first job flow to retrieve the second job flow definition from the one or more federated areas; for each task specified by a corresponding flow task identifier in the second job flow definition, using the corresponding flow task identifier to retrieve a most recent version of a corresponding task routine from the one or more federated areas; and in response to the request comprising a request to provide objects to the remote device to enable the remote device to repeat the earlier performance, transmitting, from the processor and to the requesting device, at least the second job flow definition and the most recent version of task routine corresponding to each task specified in the second job flow definition. The method may further include, in response to the determination that performances of the first job flow do comprise use of a neural network, and in response to a determination that the neural network was trained using a training data set derived from at least one performance of the second job flow, performing operations including: using a second instance log identifier provided within the selected object associated with the first job flow to retrieve a second instance log that describes the at least one performance of the second job flow from the one or more federated areas; using a second job flow identifier provided within the second instance log to retrieve the second job flow definition from the one or more federated areas; for each task routine executed during the at least one performance of the second job flow to perform a corresponding task specified in the second job flow definition, using the corresponding task routine identifier within the second instance log to retrieve the task routine from the one or more federated areas; and in response to the request comprising a request to provide objects to the remote device to enable the remote device to repeat the earlier performance, transmitting, from the processor and to the requesting device, at least the second job flow definition and each task routine executed during the at least one performance of the second job flow. The method may further include, in response to the request comprising a request to repeat the earlier performance, in response to a determination that performances of the first job flow do comprise use of a neural network, and in response to a determination that the neural network was trained using a training data set derived from at least one performance of the second job flow, performing operations including: for each data object associated with the at least one performance of the second job flow and that became part of the training data set used to train the neural network of the first job flow, using the corresponding data object identifier within the second instance log to retrieve the data object from the one or more federated areas; performing, by the processor, a regression analysis of the training data set to identify one or more characteristics of the training data set; and transmitting, from the processor, an indication of the identified one or more characteristics to the requesting device.

The method may further include, in response to the determination that performances of the first job flow do comprise use of a neural network, performing operations including: performing, by the processor, a regression analysis with a first one of the one or more data sets associated with the earlier performance of the first job flow that was employed as an input to the earlier performance, and with a second one of the one or more data sets associated with the earlier performance that was generated during the earlier performance to identify one or more characteristics of the combination of the first and second ones of the one or more data sets; and transmitting, from the processor, an indication of the identified one or more characteristics to the requesting device. The method may further include: at least one data set associated with the earlier performance of the first job flow comprises neural network configuration data that comprises at least one of a hyperparameter or a trained parameter; and the method comprises, in response to the determination that performances of the first job flow do comprise use of a neural network, transmitting the neural network configuration data from the processor and to the requesting device. The method may further include, in response to a determination that performances of the first job flow do comprise use of a neural network, and in response to a determination that the neural network of the first job flow was trained using a training data set derived from at least one performance of the second job flow, performing operations including: using a third job flow identifier provided within the selected object associated with the first job flow to retrieve, from the one or more federated areas, a third job flow definition that defines a third job flow to test the neural network or a third instance log identifier that identifies an instance log that describes a performance of the third job flow to test the neural network; retrieving, from the one or more storage devices, data objects associated with the performance of the third job flow and that became part of a testing data set used to test the neural network; and transmitting, from the processor and to the requesting device, the testing data set or an indication of one or more characteristics of the testing set that are identified in a regression analysis of the testing data set.

An apparatus includes a processor and a storage to store instructions that, when executed by the processor, cause the processor to perform operations including: receive a first request to perform an analytical function with a first data set comprising multiple sets of input values to generate multiple corresponding sets of output values; assign, as part of a first assignment of processing resources, at least a portion of currently available instruction-based processing resources to a first non-neuromorphic performance of the analytical function with the first data set, and with at least a predetermined level of throughput, through execution of instructions implementing the analytical function by one or more processor cores; and after the assignment of instruction-based processing resources to the first non-neuromorphic performance, analyze a state of remaining processing resources. The processor is also caused to, in response to current availability of sufficient remaining processing resources to enable a first neuromorphic performance of the analytical function with at least a subset of the sets of input values of the first data set through use of a neural network defined by at least a set of hyperparameters, and at least partly in parallel with the first non-neuromorphic performance: assign, as part of the first assignment, at least a portion of the remaining processing resources to the first neuromorphic performance; analyze the sets of output values generated from the subset of the sets of input values by the first neuromorphic performance relative to corresponding sets of output values generated by the first non-neuromorphic performance to determine a first degree of accuracy of the neural network in performing the analytical function; and in response to at least the first degree of accuracy exceeding a predetermined higher threshold, in response to receipt of a second request from a requesting device to perform the analytical function with a second data set comprising multiple sets of input values to generate multiple corresponding sets of output values, and in response to current availability of sufficient processing resources to enable a second neuromorphic performance of the analytical function with the second data set through use of the neural network, and with at least the predetermined level of throughput, the processor is caused to perform further operations: The further actions include: assign, as part of a second assignment of processing resources, at least a portion of currently available processing resources to the second neuromorphic performance; after the assignment of processing resources to the second neuromorphic performance, analyze a state of remaining instruction-based processing resources currently available; and in response to current availability of sufficient remaining instruction-based processing resources to enable a second non-neuromorphic performance of the analytical function with at least a subset of the sets of input values of the second data set through execution of instructions implementing the analytical function by one or more processor cores, and at least partly in parallel with the second neuromorphic performance, the processor is caused to perform still further operations. The still further operations include: assign, as part of the second assignment, at least a portion of the remaining instruction-based processing resources to the second non-neuromorphic performance; analyze the sets of output values generated from the subset of the sets of input values by the second neuromorphic performance relative to corresponding sets of output values generated by the second non-neuromorphic performance to determine a second degree of accuracy of the neural network in performing the analytical function; and in response to at least the second degree of accuracy exceeding the predetermined higher threshold, transmit the multiple sets of output values generated from the second data set by the second neuromorphic performance to the requesting device.

The assignment of instruction-based processing resources to the first non-neuromorphic performance may include an assignment of one or more processor cores of one or more processors comprising at least one of one or more central processing units (CPUs), or one or more graphics processing units (GPUs). The one or more processor cores of the one or more processors may be processors distributed among multiple node devices of a grid of node devices; and the assignment of instruction-based processing resources to the first non-neuromorphic performance may include an assignment of processing resources of the multiple node devices to the first non-neuromorphic performance. The assignment of at least a portion of remaining processing resources to the first neuromorphic performance may include an assignment of at least a subset of one or more remaining processor cores, or an assignment of at least a portion of each of one or more neuromorphic devices; each of the remaining processor cores may be programmable to instantiate at least a portion of the neural network; each of the neuromorphic devices may include at least one of a field-programmable gate array (FPGA), or an application-specific integrated circuit (ASIC); and each of the neuromorphic devices may include sets of circuits that each implement an artificial neuron able to be included in the neural network.

The set of hyperparameters may specify a quantity of artificial neurons within the neural network; and the analysis of the state of remaining processing resources after the assignment of instruction-based processing resources to the first non-neuromorphic performance may include a determination of whether sufficient processing resources are available to instantiate the specified quantity of artificial neurons. The processor may be caused, in response to at least the second degree of accuracy exceeding the predetermined higher threshold, in response to receipt of a third request from a requesting device to perform the analytical function with a third data set comprising multiple sets of input values to generate multiple corresponding sets of output values, and in response to current availability of sufficient processing resources to enable a third neuromorphic performance of the analytical function with the third data set through use of the neural network, and with at least the predetermined level of throughput, to: assign, as part of a third assignment of processing resources, at least a portion of currently available processing resources to the third neuromorphic performance; and refrain from assigning processing resources to a third non-neuromorphic performance of the analytical function with the third data set through execution of instructions implementing the analytical function by one or more processor cores.

The processor may be caused, in response to at least the first degree of accuracy falling below a predetermined lower threshold that is lower than the predetermined higher threshold, provide an indication that the performance of the analytical function by the neural network is deemed insufficiently accurate to be used. The processor may be caused, in response to at least the first degree of accuracy falling below the predetermined higher threshold and above the predetermined lower threshold, to perform operations including: assign at least a portion of currently available processing resources to instantiating the neural network in a training mode; and use backpropagation to train the neural network with the multiple sets of input values of the first data set and the corresponding multiple sets of output values generated by the first non-neuromorphic performance. The first neuromorphic performance and the first non-neuromorphic performance may occur at least partly within a testing federated area maintained by one or more storage devices to store the first data set, a first neuromorphic job flow definition, at least one task routine to perform at least one task defined by the first neuromorphic job flow definition, a first non-neuromorphic job flow definition, and at least one task routine to perform at least one task defined by the first non-neuromorphic job flow definition; the neural network may be trained at least partly within a training federated area maintained by the one or more storage devices to store at least one training data set, a training job flow definition, and at least one task routine to perform at least one task defined by the training job flow definition; and in response to at least the first degree of accuracy falling below the predetermined lower threshold, the processor may be caused to transfer the indication that the performance of the analytical function by the neural network is deemed insufficiently accurate to be used from the testing federated area to the training federated area to trigger retraining of the neural network within another set of hyperparameters. The second neuromorphic performance and the second non-neuromorphic performance may occur at least partly within a usage federated area maintained by the one or more storage devices to store the second data set, a second neuromorphic job flow definition, at least one task routine to perform at least one task defined by the second neuromorphic job flow definition, a second non-neuromorphic job flow definition, and at least one task routine to perform at least one task defined by the second non-neuromorphic job flow definition; and in response to at least the second degree of accuracy exceeding the predetermined higher threshold, the processor may be caused to transfer neural network configuration data that defines the neural network from the testing federated area to the usage federated area to enable instantiation of the neural network to support the second neuromorphic performance.

A computer-program product tangibly embodied in a non-transitory machine-readable storage medium, the computer-program product including instructions operable to cause a processor to perform operations including: receive a first request to perform an analytical function with a first data set comprising multiple sets of input values to generate multiple corresponding sets of output values; assign, as part of a first assignment of processing resources, at least a portion of currently available instruction-based processing resources to a first non-neuromorphic performance of the analytical function with the first data set, and with at least a predetermined level of throughput, through execution of instructions implementing the analytical function by one or more processor cores; and after the assignment of instruction-based processing resources to the first non-neuromorphic performance, analyze a state of remaining processing resources. The processor is also caused to, in response to current availability of sufficient remaining processing resources to enable a first neuromorphic performance of the analytical function with at least a subset of the sets of input values of the first data set through use of a neural network defined by at least a set of hyperparameters, and at least partly in parallel with the first non-neuromorphic performance: assign, as part of the first assignment, at least a portion of the remaining processing resources to the first neuromorphic performance; analyze the sets of output values generated from the subset of the sets of input values by the first neuromorphic performance relative to corresponding sets of output values generated by the first non-neuromorphic performance to determine a first degree of accuracy of the neural network in performing the analytical function; and in response to at least the first degree of accuracy exceeding a predetermined higher threshold, in response to receipt of a second request from a requesting device to perform the analytical function with a second data set comprising multiple sets of input values to generate multiple corresponding sets of output values, and in response to current availability of sufficient processing resources to enable a second neuromorphic performance of the analytical function with the second data set through use of the neural network, and with at least the predetermined level of throughput, the processor is caused to perform further operations: The further actions include: assign, as part of a second assignment of processing resources, at least a portion of currently available processing resources to the second neuromorphic performance; after the assignment of processing resources to the second neuromorphic performance, analyze a state of remaining instruction-based processing resources currently available; and in response to current availability of sufficient remaining instruction-based processing resources to enable a second non-neuromorphic performance of the analytical function with at least a subset of the sets of input values of the second data set through execution of instructions implementing the analytical function by one or more processor cores, and at least partly in parallel with the second neuromorphic performance, the processor is caused to perform still further operations. The still further operations include: assign, as part of the second assignment, at least a portion of the remaining instruction-based processing resources to the second non-neuromorphic performance; analyze the sets of output values generated from the subset of the sets of input values by the second neuromorphic performance relative to corresponding sets of output values generated by the second non-neuromorphic performance to determine a second degree of accuracy of the neural network in performing the analytical function; and in response to at least the second degree of accuracy exceeding the predetermined higher threshold, transmit the multiple sets of output values generated from the second data set by the second neuromorphic performance to the requesting device.

The assignment of instruction-based processing resources to the first non-neuromorphic performance may include an assignment of one or more processor cores of one or more processors comprising at least one of one or more central processing units (CPUs), or one or more graphics processing units (GPUs). The one or more processor cores of the one or more processors may be processors distributed among multiple node devices of a grid of node devices; and the assignment of instruction-based processing resources to the first non-neuromorphic performance may include an assignment of processing resources of the multiple node devices to the first non-neuromorphic performance. The assignment of at least a portion of remaining processing resources to the first neuromorphic performance may include an assignment of at least a subset of one or more remaining processor cores, or an assignment of at least a portion of each of one or more neuromorphic devices; each of the remaining processor cores may be programmable to instantiate at least a portion of the neural network; each of the neuromorphic devices may include at least one of a field-programmable gate array (FPGA), or an application-specific integrated circuit (ASIC); and each of the neuromorphic devices may include sets of circuits that each implement an artificial neuron able to be included in the neural network.

The set of hyperparameters may specify a quantity of artificial neurons within the neural network; and the analysis of the state of remaining processing resources after the assignment of instruction-based processing resources to the first non-neuromorphic performance may include a determination of whether sufficient processing resources are available to instantiate the specified quantity of artificial neurons. The computer-program product of claim 11, wherein the processor may be caused, in response to at least the second degree of accuracy exceeding the predetermined higher threshold, in response to receipt of a third request from a requesting device to perform the analytical function with a third data set comprising multiple sets of input values to generate multiple corresponding sets of output values, and in response to current availability of sufficient processing resources to enable a third neuromorphic performance of the analytical function with the third data set through use of the neural network, and with at least the predetermined level of throughput, to: assign, as part of a third assignment of processing resources, at least a portion of currently available processing resources to the third neuromorphic performance; and refrain from assigning processing resources to a third non-neuromorphic performance of the analytical function with the third data set through execution of instructions implementing the analytical function by one or more processor cores.

The processor may be caused, in response to at least the first degree of accuracy falling below a predetermined lower threshold that is lower than the predetermined higher threshold, provide an indication that the performance of the analytical function by the neural network is deemed insufficiently accurate to be used. The processor may be caused, in response to at least the first degree of accuracy falling below the predetermined higher threshold and above the predetermined lower threshold, to perform operations including: assign at least a portion of currently available processing resources to instantiating the neural network in a training mode; and use backpropagation to train the neural network with the multiple sets of input values of the first data set and the corresponding multiple sets of output values generated by the first non-neuromorphic performance. The first neuromorphic performance and the first non-neuromorphic performance may occur at least partly within a testing federated area maintained by one or more storage devices to store the first data set, a first neuromorphic job flow definition, at least one task routine to perform at least one task defined by the first neuromorphic job flow definition, a first non-neuromorphic job flow definition, and at least one task routine to perform at least one task defined by the first non-neuromorphic job flow definition; the neural network may be trained at least partly within a training federated area maintained by the one or more storage devices to store at least one training data set, a training job flow definition, and at least one task routine to perform at least one task defined by the training job flow definition; and in response to at least the first degree of accuracy falling below the predetermined lower threshold, the processor may be caused to transfer the indication that the performance of the analytical function by the neural network is deemed insufficiently accurate to be used from the testing federated area to the training federated area to trigger retraining of the neural network within another set of hyperparameters. The second neuromorphic performance and the second non-neuromorphic performance may occur at least partly within a usage federated area maintained by the one or more storage devices to store the second data set, a second neuromorphic job flow definition, at least one task routine to perform at least one task defined by the second neuromorphic job flow definition, a second non-neuromorphic job flow definition, and at least one task routine to perform at least one task defined by the second non-neuromorphic job flow definition; and in response to at least the second degree of accuracy exceeding the predetermined higher threshold, the processor may be caused to transfer neural network configuration data that defines the neural network from the testing federated area to the usage federated area to enable instantiation of the neural network to support the second neuromorphic performance.

A computer-implemented method includes: receiving, by a processor, a first request to perform an analytical function with a first data set comprising multiple sets of input values to generate multiple corresponding sets of output values; assigning, by the processor and as part of a first assignment of processing resources, at least a portion of currently available instruction-based processing resources to a first non-neuromorphic performance of the analytical function with the first data set, and with at least a predetermined level of throughput, through execution of instructions implementing the analytical function by one or more processor cores; and after the assignment of instruction-based processing resources to the first non-neuromorphic performance, analyzing, by the processor, a state of remaining processing resources. The method further includes, in response to current availability of sufficient remaining processing resources to enable a first neuromorphic performance of the analytical function with at least a subset of the sets of input values of the first data set through use of a neural network defined by at least a set of hyperparameters, and at least partly in parallel with the first non-neuromorphic performance: assigning, by the processor and as part of the first assignment, at least a portion of the remaining processing resources to the first neuromorphic performance; analyzing, by the processor, the sets of output values generated from the subset of the sets of input values by the first neuromorphic performance relative to corresponding sets of output values generated by the first non-neuromorphic performance to determine a first degree of accuracy of the neural network in performing the analytical function; and in response to at least the first degree of accuracy exceeding a predetermined higher threshold, in response to receipt of a second request from a requesting device to perform the analytical function with a second data set comprising multiple sets of input values to generate multiple corresponding sets of output values, and in response to current availability of sufficient processing resources to enable a second neuromorphic performance of the analytical function with the second data set through use of the neural network, and with at least the predetermined level of throughput, performing further operations. The further operations include: assigning, by the processor and as part of a second assignment of processing resources, at least a portion of currently available processing resources to the second neuromorphic performance; after the assignment of processing resources to the second neuromorphic performance, analyzing, by the processor, a state of remaining instruction-based processing resources currently available; and in response to current availability of sufficient remaining instruction-based processing resources to enable a second non-neuromorphic performance of the analytical function with at least a subset of the sets of input values of the second data set through execution of instructions implementing the analytical function by one or more processor cores, and at least partly in parallel with the second neuromorphic performance, performing still further operations. The still further operations include: assigning, by the processor and as part of the second assignment, at least a portion of the remaining instruction-based processing resources to the second non-neuromorphic performance; analyzing, by the processor, the sets of output values generated from the subset of the sets of input values by the second neuromorphic performance relative to corresponding sets of output values generated by the second non-neuromorphic performance to determine a second degree of accuracy of the neural network in performing the analytical function; and in response to at least the second degree of accuracy exceeding the predetermined higher threshold, transmitting, from the processor, the multiple sets of output values generated from the second data set by the second neuromorphic performance to the requesting device.

The assignment of instruction-based processing resources to the first non-neuromorphic performance may include an assignment of one or more processor cores of one or more processors comprising at least one of one or more central processing units (CPUs), or one or more graphics processing units (GPUs). The one or more processor cores of the one or more processors may be processors distributed among multiple node devices of a grid of node devices; and the assignment of instruction-based processing resources to the first non-neuromorphic performance may include an assignment of processing resources of the multiple node devices to the first non-neuromorphic performance. The assignment of at least a portion of remaining processing resources to the first neuromorphic performance may include an assignment of at least a subset of one or more remaining processor cores, or an assignment of at least a portion of each of one or more neuromorphic devices; each of the remaining processor cores may be programmable to instantiate at least a portion of the neural network; each of the neuromorphic devices may include at least one of a field-programmable gate array (FPGA), or an application-specific integrated circuit (ASIC); and each of the neuromorphic devices may include sets of circuits that each implement an artificial neuron able to be included in the neural network.

The set of hyperparameters may specify a quantity of artificial neurons within the neural network; and the analysis of the state of remaining processing resources after the assignment of instruction-based processing resources to the first non-neuromorphic performance may include a determination of whether sufficient processing resources are available to instantiate the specified quantity of artificial neurons. The computer-implemented method may further include in response to at least the second degree of accuracy exceeding the predetermined higher threshold, in response to receipt of a third request from a requesting device to perform the analytical function with a third data set comprising multiple sets of input values to generate multiple corresponding sets of output values, and in response to current availability of sufficient processing resources to enable a third neuromorphic performance of the analytical function with the third data set through use of the neural network, and with at least the predetermined level of throughput, performing operations including: assigning, by the processor and as part of a third assignment of processing resources, at least a portion of currently available processing resources to the third neuromorphic performance; and refraining from assigning processing resources to a third non-neuromorphic performance of the analytical function with the third data set through execution of instructions implementing the analytical function by one or more processor cores.

The computer-implemented method may further include, in response to at least the first degree of accuracy falling below a predetermined lower threshold that is lower than the predetermined higher threshold, providing an indication that the performance of the analytical function by the neural network is deemed insufficiently accurate to be used. The computer-implemented method may further include, in response to at least the first degree of accuracy falling below the predetermined higher threshold and above the predetermined lower threshold, performing operations including: assigning, by the processor, at least a portion of currently available processing resources to instantiating the neural network in a training mode; and using backpropagation to train the neural network with the multiple sets of input values of the first data set and the corresponding multiple sets of output values generated by the first non-neuromorphic performance. The computer-implemented method may further include: the first neuromorphic performance and the first non-neuromorphic performance occur at least partly within a testing federated area maintained by one or more storage devices to store the first data set, a first neuromorphic job flow definition, at least one task routine to perform at least one task defined by the first neuromorphic job flow definition, a first non-neuromorphic job flow definition, and at least one task routine to perform at least one task defined by the first non-neuromorphic job flow definition; the neural network was trained at least partly within a training federated area maintained by the one or more storage devices to store at least one training data set, a training job flow definition, and at least one task routine to perform at least one task defined by the training job flow definition; and in response to at least the first degree of accuracy falling below the predetermined lower threshold, transferring the indication that the performance of the analytical function by the neural network is deemed insufficiently accurate to be used from the testing federated area to the training federated area to trigger retraining of the neural network within another set of hyperparameters. The computer-implemented method may further include: the second neuromorphic performance and the second non-neuromorphic performance occur at least partly within a usage federated area maintained by the one or more storage devices to store the second data set, a second neuromorphic job flow definition, at least one task routine to perform at least one task defined by the second neuromorphic job flow definition, a second non-neuromorphic job flow definition, and at least one task routine to perform at least one task defined by the second non-neuromorphic job flow definition; and in response to at least the second degree of accuracy exceeding the predetermined higher threshold, transferring neural network configuration data that defines the neural network from the testing federated area to the usage federated area to enable instantiation of the neural network to support the second neuromorphic performance.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 16A, 16B, 16C, 16D and 16E, together, illustrate an example formation of a hierarchical set of federated areas.

FIGS. 17A, 17B, 17C, 17D, 17E and 17F, together, illustrate an example of defining and documenting a performance of a job flow.

FIGS. 19A and 19B each illustrate an example of organization of object identifiers.

FIGS. 21A, 21B and 21C, together, illustrate an example formation of a transfer area.

FIGS. 24A, 24B and 24C, together, illustrate an example transition from non-neuromorphic processing to neuromorphic processing to perform an analytical function.

FIGS. 27A, 27B, 27C, 27D, 27E, 27F, 27G and 27H, together, illustrate examples of automated transfers of objects associated with training and testing of a neural network.

FIGS. 28A, 28B, 28C, 28D, 28E and 28F, together, illustrate an example embodiment of a logic flow of a federated device storing objects in a federated area.

FIGS. 30A and 30B, together, illustrate still another example embodiment of a logic flow of a federated device storing objects in a federated area.

FIGS. 33A and 33B, together, illustrate an example embodiment of a logic flow of a federated device performing a job flow.

FIG. 36 illustrates an example embodiment of a logic flow of an automated transfer of object(s) between two federated areas.

FIGS. 37A and 37B, together, illustrate an example embodiment of a logic flow of an automated transfer of object(s) associated with a neural network between two federated areas.

FIG. 39 illustrates an example embodiment of a logic flow of testing a neural network.

FIGS. 40A, 40B and 40C, together, illustrate another example embodiment of a logic flow of another automated transfer of object(s) associated with a neural network between two federated areas.

DETAILED DESCRIPTION

Figure 1:
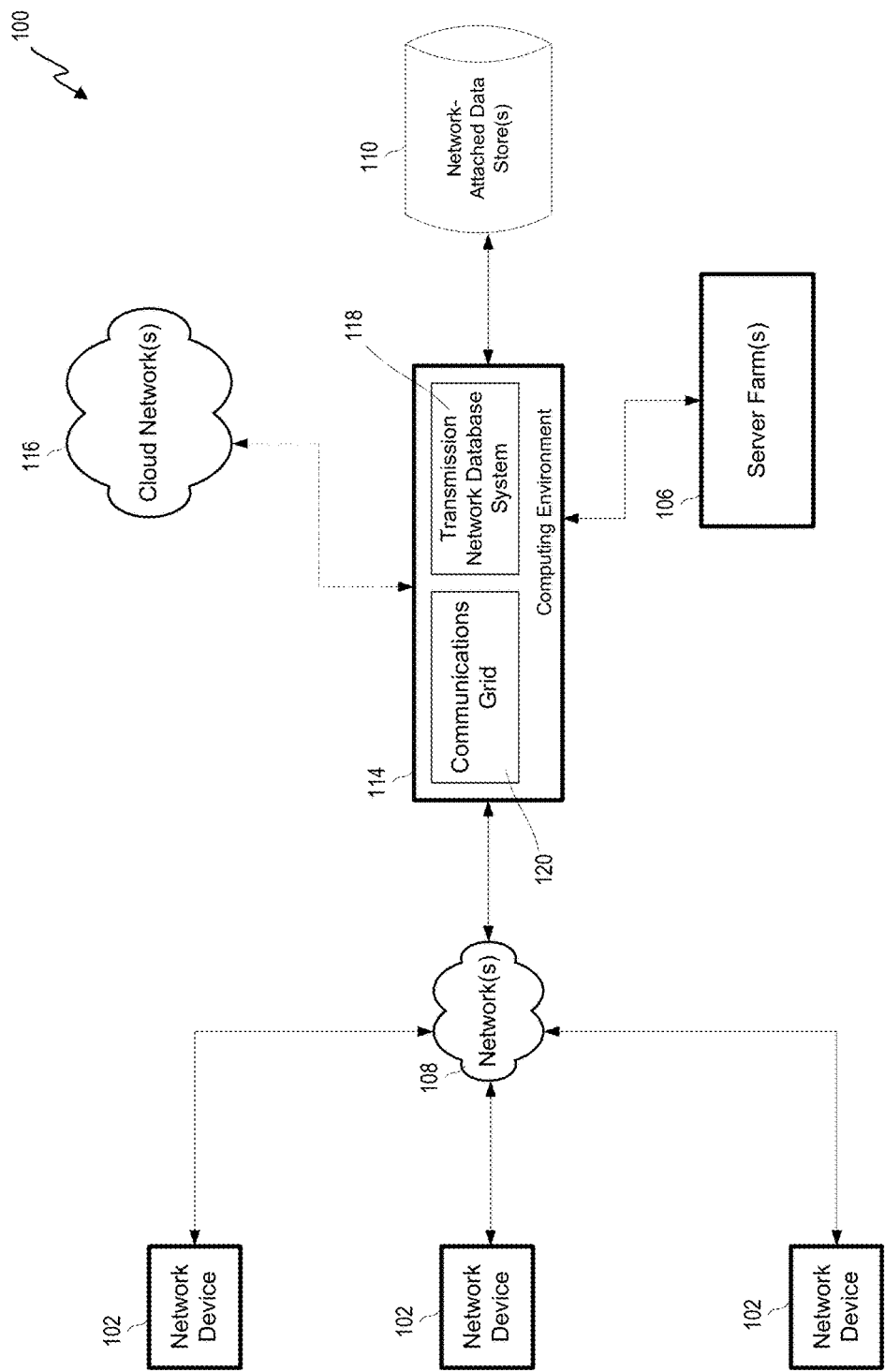
FIG. 1 illustrates a block diagram that provides an illustration of the hardware components of a computing system, according to some embodiments of the present technology.

Various embodiments described herein are generally directed to techniques for improving accountability, reproducibility and ease of access in the use of pooled data and pooled routines to perform analyses of pooled data. Network accessible gridded storage may be employed to maintain one or more federated areas with controlled access for data objects and task routines where various rules are imposed to provide access security while improving ease of access, and to maintain interoperability while allowing updates to be made. One or more federated devices may provide a portal to control access to data objects and task routines within each of the federated areas, including control over types of accesses made, to prevent unauthorized additions, changes and/or deletions. The one or more federated devices may maintain instance logs that document instances of activities performed with data objects and task routines to provide a reviewable audit trail of the steps in conducting analyses, as well as confirmation of the conditions under which analyses are performed. However, these features of the federated area(s) may be provided by the one or more federated devices in a manner that improves ease of use in both the performance of and subsequent review of complex analyses with large quantities of data.

Various embodiments described herein are also generally directed to techniques for more granular control of access to, and improved collaboration in the development of, pooled data and pooled routines to perform analyses of pooled data. Network accessible gridded storage may be employed to maintain a set of federated areas with a set of defined relationships thereamong that correspond to differing levels of restriction of access and various automated relationships in the handling of objects thereamong. A hierarchy among a set of federated areas may be defined in which there is progressively greater restriction in access from a base federated area with widely granted access to at least one private federated area with greatly restricted access, with one or more intermediate federated areas therebetween with corresponding intermediate levels of granted access. Multiple linear hierarchies of federated areas may be combined to form a tree of federated areas, starting with a base federated area at its root, and in which the branching within the tree through intermediate federated areas and to private federated areas may be defined to correspond to a manner in which collaboration among individuals and/or other entities is overseen and/or controlled.

Various embodiments described herein are also generally directed to techniques for generating and using directed acyclic graphs (DAGs) in the development of task routines to implement tasks and/or job flow definitions that control the use of multiple task routines to perform job flows. A DAG may be generated from comments incorporated into the programming code of one or more task routines that provide a human readable description of at least inputs and/or outputs of each of the one or more task routines. Where a DAG is generated from the comments of more than one task routine, and where those comments identify specific objects as inputs and outputs, the DAG may be generated to visually depict dependencies among multiple task routines. A DAG so generated from one or more task routines may be employed by developers of task routines as a visual guide to the functionality and/or interdependencies of task routines that are under development and/or that are under consideration for inclusion in a job flow. Alternatively or additionally, a DAG so generated may be employed by one or more federated devices to guide aspects of the execution of interdependent task routines during the performance of a job flow and/or to provide at least a portion of the definition of a job flow.

More specifically, the storage of objects (e.g., data objects, task routines, job flow definitions, instance logs of performances of analyses, and/or DAGs) may be effected using a grid of storage devices that are coupled to and/or incorporated into one or more federated devices. The grid of storage devices may provide distributed storage for data objects that include large data sets, complex sets of task routines for the performance of various analyses, and/or instance logs that document an extensive history of performances of analyses. Such distributed storage may be used to provide one or both of fault tolerance and/or faster access through the use of parallelism. In various embodiments, the objects stored within a federated area or a set of federated areas may be organized in any of a variety of ways. By way of example, one or more databases may be defined by the one or more federated devices to improve efficiency in accessing data objects, task routines and/or instance logs of performances of analyses.

The one or more federated devices may define at least some of the storage space provided by the storage device grid as providing federated area(s) to which access is controlled by the one or more federated devices (or one or more other devices separately providing access control) in accordance with various rules. By way of example, access to a federated area may be limited to one or more particular authorized persons and/or one or more particular authorized entities (e.g., scholastic entities, governmental entities, business entities, etc.). Alternatively or additionally, access to a federated area may be limited to one or more particular authorized devices that may be operated under the control of one or more particular persons and/or entities. Also by way of example, various aspects of the access provided to a federated area may be controlled, including and not limited to, the selection of objects within a federated area that may be accessed and/or types of activities that may be performed with one or more particular objects to which access may be granted. By way of example, a particular person, entity and/or device may be permitted to access a particular subset of the objects stored within a federated area, and/or may be permitted to employ one or more particular objects in the performance of an analysis, but may not be permitted to alter and/or delete those one or more particular objects.

In some embodiments, the use of a federated area may be limited to the storage and retrieval of objects with controlled access. In such embodiments, the one or more federated devices may provide a portal accessible to other devices via a network for use in storing and retrieving objects associated with the performances of analyses by other devices. More specifically, one or more source devices may access the portal through the network to provide the one or more federated devices with the data objects, task routines, job flow definitions, DAGs and/or instance logs associated with completed performances of analyses by the one or more source devices for storage within one or more federated areas for the purpose of memorializing the details of those performances. Subsequently, one or more reviewing devices may access the portal through the network to retrieve such objects from one or more federated area through the one or more federated devices for the purpose of independently confirming aspects of such the performances.

In other embodiments, the use of at least one federated area may include the performance of analyses by the one or more federated devices using the objects stored therein. In such other embodiments, the one or more federated devices may receive requests from other devices to perform analyses via the portal, and may provide indications of the results of such performances to those other devices via the portal.

More specifically, in response to such a request, the one or more federated devices may execute a combination of task routines specified in a job flow definition within a federated area to perform an analysis with one or more data objects, all of which are stored in one or more federated areas. In so doing, the one or more federated devices may generate an instance log for storage within one of the one or more federated area that documents the performances of the analysis, including indications of data objects used and/or generated, indications of task routines executed, and an indication of the job flow definition that specifies the task routines to be executed to perform the analysis. In some of such other embodiments, the one or more federated devices may be nodes of a grid of federated devices across which tasks of a requested performance of an analysis may be distributed. The provision of a grid of the federated devices may make available considerable shared processing and/or storage resources to allow such a grid to itself perform complex analyses of large quantities of data, while still allowing a detailed review of aspects of the performance of that analysis in situations where questions may arise concerning data quality, correctness of assumptions made and/or coding errors.

Among the objects that may be stored in a federated area may be numerous data objects that may include data sets. Each data set may be made up of any of a variety of types of data concerning any of a wide variety of subjects. By way of example, a data set may include scientific observation data concerning geological and/or meteorological events, or from sensors in laboratory experiments in areas such as particle physics. By way of another example, a data set may include indications of activities performed by a random sample of individuals of a population of people in a selected country or municipality, or of a population of a threatened species under study in the wild. By way of still another example, a data set may include data descriptive of a neural network, such as weights and biases of the nodes of a neural network that may have been derived through a training process in which the neural network is trained to perform a function.

Regardless of the types of data each such data set may contain, some data sets stored in a federated area may include data sets employed as inputs to the performance of one or more analyses, and may include data sets provided to the one or more federated devices for storage within a federated area as input data sets. Other data sets stored in a federated area may include data sets that are generated as outputs of the performance of one or more analyses. It should be noted that some data sets that serve as inputs to the performance of one analysis may be generated as an output of an earlier performance of another analysis. Still other data sets may be both generated and used as input during a single performance of an analysis, such as a data set generated by the performance of one task of an analysis for use by one or more other tasks of that same analysis. Such data sets that are both generated and used during a single performance of an analysis may exist only temporarily within a federated area in embodiments in which analyses are performed within federated area(s) by the one or more federated devices. In other embodiments in which analyses are performed by other devices outside of federated area(s), such data sets may not be stored, even temporarily, within a federated area.

One of the rules imposed by the one or more federated devices may be that storage within a federated area of executable instructions for the performance of analysis requires that the analysis itself be defined as a set of tasks that are to be performed in an order defined as a job flow. More precisely, executable instructions for the performance of an analysis may be required to be stored as a set of task routines and a job flow definition that specifies aspects of how the set of task routines are executed together to perform the analysis. In some embodiments, the definition of each task routine may include definitions of the inputs and outputs thereof. In a job flow definition, each task to be performed may be assigned a flow task identifier, and each task routine that is to perform a particular task may be assigned the flow task identifier of that particular task to make each task routine retrievable by the flow task identifier of the task it performs. Thus, each performance of an analysis may entail a parsing of the job flow definition for that analysis to retrieve the flow task identifiers of the tasks to be performed, and may then entail the retrieval of a task routine required to perform each of those tasks.

As will also be explained in greater detail, such breaking up of an analysis into a job flow made up of tasks performed by task routines that are stored in federated area(s) may be relied upon to enable code reuse in which individual task routines may be shared among the job flows of multiple analyses. Such reuse of a task routine originally developed for one analysis by another analysis may be very simply effected by specifying the flow task identifier of the corresponding task in the job flow definition for the other analysis. Additionally, reuse may extend to the job flow definitions, themselves, as the availability of job flow definitions in a federated area may obviate the need to develop of a new analysis routine where there is a job flow definition already available that defines the tasks to be performed in an analysis that may be deemed suitable. Thus, among the objects that may be stored in a federated area may be numerous selectable and reusable task routines and job flow definitions.

In some embodiments, job flow definitions may be stored within federated area(s) as a file or other type of data structure in which a job flow definition is represented as a DAG. Alternatively or additionally, a file or other type of data structure may be used that organizes aspects of a job flow definition in a manner that enables a DAG to be directly derived therefrom. Such a file or data structure may directly indicate an order of performance of tasks, or may specify dependencies between inputs and outputs of each task to enable an order of performance to be derived. By way of example, an array may be used in which there is an entry for each task routine that includes specifications of its inputs, its outputs and/or dependencies on data objects that may be provided as one or more outputs of one or more other task routines. Thus, a DAG may be usable to visually portray the relative order in which specified tasks are to be performed, while still being interpretable by federated devices and/or other devices that may be employed to perform the portrayed analysis. Such a form of a job flow definition may be deemed desirable to enable an efficient presentation of the job flow on a display of a reviewing device as a DAG. Thus, review of aspects of a performance of an analysis may be made easier by such a representation of a job flow.

The tasks that may be performed by any of the numerous tasks routines may include any of a variety of data analysis tasks, including and not limited to searches for one or more particular data items, and/or statistical analyses such as aggregation, identifying and quantifying trends, subsampling, calculating values that characterize at least a subset of the data items within a data object, deriving models, testing hypothesis with such derived models, making predictions, generating simulated samples, etc. The tasks that may be performed may also include any of a variety of data transformation tasks, including and not limited to, sorting operations, row and/or column-based mathematical operations, filtering of rows and/or columns based on the values of data items within a specified row or column, and/or reordering of at least a specified subset of data items within a data object into a specified ascending, descending or other order. Alternatively or additionally, the tasks that may be performed by any of the numerous task routines may include any of a variety of data normalization tasks, including and not limited to, normalizing time values, date values, monetary values, character spacing, use of delimiter characters and/or codes, and/or other aspects of formatting employed in representing data items within one or more data objects. The tasks performed may also include, and are not limited to, normalizing use of big or little Endian encoding of binary values, use or lack of use of sign bits, the quantity of bits to be employed in representations of integers and/or floating point values (e.g., bytes, words, doublewords or quadwords), etc.

The analyses that may be defined by the job flow definitions as job flows may be any of a wide variety of types of analyses that may include any of a wide variety of combinations of analysis, normalization and/or transformation tasks. The result reports generated through performances of the tasks as directed by each of the job flow definitions may include any of a wide variety of quantities and/or sizes of data. In some embodiments, one or more of the result reports generated may contain one or more data sets that may be provided as inputs to the performances of still other analyses, and/or may be provided to a reviewing device to be presented on a display thereof in any of a wide variety of types of visualization. In other embodiments, each of one or more of the result reports generated may primarily include an indication of a prediction and/or conclusion reached through the performance of an analysis that generated the result report as an output.

Also among the objects that may be stored in a federated area may be numerous instance logs that may each provide a record of various details of a single performance of a job flow that defines an analysis. More specifically, each instance log may provide indications of when a performance of a job flow occurred, along with identifiers of various objects stored within federated area(s) that were used and/or generated in that performance. Among those identifiers may be an identifier of the job flow definition that defines the job flow of the analysis performed, identifiers for all of the task routines executed in that performance, identifiers for any data objects employed as an input (e.g., input data sets), and identifiers for any data objects generated as an output (e.g., a result report that may include one or more output data sets). The one or more federated devices may assign such identifiers to data objects, task routines and/or job flow definitions as each is stored and/or generated within a federated area to enable such use of identifiers in the instance logs. In some embodiments, the identifier for each such object may be generated by taking a hash of at least a portion of that object to generate a hash value to be used as the identifier with at least a very high likelihood that the identifier generated for each such object is unique. Such use of a hash algorithm may have the advantage of enabling the generation of identifiers for objects that are highly likely to be unique with no other input than the objects, themselves, and this may aid in ensuring that such an identifier generated for an object by a federated device will be identical to the identifier that would be generated for the same object by another device.

It should be noted, however, that in the case of task routines, the identifiers assigned by the one or more federated devices to each of the task routines are not the same identifiers as the flow task identifiers that are employed by the job flow definitions to specify the tasks to be performed in a job flow. As will be explained in greater detail, for each task identified in a job flow definition by a flow task identifier, there may be multiple task routines to choose from to perform that task, and each of those task routines may be assigned a different identifier by the one or more federated devices to enable each of those task routines to be uniquely identified in an instance log.

Another of the rules imposed by the one or more federated devices may be that objects referred to within job flow definitions and/or instance logs that are stored within a federated area may not be permitted to be deleted from within the federated area. More precisely, to ensure that it remains possible to perform each of the job flows defined by a job flow definition stored in the federated area, the one or more federated devices may impose a restriction against the deletion of the task routines that have flow task identifiers that are referred to by any job flow definition stored within one or more federated areas. Correspondingly, to ensure that previous performances of job flows continue to be repeatable for purposes of review, the one or more federated devices may impose a restriction against the deletion of task routines, job flow definitions and data objects identified by their uniquely assigned identifiers within any instance log stored within one or more federated areas.

As a result of the imposition of such restrictions on the deletion of objects, the replacement of an already stored task routine with a new version of the task routine in a manner that entails the deletion of the already stored task routine may not be permitted. However, in some embodiments, the addition of updated versions of task routines to federated area(s) to coexist with older versions may be permitted to allow improvements to be made. By way of example, it may be deemed desirable to make improvements to a task routine to correct an error, to add an additional feature and/or to improve its efficiency. Doing so may entail the creation of a new version of the task routine that is given the same flow task identifier as an earlier version thereof to indicate that it performs the same task as the earlier version of the task routine. When provided to the one or more federated devices for storage, the flow task identifier given to the new version will provide an indication to the one or more federated devices that the newly created task routine is a new version of the earlier task routine already stored within the federated area. However, the one or more federated devices may still generate a unique identifier for the new version of the task routine to enable the new version to be uniquely identified in an instance log so as to make clear in an instance log which version of the task routine was used in particular the performance of a job flow.

In various embodiments, with job flow definitions, task routines, data objects and/or instance logs stored within one or more federated areas, the one or more federated devices may receive requests to employ such objects to perform analyses within a federated area and/or to provide such objects from federated area(s) to other devices to enable those other devices to perform analyses. Some requests may be to perform a specified job flow of an analysis with one or more specified data objects, or to provide another device with the objects needed to enable the performance by the other device of the specified job flow with the one or more specified data objects. Other requests may be to repeat an earlier performance of a job flow that begat a specified result report, or that entailed the use of a specific combination of a job flow and one or more data sets. Alternatively, other requests may be to provide another device with the objects needed to enable the other device to repeat an earlier performance of a job flow that begat a specified result report, or that entailed the use of a specific combination of a job flow and one or more data sets. Through the generation of identifiers for each of the various objects associated with each performance of a job flow, through the use of those identifiers to refer to such objects in instance logs, and through the use of those identifiers by the one or more federated devices in accessing such objects, requests for performances of analyses and/or for access to their associated objects are able to more efficiently identify particular performances, their associated objects and/or related objects.

In embodiments in which a request is received to perform a job flow of an analysis with one or more data objects (the corresponding job flow definition and the one or more data objects all identified in the request by their uniquely assigned identifiers), the one or more federated devices may analyze the instance logs stored in one or more federated areas to determine whether there was an earlier performance of the same job flow with the same one or more data objects. If there was such an earlier performance, then the result report generated as the output of that earlier performance may already be stored in a federated area. As long as none of the task routines executed in the earlier performance have been updated since the earlier performance, then a repeat performance of the same job flow with the same one or more data objects may not be necessary. Thus, if any instance logs are found for such an earlier performance, the one or more federated devices may analyze the instance log associated with the most recent earlier performance (if there has been more than one) to obtain the identifiers uniquely assigned to each of the task routines that were executed in that earlier performance. The one or more federated devices may then analyze each of the uniquely identified task routines to determine whether each of them continues to be the most current version stored in the federated area for use in performing its corresponding task. If so, then a repeated performance of the requested job flow with the one or more data objects identified in the request is not necessary, and the one or more federated devices may retrieve the result report generated in the earlier performance from a federated area and transmit that result report to the device from which the request was received.

However, if no instance logs are found for any earlier performance of the specified job flow with the specified one or more data objects where the earlier performance entailed the execution of the most current version of each of the task routines, then the one or more federated devices may perform the specified job flow with the specified data objects using the most current version of task routine for each task specified with a flow task identifier in the job flow definition. The one or more federated devices may then assign a unique identifier to and store the new result report generated during such a performance in a federated area, as well as transmit the new result report to the device from which the request was received. The one or more federated devices may also generate and store in a federated area a corresponding new instance log that specifies details of the performance, including the identifier of the job flow definition, the identifiers of all of the most current versions of task routines that were executed, the identifiers of the one or more data objects used as inputs and/or generated as outputs, and the identifier of the new result report that was generated.

In embodiments in which a request is received to provide objects to a requesting device to enable the requesting device (or still another device) to perform a job flow identified in the request by the identifier of the corresponding job flow definition with one or more data objects identified by their identifiers, the one or more federated devices may retrieve the requested objects from the federated area and transmit the requested objects to the requesting device. Those objects may include the identified job flow definition and the identified one or more data objects, along with the most current versions of the task routines required to perform each of the tasks specified in the job flow definition.

In embodiments in which a request is received to repeat a performance of a job flow of an analysis that begat a result report identified in the request by its uniquely assigned identifier, the one or more federated devices may analyze the instance logs stored in one or more federated areas to retrieve the instance log associated with the performance that resulted in the generation of the identified result report. The one or more federated devices may then analyze the retrieved instance log to obtain the identifiers for the job flow definition that defines the job flow, the identifiers for each of the task routines executed in the performance, and the identifiers of any data objects used as inputs in the performance. Upon retrieving the identified job flow definition, each of the identified task routines, and any identified data objects, the one or more federated devices may then execute the retrieved task routines, using the retrieved data objects, and in the manner defined by the retrieved job flow definition to repeat the performance of the job flow with those objects to generate a new result report. However, since the request was to repeat an earlier performance of the job flow with the very same objects, the new result report should be identical to the earlier result report generated in the original performance such that the new result report should be a regeneration of the earlier result report. The one or more federated devices may then assign an identifier to and store the new result report in a federated area, as well as transmit the new result report to the device from which the request was received. The one or more federated devices may also generate and store, in a federated area, a corresponding new instance log that specifies details of the new performance of the job flow, including the identifier of the job flow definition, the identifiers of all of the task routines that were executed, the identifiers of the one or more data objects used as inputs and/or generated as outputs, and the identifier of the new result report.

In embodiments in which a request is received to provide objects to a requesting device to enable the requesting device (or still another device) to repeat a performance of a job flow that begat a result report identified in the request by the identifier of the result report, the one or more federated devices may analyze the instance logs stored in one or more federated areas to retrieve the instance log associated with the performance that resulted in the generation of the identified result report. The one or more federated devices may then analyze the retrieved instance log to obtain the identifiers for the job flow definition that defines the job flow, the identifiers for each of the task routines executed in the performance, and the identifiers of any data objects used as inputs in the performance. Upon retrieving the identified job flow definition, each of the identified task routines, and any identified data objects, the one or more federated devices may then transmit those objects to the requesting device.

Through such a regime of rules restricting accesses that may be made to one or more federated areas, and through the use of unique identifiers for each object stored within one or more federated areas, objects such as data sets, task routines and job flow definitions are made readily available for reuse under conditions in which their ongoing integrity against inadvertent and/or deliberate alteration is assured. Updated versions of task routines may be independently created and stored within one or more federated areas in a manner that associates those updated versions with earlier versions without concern of accidental overwriting of earlier versions. The use of unique identifiers for every object that are able to be easily and consistently generated from the objects, themselves, serves to ensure consistency in the association of identifiers with the objects and prevent instances of accidental transposing of identifiers that may result in objects becoming irretrievable from within a federated area.

As a result of such pooling of data sets and task routines, new analyses may be more speedily created through reuse thereof by generating new job flows that identify already stored data sets and/or task routines. Additionally, where a task routine is subsequently updated, advantage may be automatically taken of that updated version in subsequent performances of each job flow that previously used the earlier version of that task routine. And yet, the earlier version of that task routine remains available to enable a comparative analysis of the results generated by the different versions if discrepancies therebetween are subsequently discovered.

As a result of such pooling of data sets, task routines and job flows, along with instance logs and result reports, repeated performances of a particular job flow with a particular data set can be avoided. Through use of identifiers uniquely associated with each object and recorded within each instance log, situations in which a requested performance of a particular job flow with a particular data set that has been previously performed can be more efficiently identified, and the result report generated by that previous performance can be more efficiently retrieved and made available in lieu of consuming time and processing resources to repeat that previous performance. And yet, if a question should arise as to the validity of the results of that previous performance, the data set(s), task routines and job flow definition on which that previous performance was based remain readily accessible for additional analysis to resolve that question.

Also, where there is no previous performance of a particular job flow with a particular data set such that there is no previously generated result report and/or instance log therefor, the processing resources of the grid of federated devices may be utilized to perform the particular job flow with the particular data set. The ready availability of the particular data set to the grid of federated devices enables such a performance without the consumption of time and network bandwidth resources that would be required to transmit the particular data set and other objects to the requesting device to enable a performance by the requesting device. Instead, the transmissions to the requesting device may be limited to the result report generated by the performance. Also, advantage may be taken of the grid of federated devices to cause the performance of one or more of the tasks of the job flow as multiple instances thereof in a distributed manner (e.g., at least partially in parallel) among multiple federated devices and/or among multiple threads of execution support by processor(s) within each such federated device.

As a result of the requirement that the data set(s), task routines and the job flow associated with each instance log be preserved, accountability for the validity of results of past performances of job flows with particular data sets is maintained. The sources of incorrect results, whether from invalid data, or from errors made in the creation of a task routine or a job flow, may be traced and identified. By way of example, an earlier performance of a particular job flow with a particular data set using earlier versions of task routines can be compared to a later performance of the same job flow with the same data set, but using newer versions of the same task routines, as part of an analysis to identify a possible error in a task routine. As a result, mistakes can be corrected and/or instances of malfeasance can be identified and addressed.

In various embodiments, the one or more federated devices may maintain a set of multiple related federated areas. The relationships among the federated areas may be such that a linear hierarchy is defined in which there is a base federated area with the least restricted degree of access, a private federated area with the most restricted degree of access, and/or one or more intervening federated areas with intermediate degrees of access restriction interposed between the base and private federated areas. Such a hierarchy of federated areas may be created to address any of a variety of situations in support of any of a variety of activities, including those in which different objects stored thereamong require different degrees of access restriction. By way of example, while a new data set or a new task routine is being developed, it may be deemed desirable to maintain it within the private federated area or intervening federated area to which access is granted to a relatively small number of users (e.g., persons and/or other entities that may each be associated with one or more source devices and/or reviewing devices) that are directly involved in the development effort. It may be deemed undesirable to have such a new data set or task routine made accessible to others beyond the users involved in such development before such development is completed, such that various forms of testing and/or quality assurance have been performed. Upon completion of such a new data set or task routine, it may then be deemed desirable to transfer it, or a copy thereof, to the base federated area or other intervening federated area to which access is granted to a larger number of users. Such a larger number of users may be the intended users of such a new data set or task routine.

It may be that multiple ones of such linear hierarchical sets of federated areas may be combined to form a tree of federated areas with a single base federated area with the least restricted degree of access at the root of the tree, and multiple private federated areas that each have more restricted degrees of access as the leaves of the tree. Such a tree may additionally include one or more intervening federated areas with various intermediate degrees of access restriction to define at least some of the branching of hierarchies of federated areas within the tree. Such a tree of federated areas may be created to address any of a variety of situations in support of any of a variety of larger and/or more complex activities, including those in which different users that each require access to different objects at different times are engaged in some form of collaboration. By way of example, multiple users may be involved in the development of a new task routine, and each such user may have a different role to play in such a development effort. While the new task routine is still being architected and/or generated, it may be deemed desirable to maintain it within a first private federated area or intervening federated area to which access is granted to a relatively small number of users that are directly involved in that effort. Upon completion of such an architecting and/or generation process, the new task routine, or a copy thereof, may be transferred to a second private federated area or intervening federated area to which access is granted to a different relatively small number of users that may be involved in performing tests and/or other quality analysis procedures on the new task routine to evaluate its fitness for release for use. Upon completion of such testing and/or quality analysis, the new task routine, or a copy thereof, may be transferred to a third private federated area or intervening federated area to which access is granted to yet another relatively small number of users that may be involved in pre-release experimental use of the new task routine to further verify its functionality in actual use case scenarios. Upon completion of such experimental use, the new task routine, or a copy thereof, may be transferred to a base federated area or other intervening federated area to which access is granted to a larger number of users that may be the intended users of the new task routine.

In embodiments in which multiple federated areas form a tree of federated areas, each user may be automatically granted their own private federated area as part of being granted access to at least a portion of the tree. Such an automated provision of a private federated area may improve the ease of use, for each such user, of at least the base federated area by providing a private storage area in which a private set of job flow definitions, task routines, data sets and/or other objects may be maintained to assist that user in the development and/or analysis of other objects that may be stored in at least the base federated area. By way of example, a developer of task routines may maintain a private set of job flow definitions, task routines and/or data sets in their private federated area for use as tools in developing, characterizing and/or testing the task routines that they develop. The one or more federated devices may be caused, by such a developer, to use such job flow definitions, task routines and/or data sets to perform compilations, characterizing and/or testing of such new task routines within the private federated area as part of the development process therefor. Some of such private job flow definitions, task routines and/or data sets may include and/or may be important pieces of intellectual property that such a developer desires to keep to themselves for their own exclusive use (e.g., treated as trade secrets and/or other forms of confidential information).

A base federated area within a linear hierarchy or hierarchical tree of federated areas may be the one federated area therein with the least restrictive degree of access such that a grant of access to the base federated area constitutes the lowest available level of access that can be granted to any user. Stated differently, the base federated area may serve as the most "open" or most "public" space within a linear hierarchy or hierarchical tree of federated spaces. Thus, the base federated area may serve as the storage space at which may be stored job flow definitions, versions of task routines, data sets, result reports and/or instance logs that are meant to be available to all users that have been granted any degree of access to the set of federated areas of which the base federated area is a part. The one or more federated devices may be caused, by a user that has been granted access to at least the base federated area, to perform a job flow within the base federated area using a job flow definition, task routines and/or data sets stored within the base federated area.

In a linear hierarchical set of federated areas that includes a base federated area and just a single private federated area, one or more intervening federated areas may be interposed therebetween to support the provision of different levels of access to other users that don't have access to the private federated area, but are meant to be given access to more than what is stored in the base federated area. Such a provision of differing levels of access would entail providing different users with access to either just the base federated area, or to one or more intervening federated areas. Of course, this presumes that each user having any degree of access to the set of federated areas is not automatically provided with their own private federated area, as the resulting set of federated areas would then define a tree that includes multiple private federated areas, and not a linear hierarchy that includes just a single private federated area.

In a hierarchical tree of federated areas that includes a base federated area at the root and multiple private federated areas at the leaves of the tree, one or more intervening federated areas may be interposed between one or more of the private federated areas and the base federated areas in a manner that defines part of one or more branches of the tree. Through such branching, different private federated areas and/or different sets of private federated areas may be linked to the base federated area through different intervening federated areas and/or different sets of intervening federated areas. In this way, users associated with some private federated areas within one branch may be provided with access to one or more intervening federated areas within that branch that allow sharing of objects thereamong, while also excluding other users associated with other private federated areas that may be within one or more other branches. Stated differently, branching may be used to create separate sets of private federated areas where each such set of private federated areas is associated with a group of users that have agreed to more closely share objects thereamong, while all users within all of such groups are able to share objects through the base federated area, if they so choose.

In embodiments in which there are multiple federated areas that form either a single linear hierarchy or a hierarchical tree, such a set of federated areas may be made navigable through the use of typical web browsing software. More specifically, the one or more federated devices may generate the portal to enable access, by a remote device, to federated areas from across a network using web access protocols in which each of multiple federated areas is provided with a unique uniform resource locator (URL). For a set of federated areas organized into either a linear hierarchy or a hierarchical tree, the URLs assigned thereto may be structured to reflect the hierarchy that has been defined among the federated areas therein. By way of example, for a tree of federated areas, the base federated area at the root of the tree may be assigned the shortest and simplest URL, and such a URL may be indicative of a name given to the tree of federated areas. In contrast, the URL of each federated area at a leaf of the tree may include a combination of at least a portion of the URL given to the base federated area, and at least a portion of the URL given to any intervening federated area in the path between the federated area at the leaf and the base federated area.

In embodiments of either a linear hierarchy of federated areas or a hierarchical tree of federated areas, one or more relationships that affect the manner in which objects may be accessed and/or used may be put in place between each private federated area and the base federated area, as well as through any intervening federated areas therebetween. Among such relationships may be an inheritance relationship in which, from the perspective of a private federate area, objects stored within the base federated area, or within any intervening federated area therebetween, may be treated as if they are also stored directly within the private federated area for purposes of being available for use in performing a job flow within the private federated area. As will be explained in greater detail, the provision of such an inheritance relationship may aid in enabling and/or encouraging the reuse of objects by multiple users by eliminating the need to distribute multiple copies of an object among multiple private federated areas in which that object may be needed for performances of job flows within each of those private federated areas. Instead, a single copy of such an object may be stored within the base federated area and will be treated as being just as readily available for use in performances of job flows within each of such private federated areas.

Also among such relationships may be a priority relationship in which, from the perspective of a private federated area, the use of a version of an object stored within the private federated area may be given priority over the use of another version of the same object stored within the base federated area, or within any intervening federated area therebetween. More specifically, where a job flow is to be performed within a private federated area, and there is one version of a task routine to perform a task in the job flow stored within the private federated area and another version of the task routine to perform the same task stored within the base federated area, use of the version of the task routine stored within the private federated area may be given priority over use of the other version stored within the base federated area. Further, such priority may be given to using the version stored within the private federated area regardless of whether the other version stored in the base federated area is a newer version. Stated differently, as part of performing the job flow within the private federated area, the one or more federated devices may first search within the private federated area for any needed task routines to perform each of the tasks specified in the job flow, and upon finding a task routine to perform a task within the private federated area, no search may be performed of any other federated area to find a task routine to perform that same task. It may be deemed desirable to implement such a priority relationship as a mechanism to allow a user associated with the private federated area to choose to override the automatic use of a version of a task routine within the base federated area (or an intervening federated area therebetween) due to an inheritance relationship by storing the version of the task routine that they prefer to use within the private federated area.

Also among such relationships may be a dependency relationship in which, from the perspective of a private federated area, some objects stored within the private federated area may have dependencies on objects stored within the base federated area, or within an intervening federated area therebetween. More specifically, as earlier discussed, the one or more federated devices may impose a rule that the task routines upon which a job flow depends may not be deleted such that the one or more federated devices may deny a request received from a remote device to delete a task routine that performs a task identified by a flow task identifier that is referred to by at least one job flow definition stored. Thus, where the private federated area stores a job flow definition that includes a flow task identifier specifying a particular task to be done, and the base federated area stores a task routine that performs that particular task, the job flow of the job flow definition may have a dependency on that task routine continuing to be available for use in performing the task through an inheritance relationship between the private federated area and the base federated area. In such a situation, the one or more federated devices may deny a request that may be received from a remote device to delete that task routine from the base federated area, at least as long as the job flow definition continues to be stored within the private federated area. However, if that job flow definition is deleted from the private federated area, and if there is no other job flow definition that refers to the same task flow identifier, then the one or more federated devices may permit the deletion of that task routine from the base federated area.

In embodiments in which there is a hierarchical tree of federated areas that includes at least two branches, a relationship may be put in place between two private and/or intervening federated areas that are each within a different one of the two branches by which one or more objects may be automatically transferred therebetween by the one or more federated devices in response to one or more conditions being met. As previously discussed, the formation of branches within a tree may be indicative of the separation of groups of users where there may be sharing of objects among users within each such group, such as through the use of one or more intervening federated areas within a branch of the tree, but not sharing of objects between such groups. However, there may be occasions in which there is a need to enable a relatively limited degree of sharing of objects between federated areas within different branches. Such an occasion may be an instance of multiple groups of users choosing to collaborate on the development of one or more particular objects such that those particular one or more objects are to be shared among the multiple groups where, otherwise, objects would not normally be shared therebetween. On such an occasion, the one or more federated devices may be requested to instantiate a transfer area through which those particular one or more objects may be automatically transferred therebetween upon one or more specified conditions being met. In some embodiments, the transfer area may be formed as an overlap between two federated areas of two different branches of a hierarchical tree. In other embodiments, the transfer area may be formed within the base federated area to which users associated with federated areas within different branches may all have access.

In some embodiments, the determination of whether the condition(s) for a transfer have been met and/or the performance of the transfer of one or more particular objects may be performed using one or more transfer routines to perform transfer-related tasks called for within a transfer flow definition. In such embodiments, a transfer routine may be stored within each of the two federated areas between which the transfer is to occur. Within the federated area that the particular one or more objects are to be transferred from, the one or more federated devices may be caused by the transfer routine stored therein to repeatedly check whether the specified condition(s) have been met, and if so, to then transfer copies of the particular one or more objects into the transfer area. Within the federated area that the particular one or more objects are to be transferred to, the one or more federated devices may be caused by the transfer routine stored therein to repeatedly check whether copies of the particular one or more objects have been transferred into the transfer area, and if so, to then retrieve the copies of the particular one or more objects from the transfer area.

A condition that triggers such automated transfers may be any of a variety of conditions that may eventually be met through one or more performances of a job flow within the federated area from which one or more objects are to be so transferred. More specifically, the condition may be the successful generation of particular results data that may include a data set that meets one or more requirements that are specified as the condition. Alternatively, the condition may be the successful generation and/or testing of a new task routine such that there is confirmation in a result report or in the generation of one or more particular data sets that the new task routine has been successfully verified as meeting one or more requirements that are specified as the condition. As will be explained in greater detail, the one or more performances of a job flow that may produce an output that causes the condition to be met may occur within one or more processes that may be separate from the process in which a transfer routine is executed to repeatedly check whether the condition has been met. Also, each of such processes may be performed on a different thread of execution of a processor of a federated device, or each of such processes may be performed on a different thread of execution of a different processor from among multiple processors of either a single federated device or multiple federated devices.

By way of example, multiple users may be involved in the development of a new neural network, and each such user may have a different role to play in such a development effort. While the new neural network is being developed through a training process, it may be deemed desirable to maintain the data set of weights and biases that is being generated through numerous iterations of training within a first intervening federated area to which access is granted to a relatively small number of users that are directly involved in that training effort. Upon completion of such training of the neural network, a copy of the data set of weights and biases may be transferred to a second intervening federated area to which access is granted to a different relatively small number of users that may be involved in testing the neural network defined by the data set to evaluate its fitness for release for use. The transfer of the copy of the data set from the first intervening federated area to the second intervening federated area may be triggered by the training having reached a stage at which a predetermined condition is met that defines the completion of training, such as a quantity of iterations of training having been performed. Upon completion of such testing of the neural network, a copy of the data set of weights and biases may be transferred from the second intervening federated area to a third intervening federated area to which access is granted to yet another relatively small number of users that may be involved in pre-release experimental use of the neural network to further verify its functionality in actual use case scenarios. Like the transfer to the second intervening federated area, the transfer of the copy of the data set from the second intervening federated area to the third intervening federated area may be triggered by the testing having reached a stage at which a predetermined condition was met that defines the completion of testing, such as a threshold of a characteristic of performance of the neural network having been found to have been met during testing. Upon completion of such experimental use, a copy of the data set of weights and biases may be transferred from the third federated area to a base federated area to which access is granted to a larger number of users that may be the intended users of the new neural network.

Such a neural network may be part of an effort to transition from performing a particular analytical function using non-neuromorphic processing (i.e., processing in which a neural network is not used) to performing the same analytical function using neuromorphic processing (i.e., processing in which a neural network is used). Such a transition may represent a tradeoff in accuracy for speed, as the performance of the analytical function using neuromorphic processing may not achieve the perfect accuracy (or at least the degree of accuracy) that is possible via the performance of the analytical function using non-neuromorphic processing, but the performance of the analytical function using neuromorphic processing may be faster by one or more orders of magnitude, depending on whether the neural network is implemented with software-based simulations of its artificial neurons executed by one or more CPUs or GPUs, or hardware-based implementations of its artificial neurons provided by one or more neuromorphic devices.

Where the testing of such a neural network progresses successfully such that the neural network begins to be put to actual use, there may be a gradual transition from the testing to the usage that may be automatically implemented in a staged manner. Initially, non-neuromorphic and neuromorphic implementations of the analytical function may be performed at least partially in parallel with the same input data values being provided to both, and with the corresponding output data values of each being compared to test the degree of accuracy of the neural network in performing the analytical function. In such initial, at least partially parallel, performances, priority may be given to providing processing resources to the non-neuromorphic implementation, since the non-neuromorphic implementation is still the one that is in use. As the neural network demonstrates a degree of accuracy that at least meets a predetermined threshold, the testing may change such that the neuromorphic implementation is used, and priority is given to providing processing resources to it, while the non-neuromorphic implementation is used at least partially in parallel solely to provide output data values for further comparisons to corresponding ones provided by the neuromorphic implementation. Presuming that the neural network continues to demonstrate a degree of accuracy that meets or exceeds the predetermined threshold, further use of the non-neuromorphic implementation of the analytical function may cease, entirely.

In training such a neural network implementing an analytical function in preparation for such a transition, training data that includes both sets of input values (e.g., data sets) and corresponding sets output values (e.g., result reports) may be generated from sets of input values and corresponding sets of output values associated with earlier performances of the non-neuromorphic implementation, or associated with performances of the non-neuromorphic implementation that occur at least partially in parallel with the training of the neural network. Alternatively or additionally, the training data may also include randomly generated sets of input values and corresponding sets of output values that were derived by the non-neuromorphic implementation from the randomly generated sets of input values.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
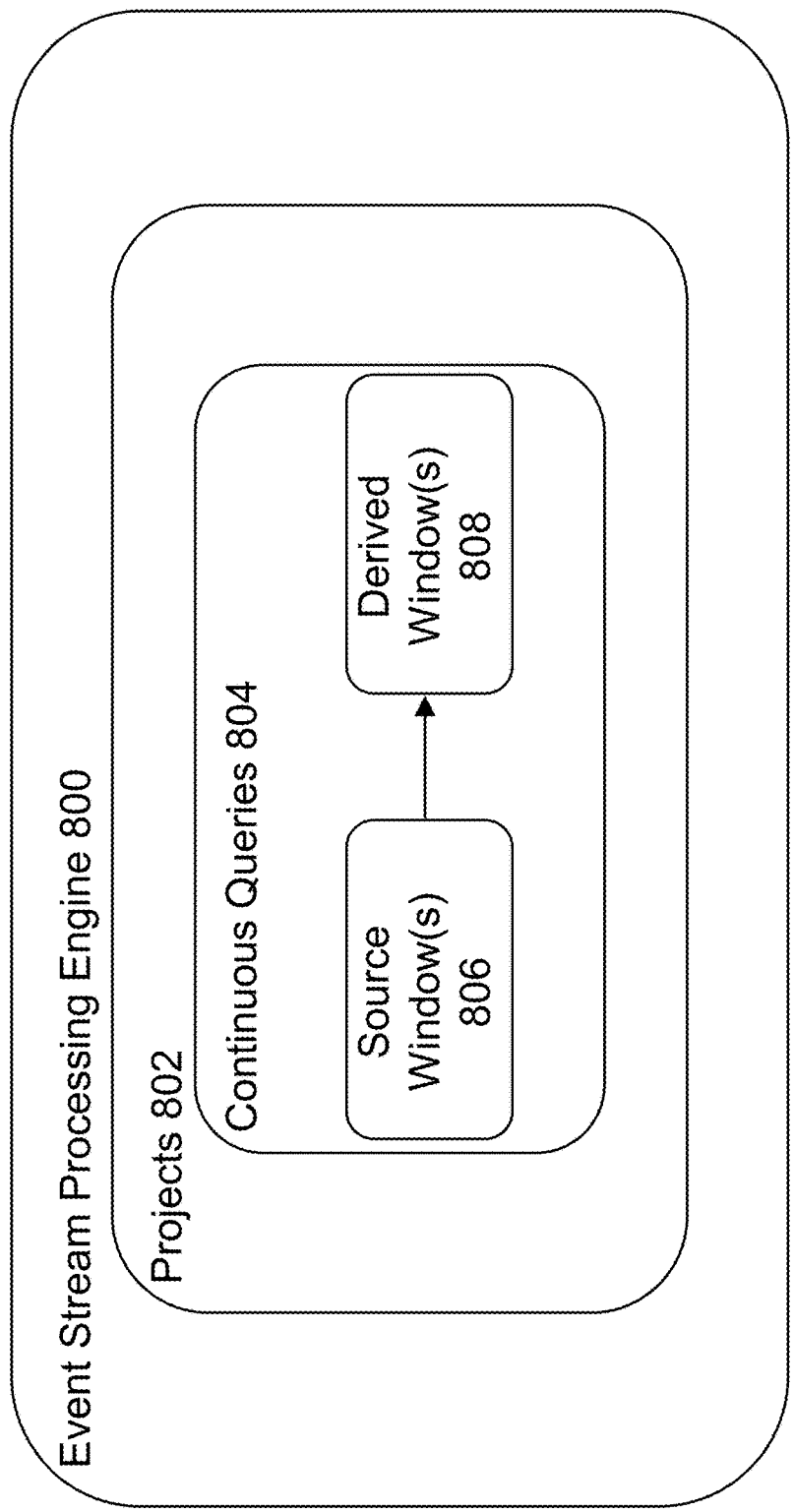
FIG. 8 illustrates a block diagram including components of an Event Stream Processing Engine (ESPE), according to embodiments of the present technology.
Figure 9:
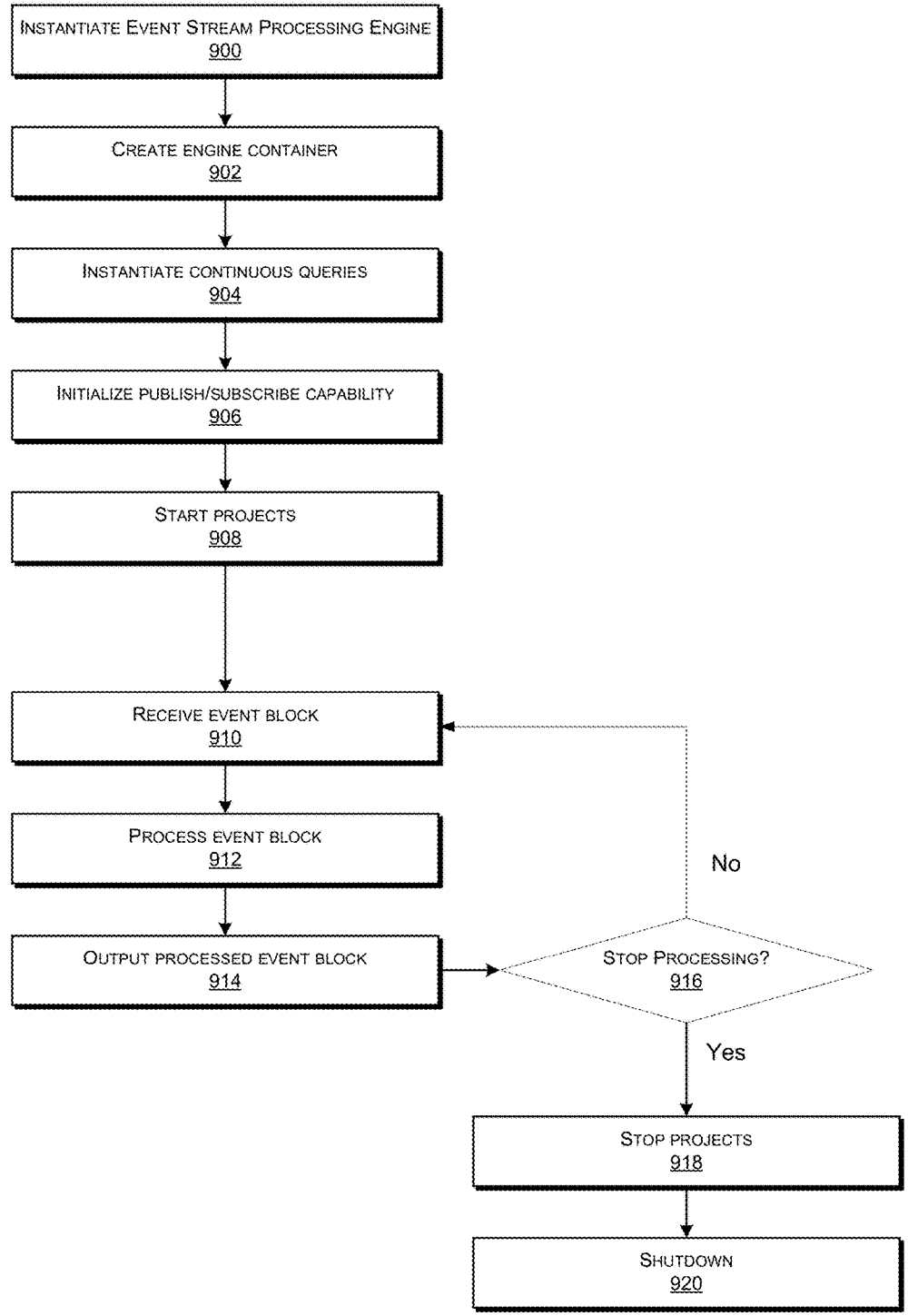
FIG. 9 illustrates a flow chart showing an example process including operations performed by an event stream processing engine, according to some embodiments of the present technology.
Figure 10:
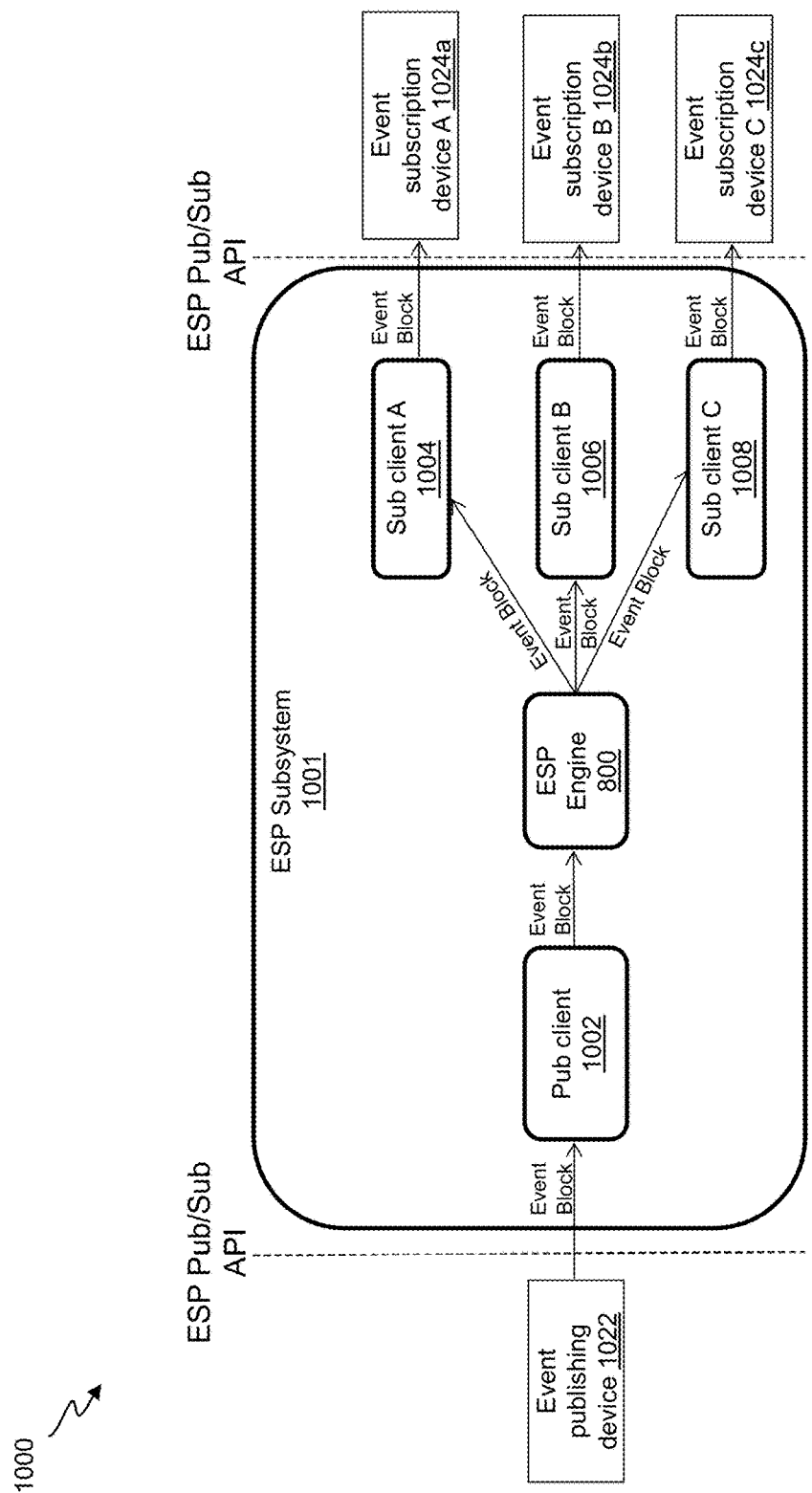
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
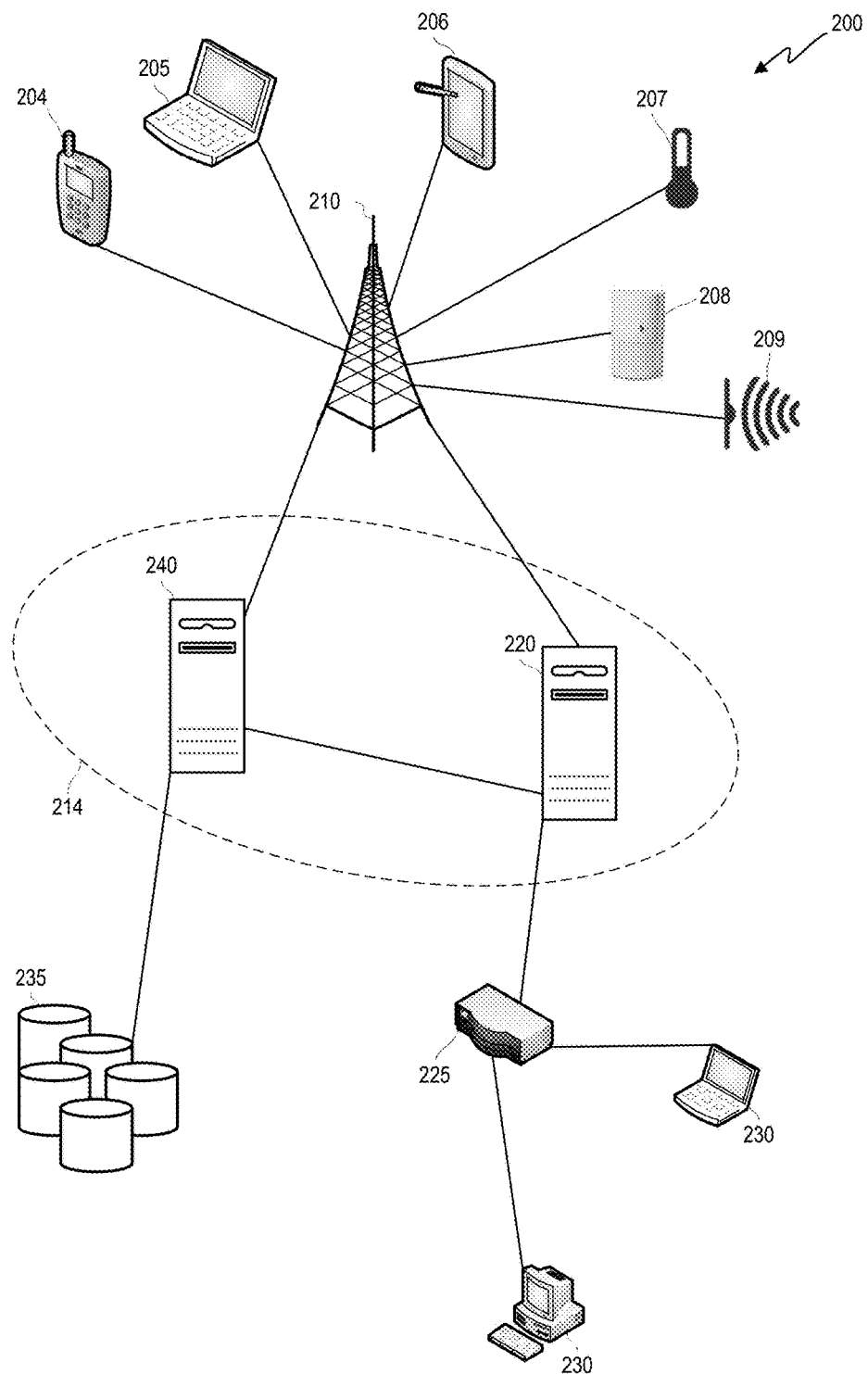
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
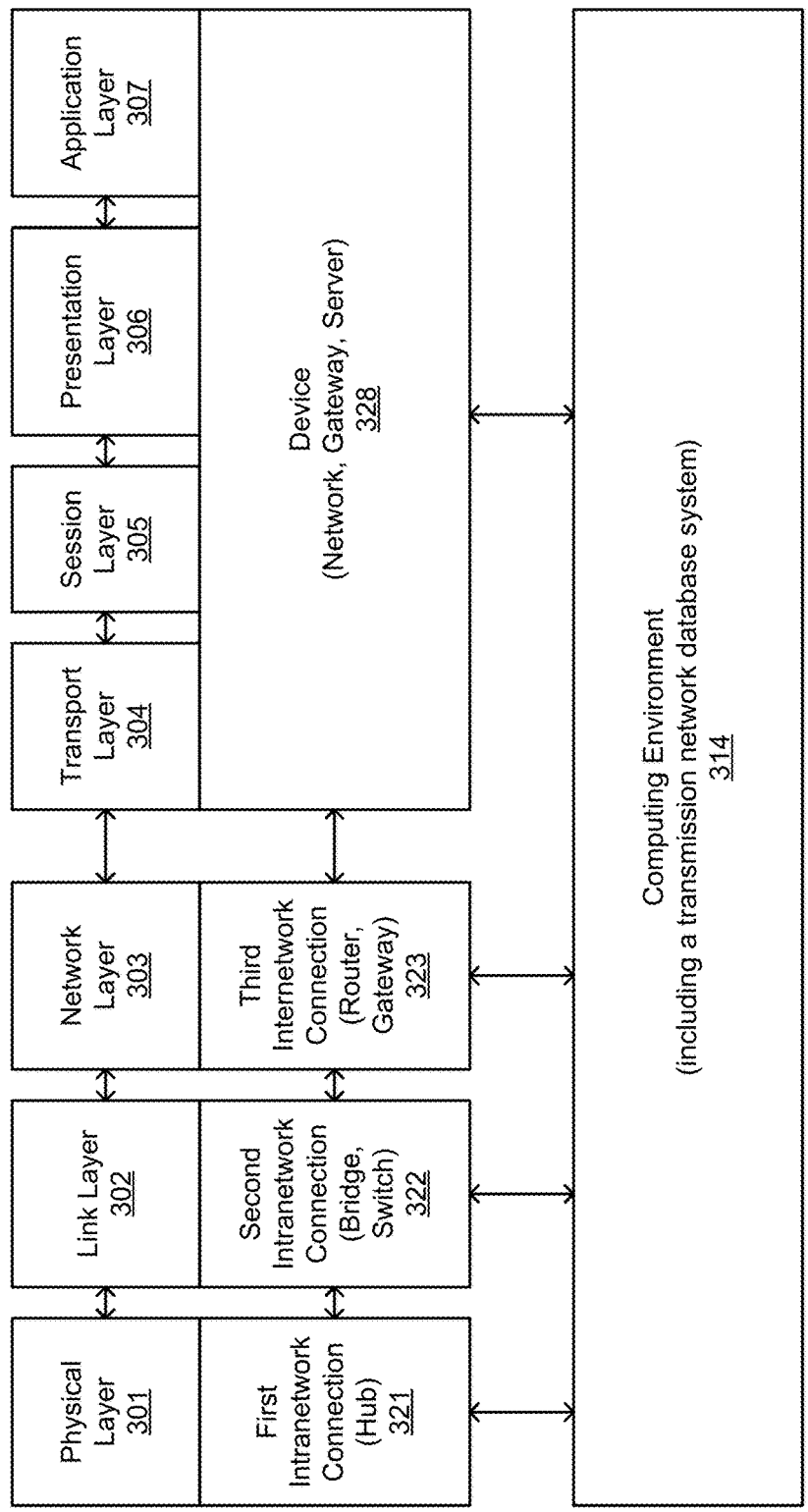
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
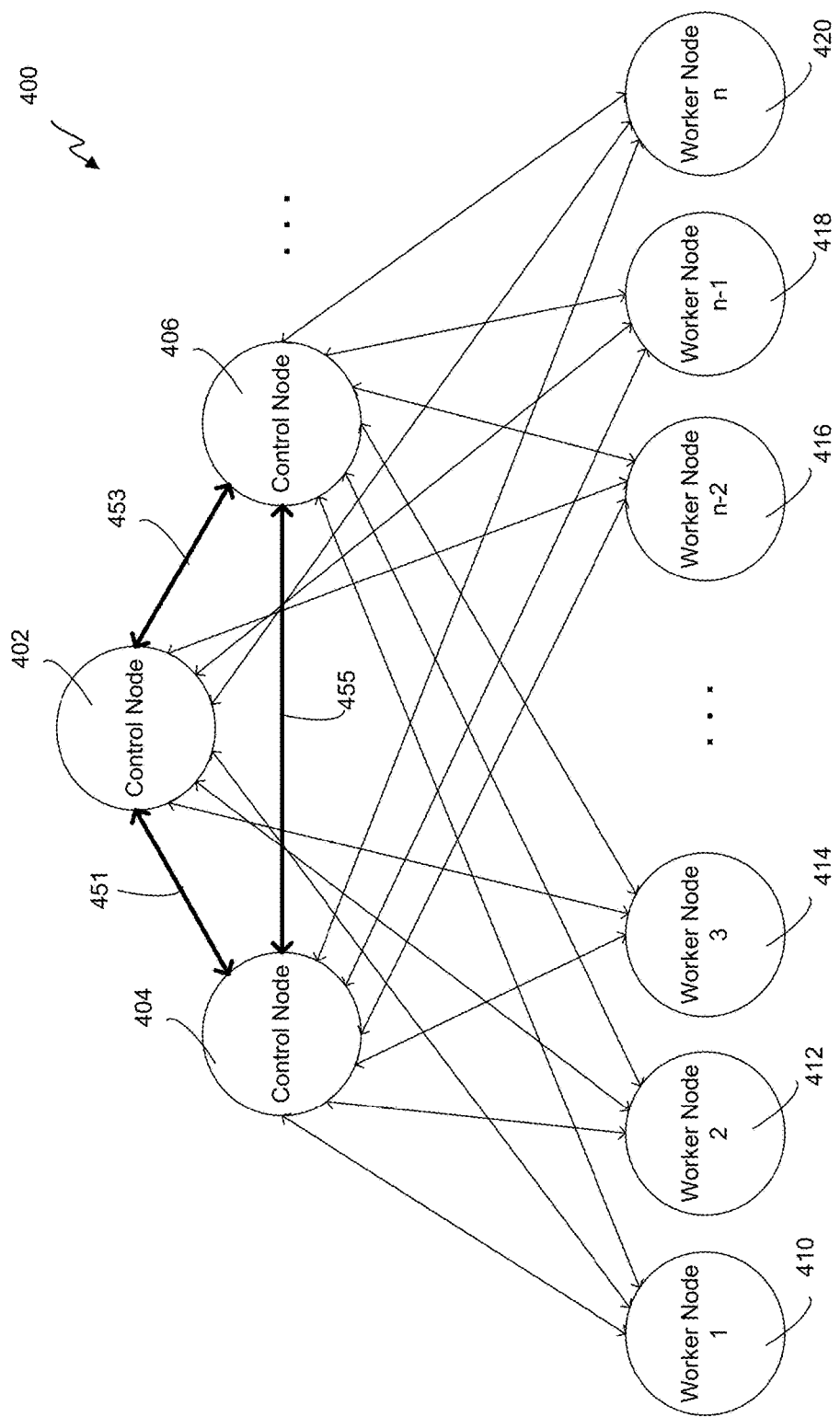
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
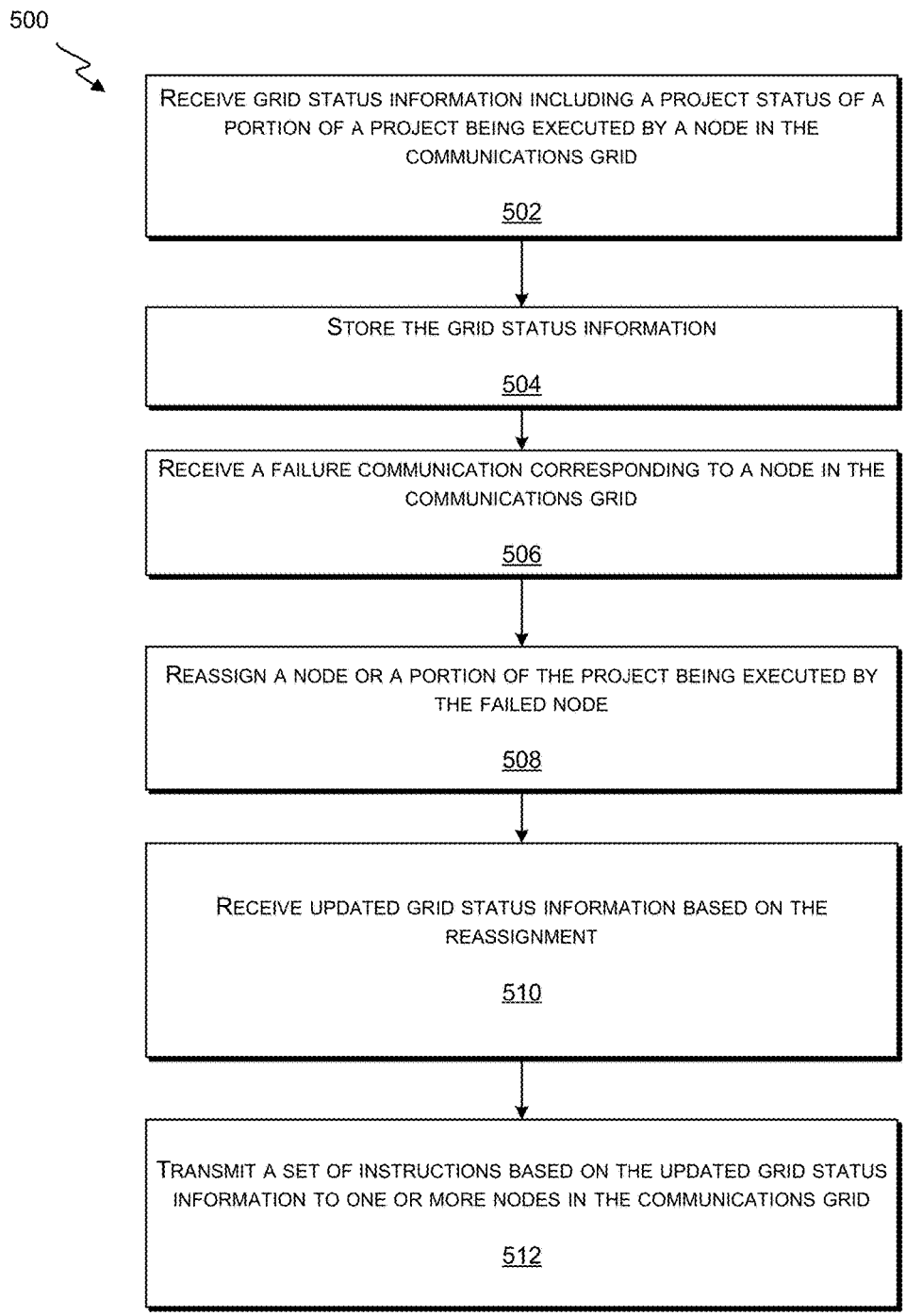
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
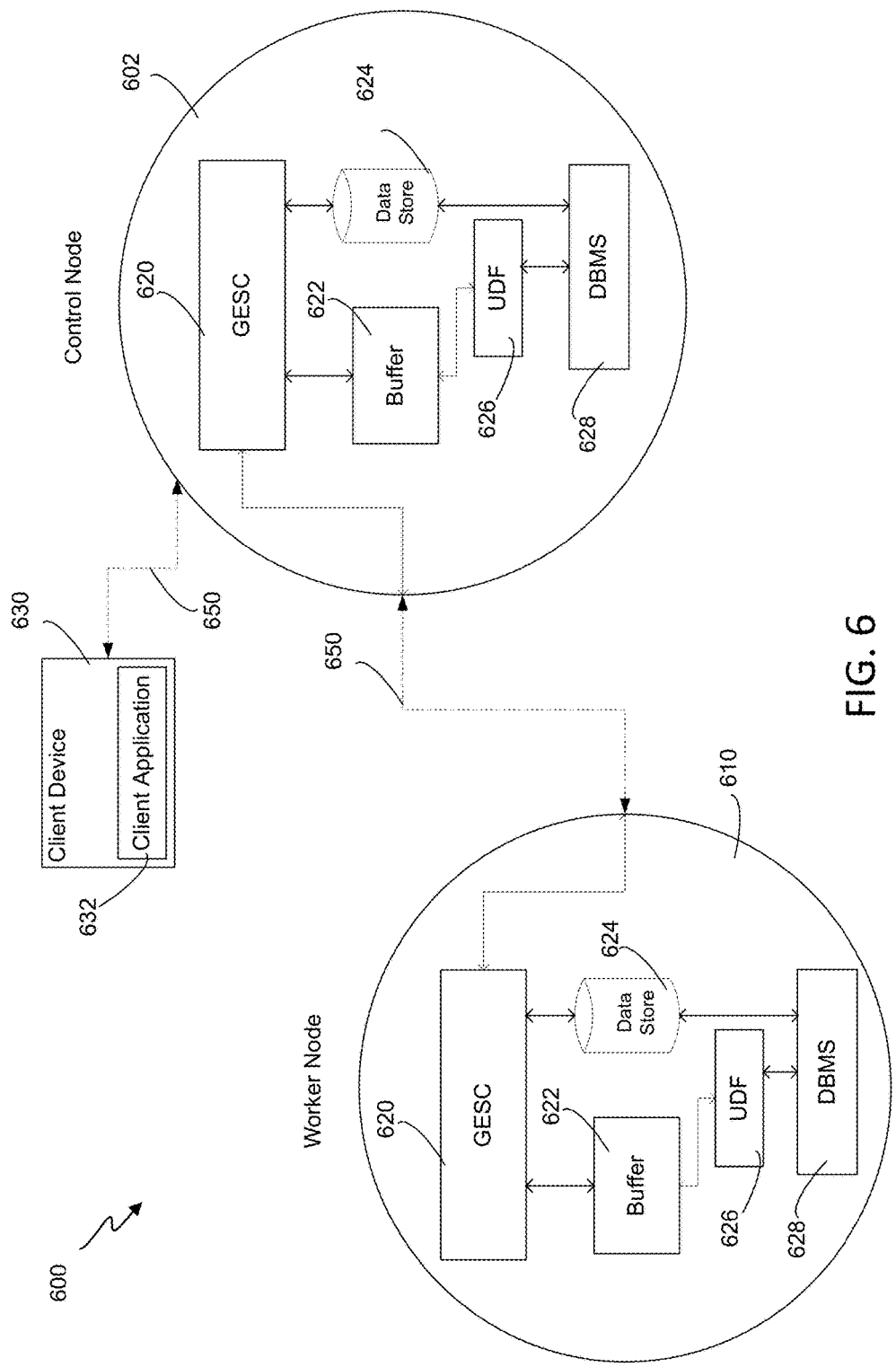
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
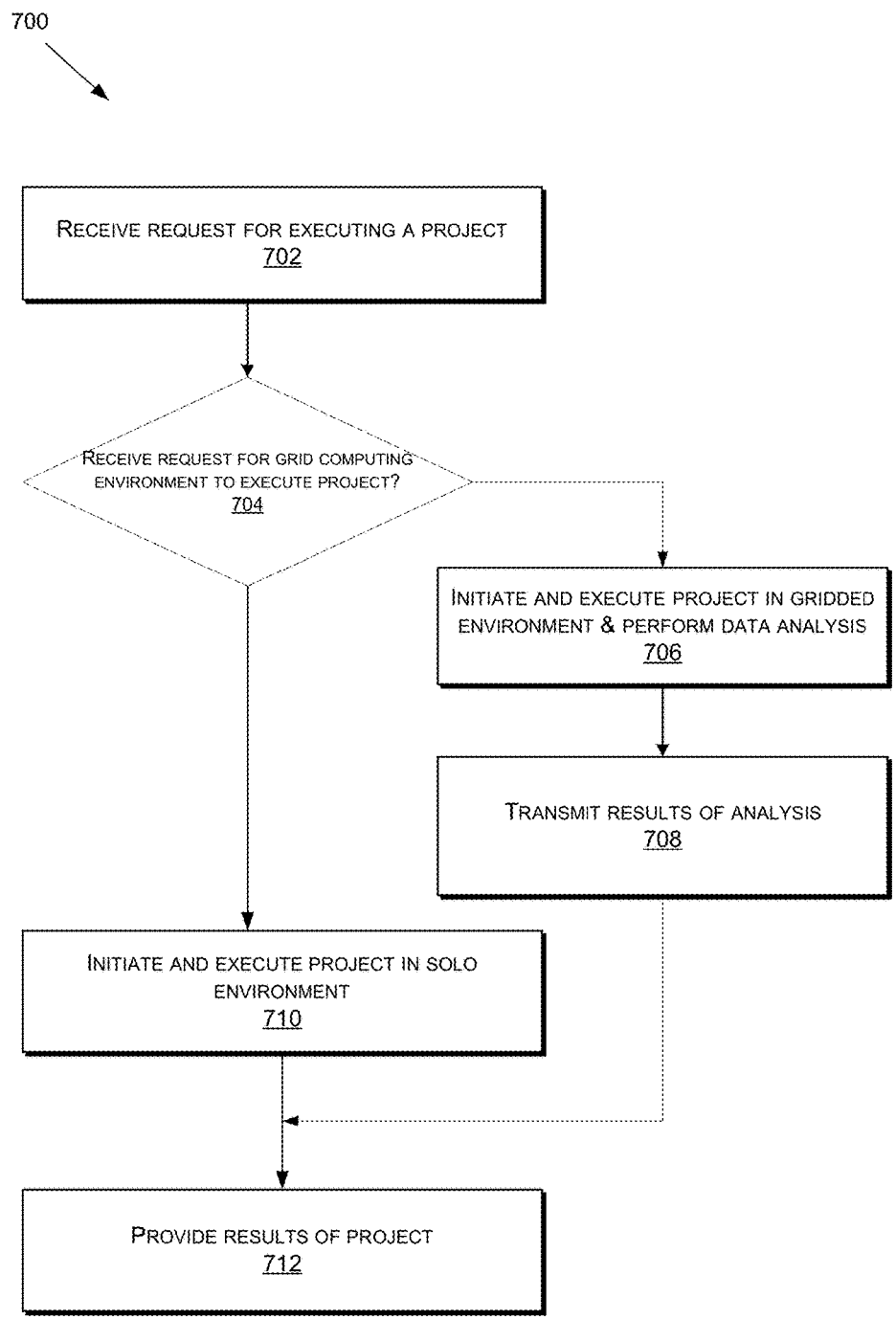
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
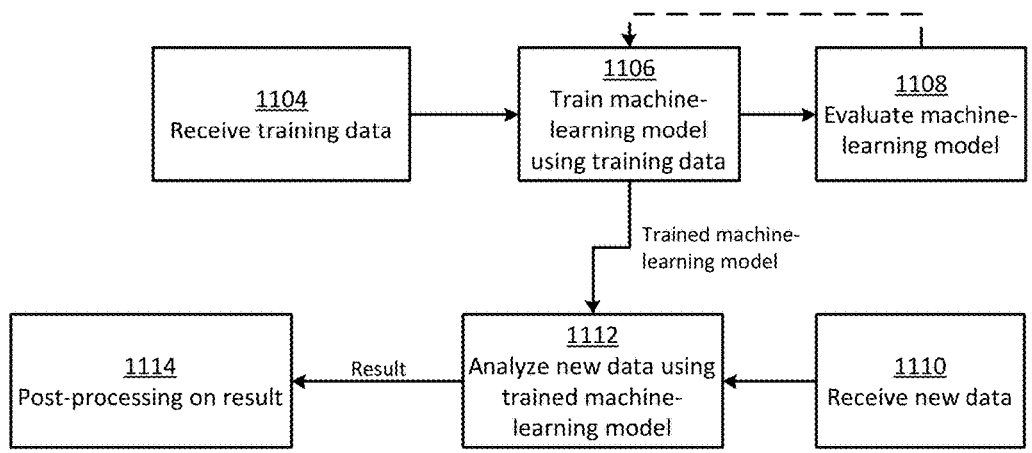
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
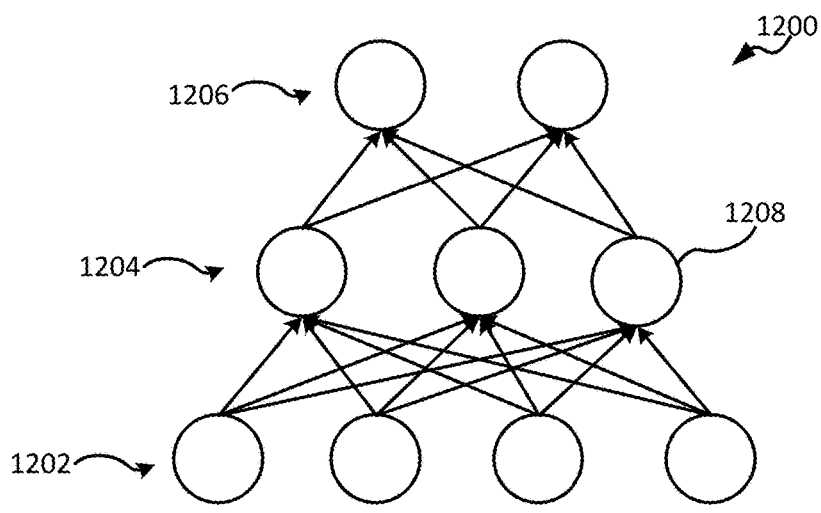
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector.

The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max(x, 0) where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. These processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13A:
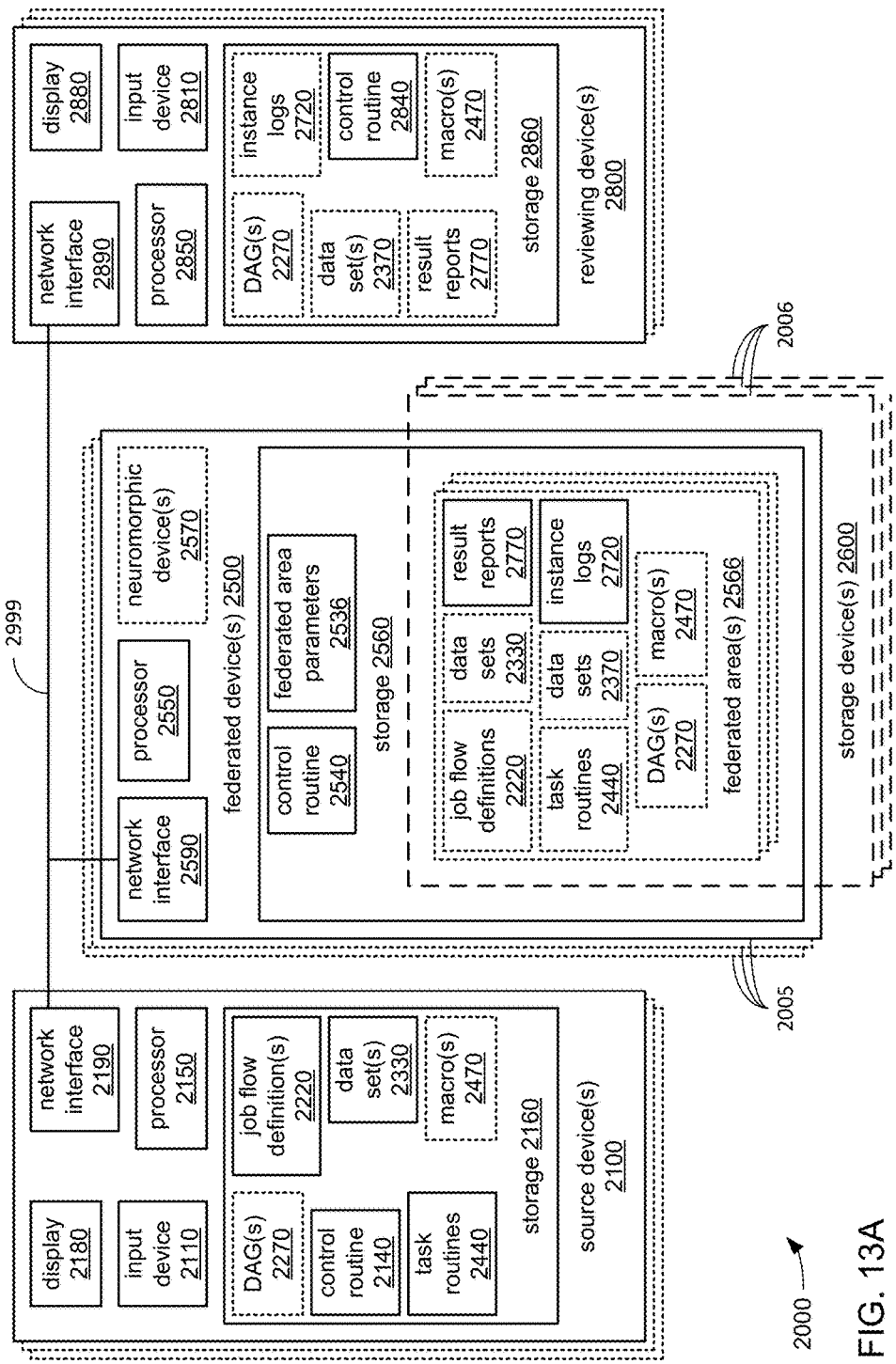
FIGS. 13A and 13B, together, illustrate an example embodiment of a distributed processing system.
Figure 13B:
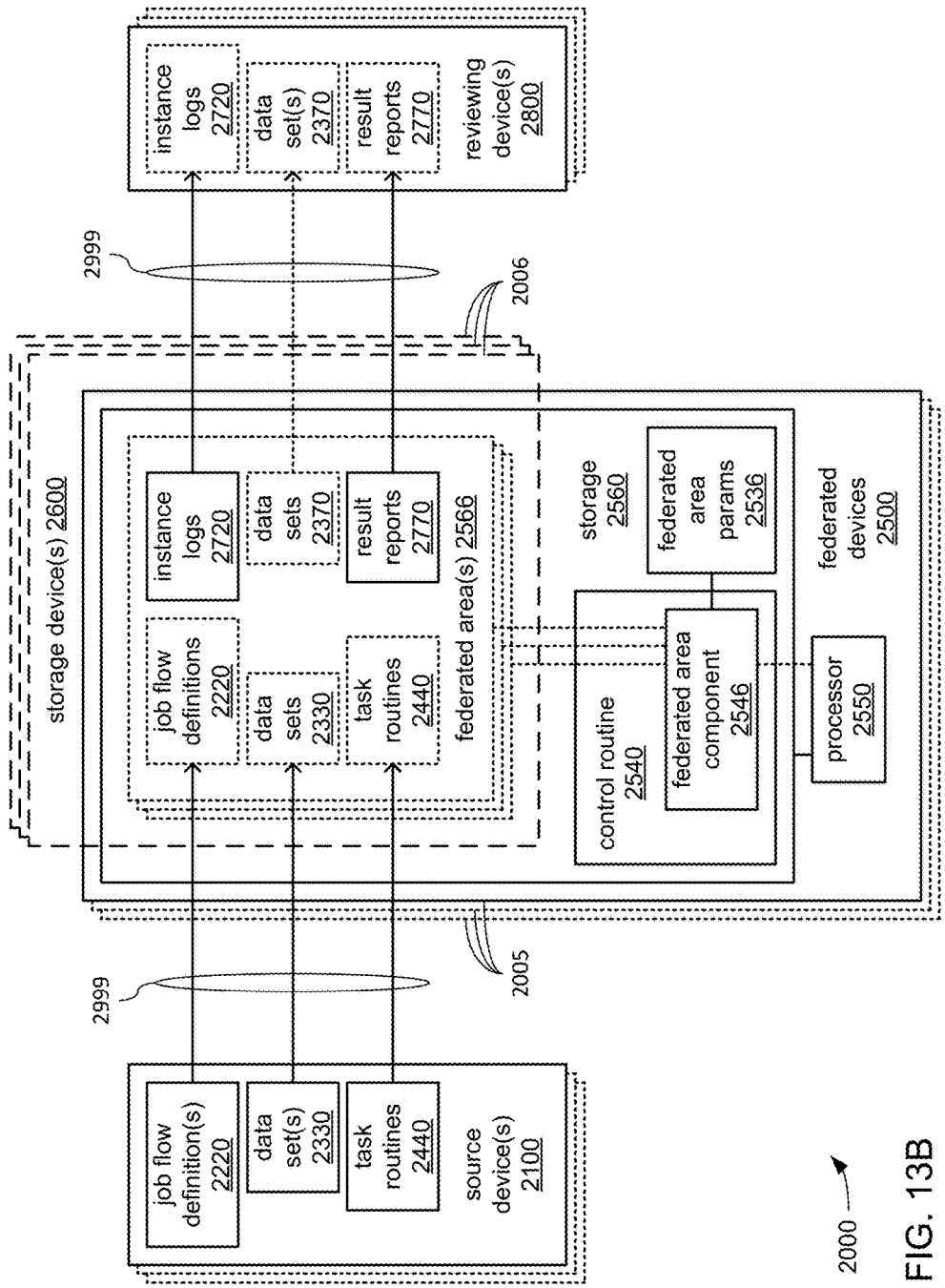

FIG. 13A illustrates a block diagram of an example embodiment of a distributed processing system 2000 incorporating one or more source devices 2100, one or more reviewing devices 2800, one or more federated devices 2500 that may form a federated device grid 2005, and/or one or more storage devices 2600 that may form a storage device grid 2006. FIG. 13B illustrates exchanges, through a network 2999, of communications among the devices 2100, 2500, 2600 and/or 2800 associated with the controlled storage of, access to and/or performance of job flows of analyses associated with various objects within one or more federated areas 2566. Referring to both FIGS. 13A and 13B, such communications may include the exchange of job flow definitions 2220, data sets 2330 and/or task routines 2440. However, one or more of the devices 2100, 2500, 2600 and/or 2800 may also exchange, via the network 2999, other data entirely unrelated to any object stored within any federated area 2566. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

In various embodiments, each of the one or more source devices 2100 may incorporate one or more of an input device 2110, a display 2180, a processor 2150, a storage 2160 and a network interface 2190 to couple each of the one or more source devices 2100 to the network 2999. The storage 2160 may store a control routine 2140, one or more job flow definitions 2220, one or more DAGs 2270, one or more data sets 2330, one or more task routines 2440 and/or one or more macros 2470. The control routine 2140 may incorporate a sequence of instructions operative on the processor 2150 of each of the one or more source devices 2100 to implement logic to perform various functions. In embodiments in which multiple ones of the source devices 2100 are operated together as a grid of the source devices 2100, the sequence of instructions of the control routine 2140 may be operative on the processor 2150 of each of those source devices 2100 to perform various functions at least partially in parallel with the processors 2150 of others of the source devices 2100.

In some embodiments, one or more of the source devices 2100 may be operated by persons and/or entities (e.g., scholastic entities, governmental entities, business entities, etc.) to generate and/or maintain analysis routines, that when executed by one or more processors, causes an analysis of data to be performed. In such embodiments, execution of the control routine 2140 may cause the processor 2150 to operate the input device 2110 and/or the display 2180 to provide a user interface by which an operator of the source device 2100 may use the source device 2100 to develop such routines and/or to test their functionality by causing the processor 2150 to execute such routines. Among such routines may be routines intended for storage and/or execution within a federated area 2566. As will be explained in greater detail, a rule imposed in connection with such use of a federated area 2566 may be that routines are required to be stored therein as a combination of a set of task routines and a job flow definition that specifies aspects of how the set of task routines are executed together. In other words, a requirement for the storage and/or execution of analysis routines within a federated area 2566 may be that the analysis itself be defined as a job flow in which a set of tasks that are performed in a defined order. Thus, an analysis routine generated through operation of one or more of the source devices 2100 may be required to take the form of multiple task routines 2440 and a job flow definition 2220 that specifies the manner in which the multiple task routines 2440 are executed by a processor as a combination to cause the performance of the analysis as a job flow.

Further execution of the control routine 2140 may cause the processor 2150 of a source device 2100 to operate the input device 2110 and/or the display 2180 to provide a UI by which an operator may provide a command to generate a DAG 2270 from one or more of the task routines 2440. As will be explained in greater detail, the provision of such a UI and the performance of such operations may be in support of generation and/or maintenance of analysis routines (i.e., combinations of job flow definitions 2220 and task routines 2440) by enabling an operator of one of the source devices 2100 to request a visual presentation of a DAG 2270 so as to be provided with a visual representation of at least inputs and/or outputs of the one or more task routines 2440 selected for inclusion in the requested DAG 2270. As will also be explained in greater detail, for each task routine 2440 so selected, a corresponding macro 2470 may be generated as an intermediate operation towards generating the requested DAG 2270.

Still further execution of the control routine 2140 may cause the processor 2150 of a source device 2100 to operate the input device 2110 and/or the display 2180 to provide a user interface by which an operator of the source device 2100 may enter commands. Among those commands may be a command to the processor 2150 to operate the network interface 2190 to transmit such a combination of multiple task routines 2440 and accompanying job flow definition 2220 via the network 2999 to the one or more federated devices 2500 for storage within a federated area 2566. The processor 2150 may be further caused to operate the display 2180 to present a request received via the network 2999 from the one or more federated devices 2500 (or from one or more other devices that provide access control to federated area(s) 2566) on the display 2180 to the operator of the source device 2100 for the provision of a password and/or other security credential. The processor 2150 may then be caused to transmit the password and/or other security credential provided by the operator (e.g., via the input device 1110) to the one or more federated devices 2500 (or the one or more access control devices) to gain authorization to store the multiple task routines 2440 and accompanying job flow definition 2220 within a federated area 2566. Further, in some of such embodiments, the operator of the source device 2100 may additionally operate the source device 2100 to similarly provide the one or more federated devices 2500 with one or more of the data sets 2330 to also store within a federated area 2566.

The tasks that each of the task routines 2440 may cause a processor to perform may include any of a variety of data analysis tasks, data transformation tasks and/or data normalization tasks. The data analysis tasks may include, and are not limited to, searches and/or statistical analyses that entail derivation of approximations, numerical characterizations, models, evaluations of hypotheses, and/or predictions (e.g., a prediction by Bayesian analysis of actions of a crowd trying to escape a burning building, or of the behavior of bridge components in response to a wind forces). The data transformation tasks may include, and are not limited to, sorting, row and/or column-based mathematical operations, row and/or column-based filtering using one or more data items of a row or column, and/or reordering data items within a data object. The data normalization tasks may include, and are not limited to, normalizing times of day, dates, monetary values (e.g., normalizing to a single unit of currency), character spacing, use of delimiter characters (e.g., normalizing use of periods and commas in numeric values), use of formatting codes, use of big or little Endian encoding, use or lack of use of sign bits, quantities of bits used to represent integers and/or floating point values (e.g., bytes, words, doublewords or quadwords), etc.

In other embodiments, one or more of the source devices 2100 may be operated by persons and/or entities to assemble one or more data sets 2330. In such embodiments, execution of the control routine 2140 by the processor 2150 may cause the processor 2150 to operate the network interface 2190, the input device 2110 and/or one or more other components (not shown) to receive data items and to assemble those received data items into one or more of the data sets 2330. By way of example, one or more of the source devices 2100 may incorporate and/or be in communication with one or more sensors to receive data items associated with the monitoring of natural phenomena (e.g., geological or meteorological events) and/or with the performance of a scientific or other variety of experiment (e.g., a thermal camera or sensors disposed about a particle accelerator). By way of another example, the processor 2150 of one or more of the source devices 2100 may be caused by its execution of the control routine 2140 to operate the network interface 2190 to await transmissions via the network 2999 from one or more other devices providing at least at portion of at least one data set 2330. Upon assembly of one or more data sets 2330, the processor 2150 may be caused by further execution of the control routine 2140 to operate the network interface 2190 to transmit one or more completed data sets 2330 to the one or more federated devices 2500 via the network 2999 for storage within a federated area 2566. The processor 2150 may be further caused by execution of the control routine 2140 to automatically provide one or more security credentials to the one or more federated devices 2500 (or the one or more access control devices) in response to a request received therefrom for security credentials as a prerequisite to granting authorization to store one or more completed data sets 2330 within a federated area 2566.

Each of the one or more data sets 2330 may include any of a wide variety of types of data associated with any of a wide variety of subjects. By way of example, each of the data sets 2330 may include scientific observation data concerning geological and/or meteorological events, or from sensors employed in laboratory experiments in areas such as particle physics. By way of another example, the data set may include indications of activities performed by a random sample of individuals of a population of people in a selected country or municipality, or of a population of a threatened species under study in the wild.

In various embodiments, each of the one or more reviewing devices 2800 may incorporate one or more of an input device 2810, a display 2880, a processor 2850, a storage 2860 and a network interface 2890 to couple each of the one or more reviewing devices 2800 to the network 2999. The storage 2860 may store a control routine 2840, one or more DAGs 2270, one or more data sets 2370, one or more macros 2470, one or more instance logs 2720, and/or one or more result reports 2770. The control routine 2840 may incorporate a sequence of instructions operative on the processor 2850 of each of the one or more reviewing devices 2800 to implement logic to perform various functions. In embodiments in which multiple ones of the reviewing devices 2800 are operated together as a grid of the reviewing devices 2800, the sequence of instructions of the control routine 2840 may be operative on the processor 2850 of each of those reviewing devices 2800 to perform various functions at least partially in parallel with the processors 2850 of others of the reviewing devices 2800.

In some embodiments, one or more of the reviewing devices 2800 may be operated by persons and/or entities (e.g., scholastic entities, governmental entities, business entities, etc.) to request performances of job flows within one or more federated areas 2566 by the one or more federated devices 2500, and to provide the one or more reviewing devices 2800 with result reports 2770 generated by those performances. In such embodiments, execution of the control routine 2840 may cause the processor 2850 to operate the input device 2810 and/or the display 2880 to provide a user interface by which an operator of the reviewing device 2800 may initiate such requests, and/or to use the display 2880 to view one or more of such result reports 2770. Stated differently, one of the reviewing devices 2800 may be operated by a person acting in the role of a consumer of the results of an analysis to request the one or more federated devices 2500 to make use of the objects stored within a federated area 2566 to perform an analysis and provide the results report 2770 generated as a result of that performance.

In other embodiments, one or more of the reviewing devices 2800 may be operated by persons and/or entities to request repeat performances of previously performed job flows within a federated area 2566, and/or to provide the one or more reviewing devices 2800 with instance logs 2720, data sets 2370 that may be exchanged between task routines during the performance of a job flow, and/or the result reports 2770 generated by past performances of job flows within the federated area. In such embodiments, execution of the control routine 2840 may cause the processor 2850 to operate the input device 2810 and/or the display 2880 to provide a user interface by which an operator of the reviewing device 2800 may initiate such requests. The processor 2850 may also be caused to operate the display 2880 to enable the operator to view one or more of such instance logs 2720, data sets 2370 (if there are any) and/or result reports 2770 as part of performing a review of past performances of job flows. Stated differently, one of the reviewing devices 2800 may be operated by a person acting in the role of a reviewer of the manner in which an analysis was performed to request the one or more federated devices 2500 to provide various objects associated with the performance of the analysis for use in performing such a review.

By way of example, the operator of one of the reviewing devices may be associated with a scholastic, governmental or business entity that seeks to review a performance of a job flow of an analysis by another entity. Such a review may be a peer review between two or more entities involved in scientific or other research, and may be focused on confirming assumptions on which algorithms were based and/or the correctness of the performance of those algorithms. Alternatively, such a review may be part of an inspection by a government agency into the quality of the analyses performed by and relied upon by a business in making decisions and/or assessing its own financial soundness, and may seek to confirm whether correct legally required calculations were used. In addition to a review of the result report 2770 that provides the outputs of an analysis, a review of the instance log 2720 generated by the performance of a job flow of an analysis may provide insights into the particular tasks performed and what versions of task routines 2440 were executed to perform those tasks, as well as what data set(s) 2330 were used as inputs. Alternatively or additionally, a review of a data set 2370 that may be generated by the performance of one task of a job flow as a mechanism to convey data that it generates for use by one or more other tasks of the same job flow may provide indications of where an error and/or statistical anomaly may have been introduced in the performance of an analysis.

Further execution of the control routine 2840 may cause the processor 2850 of a reviewing device 2800 to operate the input device 2810 and/or the display 2880 to provide a UI by which an operator may provide a command to generate a DAG 2270 from one or more of the task routines 2440. As will be explained in greater detail, the provision of such a UI and the performance of such operations may be in support of investigating a discrepancy in the results of the performance of a job flow of an analysis by enabling an operator of one of the reviewing devices 2800 to request a visual presentation of a DAG 2270 so as to be provided with a visual representation of at least inputs and/or outputs of the one or more task routines 2440 selected for inclusion in the requested DAG 2270.

In various embodiments, each of the one or more federated devices 2500 may incorporate one or more of a processor 2550, a storage 2560, one or more neuromorphic devices 2570, and a network interface 2590 to couple each of the one or more federated devices 2500 to the network 2999. The storage 2560 may store a control routine 2540 and/or federated area parameters 2536. In some embodiments, part of the storage 2560 may be allocated for at least a portion of one or more federated areas 2566. In other embodiments, each of the one or more federated devices 2500 may incorporate and/or be coupled to one or more storage devices 2600 within which storage space may be allocated for at least a portion of one or more federated areas 2566. Regardless of where storage space is allocated for one or more federated areas 2566, each of the one or more federated areas 2566 may hold one or more job flow definitions 2220, one or more DAGs 2270, one or more data sets 2330, one or more task routines 2440, one or more macros 2470, one or more instance logs 2720, and/or one or more result reports 2770. In embodiments in which job flows are performed by the one or more federated devices 2500 within a federated area 2566, such a federated area 2566 may at least temporarily hold one or more data sets 2370 during times when one or more of the data sets 2370 are generated and temporarily maintained as part of exchanging data between tasks during the performance of one or more job flows. In embodiments in which DAGs 2270 are generated by the one or more federated devices 2500 within a federated area 2566, such a federated area 2566 may at least temporarily hold one or more macros 2470 during times when one or more of the macros 2470 are generated as part of generating a DAG 2270.

In some embodiments that include the one or more storage devices 2600 in addition to the one or more federated devices 2500, the maintenance of the one or more federated areas 2566 within such separate and distinct storage devices may be part of an approach of specialization between the federated devices 2500 and the storage devices 2600. More specifically, there may be numerous ones of the federated devices 2500 forming the grid 2005 in which each of the federated devices 2500 may incorporate processing and/or other resources selected to better enable the execution of task routines 2440 as part of performing job flows defined by the job flow definitions 2220. Correspondingly, there may be numerous ones of the storage devices 2600 forming the grid 2006 in which the storage devices 2600 may be organized and interconnected in a manner providing a distributed storage system that may provide increased speed of access to objects within each of the one or more federated areas 2566 through parallelism, and/or may provide fault tolerance of storage. Such distributed storage may also be deemed desirable to better accommodate the storage of particularly large ones of the data sets 2330 and/or 2370, as well as any particularly large data sets that may be incorporated into one or more of the result reports 2770.

The control routine 2540 may incorporate a sequence of instructions operative on the processor 2550 of each of the one or more federated devices 2500 to implement logic to perform various functions. In embodiments in which multiple ones of the federated devices 2500 are operated together as the grid 2005 of the federated devices 2500, the sequence of instructions of the control routine 2540 may be operative on the processor 2550 of each of the federated devices 2500 to perform various functions at least partially in parallel with the processors 2550 of others of the federated devices 2500. As will be described in greater detail, among such functions may be the at least partially parallel performance of job flows defined by one or more of the job flow definitions 2220, which may include the at least partially parallel execution of one or more of the task routines 2440 to perform tasks specified by the one or more job flow definitions 2220. As will also be described in greater detail, also among such functions may be the operation of the one or more neuromorphic devices 2570 to instantiate one or more neural networks to enable neuromorphic processing to be employed in the performance of one or more of such tasks.

As depicted, the control routine 2540 may include a federated area component 2546 operable on the processor 2550 to generate at least a portion of each of the one or more federated areas 2566 within either the storage 2560 or one or more of the storage devices 2600. In so doing, the processor 2550 may be caused to retrieve specifications from within the federated area parameters 2536 of various aspects of each of the one or more federated areas 2566. By way of example, the federated area parameters 2536 may specify a minimum and/or maximum amount of storage space to be allocated to each federated area 2566, a manner of organizing the objects stored therein, one or more aspects of the manner in which the storage devices 2600 are operated together to provide storage space for the one or more federated areas 2566, etc.

Figure 14A:
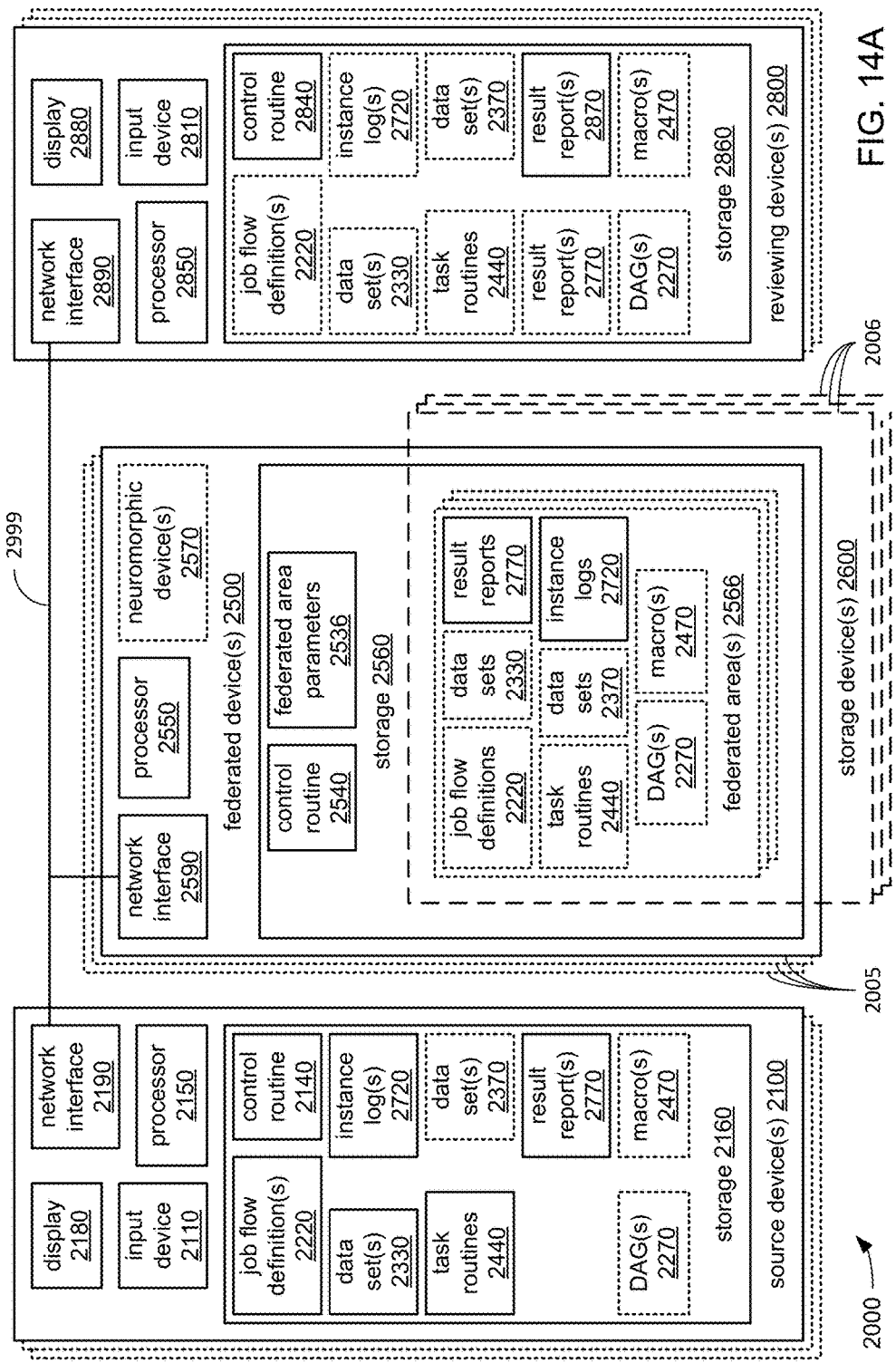
FIGS. 14A and 14B, together, illustrate an example alternate embodiment of a distributed processing system.
Figure 14B:
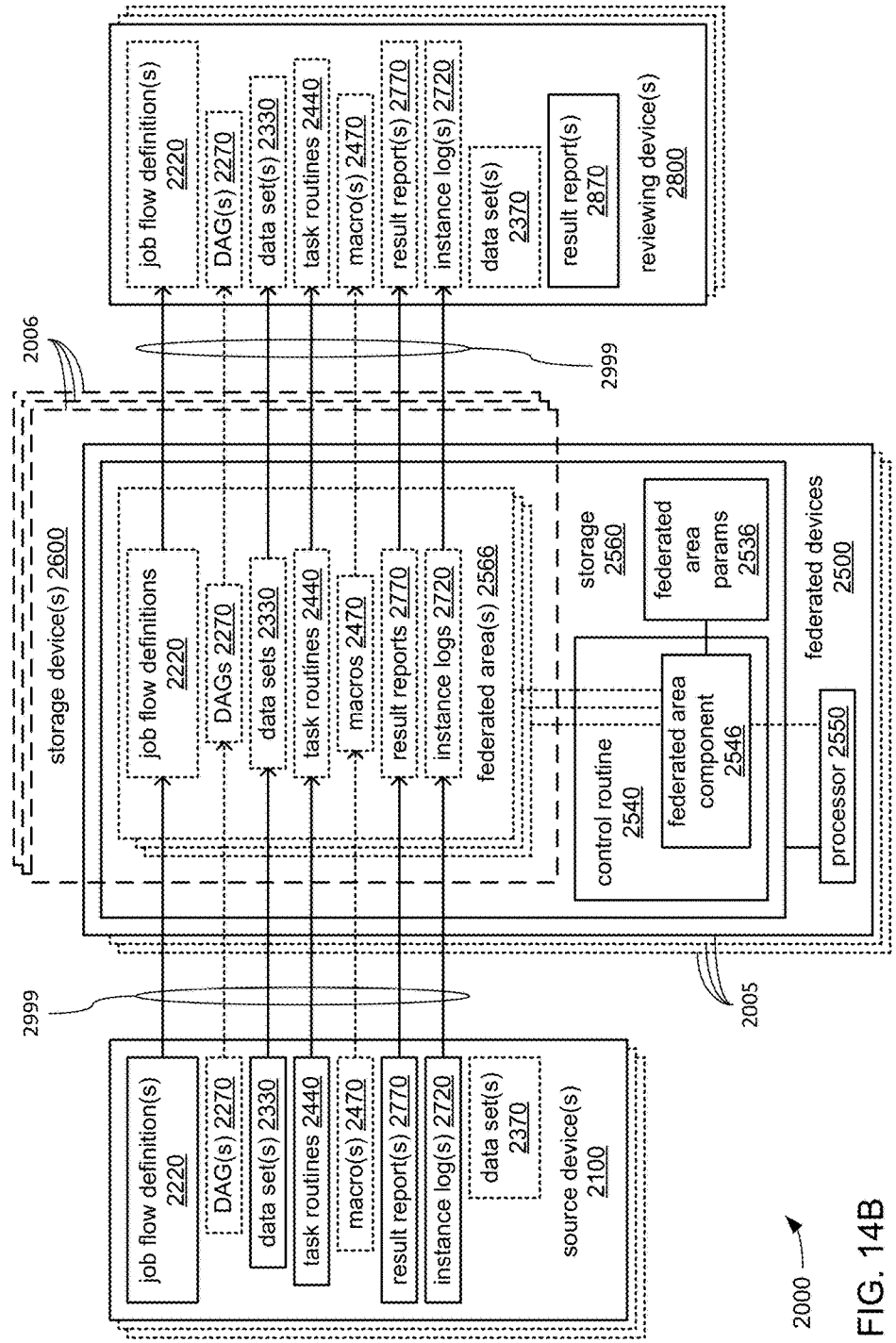

FIG. 14A illustrates a block diagram of another example embodiment of a distributed processing system 2000 also incorporating one or more source devices 2100, one or more reviewing devices 2800, one or more federated devices 2500 that may form the federated device grid 2005, and/or one or more storage devices 2600 that may form the storage device grid 2006. FIG. 14B illustrates exchanges, through a network 2999, of communications among the devices 2100, 2500, 2600 and/or 2800 associated with the controlled storage of and/or access to various objects within one or more federated areas 2566. The example distributed processing system 2000 of FIGS. 14A-B is substantially similar to the example processing system 2000 of FIGS. 13A-B, but featuring an alternate embodiment of the one or more federated devices 2500 providing an embodiment of the one or more federated areas 2566 within which job flows are not performed. Thus, while task routines 2440 may be executed by the one or more federated devices 2500 within each of the one or more federated areas 2566 in addition to storing objects within each of the one or more federated areas 2566 of FIGS. 13A-B, in FIGS. 14A-B, each of the one or more federated areas 2566 serves as a location in which objects may be stored, but within which no task routines 2440 are executed.

Instead, in the example distributed processing system 2000 of FIGS. 14A-B, the performance of job flows, including the execution of task routines 2440 of job flows, may be performed by the one or more source devices 2100 and/or by the one or more reviewing devices 2800. Thus, as best depicted in FIG. 14B, the one or more source devices 2100 may be operated to interact with the one or more federated devices 2500 to store a wider variety of objects associated with the performance of a job flow within the one or more source devices 2100. More specifically, one of the source devices 2100 may be operated to store, in a federated area 2566, a result report 2770 and/or an instance log 2720 associated with a performance of a job flow defined by a job flow definition 2220, in addition to also being operated to store the job flow definition 2220, along with the associated task routines 2440 and any associated data sets 2330 in a federated area 2566. Additionally, such a one of the source devices 2100 may also store any DAGs 2270 and/or macros 2470 that may be associated with those task routines 2440. As a result, each of the one or more federated areas 2566 is employed to store a record of performances of job flows that occur externally thereof.

Correspondingly, as part of a review of a performance of a job flow, the one or more reviewing devices 2800 may be operated to retrieve the job flow definition 2220 of the job flow, along with the associated task routines 2440 and any associated data sets 2330 from a federated area 2566, in addition to retrieving the corresponding result report 2770 generated by the performance and/or the instance log 2720 detailing aspects of the performance With such a more complete set of the objects associated with the performance retrieved from one or more federated areas 2566, the one or more reviewing devices 2800 may then be operated to independently repeat the performance earlier carried out by the one or more source devices 2100. Following such an independent performance, a new result report 2870 generated by the independent performance may then be compared to the retrieved result report 2770 as part of reviewing the outputs of the earlier performance. Where macros 2470 and/or DAGs 2270 associated with the associated task routines 2440 are available, the one or more reviewing devices 2800 may also be operated to retrieve them for use in analyzing any discrepancies revealed by such an independent performance.

Referring back to all of FIGS. 13A-B and 14A-B, the role of generating objects and the role of reviewing the use of those objects in a past performance have been presented and discussed as involving separate and distinct devices, specifically, the source devices 2100 and the reviewing devices 2800, respectively. However, it should be noted that other embodiments are possible in which the same one or more devices may be employed in both roles such that at least a subset of the one or more source devices 1100 and the one or more reviewing devices 1800 may be one and the same.

Figure 15A:
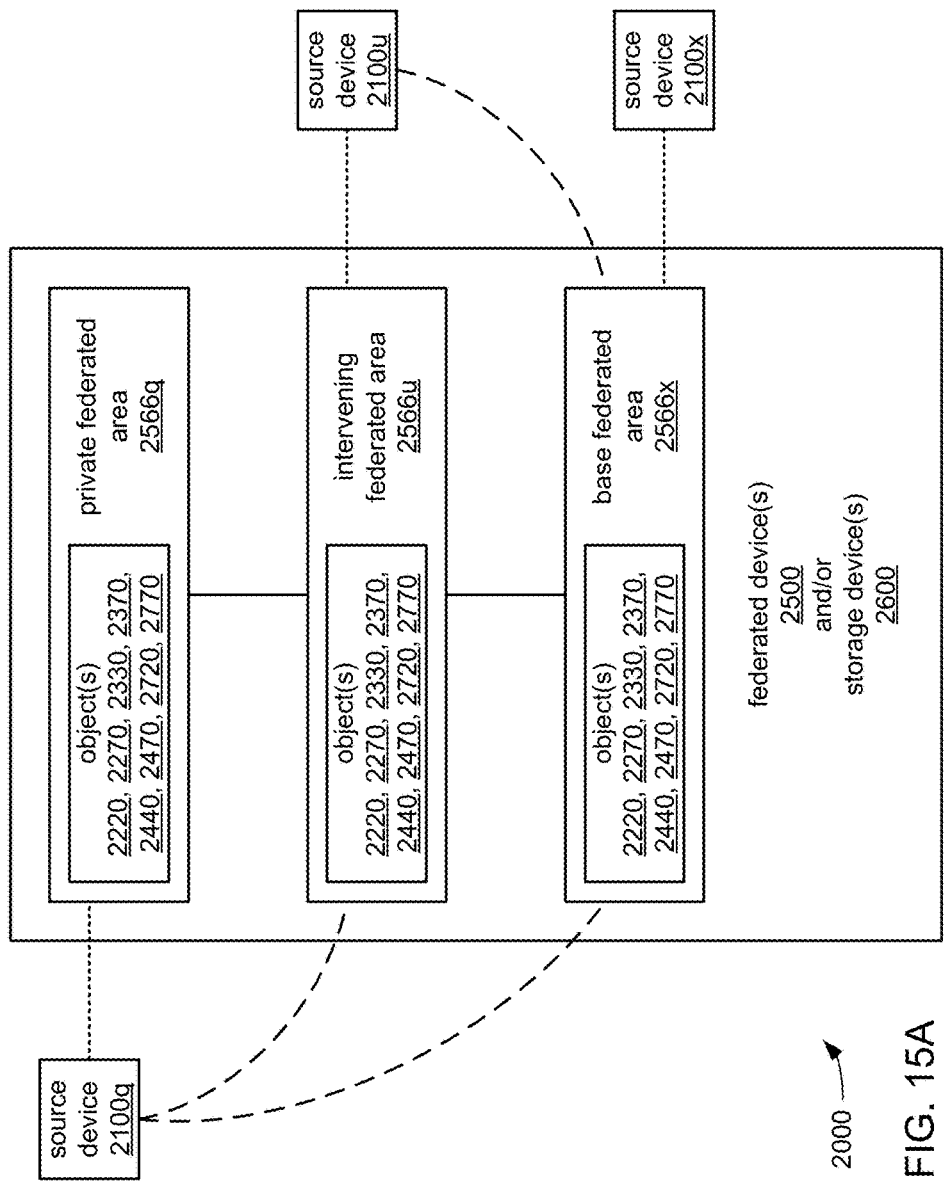
FIGS. 15A, 15B and 15C each illustrate an example hierarchical set of federated areas.
Figure 15B:
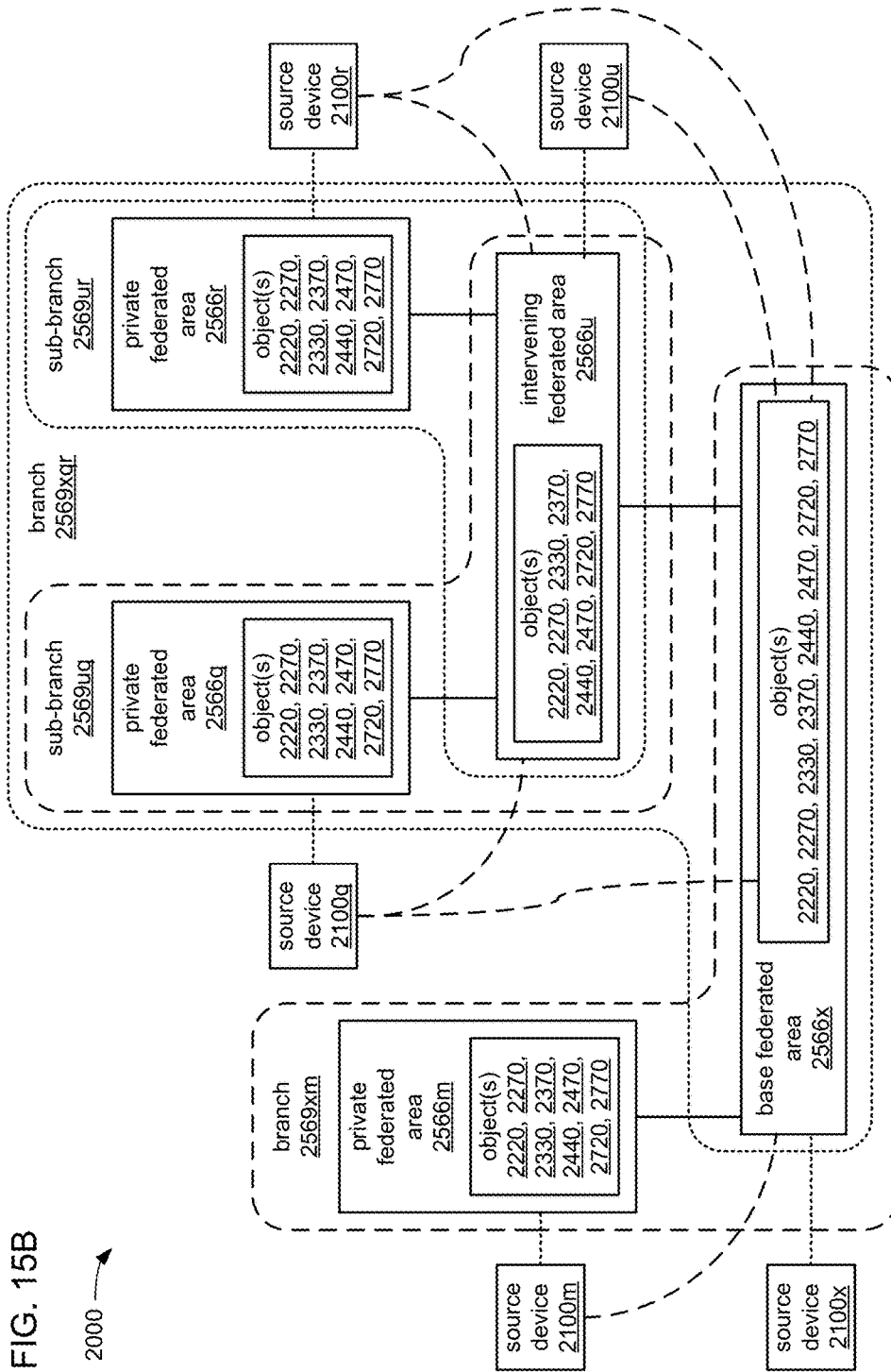
Figure 15C:
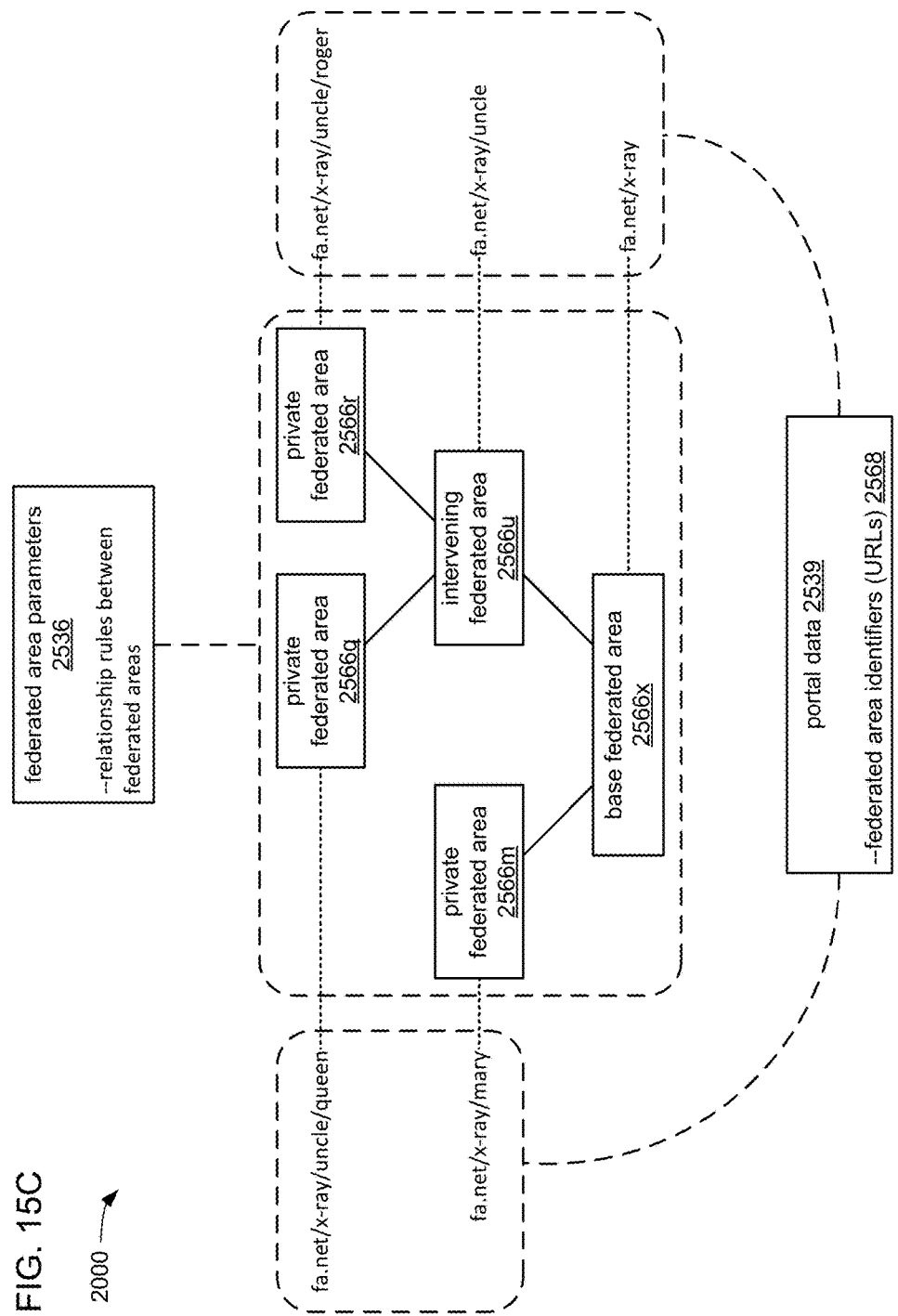

FIGS. 15A, 15B and 15C, together, illustrate aspects of the provision of multiple related federated areas 2566 by the one or more federated devices 2500. FIG. 15A depicts aspects of a linear hierarchy of federated areas 2566, FIG. 15B depicts aspects of a hierarchical tree of federated areas 2566, and FIG. 15C depicts aspects of navigating among federated areas 2566 within the hierarchical tree of FIG. 15B. FIGS. 15A-C, together, also illustrate aspects of one or more relationships that may be put in place among federated areas 2566.

Turning to FIG. 15A, a set of federated areas $2566q$, $2566u$ and $2566x$ may be maintained within the storage(s) 2560 of the one or more federated devices 2500 and/or within the one or more storage devices 2600. As depicted, a hierarchy of degrees of restriction of access may be put in place among the federated areas $2566q$, $2566u$ and $2566x$. More specifically, the federated area $2566q$ may be a private federated area subject to the greatest degree of restriction in access among the depicted federated areas 2566*q*, 2566*u* and 2566*x*. In contrast, the base federated area 2566*x* may a more "public" federated area to the extent that it may be subject to the least restricted degree of access among the depicted federated areas 2566*q*, 2566*u* and 2566*x*. Further, the intervening federated area 2566*u* may be subject to an intermediate degree of restriction in access ranging from almost as restrictive as the greater degree of restriction applied to the private federated area 2566*q* to almost as unrestrictive as the lesser degree of restriction applied to the base federated area 2566*x*. Stated differently, the number of users granted access may be the largest for the base federated area 2566*x*, may progressively decrease to an intermediate number for the intervening federated area 2566*u*, and may progressively decrease further to a smallest number for the private federated area 2566*q*.

There may be any of a variety of scenarios that serve as the basis for selecting the degrees of restriction of access to each of the federated areas 2566*q*, 2566*u* and 2566*x*. By way of example, all three of these federated areas may be under the control of a user of the source device 2100*q* where such a user may desire to provide the base federated area 2566*x* as a storage location to which a relatively large number of other users may be granted access to make use of objects stored therein by the user of the source device 2100*q* and/or at which other users may store objects as a mechanism to provide objects to the user of the source device 2100*q*. Such a user of the source device 2100*q* may also desire to provide the intervening federated area 2566*u* as a storage location to which a smaller number of selected other users may be granted access, where the user of the source device 2100*q* desires to exercise tighter control over the distribution of objects stored therein.

As a result of this hierarchical range of restrictions in access, a user of the depicted source device 2100*x* may be granted access to the base federated area 2566*x*, but not to either of the other federated areas 2566*u* or 2566*q*. A user of the depicted source device 2100*u* may be granted access to the intervening federated area 2566*u*. As depicted, such a user of the source device 2100*u* may also be granted access to the base federated area 2566*x*, for which restrictions in access are less than that of the intervening federated area 2566*u*. However, such a user of the source device 2100*u* may not be granted access to the private federated area 2566*q*. In contrast, a user of the source device 2100*q* may be granted access to the private federated area 2566*q*. As depicted, such a user of the source device 2100*q* may also be granted access to the intervening federated area 2566*u* and the base federated area 2566*x*, both of which are subject to lesser restrictions in access than the private federated area 2566*q*.

As a result of the hierarchy of access restrictions just described, users granted access to the intervening federated area 2566*u* are granted access to objects 2220, 2270, 2330, 2370, 2440, 2470, 2720 and/or 2770 that may be stored within either of the intervening federated area 2566*u* or the base federated area 2566*x*. To enable such users to request the performance of job flows using objects stored in either of these federated areas 2566*x* and 2566*u*, an inheritance relationship may be put in place between the intervening federated area 2566*u* and the base federated area 2566*x* in which objects stored within the base federated area 2566*x* may be as readily available to be utilized in the performance of a job flow at the request of a user of the intervening federated area 2566*u* as objects that are stored within the intervening federated area 2566*u*.

Similarly, also as a result of the hierarchy of access restrictions just described, the one or more users granted access to the private federated area 2566*q* are granted access to objects 2220, 2270, 2330, 2370, 2440, 2470, 2720 and/or 2770 that may be stored within any of the private federated area 2566*q*, the intervening federated area 2566*u* or the base federated area 2566*x*. Correspondingly, to enable such users to request the performance of job flows using objects stored in any of these federated areas 2566*x* and 2566*u*, an inheritance relationship may be put in place among the private federated area 2566*q*, the intervening federated area 2566*u* and the base federated area 2566*x* in which objects stored within the base federated area 2566*x* or the intervening federated area 2566*u* may be as readily available to be utilized in the performance of a job flow at the request of a user of the private federated area 2566*q* as objects that are stored within either the intervening federated area 2566*u* or the base federated area 2566*x*.

Such inheritance relationships among the federated areas 2566*q*, 2566*u* and 2566*x* may be deemed desirable to encourage efficiency in the storage of objects throughout by eliminating the need to store multiple copies of the same objects throughout multiple federated areas 2566 to make them accessible throughout a hierarchy thereof. More precisely, a task routine 2440 stored within the base federated area 2566*x* need not be copied into the private federated area 2566*q* to become available for use during the performance of a job flow requested by a user of the private federated area 2566*q* and defined by a job flow definition 2220 that may be stored within the private federated area 2566*q*.

In some embodiments, such inheritance relationships may be accompanied by corresponding priority relationships to provide at least a default resolution to instances in which multiple versions of an object are stored in different ones of the federated areas 2566*q*, 2566*u* and 2566*x* such that one version thereof must be selected for use in the performance of a job flow. By way of example, and as will be explained in greater detail, there may be multiple versions of a task routine 2440 that may be stored within a single federated area 2566 or across multiple federated areas 2566. This situation may arise as a result of improvements being made to such a task routine 2440, and/or for any of a variety of other reasons. Where a priority relationship is in place between at least the base federated area 2566*x* and the intervening federated area 2566*u*, in addition to an inheritance relationship therebetween, and where there is a different version of a task routine 2440 within each of the federated areas 2566*u* and 2566*x* that may be used in the performance of a job flow requested by a user of the intervening federated area 2566*u* (e.g., through the source device 2100*u*), priority may be automatically given by the processor(s) 2550 of the one or more federated devices 2500 to using a version stored within the intervening federated area 2566*u* over using any version that may be stored within the base federated area 2566*x*. Stated differently, the processor(s) 2550 of the one or more federated devices 2500 may be caused to search within the intervening federated area 2566*u*, first, for a version of such a task routine 2440, and may use a version found therein if a version is found therein. The processor(s) 2550 of the one or more federated devices 2500 may then entirely forego searching within the base federated area 2566*x* for a version of such a task routine 2440, unless no version of the task routine 2440 is found within the intervening federated area 2566*u*.

Similarly, where a priority relationship is in place between among all three of the federated areas 2566*x*, 2566*u* and 2566*q*, in addition to an inheritance relationship thereamong, and where there is a different version of a task routine 2440 within each of the federated areas 2566*q*, 2566*u* and 2566*x* that may be used in the performance of a job flow requested by a user of the private federated area 2566*q* (e.g., through the source device 2100*q*), priority may be automatically given to using the version stored within the private federated area 2566*q* over using any version that may be stored within either the intervening federated area 2566*u* or the base federated area 2566*x*. However, if no version of such a task routine 2440 is found within the private federated area 2566*q*, then the processor(s) 2550 of the one or more federated devices 2500 may be caused to search within the intervening federated area 2566*u* for a version of such a task routine 2440, and may use a version found therein if a version is found therein. However, if no version of such a task routine 2440 is found within either the private federated area 2566*q* or the intervening federated area 2566*u*, then the processor(s) 2550 of the one or more federated devices 2500 may be caused to search within the base federated area 2566*x* for a version of such a task routine 2440, and may use a version found therein if a version is found therein.

In some embodiments, inheritance relationships may be accompanied by corresponding dependency relationships that may be put in place to ensure that all objects required to perform a job flow continue to be available. As will be explained in greater detail, for such purposes as enabling accountability and/or investigating errors in analyses, it may be deemed desirable to impose restrictions against actions that may be taken to delete (or otherwise make inaccessible) objects stored within a federated area 2566 that are needed to perform a job flow that is defined by a job flow definition 2220 within that same federated area 2566. Correspondingly, where an inheritance relationship is put in place among multiple federated areas 2566, it may be deemed desirable to put a corresponding dependency relationship in place in which similar restrictions are imposed against deleting (or otherwise making inaccessible) an object in one federated area 2566 that may be needed for the performance of a job flow defined by a job flow definition 2220 stored within another federated area 2566 that is related by way of an inheritance relationship put in place between the two federated areas 2566. More specifically, where a job flow definition 2220 is stored within the intervening federated area 2566*u* that defines a job flow that requires a task routine 2440 stored within the base federated area 2566*x* (which is made accessible from within the intervening federated area 2566*u* as a result of an inheritance relationship with the base federated area 2566*x*), the processor(s) 2550 of the one or more federated devices 2500 may not permit the task routine 2440 stored within the base federated area 2566*x* to be deleted. However, in some embodiments, such a restriction against deleting the task routine 2440 stored within the base federated area 2566*x* may cease to be imposed if the job flow definition 2220 that defines the job flow that requires that task routine 2440 is deleted, and there are no other job flow definitions 2220 stored elsewhere that also have such a dependency on that task routine 2440.

Similarly, where a job flow definition 2220 is stored within the private federated area 2566*q* that defines a job flow that requires a task routine 2440 stored within either the intervening federated area 2566*u* or the base federated area 2566*x* (with which there may be an inheritance relationship), the processor(s) of the one or more federated devices 2500 may not permit that task routine 2440 to be deleted. However, such a restriction against deleting that task routine 2440 may cease to be imposed if the job flow definition 2220 that defines the job flow that requires that task routine 2440 is deleted, and there are no other job flow definitions 2220 stored elsewhere that also have such a dependency on that task routine 2440.

In concert with the imposition of inheritance and/or priority relationships among a set of federated areas 2566, the exact subset of federated areas 2566 to which a user is granted access may be used as a basis to automatically select a "perspective" from which job flows may be performed by the one or more federated devices 2500 at the request of that user. Stated differently, where a user requests the performance of a job flow, the retrieval of objects required for that performance may be based, at least by default, on what objects are available at the federated area 2566 among the one or more federated areas 2566 to which the user is granted access that has highest degree of access restriction. The determination of what objects are so available may take into account any inheritance and/or priority relationships that may be in place that include such a federated area 2566. Thus, where a user granted access to the private federated area 2566*q* requests the performance of a job flow, the processor(s) 2550 of the federated devices 2500 may be caused to select the private federated area 2566*q* as the perspective on which determinations concerning which objects are available for use in that performance will be based, since the federated area 2566*q* is the federated area 2566 with the most restricted access that the user has been granted access to within the depicted hierarchy of federated areas 2566. With the private federated area 2566*q* so selected as the perspective, any inheritance and/or priority relationships that may be in place between the private federated area 2566*q* and either of the intervening federated area 2566*u* or the base federated area 2566*x* may be taken into account in determining whether any objects stored within either are to be deemed available for use in that performance (which may be a necessity if there are any objects that are needed for that performance that are not stored within the private federated area 2566*q*).

Alternatively or additionally, in some embodiments, such an automatic selection of perspective may be used to select the storage space in which a performance takes place. Stated differently, as part of maintaining the security that is intended to be provided through the imposition of a hierarchy of degrees of access restriction across multiple federated areas 2566, a performance of a job flow requested by a user may, at least by default, be performed within the federated area that has the highest degree of access restriction among the one or more federated areas to which that user has been granted access. Thus, where a user granted access to the private federated area 2566*q* requests a performance of a job flow by the one or more federated devices 2500, such a requested performance of that job flow may automatically be so performed by the processor(s) 2550 of the one or more federated devices 2500 within the storage space of the private federated area 2566*q*. In this way, aspects of such a performance are kept out of reach from other users that have not been granted access to the private federated area 2566*q*, including any objects that may be generated as a result of such a performance (e.g., temporary data sets 2370, result reports 2770, etc.). Such a default selection of a federated area 2566 having more restricted access in which to perform a job flow may be based on a presumption that each user will prefer to have the job flow performances that they request being performed within the most secure federated area 2566 to which they have been granted access.

It should be noted that, although a linear hierarchy of just three federated areas is depicted in FIG. 15A for sake of simplicity of depiction and discussion, other embodiments of a linear hierarchy are possible in which there may be multiple intervening federated areas 2566 of progressively changing degree of restriction in access between the base federated area 2566x and the private federated area 2566q. Therefore, the depicted quantity of federated areas should not be taken as limiting.

It should also be noted that, although just a single source device 2100 is depicted as having been granted access to each of the depicted federated areas 2566, this has also been done for sake of simplicity of depiction and discussion, and other embodiments are possible in which access to one or more of the depicted federated areas 2566 may be granted to users of more than one device. More specifically, the manner in which restrictions in access to a federated area 2566 may be implemented may be in any of a variety of ways, including and not limited to, restricting access to one or more particular users (e.g., through use of passwords or other security credentials that are associated with particular persons and/or with particular organizations of people), or restricting access to one or more particular devices (e.g., through certificates or security credentials that are stored within one or more particular devices that may be designated for use in gaining access).

Turning to FIG. 15B, a larger set of federated areas 2566m, 2566q, 2566r, 2566u and 2566x may be maintained within the storage(s) 2560 of the one or more federated devices 2500 and/or within the one or more storage devices 2600. As depicted, a hierarchy of degrees of restriction of access, like the hierarchy depicted in FIG. 15A, may be put in place among the federated areas 2566 within each of multiple branches and/or sub-branches of a hierarchical tree. More specifically, each of the federated areas 2566m, 2566q and 2566r may each be a private federated area subject to the highest degrees of restriction in access among the depicted federated areas 2566m, 2566q, 2566r, 2566u and 2566x. Again, in contrast, the base federated area 2566x may be a more public federated area to the extent that it may be subject to the least restricted degree of access among the depicted federated areas 2566m, 2566q, 2566r, 2566u and 2566x. Further, the intervening federated area 2566u interposed between the base federated area 2566x and each of the private federated areas 2566q and 2566r may be subject to an intermediate degree of restriction in access ranging from almost as restrictive as the degree of restriction applied to either of the private federated areas 2566q or 2566r to almost as unrestrictive as the degree of restriction applied to the base federated area 2566x. Thus, as in the case of the linear hierarchy depicted in FIG. 15A, the number of users granted access may be the largest for the base federated area 2566x, may progressively decrease to an intermediate number for the intervening federated area 2566u, and may progressively decrease further to smaller numbers for each of the private federated areas 2566m, 2566q and 2566r. Indeed, the hierarchical tree of federated areas 2566 of FIG. 15B shares many of the characteristics concerning restrictions of access of the linear hierarchy of federated areas 2566 of FIG. 15A, such that the linear hierarchy of FIG. 15A may be aptly described as a hierarchical tree without branches.

As a result of the depicted hierarchical range of restrictions in access, a user of the depicted source device 2100x may be granted access to the base federated area 2566x, but not to any of the other federated areas 2566m, 2566q, 2566r or 2566u. A user of the depicted source device 2100u may be granted access to the intervening federated area 2566u, and may also be granted access to the base federated area 2566x, for which restrictions in access are less than that of the intervening federated area 2566u. However, such a user of the source device 2100u may not be granted access to any of the private federated areas 2566m, 2566q or 2566r. In contrast, a user of the source device 2100q may be granted access to the private federated area 2566q, and may also granted access to the intervening federated area 2566u and the base federated area 2566x, both of which are subject to lesser restrictions in access than the private federated area 2566q. A user of the source device 2100r may similarly be granted access to the private federated area 2566r, and may similarly also be granted access to the intervening federated area 2566u and the base federated area 2566x. Additionally, a user of the source device 2100m may be granted access to the private federated area 2566m, and may also be granted access to the base federated area 2566x. However, none of the users of the source devices 2100m, 2100q and 2100r may be granted access to the others of the private federated areas 2566m, 2566q and 2566r.

As in the case of the linear hierarchy of FIG. 15A, within the depicted branch 2569xm, one or more of inheritance, priority and/or dependency relationships may be put in place to enable objects stored within the base federated area 2566x to be accessible from the private federated area 2566m to the same degree as objects stored within the private federated area 2566m. Similarly, within the depicted branch 2569xqr, and within each of the depicted sub-branches 2569uq and 2569ur, one or more of inheritance, priority and/or dependency relationships may be put in place to enable objects stored within either of the intervening federated area 2566u and the base federated area 2566x to be accessible from the private federated areas 2566q and 2566r to the same degree as objects stored within the private federated areas 2566q and 2566r, respectively.

Turning to FIG. 15C, the same hierarchical tree of federated areas 2566m, 2566q, 2566r, 2566u and 2566x of FIG. 15B is again depicted to illustrate an example of the use of web access techniques to enable a user of a remote device (e.g., one of the source devices 2100 or one of the reviewing devices 2800) to navigate about the hierarchical tree and toward a desired one of the depicted federated areas 2566m, 2566q, 2566r, 2566u or 2566x. More specifically, each of the federated areas 2566m, 2566q, 2566r, 2566u and 2566x may be assigned a human-readable textual name "mary", "queen", "roger", "uncle" and "x-ray", respectively, and each of the assigned names may form at least part of a corresponding URL (or other form of federated area identifier) 2568 that is assigned to each of these federated areas. As depicted, the type of federated area identifier 2568 used is a URL, and each URL may be structured to provide an indication of where its corresponding one of these federated areas is located within the hierarchical tree. By way of example, the URL of the base federated area 2566x, which is located at the root of the tree, may include the name "x-ray" of the base federated area 2566x, but not include any of the names assigned to any other of these federated areas. In contrast, each of the URLs of each of the private federated areas located at the leaves of the hierarchical tree may be formed, at least partially, as a concatenation of the names of the federated areas that are along the path from each such private federated area at a leaf location to the base federated area 2566x at the root of the tree. By way of example, the private federated area 2566r may be assigned a URL that includes the names of the private federated area 2566r, the intervening federated area 2566u and the base federated area 2566x, thereby providing an indication of the entire path from the leaf position of the private federated area 2566r to the root position of the base federated area 2566x.

Figure 16A:
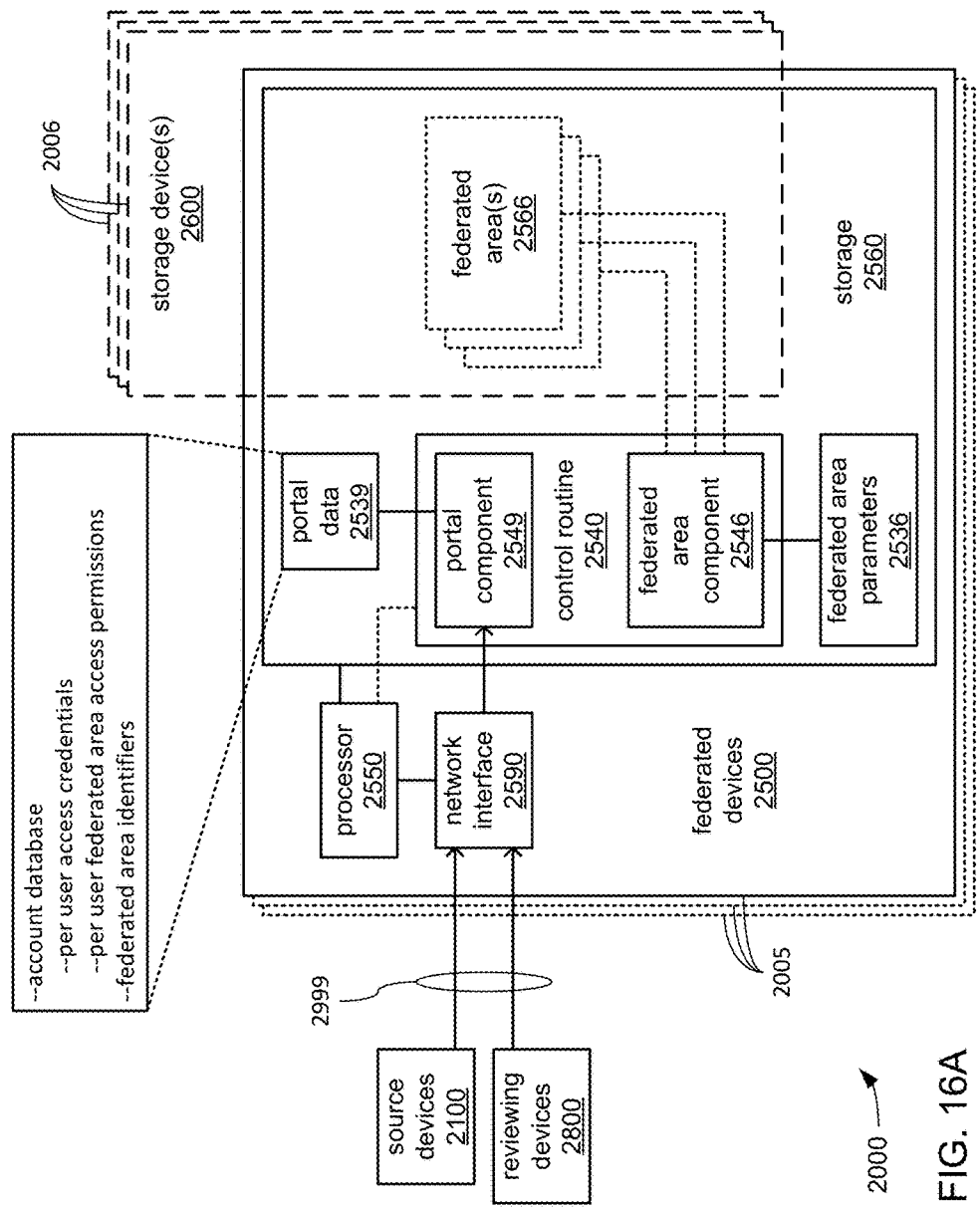

FIGS. 16A, 16B, 16C, 16D and 16E, together, illustrate the manner in which the one or more federated devices 2500 instantiate and maintain federated areas 2566. FIG. 16A illustrates aspects of selectively allowing users of one or more federated areas 2566 to exercise control over various aspects thereof. FIGS. 16B-E illustrates aspects of supporting the addition of new federated areas 2566 and/or new users of federated areas 2566, using examples of combinations of federated areas 2566 based on the example hierarchical tree of federated areas introduced in FIGS. 15B-C.

Turning to FIG. 16A, the control routine 2540 executed by processor(s) 2550 of the one or more federated devices 2500 may include a portal component 2549 to restrict access to the one or more federated areas 2566 to only authorized users (e.g., authorized persons, entities and/or devices), and may restrict the types of accesses made to only the federated area(s) 2566 for which each user is authorized. However, in alternate embodiments, control of access to the one or more federated areas 2566 may be provided by one or more other devices that may be interposed between the one or more federated devices 2500 and the network 2999, or that may be interposed between the one or more federated devices 2500 and the one or more storage devices 2600 (if present), or that may still otherwise cooperate with the one or more federated devices 2500 to do so.

In executing the portal component 2549, the processor(s) 2550 of the one or more federated devices 2500 may be caused to operate one or more of the network interfaces 2590 to provide a portal accessible by other devices via the network 2999 (e.g., the source devices 2100 and/or the reviewing devices 2800), and through which access may be granted to the one or more federated areas 2566. In some embodiments in which the one or more federated devices 2500 additionally serve to control access to the one or more federated areas 2566, the portal may be implemented employing the hypertext transfer protocol over secure sockets layer (HTTPS) to provide a website securely accessible from other devices via the network 2999. Such a website may include a webpage generated by the processor 2550 that requires the provision of a password and/or other security credentials to gain access to the one or more federated areas 2566. Such a website may be configured for interaction with other devices via an implementation of representational state transfer (REST or RESTful) application programming interface (API). However, other embodiments are possible in which the processor 2550 may provide a portal accessible via the network 2999 that is implemented in any of a variety of other ways using any of a variety of handshake mechanisms and/or protocols to selectively provide secure access to the one or more federated areas 2566.

Regardless of the exact manner in which a portal may be implemented and/or what protocol(s) may be used, in determining whether to grant or deny access to the one or more federated areas 2566 to another device from which a request for access has been received, the processor(s) 2550 of the one or more federated devices 2500 may be caused to refer to indications stored within portal data 2539 of users authorized to be granted access. Such indications may include indications of security credentials expected to be provided by such persons, entities and/or machines. In some embodiments, such indications within the portal data 2539 may be organized into accounts that are each associated with an entity with which particular persons and/or devices may be associated. The processor(s) 2550 may be caused to employ the portal data 2539 to evaluate security credentials received in association with a request for access to the at least one of the one or more federated areas 2566, and may operate a network interface 2590 of one of the one or more federated devices 2500 to transmit an indication of grant or denial of access to the at least one requested federated area 2566 depending on whether the processor(s) 2550 determine that access is to be granted.

Beyond selective granting of access to the one or more federated areas 2566 (in embodiments in which the one or more federated devices 2500 control access thereto), the processor(s) 2550 may be further caused by execution of the portal component 2549 to restrict the types of access granted, depending on the identity of the user to which access has been granted. By way of example, the portal data 2539 may indicate that different users are each to be allowed to have different degrees of control over different aspects of one or more federated areas 2566. A user may be granted a relatively high degree of control such that they are able to create and/or remove one or more federated areas 2566, are able to specify which federated areas 2566 may be included in a set of federated areas, and/or are able to specify aspects of relationships among one or more federated areas 2566 within a set of federated areas. Alternatively or additionally, a user may be granted a somewhat more limited degree of control such that they are able to alter the access restrictions applied to one or more federated areas 2566 such that they may be able to control which users have access each of such one or more federated areas 2566. The processor(s) 2550 may be caused to store indications of such changes concerning which users have access to which federated areas 2566 and/or the restrictions applied to such access as part of the portal data 2539, where such indications may take the form of sets of correlations of authorized users to federated areas 2566 and/or correlations of federated areas 2566 to authorized users.

Figure 16B:
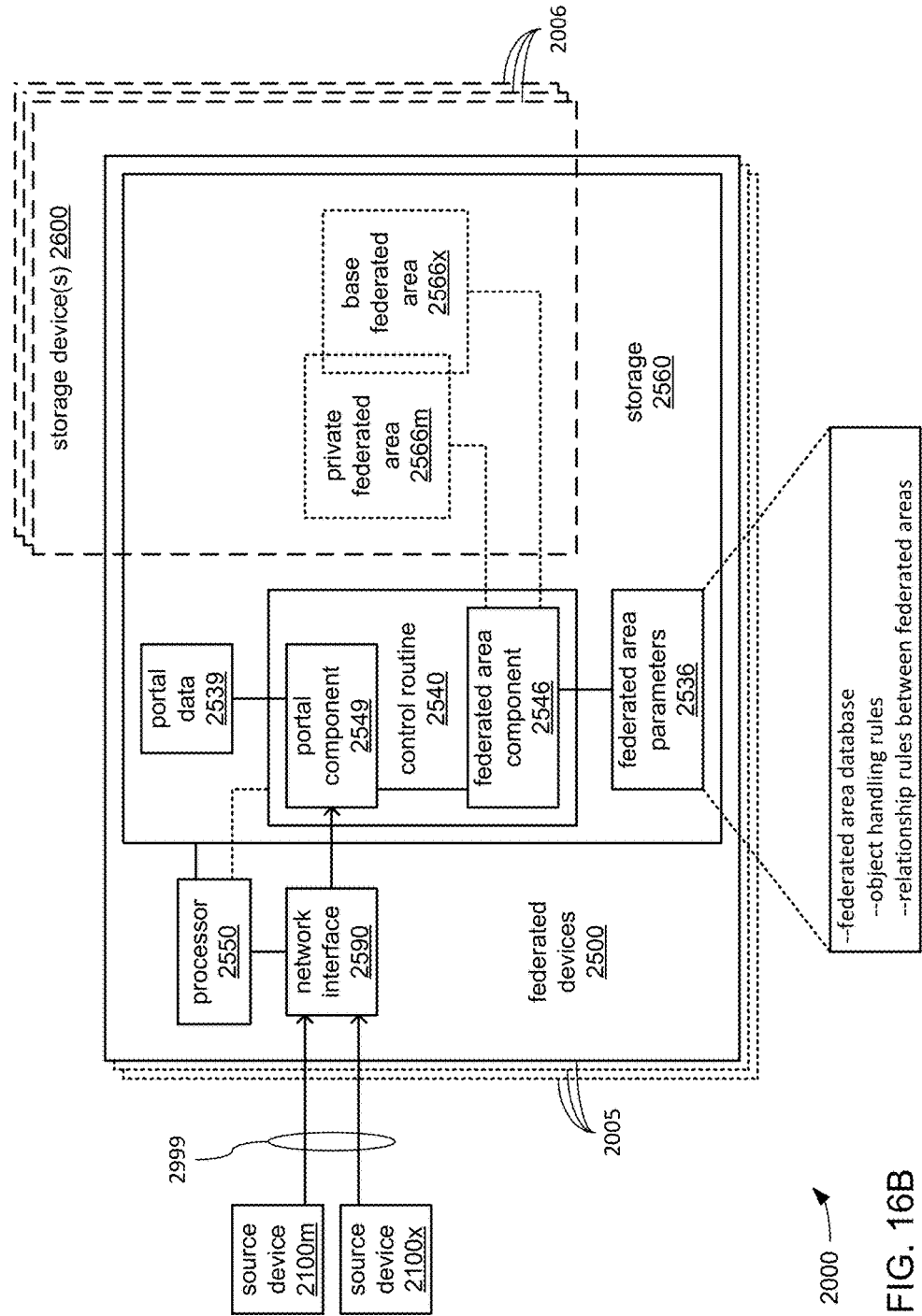

Turning to FIG. 16B, as depicted, the processor(s) 2550 of the one or more federated devices 2500 may be caused to instantiate and maintain both a private federated area 2566m and a base federated area 2566x as part of a set of related federated areas that form a linear hierarchy of degrees of access restriction therebetween. In some embodiments, the depicted pair of federated areas 2566m and 2566x may have been caused to be generated by a user of the source device 2100m having sufficient access permissions (as determined via the portal component 2549) as to be able to create the private federated area 2566m for private storage of one or more objects that are meant to be accessible by a relatively small number of users, and to create the related public federated area 2566x for storage of objects meant to be made more widely available through the granting of access to the base federated area 2566x to a larger number of users. Such access permissions may also include the granted ability to specify what relationships may be put in place between the federated areas 2566m and 2566x, including and not limited to, any inheritance, priority and/or dependency relationships therebetween. Such characteristics about each of the federated areas 2566m and 2566x may be caused to be stored by the federated area component 2546 as part of the federated area parameters 2536. As depicted, the federated area parameters 2536 may include a database of information concerning each federated area 2566 that is instantiated and/or maintained by the one or more federated devices 2500.

As an alternative to both of the federated areas 2566m and 2566x having been created and caused to be related to each other through express requests by a user, in other embodiments, the processor(s) 2550 of the one or more federated devices 2500 may be caused to automatically create and configure the private federated area 2566m in response to a request to add a user associated with the source device 2100*m* to the users permitted to access the base federated area 2566*x*. More specifically, a user of the depicted source device 2100*x* that may have access permissions to control various aspects of the base federated area 2566*x* may operate the source device 2100*x* to transmit a request to the one or more federated devices 2500, via the portal provided thereby on the network 2999, to grant a user associated with the source device 2100*m* access to use the base federated area 2566*x*. In response, and in addition to so granting the user of the source device 2100*m* access to the base federated area 2566*x*, the processor(s) 2550 of the one or more federated devices 2500 may automatically generate the private federated area 2566*m* for private use by the user of the source device 2100*m*. Such automatic operations may be triggered by an indication stored in the federated area database within the federated area parameters 2536 that each user that is newly granted access to the base federated area 2566*x* is to be so provided with their own private federated area 2566. This may be deemed desirable as an approach to making the base federated area 2566*x* easier to use for each such user by providing individual private federate areas 2566 within which objects may be privately stored and/or developed in preparation for subsequent release into the base federated area 2566*x*. Such users may be able to store private sets of various tools that each may use in such development efforts.

Figure 16C:
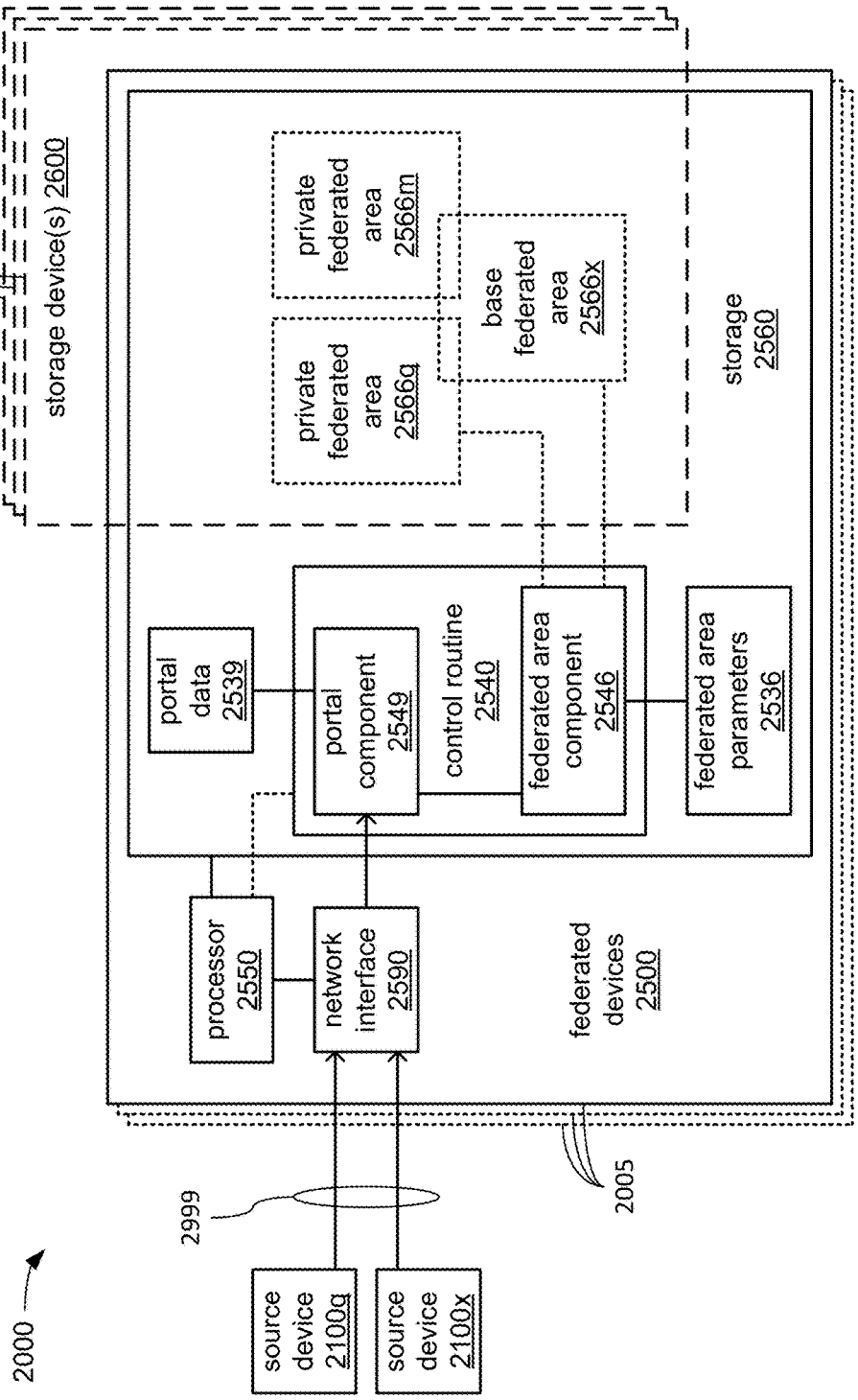

Turning to FIG. 16C, as depicted, the processor(s) 2550 of the one or more federated devices 2500 may be caused to instantiate and maintain another private federated area 2566*q* to be part of the set of federated areas 2566*m* and 2566*x*. In so doing, the private federated area 2566*q* is added to the set in a manner that converts the linear hierarchy of FIG. 16B into a hierarchical tree with a pair of branches. As with the instantiation of the private federated area 2566*m* in FIG. 16B, the instantiation of the private federated area 2566*q* in FIG. 16C may also be performed by the processor(s) 2550 of the one or more federated devices 2500 as an automated response to the addition of a user of the depicted source device 2100*q* as authorized to access the base federated area 2566*x*. Alternatively, a user with access permissions to control aspects of the base federated area 2566*x* may operate the source device 2100*x* to transmit a request to the portal generated by the one or more federated devices 2500 to create the private federated area 2566*q*, with inheritance, priority and/or dependency relationships with the base federated area 2566*x*, and with access that may be limited (at least initially) to the user of the source device 2100*q*.

Figure 16E:
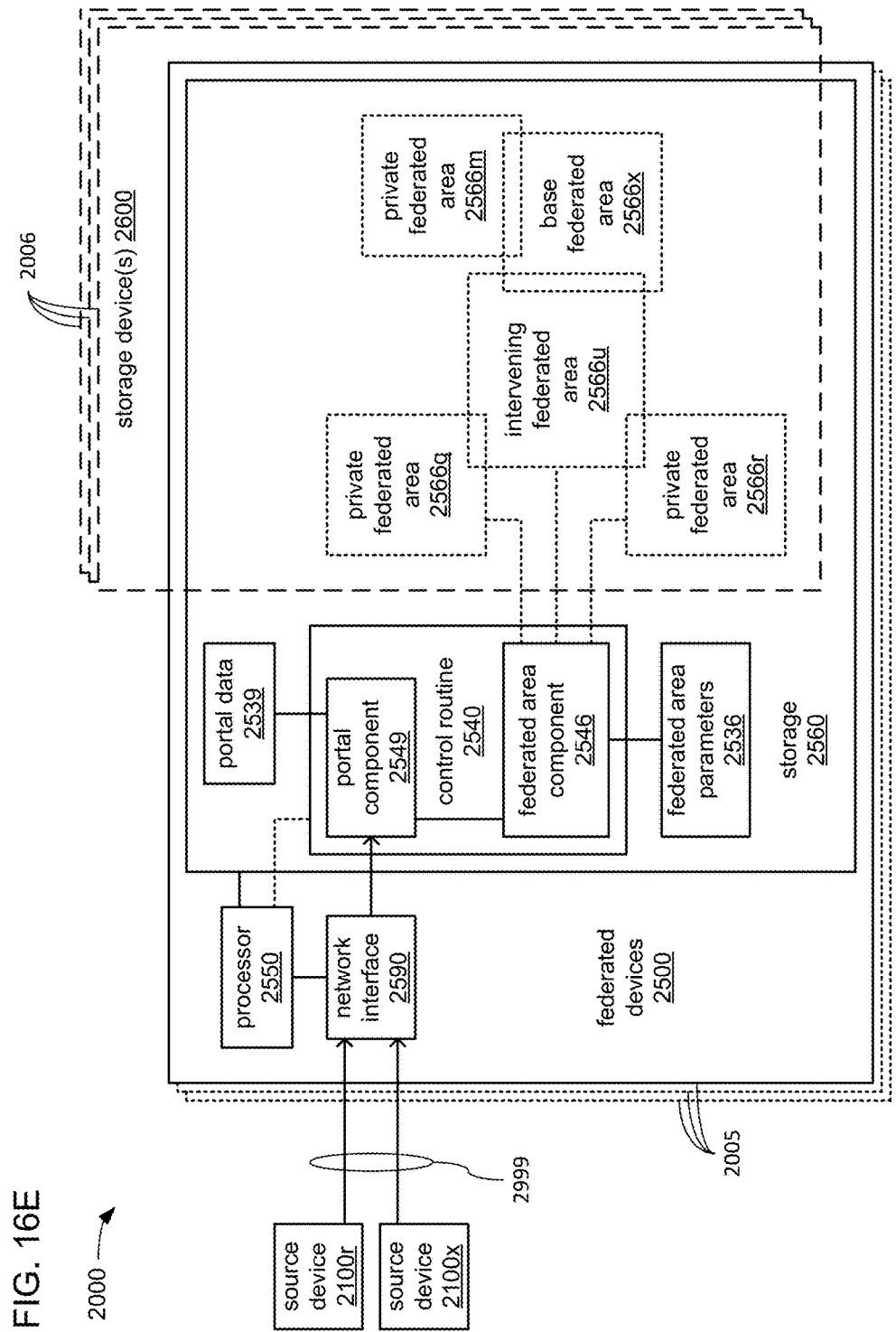

Turning to FIGS. 16D and 16E, as depicted, the processor(s) 2550 of the one or more federated devices 2500 may be caused to first, instantiate an intervening federated area 2566*u* inserted between the private federated area 2566*q* and the base federated area 2566*x*, and then instantiate another private federated area 2566*r* that branches from the newly created intervening federated area 2566*u*. In so doing, the second branch that was created in FIG. 16C with the addition of the private federated area 2566*q* is expanded into a larger branch that includes both of the private federated areas 2566*q* and 2566*r* in separate sub-branches.

In various embodiments, the insertion of the intervening federated area 2566*u* may be initiated in a request transmitted to the portal from either the user of the source device 2100*q* or the user of the source device 2100*x*, depending on which user has sufficient access permissions to be permitted to make such a change in the relationship between the private federated area 2566*q* and the base federated area 2566*x*, including the instantiation and insertion of the intervening federated area 2566*u* therebetween. In some embodiments, it may be necessary for such a request made by one of such users to be approved by the other before the processor(s) 2550 of the one or more federated devices 2500 may proceed to act upon it.

Such a series of additions to a hierarchical tree may be prompted by any of a variety of circumstances, including and not limited to, a desire to create an isolated group of private federated areas that are all within a single isolated branch that includes an intervening federated area by which users associated with each of the private federated areas within such a group may be able to share objects without those objects being more widely shared outside the group as by being stored within the base federated area 2566*x*. Such a group of users may include a group of collaborating developers of task routines 2440, data sets 2330 and/or job flow definitions 2220.

Figure 17A:
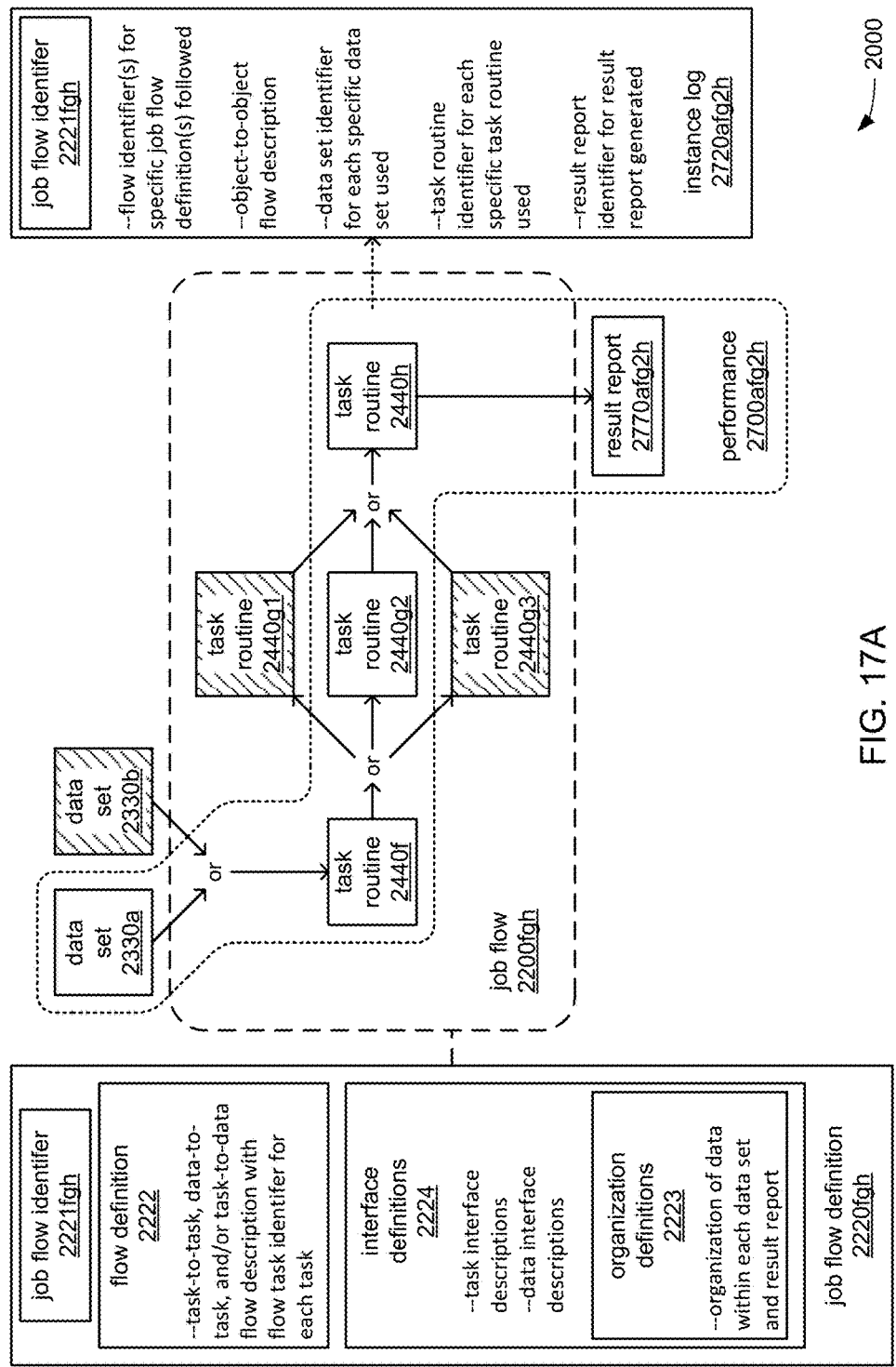
Figure 17B:
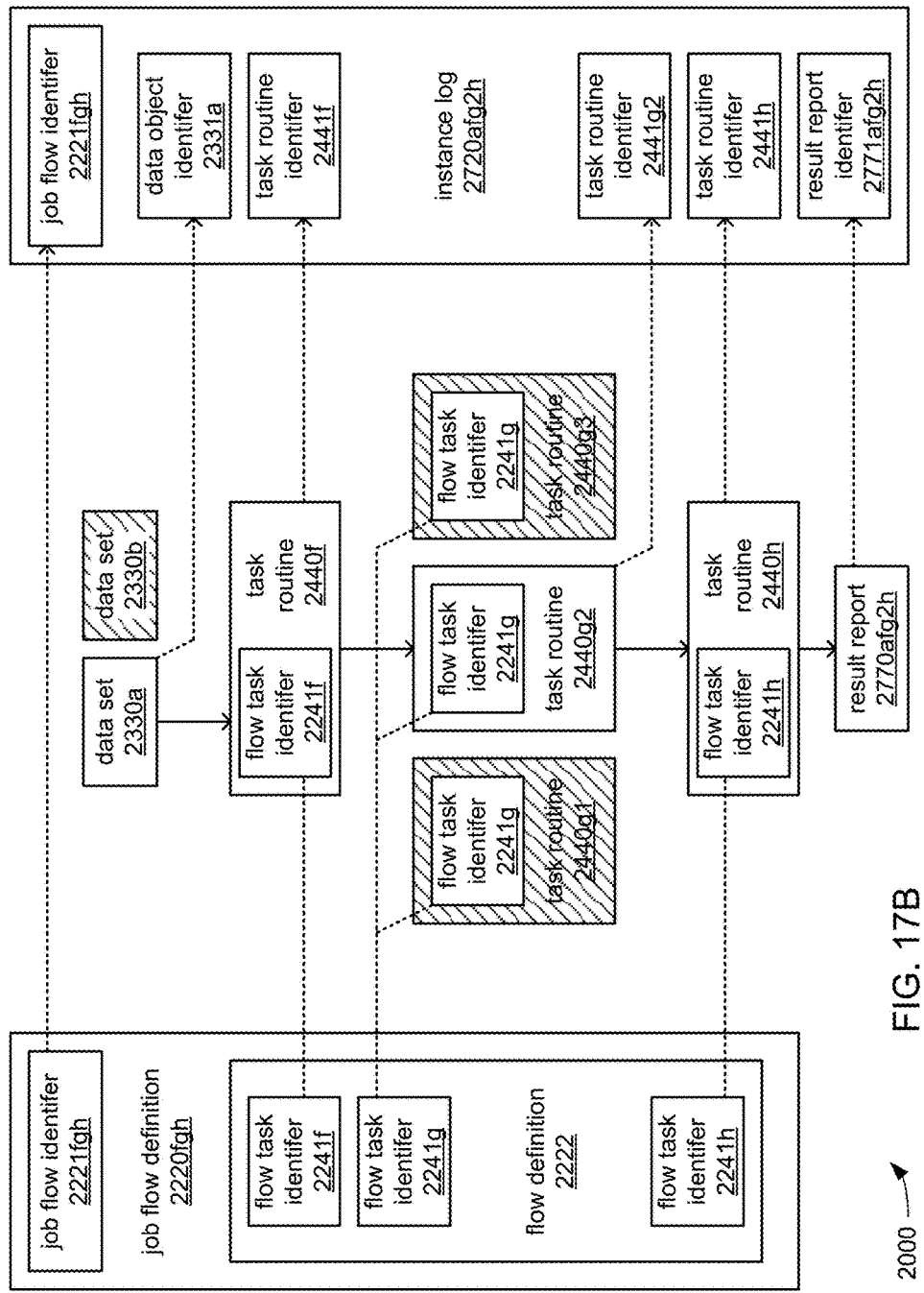
Figure 17C:
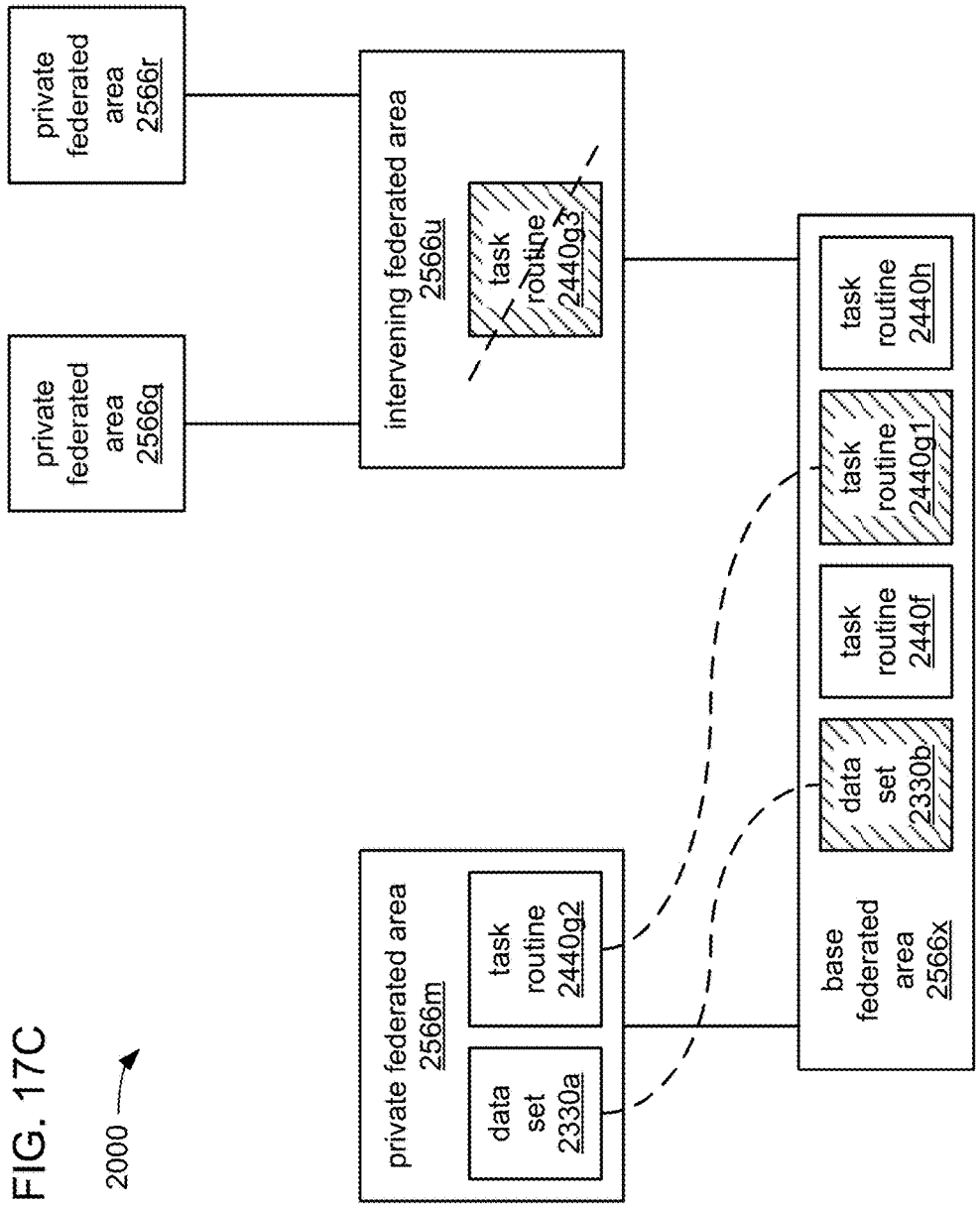
Figure 17D:
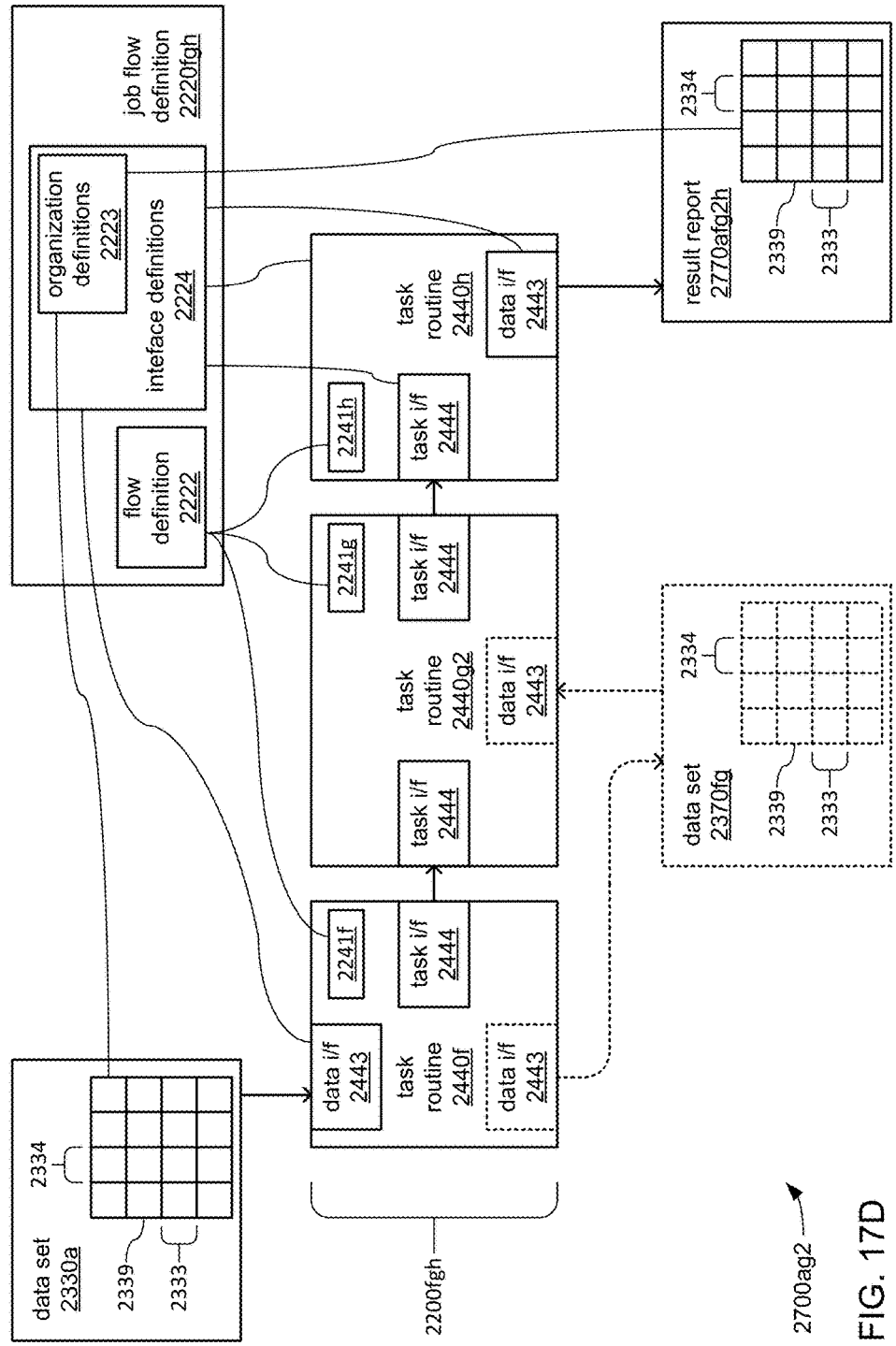
Figure 17F:
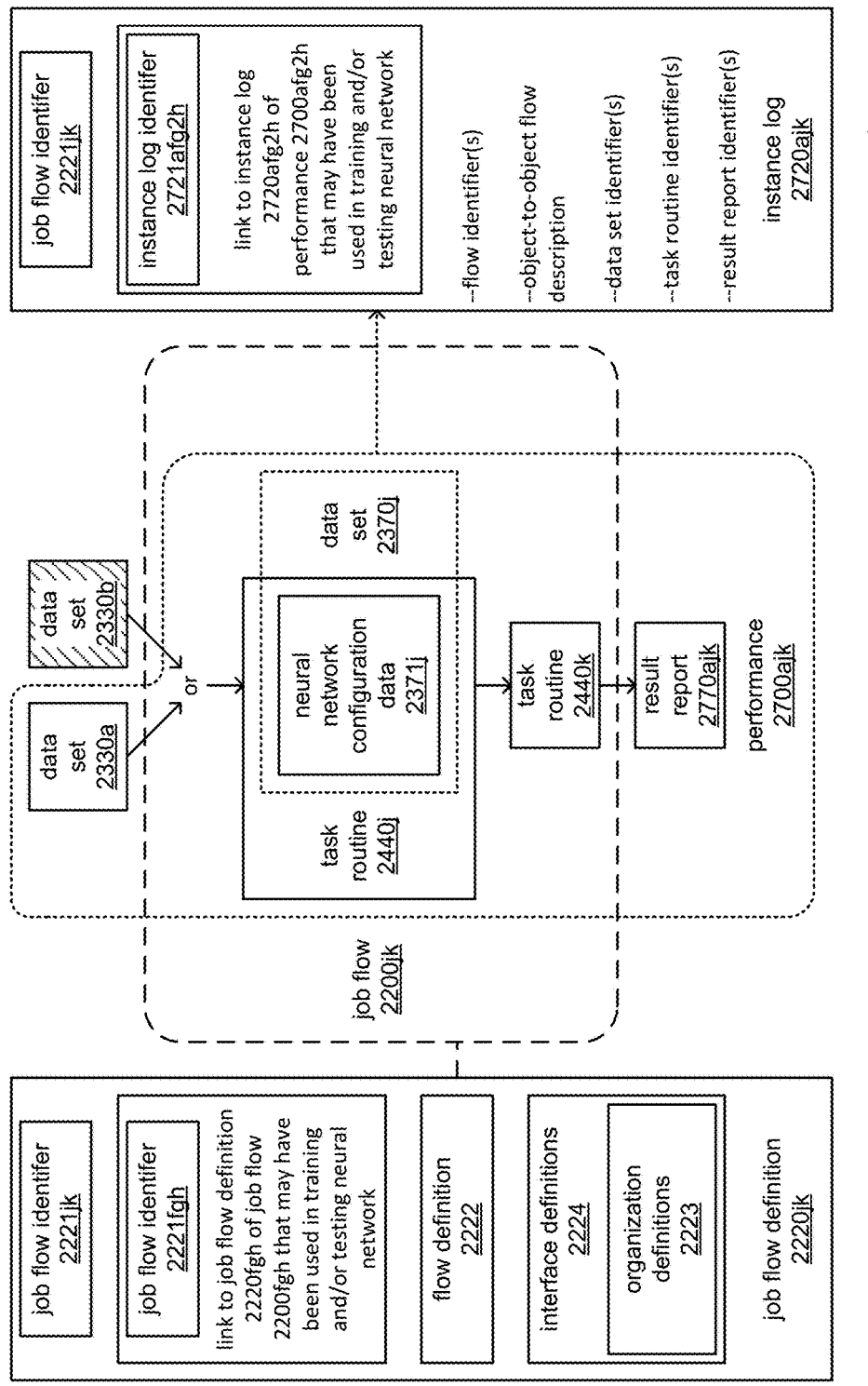

FIGS. 17A, 17B, 17C, 17D, 17E and 17F, together, illustrate the manner in which an example job flow 2200*fgh* may be configured by a job flow definition 2220*fgh*. FIGS. 17A, 17B, 17C, 17D, 17E and 17F, together, also illustrate the manner in which an example performance 2700*afg2h* of the example job flow 2200*fgh* may be documented by an example instance log 2720*afg2h*. FIG. 17E additionally illustrates the manner in which the job flow definition 2220*fgh* may be generated as and/or from a DAG 2270*fgh*. FIG. 17F additionally illustrates the manner in which the job flow 2200*fgh* that employs non-neuromorphic processing to perform a function may be associated with another job flow 2200*jk* that employs neuromorphic processing to perform the same function and that was derived from the job flow 2200*fgh*. For sake of ease of discussion and understanding, the same example job flow 2200*fgh* and example performance 2700*afg2h* of the example job flow 2200*fgh* are depicted throughout all of FIGS. 17A, 17B, 17C, 17D, 17E and 17F. Also, the example job flow 2200*fgh* and example performance 2700*afg2h* thereof are deliberately relatively simple examples presented herein for purposes of illustration, and should not be taken as limiting what is described and claimed herein to such relatively simple embodiments.

As depicted, the example job flow 2200*fgh* incorporates three tasks that are to be performed in a relatively simple three-step linear order through a single execution of a single task routine 2440 for each task, with none of those three tasks entailing the use of neuromorphic processing. Also, the example job flow 2200*fgh* requires a single data set as an input data object to the first task in the linear order, may generate and exchange a single data set between two of the tasks, and generates a result report as an output data object of the last task in the linear order. As also depicted, in the example performance 2700*afg2h* of the example job flow 2200*fgh*, task routines 2440*f*, 2440*g*2 and 2440*h* are the three task routines selected to be executed to perform the three tasks. Also, a data set 2330*a* is selected to serve as the input data object, a data set 2370*fg* may be generated and exchanged between performed tasks as a mechanism to exchange data therebetween, and a result report 2770*afg2h* is the output data object to be generated as an output of the performance 2700*afg2h*. Again, it should be noted that other embodiments of a job flow are possible in which there may be many more tasks to be performed, many more data objects that serve as inputs and/or many more data objects generated as outputs. It should also be noted that other embodiments of a job flow are possible in which there is a much more complex order of the performance of tasks that may include parallel and/or conditional branches that may converge and/or diverge.

Turning to FIGS. 17A and 17B, the job flow definition 2220*fgh* for the example job flow 2200*fgh* may include a flow definition 2222 that specifies the three tasks to be performed, the order in which they are to be performed, and which of the three tasks is to accept a data object as an input and/or generate a data object as an output. In specifying the three tasks to be performed, the flow definition 2222 may use flow task identifiers 2241, such as the depicted flow task identifiers 2241*f*, 2241*g* and 2241*h* that uniquely identify each of the three tasks. As depicted, there may be a single task routine 2440*f* that is able to perform the task specified with the flow task identifier 2241*f*, and therefore, the single task routine 2440*f* may be the one task routine that is assigned the flow task identifier 2241*f* to provide an indication that it is able to perform the task. Also, there may be three task routines 2440*g*1, 2440*g*2 and 2440*g*3 that are each able to perform the task specified with the flow task identifier 2241*g*, and therefore, each may be assigned the same flow task identifier 2241*g*. Further, there may be a single task routine 2440*h* that is able to perform the task specified with the flow task identifier 2241*h*, resulting in the assignment of the flow task identifier 2241*h* to the single task routine 2440*h*.

As has been discussed, the job flow definition 2220*fgh* specifies the tasks to be performed in a job flow, but does not specify any particular task routine 2440 to be selected for execution to perform any particular one of those tasks during any particular performance of the job flow. Where there are multiple task routines 2440 that are capable of performing a particular task, a single one of those multiple task routines 2440 is selected for execution to do so, and the selection that is made may depend on the nature of the request received to perform a job flow. More specifically, the selection of a particular task routine 2440 for execution to perform each particular task may be based on which task routine 2440 is the newest version to perform each task, and/or may be based on which task routine 2440 was used in a previous performance of each task in a specified previous performance of a job flow. As will be explained in detail, the selection criteria that is used to select a task routine 2440 for each task may depend on whether an entirely new performance of a job flow is requested or a repetition of an earlier performance of a job flow is requested. As depicted, in the example performance 2700*afg*2*h* of the example job flow 2200*fgh*, the task routine 2440*g*2 is selected from among the task routines 2440*g*1, 2440*g*2 and 2440*g*3 for execution to perform the task identified with the flow task identifier 2241*g*.

Alternatively or additionally, and as previously explained in connection with FIGS. 15A-B, in situations in which objects needed for the performance of a job flow are distributed among multiple federated areas that are related by inheritance and/or priority relationships, the selection of a particular task routine 2440 to perform a task from among multiple task routines 2440 that may each perform that same task may be dependent upon which federated area 2566 each of such multiple task routines 2440 are stored within. By way of example, FIG. 17C depicts an example situation in which objects needed to perform the job flow 2200*fgh* are distributed among the federated areas 2566*m*, 2566*u* and 2566*x* in the example hierarchical tree of federated areas introduced in FIGS. 15B-C. More specifically, in this example, the data set 2330*a* and the task routine 2440*g*2 are stored within the private federated area 2566*m*; the task routine 2440*g*3 is stored within the intervening federated area 2566*u*; and the data set 2330*b* and the task routines 2440*f*, 2440*g*1 and 2440*h* are stored within the base federated area 2566*x*. As depicted, where the request to perform the job flow 2200*fgh* is received from a user granted access to the private federated area 2566*m*, as well as to the base federated area 2566*x*, but not granted access to any of the federated areas 2566*q*, 2566*r* or 2566*u*, the search for objects to use in the requested performance may be limited to those stored within the private federated area 2566*m* and the base federated area 2566*x*. Stated differently, the perspective that may be automatically selected for use in determining which federated areas are searched for objects may be that of the private federated area 2566*m*, since the private federated area 2566*m* is the one federated area to which the user in this example has been granted access to that is subject to the most restricted degree of access.

As a result, the task routine 2440*g*3 stored within the intervening federated area 2566*u* is entirely unavailable for use in the requested performance as a result of the user having no grant of access to the intervening federated area 2566*u*, and this then becomes the reason why the task routine 2440*g*3 is not selected. In contrast, as a result of an inheritance relationship between the private federated area 2566*m* and the base federated area 2566*x*, the data set 2330*b* and each of the task routines 2440*f*, 2440*g*1 and 2440*h* stored in the based federated area 2566*x* may each be as readily available for being used in the requested performance of the job flow 2200*fgh* as the data set 2330*a* and the task routine 2440*g*2 stored in the private federated area 2566*m*. Therefore, the task routines 2440*f* and 2440*h* may be selected as a result of being the only task routines available within either federated area 2566*m* or 2566*x* that perform their respective tasks. However, although both of the data sets 2330*a* and 2330*b* may be equally available through that same inheritance relationship, a priority relationship also in place between the federated areas 2566*m* and 2566*x* may result in the data set 2330*a* being selected as the input data set, since the data set 2330*a* is stored within the private federated area 2566*m*, which is searched first for the objects needed for the requested performance, while the data set 2330*b* is stored within the base federated area 2566*x*, which is searched after the search of the private federated area 2566*m*. The same combination of inheritance and priority relationships in place between the federated areas 2566*m* and 2566*x* may also result in the task routine 2440*g*2 stored within the private federated area 2566*m* being selected, instead of the task routine 2440*g*1 stored within the base federated area 2566*x*.

Turning to FIGS. 17A and 17D, the job flow definition 2220*fgh* may include interface definitions 2224 that specify aspects of task interfaces 2444 employed in communications among task the routines 2440 that are selected for execution to perform the tasks of the example job flow 2200*fgh* (e.g., the task routines 2440*f*, 2440*g*2 and 2440*h*). Such aspects may include quantity, type, bit widths, protocols, etc., of parameters passed from one task routine 2440 to another as part of communications among task routines 2440 during their execution. As also depicted, the interface definitions 2224 may specify aspects of data interfaces 2443 between task routines 2440 and any data objects that may be employed as an input to a performance (e.g., the data set 2330*a*) and/or that may be generated as an output of a performance (e.g., the result report 2770*afg*2*h*) of the example job flow 2200*fgh*, such as the data example performance 2700*afg*2*h*. The interface definitions 2224 may also specify aspects of data interfaces 2443 employed by one task routine 2440 to generate a data object to convey a relatively large quantity of data to another task routine 2440 (e.g., the data set 2370*fg* depicted with dotted lines, and depicted as generated by task routine 2440*f* for use as an input to task routine 2440*g*2), and may specify aspects of the data interface 2443 employed by the other task routine 2440 to retrieve data from that same data object. Since many of the specified aspects of the data interfaces 2443 may necessarily be closely associated with the manner in which data items are organized and made accessible within data objects, the interface definitions 2224 may include organization definitions 2223 that specify such organizational and access aspects of the data objects. Thus, as depicted in FIG. 17D, where each of the data sets 2330*a* and 2370*fg* (if any are present), and the result report 2770*afg2h* include a two-dimensional array, the organization definitions 2223 may specify various aspects of the data items 2339 (e.g., data type, bit width, etc.), the rows 2333 and/or the columns 2334 for each these data objects.

As previously discussed, the job flow definition 2220*fgh* specifies tasks to be performed and not the particular task routines 2440 to be selected for execution to perform those tasks, which provides the flexibility to select the particular task routines 2440 for each task at the time a performance takes place. Similarly, the job flow definition 2220*fgh* also does not specify particular data objects to be used, which provides the flexibility to select the particular data objects with which the job flow is to be used at the time a performance takes place. However, the interface definitions 2224 do specify aspects of the interfaces among the task routines 2440, and between the task routines 2440 and data objects. The specification of aspects of the interfaces 2443 and/or 2444 may be deemed desirable to ensure continuing interoperability among task routines 2440, as well as between task routines 2440 and data objects, in each new performance of a job flow, even as new versions of one or more of the task routines 2440 and/or new data objects are created for use in later performances.

In some embodiments, new versions of task routines 2440 may be required to implement the interfaces 2443 and/or 2444 in a manner that exactly matches the specifications of those interfaces 2443 and/or 2444 within a job flow definition 2220*fgh*. However, in other embodiments, a limited degree of variation in the implementation of the interfaces 2443 and/or 2444 by newer versions of task routines 2440 may be permitted as long as "backward compatibility" is maintained in retrieving input data objects or generating output data objects through data interfaces 2443, and/or in communications with other task routines through task interfaces 2444. As will be explained in greater detail, the one or more federated devices 2500 may employ the job flow definitions 2220 stored within one or more federated areas 2566 to confirm that new versions of task routines 2440 correctly implement task interfaces 2444 and/or data interfaces 2443. By way of example, in some embodiments, it may be deemed permissible for an interface 2443 or 2444 that receives information to be altered in a new version of a task routine 2440 to accept additional information from a newer data object or a newer version of another task routine 2440 if that additional information is provided, but to not require the provision of that additional information. Alternatively or additionally, by way of example, it may be deemed permissible for an interface 2443 or 2444 that outputs information to be altered in a new version of task routine 2440 to output additional information as an additional data object generated as an output, or to output additional information to a newer version of another task routine 2440 in a manner that permits that additional information to be ignored by an older version of that other task routine 2440.

Turning to FIG. 17E, and as will be explained in greater detail, the interface definitions 2224 within the job flow definition 2220*fgh* may, in some embodiments, be derived as part of the generation of a DAG 2270*fgh* from comments and/or other portions of the programming code of the task routines 2440*f*, 2440*g*2 and 2440*h*. More specifically, it may be that the job flow definition 2220*fgh* is at least partially generated from a parsing of comments descriptive of the inputs and/or outputs of one or more task routines 2440 that perform the functions of the job flow 2200*fgh* that the job flow definition 2220*fgh* is to define. In some embodiments, and as depicted, information concerning inputs to and/or outputs from each of the task routines 2440*f*, 2440*g*2 and 2440*h* may be stored, at least temporarily, as macros 2470*f*, 2470*g*2 and 2470*h*, respectively, although it should be noted that other forms of intermediate data structure may be used in providing intermediate storage of information concerning inputs and/or outputs. With all of such data structures having been generated, the information within each that concerns inputs and/or outputs may then be used to generate the DAG 2270*fgh* to include the interface definitions 2224. And, as will be explained in greater detail, from the interface definitions 2224, it may be that at least a portion of the flow definition 2222 is able to be derived.

Returning to FIGS. 17A and 17B, an example instance log 2720*afg2h* that is generated as result a of the example performance 2700*afg2h* of the example job flow 2200*fgh* is depicted. Although the job flow definition 2220*fgh* does not specify particular data objects or task routines 2440 to be used in performances of the example job flow 2200*fgh*, the example instance log 2720*afg2h* does include such details, as well as others, concerning the example performance 2700*afg2h*. Thus, the example instance log 2720*afg2h* includes the job flow identifier 2221*fgh* for the example job flow definition 2220*fgh*; the task routine identifiers 2441*f*, 2441*g*2 and 2441*h* for the particular task routines 2440*f*, 2440*g*2 and 2440*h*, respectively, that were executed in the example performance 2700*afg2h*; the data object identifier 2331*a* for the data set 2330*a* used as an input data object; and the result report identifier 2771*afg2h* for the result report 2770*afg2h* generated during the example performance 2700*afg2h*. As has been discussed, the example instance log 2720*afg2h* is intended to serve as a record of sufficient detail concerning the example performance 2700*afg2h* as to enable all of the objects associated with the example performance 2700*afg2h* to be later identified, retrieved and used to repeat the example performance 2700*afg2h*. In contrast, the job flow definition 2220*fgh* is intended to remain relatively open-ended for use with a variety of data objects and/or with a set of task routines 2440 that may change over time as improvements are made to the task routines 2440.

Turning for FIG. 17F, and as will be explained in greater detail, a new job flow that employs neuromorphic processing (i.e., uses a neural network to implement a function) may be derived from an existing job flow that does not employ neuromorphic processing (i.e., does not use a neural network, and instead, uses the execution of a series of instructions to perform the function). This may be done as an approach to creating a new job flow that is able to be performed much more quickly (e.g., by multiple orders of magnitude) than an existing job flow by using a neural network in the new job flow to perform one or more tasks much more quickly than may be possible through the non-neuromorphic processing employed in the existing job flow. However, as those skilled in the art will readily recognize, such a neural network may need to be trained, and neuromorphic processing usually requires the acceptance of some degree of inaccuracy that is usually not present in instruction-based processing in which each step in the performance of a function is explicitly set forth with executable instructions.

As will be explained in greater detail, such training of a neural network of such a new job flow may entail the use of a training data set that may be assembled from data inputs and data outputs of one or more performances of an existing job flow. Such a training data set may then be used, through backpropagation and/or other neuromorphic training techniques, to train the neural network. Further, following such training, the degree of accuracy of the neural network in one or more performances of the new job flow may be tested by comparing data outputs of the existing and new job flows that are derived from identical data inputs provided to each. Presuming that the new job flow incorporating use of the neural network is deemed to be accurate enough to be put to use, there may still, at some later time, be an occasion where the functionality and/or accuracy of the new job flow and/or the neural network may be deemed to be in need of an evaluation. On such an occasion, as an aid to ensuring accountability for the development of the new job flow and/or the neural network, it may be deemed desirable to provide an indication of what earlier job flow(s) and/or data object(s) were employed in training and/or in testing the new job flow and/or the neural network.

FIG. 17F provides a view of aspects of a example job flow 2200$jk$ that employs neuromorphic processing (i.e., employs a neural network), an example job flow definition 2220$jk$ that defines the job flow 2200$jk$, an example performance 2700$ajk$ of the job flow 2200$jk$, and a corresponding example instance log 2720$ajk$ that documents the performance 2700$ajk$. This view is similar to the view provided by FIG. 17A of aspects of the earlier discussed example job flow 2200$fgh$ that does not employ neuromorphic processing (i.e., does not employ a neural network), the job flow definition 2220$fgh$ that defines the job flow 2200$fgh$, the example performance 2700$afg2h$ of the job flow 2200$fgh$, and the example instance log 2720$afg2h$ that documents the performance 2700$afg2h$. As depicted in FIG. 17F, the job flow definition 2220$jk$ may be defined to include a first task able to be performed by a task routine 2440$j$ that entails the use of neural configuration data 2371$j$, and a second task able to be performed by a task routine 2440$k$. As will be explained in greater detail, the task performable by the task routine 2440$j$ may be that of using the neural network configuration data 2371$j$ to instantiate a neural network (not specifically shown), and the task performable by the task routine 2440$k$ may be that of using that neural network to cause the job flow 2200$jk$ to perform the same function as the job flow 2200$fgh$.

As will be explained in greater detail, the neural network configuration data 2371$j$ may define hyperparameters and/or trained parameters that define the neural network employed in the job flow 2200$jk$ after it has been trained. In some embodiments, the neural network configuration data 2371$j$ may be deemed and/or handled for purposes of storage among one or more federated areas 2566 as an integral part of the depicted example task routine 2440$j$. In such embodiments, the executable code of the task routine 2440$j$ may include some form of link (e.g., a pointer, identifier, etc.) that refers to the neural network configuration data 2371$j$ as part of a mechanism to cause the retrieval and/or use of the neural network configuration data 2371$j$ alongside the task routine 2440$j$. Alternatively, in such embodiments, the task routine 2440$j$ may wholly integrate the neural network configuration data 2371$j$ as a form of directly embedded data structure.

However, in other embodiments, the neural network configuration data 2371$j$ may be incorporated into and/or be otherwise treated as a data set 2370$j$ that may be stored among multiple data sets 2330 and/or 2370 within one or more federated areas 2566, including being subject to at least a subset of the same rules controlling access thereto as are applied to any other data set 2330 and/or 2370. In such other embodiments, the same techniques normally employed in selecting and/or specifying a data set 2330 or 2370 as an input to a task routine 2440 in a performance of a job flow 2200 may be used to specify the neural network configuration data 2371$j$ as the data set 2370$j$ serving as an input to the task routine 2440$j$. In this way, and as will be explained in greater detail, the neural network defined by the configuration data 2371$j$ may be given at least some degree of protection against deletion, may be made available for use in multiple different job flow flows (including other job flows that may perform further training of that neural network that yield improved versions that may also be so stored), and/or may be documented within one or more instance logs as having been employed in one or more corresponding performances of job flows 2200.

As also depicted in FIG. 17F, the job flow definition 2220$jk$ of the example job flow 2200$jk$ may include the job flow identifier 2221$fgh$ as a form of link to the job flow definition 2220$fgh$ that defines the example job flow 2200$fgh$. Such a link to the job flow definition 2220$fgh$ may be provided in the job flow definition 2220$jk$ in a situation where one or more performances (i.e., the example performance 2700$afg2h$) of the job flow 2200$fgh$ were used in training and/or in testing the neural network of the job flow 2200$jk$. Alternatively or additionally, the instance log 2720$ajk$ that documents aspects of the example performance 2700$afk$ of the example job flow 2200$jk$ may include the instance log identifier 2721$afg2h$ as a link to the instance log 2720$afg2h$ that documents the example performance 2700$afg2h$. Such a link to the instance log 2720$afg2h$ may be provided in the instance log 2720$ajk$ in a situation where the performance 2700$afg2h$ was used in training and/or in testing the neural network of the job flow 2200$jk$. Through the provision of such links, the fact that the job flow 2200$fgh$ and/or the specific performance 2700$afg2h$ was used in training and/or in testing the neural network of the job flow 2200$jk$ may be readily revealed, if at a later date, the job flow definition 2220$jk$ and/or the instance log 2720$ajk$ are retrieved and analyzed as part of a later evaluation of the job flow 2200$jk$. In this way, some degree of accountability for how the neural network of the job flow 2200$jk$ was trained and/or tested may be ensured should such training and/or testing need to be scrutinized.

Figure 18A:
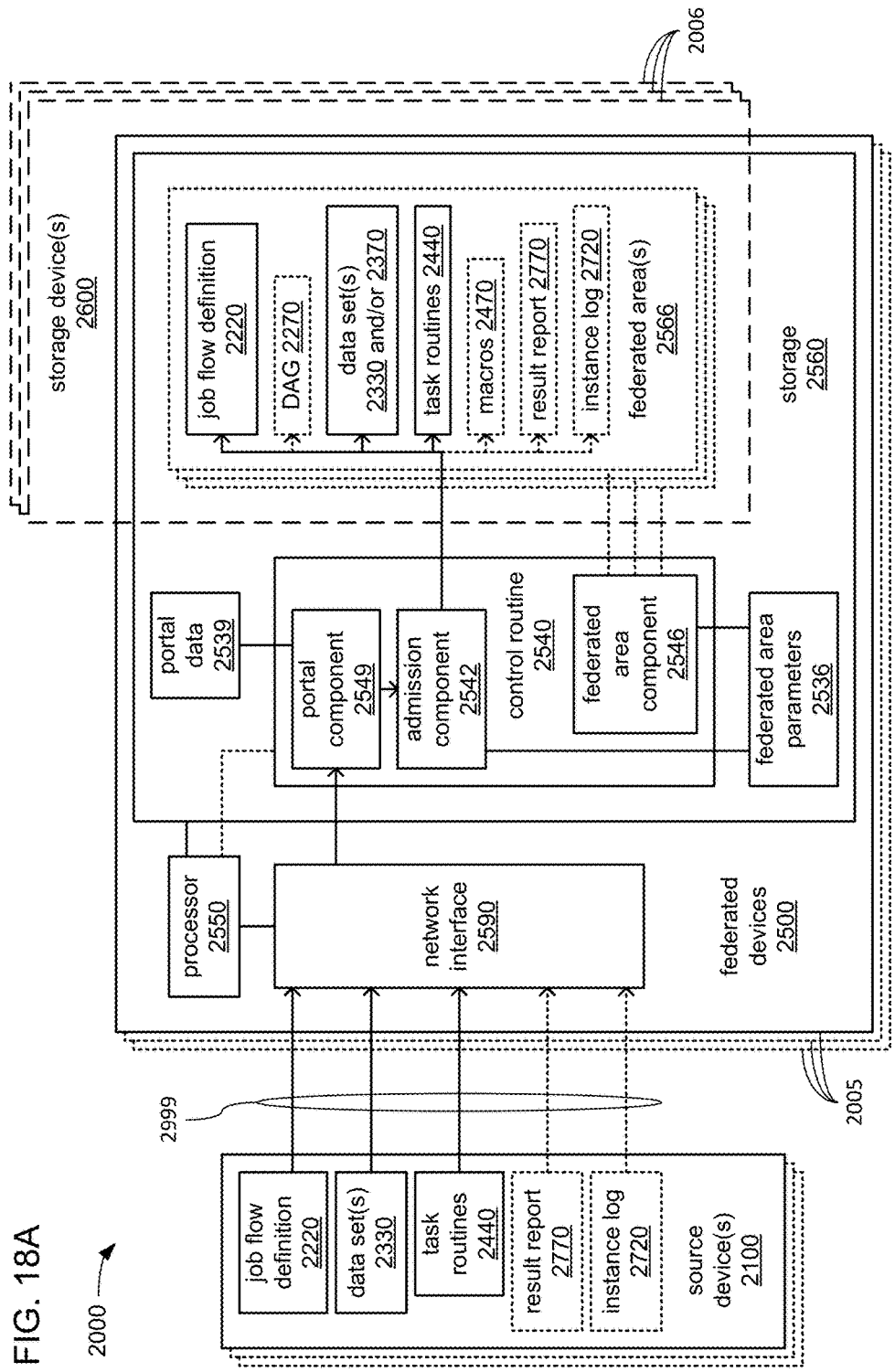
FIGS. 18A, 18B, 18C, 18D and 18E, together, illustrate an example of a federated device storing and organizing objects in a federated area.

FIGS. 18A, 18B, 18C, 18D and 18E, together, illustrate the manner in which the one or more federated devices 2500 selectively store and organize objects within one or more federated areas 2566. FIG. 18A illustrates aspects of selective storage of objects received from one or more of the source devices 2100 within the one or more federated areas 2566, and FIGS. 18B-E illustrates aspects of organization objects within the one or more federated areas 2566 in preparation for retrieval and use in performances of job flows.

Turning to FIG. 18A, one of the source devices 2100 may be operated to transmit a request to one of the federated devices 2500 to store objects associated with a job flow within a federated area 2566. Again, the processor(s) 2550 of the one or more federated devices 2500 may be caused by the portal component 2549 to restrict access to the one or more federated areas 2566 to only authorized users (e.g., authorized persons, entities and/or devices), and may restrict the types of accesses made to only those for which each user is authorized. The control routine 2540 may also include an admission component 2542 to restrict the objects that may be accepted for storage within a federated area 2566 to those that comply with one or more requirements.

Again, in executing the portal component 2549, the processor(s) 2550 of the one or more federated devices 2500 may be caused to operate one or more of the network interfaces 2590 to provide a portal accessible by other devices via the network 2999, and through which access may be granted by the processor(s) 2550 to the one or more federated areas 2566. Again, any of a variety of network and/or other protocols may be used. Again, in determining whether to grant or deny access to one or more federated areas 2566 to another device from which a request for access has been received, the processor(s) 2550 may be caused to refer to indications stored within portal data 2539 of users that are authorized to be granted access.

Beyond selective granting of access to the one or more federated areas 2566 (in embodiments in which the one or more federated devices 2500 control access thereto), the processor(s) 2550 may be further caused by execution of the portal component 2549 to restrict the types of access granted, depending on the identity of the user to which access has been granted. By way of example, the portal data 2539 may indicate that different persons and/or different devices associated with a particular scholastic, governmental or business entity are each to be allowed different degrees and/or different types of access. One such person or device may be granted access to retrieve objects from within a federated area 2566, but may not be granted access to alter or delete objects, while another particular person operating a particular device may be granted a greater degree of access that allows such actions. In embodiments in which there is a per-object control of access, the one or more federated devices 2500 (or the one or more other devices that separately control access) may cooperate with the one or more storage devices 2600 (if present) to effect such per-object access control.

It should be noted that the granting of access to a federated area 2566 to store one or more objects may lead to a parallel transfer of portions of one or more of the objects via the network 2999 from and/or to a grid of devices. This may be deemed desirable for the transfer of larger objects, such as data objects (e.g., a data set 2330) that may be quite large in size. More precisely, in embodiments in which the source device 2100 that transmitted the request for access to store objects is operated as part of a grid of the source devices 2100, the granting of access to store objects in a federated area 2566 may result in multiple ones of source devices 2100 transmitting one or more of the objects to one or more of the federated devices 2500 as multiple portions in at least partially parallel transfers. Correspondingly, in embodiments in which the federated device 2500 that received the request is operated as part of a federated device grid 2005, multiple ones of the federated devices 2500 may receive one or more of the transmitted objects as portions and at least partially in parallel.

In executing the admission component 2542, the processor(s) 2550 of the one or more federated devices 2500 may be caused to impose various restrictions on what objects may be stored within a federated area 2566, presuming that the processor(s) 2550 have been caused by the portal component 2549 to grant access in response to the received request to store objects. Some of such restrictions may be based on dependencies between objects and may advantageously automate the prevention of situations in which one object stored in a federated area 2566 is rendered nonfunctional as a result of another object having not been stored within the same federated area 2566 or within a federated area 2566 that is related through an inheritance relationship such that it is unavailable.

By way of example, and as previously explained, such objects as job flow definitions 2220 include references to tasks to be performed. In some embodiments, it may be deemed desirable to prevent a situation in which there is a job flow definition 2220 stored within a federated area 2566 that describes a job flow that cannot be performed as a result of there being no task routines 2440 stored within the same federated area 2566 and/or within a related federated area 2566 that are able to perform one or more of the tasks specified in the job flow definition 2220. Thus, where a request is received to store a job flow definition 2220, the processor(s) 2550 may be caused by the admission component 2542 to first determine whether there is at least one task routine 2440 stored within the same federated area 2566 and/or within a related federated area 2566 to perform each task specified in the job flow definition. If there isn't, then the processor(s) 2550 may be caused by the admission component 2542 to disallow storage of that job flow definition 2220 within that federated area 2566, at least until such missing task routine(s) 2440 have been stored therein and/or within a related federated area 2566 from which they would be accessible through an inheritance relationship. In so doing, and as an approach to improving ease of use, the processor(s) 2550 may be caused to transmit an indication of the reason for the refusal to inform an operator of the source device 2100 of what can be done to remedy the situation.

Also by way of example, and as previously explained, such objects as instance logs 2720 include references to such other objects as a job flow definition, task routines executed to perform tasks, and data objects employed as inputs and/or generated as outputs. In some embodiments, it may also be deemed desirable to avoid a situation in which there is an instance log 2720 stored within a federated area 2566 that describes a performance of a job flow that cannot be repeated as a result of the job flow definition 2220, one of the task routines 2440, or one of the data objects referred to in the instance log 2720 not being stored within the same federated area 2566 and/or within a related federated area 2566 from which they would also be accessible. Such a situation may entirely prevent a review of a performance of a job flow. Thus, where a request is received to store an instance log 2720, the processor(s) 2550 of the one or more federated devices 2500 may be caused by the admission component 2542 to first determine whether all of the objects referred to in the instance log 2720 are stored within the same federated area 2566 and/or a related federated area 2566 in which they would also be accessible, thereby enabling a repeat performance using all of the objects referred to in the instance log 2720. If there isn't then the processor(s) 2550 may be caused by the admission component 2542 to disallow storage of that instance log 2720 within that federated area 2566, at least until such missing object(s) have been stored therein and/or within a related federated area 2566. Again, as an approach to improving ease of use, the processor(s) 2550 may be caused to transmit an indication of the reason for the refusal to inform an operator of the source device 2100 of what can be done to remedy the situation, including identifying the missing objects.

Additionally by way of example, and as previously explained, such objects as job flow definitions 2220 may specify various aspects of interfaces among task routines, and/or between task routines and data objects. In some embodiments, it may be deemed desirable to prevent a situation in which the specification in a job flow definition 2220 of an interface for any task routine that may be selected to perform a specific task does not match the manner in which that interface is implemented in a task routine 2440 that may be selected for execution to perform that task. Thus, where a request is received to store a combination of objects that includes both a job flow definition 2220 and one or more associated task routines 2440, the processor(s) 2550 may be caused to compare the specifications of interfaces within the job flow definition 2220 to the implementations of those interfaces within the associated task routines 2440 to determine whether they sufficiently match. Alternatively or additionally, the processor(s) 2550 may be caused to perform such comparisons between the job flow definition 2220 that is requested to be stored and one or more task routines 2440 already stored within one or more federated areas 2566, and/or to perform such comparisons between each of the task routines 2440 that are requested to be stored and one or more job flow definitions 2220 already stored within one or more federated areas 2566. If the processor(s) 2550 determine that there is an insufficient match, then the processor(s) 2550 may be caused to disallow storage of the job flow definition 2220 and/or of the one or more associated task routines 2440. In so doing, and as an approach to improving ease of use, the processor(s) 2550 may be caused to transmit an indication of the reason for the refusal to inform an operator of the source device 2100 of what can be done to remedy the situation, including providing details of the insufficiency of the match.

As previously discussed, macros 2470 and DAGs 2270 may be generated from information concerning the inputs and/or outputs of one or more task routines 2440 such that, like a job flow definition 2200 and/or an instance log 2720, each macro 2470 and each DAG 2270 is associated with one or more task routines 2440. As a result of such associations, it may be deemed desirable to ensure that further analysis of the information within each macro 2470 and/or DAG 2270 is enabled by requiring that the one or more task routines 2440 from which each is derived be available within a federated area 2566 to be accessed. More specifically, in executing the admission component 2542, the processor(s) 2550 of the one or more federated devices 2500 may be caused to impose restrictions on the storage of macros 2470 and/or DAGs 2270 that may be similar to those just discussed for the storage of job flow definitions 2200 and/or instance logs 2720. Thus, in response to a request to store one or more macros 2470 and/or one or more DAGs 2270, the processor(s) 2550 may first be caused to determine whether the task routine(s) 2440 on which the information concerning inputs and/or outputs within each macro 2470 and/or within each DAG 2270 may be based is stored within a federated area 2566 or is provided for storage along with each 2470 and/or each DAG 2270 for storage. Storage of a macro 2470 or of a DAG 2270 may be refused if such associated task routine(s) 2440 are not already so stored and are also not provided along with the macro 2470 or DAG 2270 that is requested to be stored.

Figure 18B:
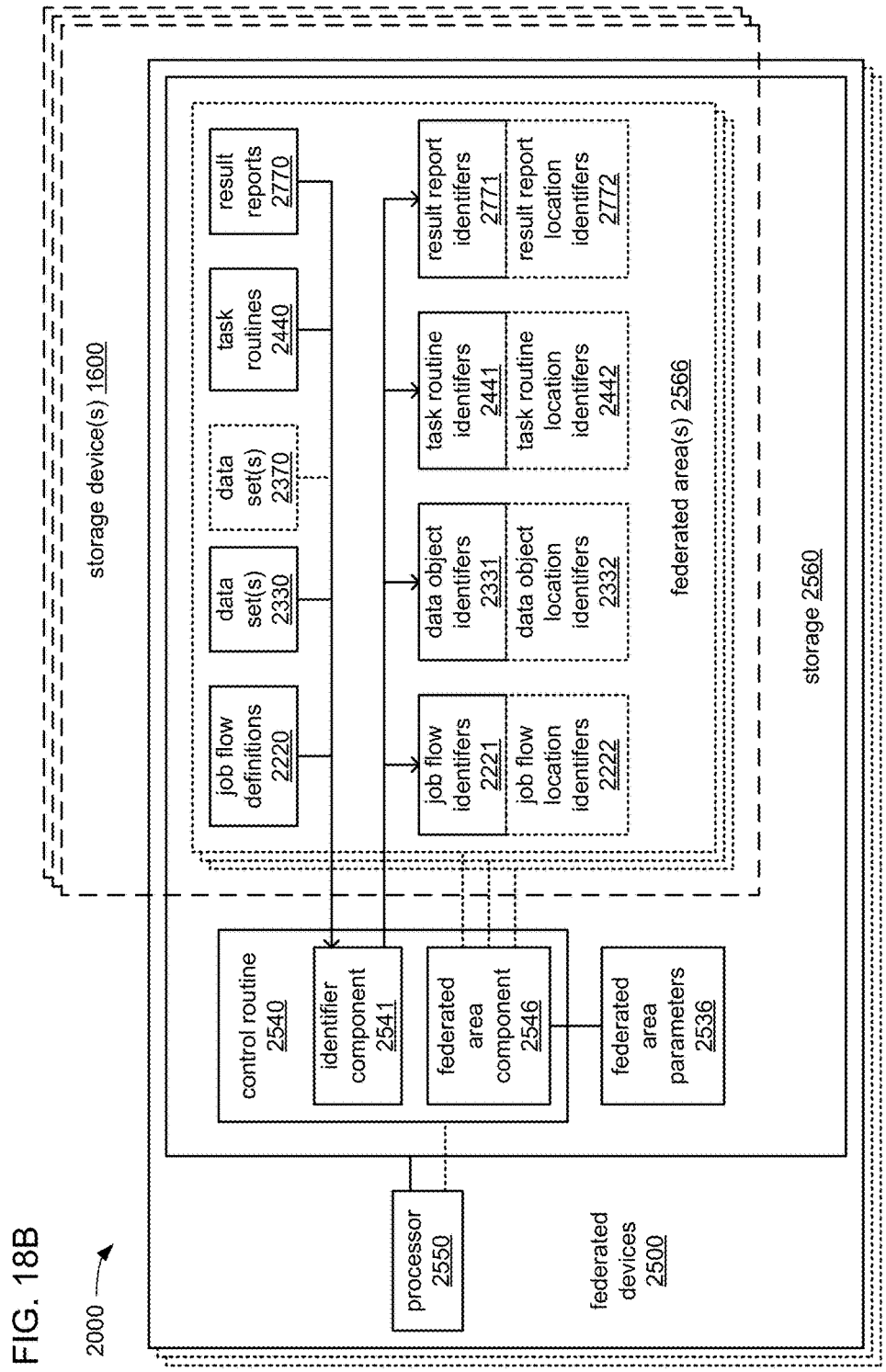

Turning to FIG. 18B, as depicted, the control routine 2540 executed by processor(s) 2550 of the one or more federated devices 2500 may include an identifier component 2541 to assign identifiers to objects within the one or more federated areas 2566. As previously discussed, each instance log 2720 may refer to objects associated with a performance of a job flow (e.g., a job flow definition 2220, task routines 2440, and/or data objects used as inputs and/or generated as outputs, such as the data sets 2330 and/or 2370, and/or a result report 2770) by identifiers assigned to each. Also, as will shortly be explained, the assigned identifiers may be employed as part of an indexing system in one or more data structures and/or databases to more efficiently retrieve such objects. In some embodiments, the processor(s) 2550 of the one or more federated devices 2500 may be caused by the identifier component 2541 to assign identifiers to objects as they area received via the network 2999 from other devices, such as the one or more source devices 2100. In other embodiments, the processor(s) 2550 may be caused by the identifier component 2541 to assign identifiers to objects generated as a result of a performance of a job flow (e.g., a result report 2770 generated as an output data object).

In some embodiments, each identifier may be generated by taking a hash of at least a portion of its associated object to generate a hash value that becomes the identifier. More specifically, a job flow identifier 2221 may be generated by taking a hash of at least a portion of the corresponding job flow definition 2220; a data object identifier 2331 may be generated by taking a hash of at least a portion of the corresponding data set 2330 or 2370; a task routine identifier 2441 may be generated by taking a hash of at least a portion of the corresponding task routine 2440; and/or a result report identifier 2771 may be generated by taking a hash of at least a portion of the corresponding result report 2770. Any of a variety of hash algorithms familiar to those skilled in the art may be employed. Such an approach to generating identifiers may be deemed desirable as it may provide a relatively simple mechanism to generate identifiers that are highly likely to be unique to each object, presuming that a large enough portion of each object is used as the basis for each hash taken and/or each of the identifiers is of a large enough bit width. In some embodiments, the size of the portions of each of these different objects of which a hash is taken may be identical. Alternatively or additionally, the bit widths of the resulting hash values that become the identifiers 2221, 2331, 2441 and 2771 may be identical.

Such an approach to generating identifiers may advantageously be easily implemented by devices other than the one or more federated devices 2500 to reliably generate identifiers for objects that are identical to the identifiers generated by the processor(s) 2550 of any of the one or more federated devices 2500. Thus, if a job flow is performed by another device, the instance log 2720 generated by the other device would use identifiers to refer to the objects associated with that performance that would be identical to the identifiers that would have been generated by the processor(s) 2550 of the one or more federated devices 2500 to refer to those same objects. As a result, such an instance log 2720 could be received by the one or more federated devices 2500 and stored within a federated area 2566 without the need to derive new identifiers to replace those already included within that instance log 2720 to refer to objects associated with a performance of a job flow.

Referring to FIG. 18A in addition to FIG. 18B, in some embodiments, the identifier component 2541 may cooperate with the admission component 2542 in causing the processor(s) 2550 of the one or more federated devices 2500 to analyze received objects to determine compliance with various restrictions as part of determining whether to allow those objects to be stored within the one or more federated areas 2566. More specifically, and by way of example, the identifier component 2541 may generate identifiers for each received object. The provision of identifiers for each received object may enable the admission component 2542 to cause the processor(s) 2550 to check whether the objects specified in a received instance log 2720 are available among the other objects received along with the received instance log 2720, as well as whether the objects specified in the received instance log 2720 are available as already stored within one or more of the federated areas 2566. If an object referred to in the received instance log 2720 is neither among the other received objects or among the objects already stored within one or more of the federated area 2566, then the processor(s) 2550 may be caused by the admission component 2542 to disallow storage of the received instance log 2720 within the one or more federated areas 2566. As previously discussed, disallowing the storage of an instance log 2720 for such reasons may be deemed desirable to prevent storage of an instance log 2720 that describes a performance of a job flow that cannot be repeated due to one or more of the objects associated with that performance being missing.

Figure 18C:
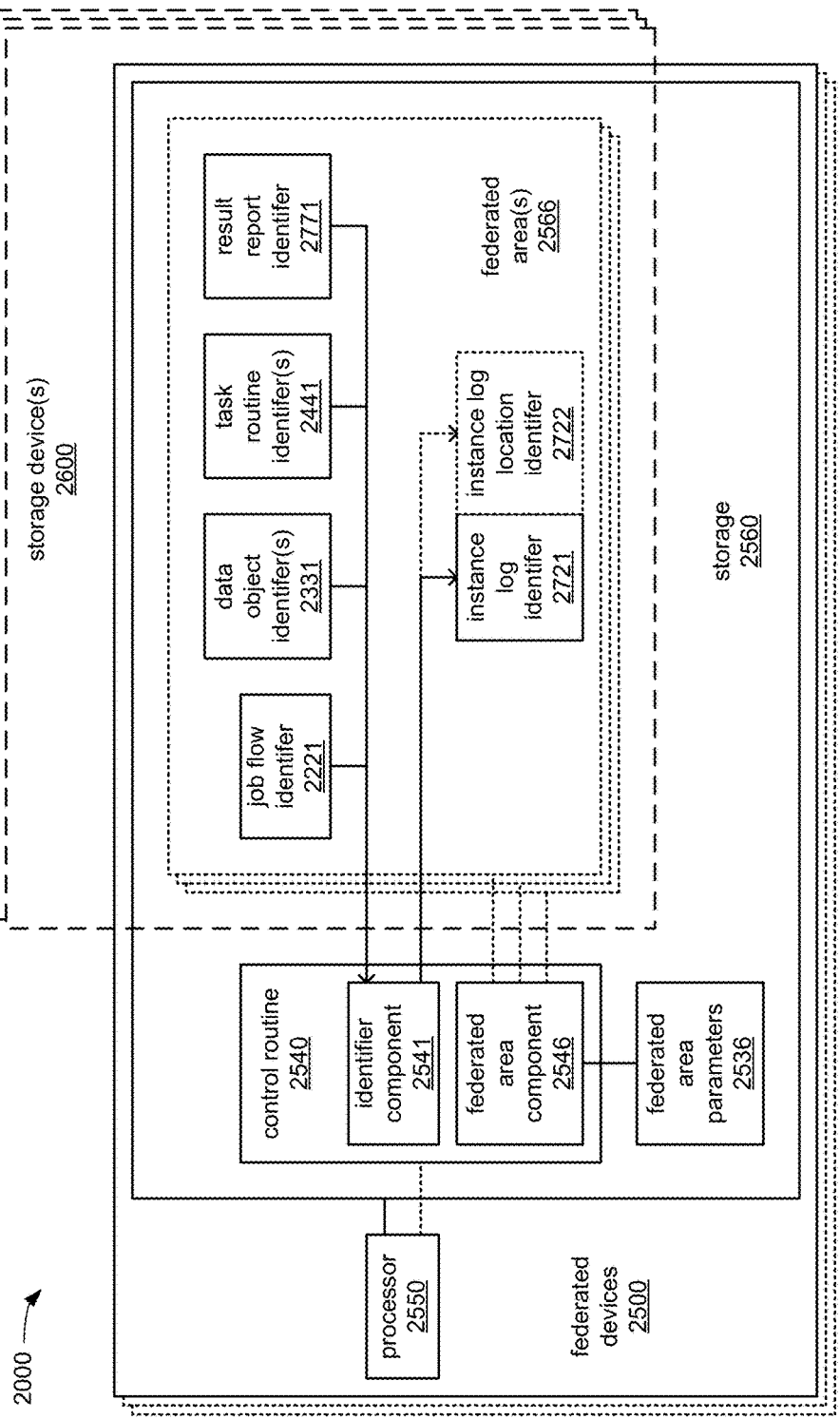

Turning to FIG. 18C, in some embodiments, the generation of identifiers for instance logs 2720 may differ from the generation of identifiers for other objects. More specifically, while the identifiers 2221, 2331, 2441 and 2771 may each be derived by taking a hash of at least a portion of its corresponding object, an instance log identifier 2721 for an instance log 2720 may be derived from at least a portion of each of the identifiers for the objects that are associated with the performance that corresponds to that instance log 2720. Thus, as depicted, the processor(s) 2550 of the one or more federated devices 2500 may be caused by the identifier component 2541 to generate an instance log identifier 2721 for a performance of a job flow by concatenating at least a portion of each of a job flow identifier 2221, one or more data object identifiers 2331, one or more task routine identifiers 2441, and a result report identifier 2771 for a job flow definition 2220, one or more data sets 2330 and/or 2370, one or more task routines 2440, and a result report 2770, respectively, that are all associated with that performance of that job flow. In embodiments in which the bit widths of each of the identifiers 2221, 2331, 2441 and 2771 are identical, log identifiers 2721 may be formed from identically sized portions of each of such identifiers 2221, 2331, 2441 and 2771, regardless of the quantity of each of the identifiers 2221, 2331, 2441 and 2771 used. Such use of identically sized portions of such identifiers 2221, 2331, 2441 and 2771 may be deemed desirable to aid in limiting the overall bit widths of the resulting log identifiers 2721.

Figure 18D:
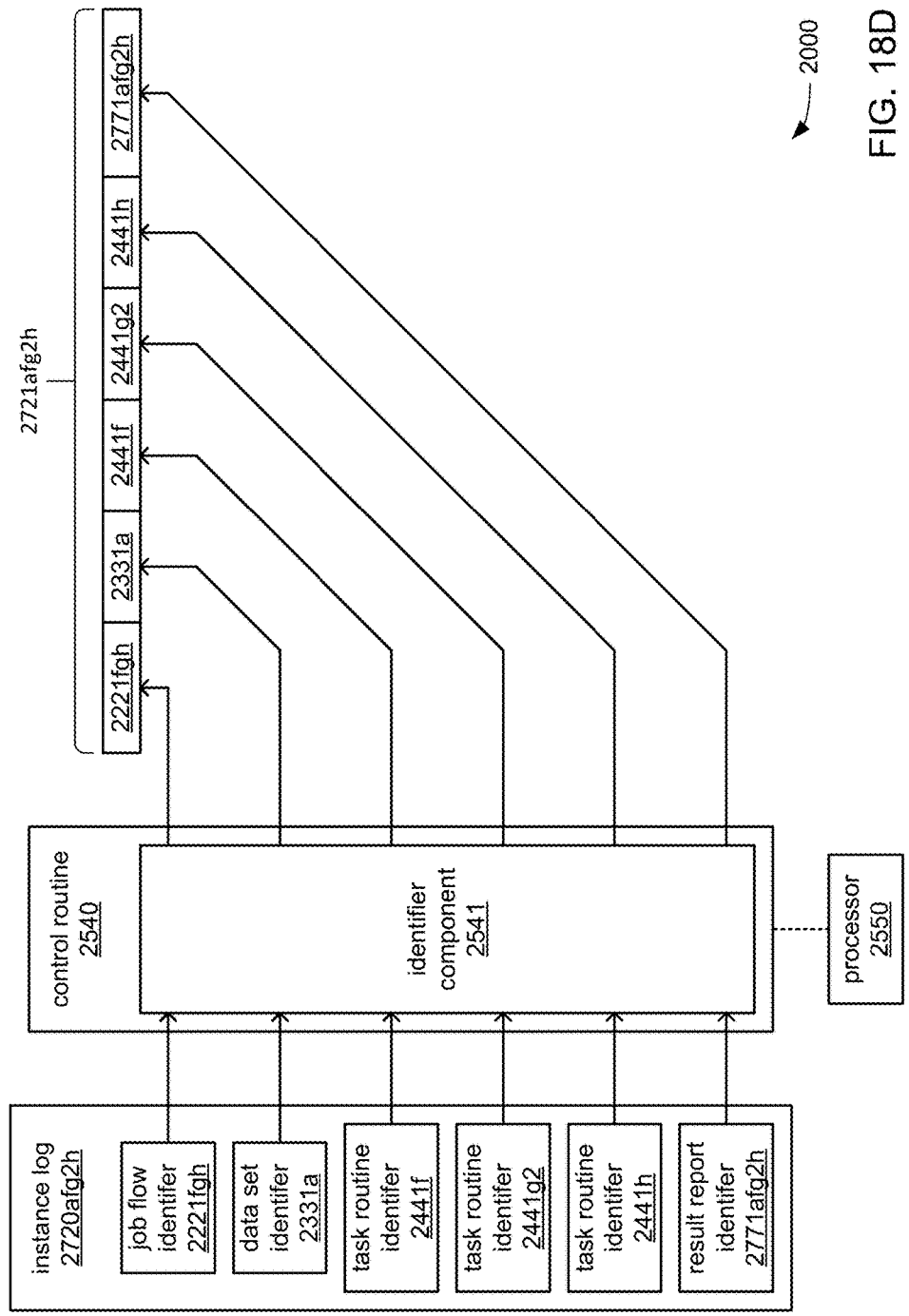

FIG. 18D illustrates such a concatenation of identifiers in greater detail using identifiers of objects associated with the example job flow 2200*fgh* and the example performance 2700*afg2h* earlier discussed in connection with FIGS. 17A-E. As depicted, after having generated a job flow identifier 2221*fgh*, a data set identifier 2331*a*, a task routine identifier 2441*f*, a task routine identifier 2441*g2*, a task routine identifier 2441*h* and a result report identifier 2771*afg2h* for the example job flow definition 2220*fgh*, the data set 2330*a*, the task routine 2440*f*, the task routine 2440*g2*, the task routine 2440*h* and the result report 2770*afg2h*, respectively, the processor(s) 2550 may be caused by the identifier component 2541 to concatenate at least an identically sized portion of each of these identifiers together to form the single instance log identifier 2721*afg2h* for the example instance log 2720*afg2h* of FIGS. 17A-E.

Figure 18E:
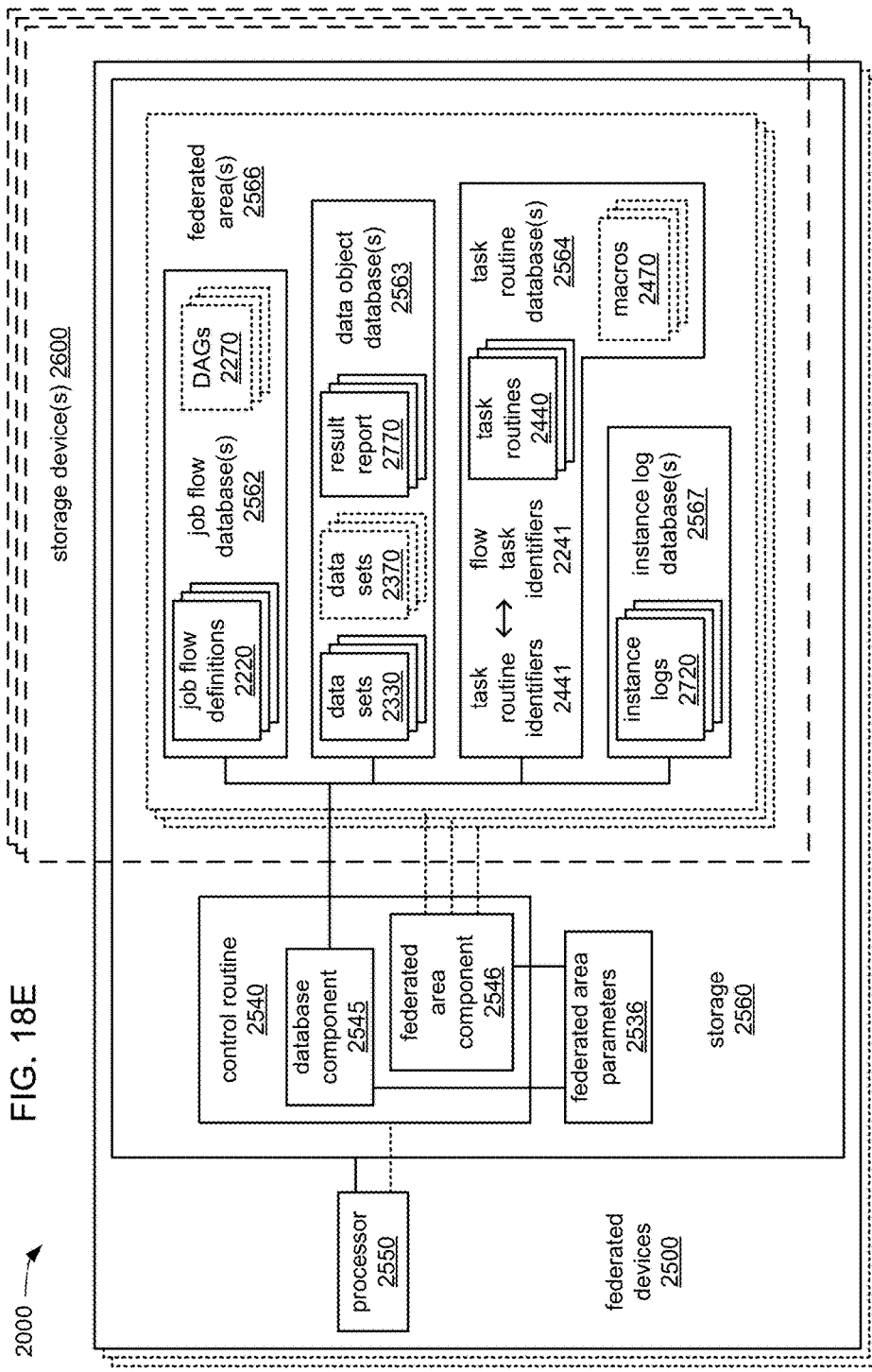

Turning to FIG. 18E, as depicted, the control routine 2540 executed by the processor(s) 2550 of the one or more federated devices 2500 may include a database component 2545 to organize various ones of the objects 2220, 2270, 2330, 2370, 2440, 2470, 2720 and 2770 into one or more databases (or one or more other data structures of other varieties) for more efficient storage and retrieval thereof within each federated area 2566 of the one or more federated areas 2566. In some embodiments, such organization of objects may be performed within the storages 2560 of multiple ones of the federated devices 2500, which may be operated together as the federated device grid 2005. In other embodiments, such organization of objects may be performed within multiple ones of the storage devices 2600, which may be operated together as the storage device grid 2006. In different embodiments, either of the grids 2005 or 2006 may be employed to provide distributed storage space across multiple ones of the devices 2500 or 2600, respectively, for the one or more federated areas 2566.

As depicted, the processor(s) 2550 may be caused by the database component 2545 to generate and/or maintain a distinct job flow database 2562 of the job flow definitions 2220 within each federated area 2566. Within each job flow database 2562, the job flow definitions 2220 may be indexed or made otherwise addressable by their corresponding job flow identifiers 2221. The processor(s) 2550 may also be caused to generate and/or maintain a distinct data object database 2563 of the data sets 2330 and/or 2370, and/or for the result reports 2770 within each federated area 2566. Within each data object database 2563, each of the data sets 2330 and/or 2370 may be accessible via their corresponding data object identifiers 2331, and/or each of the result reports 2770 may be accessible via their corresponding result report identifiers 2771.

As also depicted, the processor(s) 2550 may be caused by the database component 2545 to generate and/or maintain a distinct task routine database 2564 of the task routines 2440 within each federated area 2566. Within each task routine database 2564, the task routines 2440 may be indexed or made otherwise addressable both by their corresponding task routine identifiers 2441, and by the flow task identifiers 2241 that each may also be assigned to indicate the particular task that each is able to perform. As has been discussed, there may be tasks that multiple task routines 2440 are able to perform such that there may be sets of multiple task routines 2440 that all share the same flow task identifier 2241. In some embodiments, a search of a task routine database 2564 using a flow task identifier 2241 to find a task routine 2440 that is able to perform the task identified by that flow task identifier 2241 may beget an indication from the task routine database 2564 of there being more than one of such task routines 2440, such as a list of the task routine identifiers 2441 of such task routines 2440. Such an indication may also include an indication of which of the multiple task routines 2440 so identified is the most recent version thereof. Such an indication may be provided by an ordering of the task routine identifiers 2441 of the multiple task routines 2440 that places the task routine identifier 2441 of the most recent version of the task routines 2440 at a particular position within the list. In this way, indications of whether one, or more than one, task routines 2440 exist that are able to perform a task, as well as which one of multiple task routines 2440 is the newest version may be quickly provided by a task routine database 2564 in a manner that obviates the need to access and/or analyze any of the task routines 2440 therefrom.

As further depicted, the processor(s) 2550 may be caused by the database component 2545 to generate and/or maintain a distinct instance log database 2567 of the instance logs 2720 within each federated area 2566. Within each instance log database 2567, the instance logs 2720 may be indexed or made otherwise addressable by their corresponding instance log identifiers 2721. As has been discussed, each performance of a job flow may cause the generation of a separate corresponding instance log 2720 during that performance that provides a log of events occurring during the performance, including and not limited to, each performance of a task. In such embodiments, each instance log 2720 may be implemented as a separate data structure and/or file to provide indications of events occurring during the performance to which it corresponds. However, other embodiments are possible in which each of the instance logs 2720 is implemented as an entry of a larger log data structure and/or larger log data file, such as the instance log database 2567. In some embodiments, the manner in which the instance log identifiers 2721 of the instance logs 2720 are stored within an instance log database 2567 (or other data structure) may be structured to allow each of the instance log identifiers 2721 to be searched for at least portions of particular identifiers for other objects that were concatenated to form one or more of the instance log identifiers 2721. As will shortly be explained in greater detail, enabling such searches to be performed of the instance log identifiers 2721 may advantageously allow an instance log 2720 for a particular performance of a particular job flow to be identified in a manner that obviates the need to access and/or analyze any of the instance logs 2720 within an instance log database 2567.

As additionally depicted in FIG. 18E, the processor(s) 2250 may be additionally caused by the database component 2545 to store macros 2470 within task routine database(s) 2564 alongside the task routines 2440 from which each macro 2470 may be derived. As will be explained in greater detail, it may be deemed desirable to enable each macro 2470 to be searchable based on either the task routine identifier 2441 of the specific task routine 2440 from which it was generated, or the flow task identifier 2241 of the task that the task routine 2440 performs. As also additionally depicted in FIG. 18E, the processor(s0 2250 may be additionally caused by the database component 2545 to store DAGs 2270 within job flow database(s) 2562 alongside the job flow definitions 2220. As has been discussed, new job flow definitions 2220 may be at least partially based on DAGs 2270.

As depicted in FIG. 18E, within each federated area 2566, objects may be organized in object databases depicted in FIG. 18E in which object identifiers may be used to assist in more efficiently storing objects, to more efficiently identify what objects are within each database and/or to more efficiently retrieve objects therefrom. However, among federated areas 2566 that are part of a set of related federated areas (e.g., a linear hierarchy or hierarchical tree of federated areas), it may be deemed advantageous to maintain a separate index system of the object identifiers for use in locating objects that may be stored within any one of the federated areas 2566 within the set.

Figure 19B:
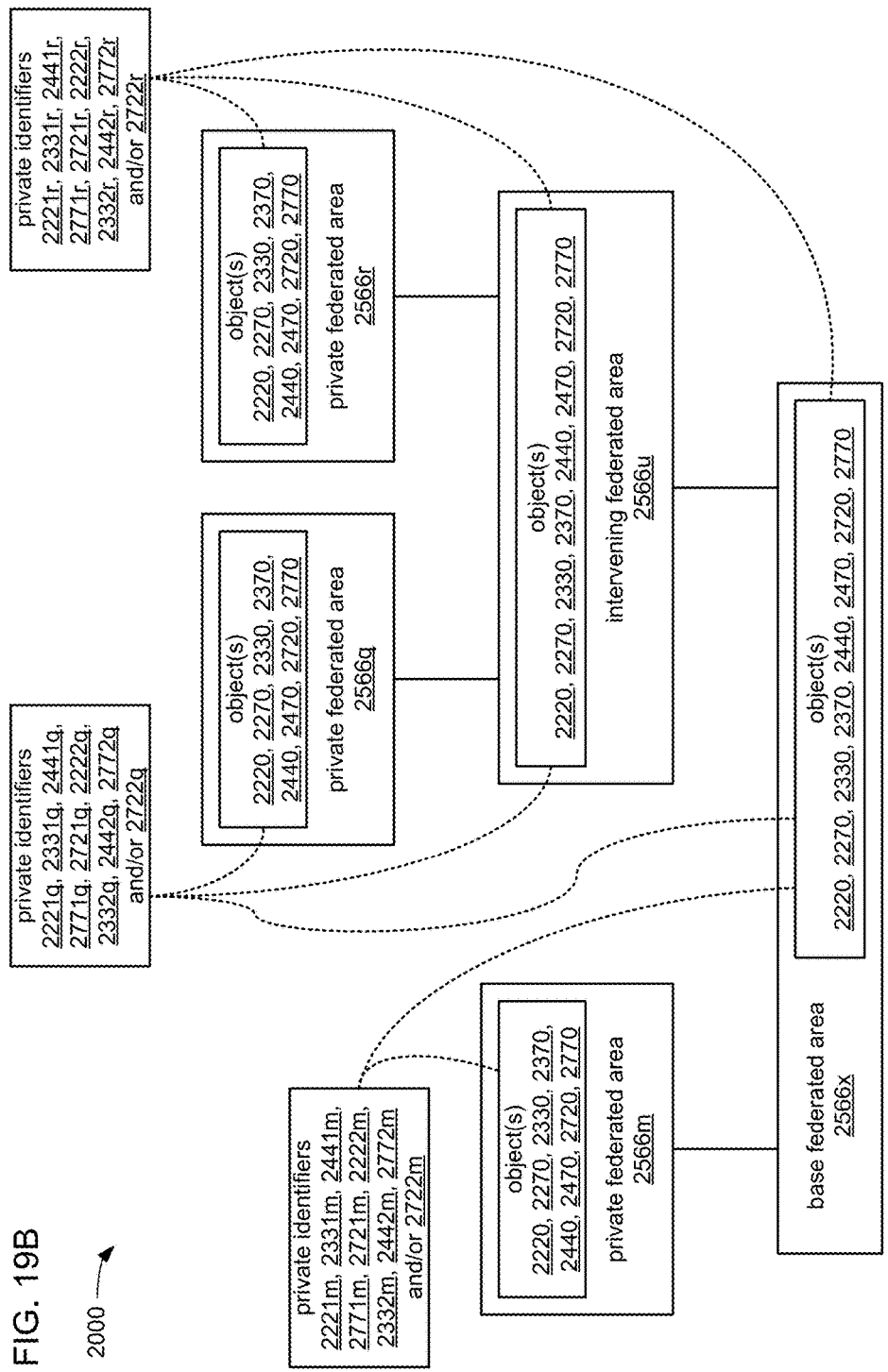

Each of FIGS. 19A and 19B illustrates an example embodiment of an index system that covers multiple federated areas within such a set of related federated areas. FIG. 19A depicts aspects of a single global index that covers all federated areas 2566 within the example hierarchical tree earlier introduced in FIGS. 15B-C, and FIG. 19B depicts aspects of multiple side-by-side indexes for each private federated area 2566 within the same example hierarchical tree.

Turning to FIG. 19A, a single global index of job flow identifiers 2221, data object identifiers 2331, task routine identifiers 2441, result report identifiers 2771 and instance log identifiers 2721 may be maintained by the one or more federated devices 2500 for use in identifying all the corresponding types of objects present within the federated areas 2566m, 2566q, 2566r, 2566u and 2566x of the depicted example hierarchical tree. Additionally, as was depicted within FIGS. 18B and 18C, each of these identifiers may be paired and/or stored together with a corresponding one of multiple job flow location identifiers 2222, data object location identifiers 2332, task routine location identifiers 2442, result report location identifiers 2772 and instance log location identifiers 2722 that each specify which one of the federated areas 2566m, 2566q, 2566r, 2566u and 2566x is the federated area in which each corresponding object is stored. Still further, each of the task routine identifiers 2441 may be correlated to a flow task identifier 2241 that identifies the task performed by each task routine 2440 in a manner similar to what was discussed in reference to FIG. 18E.

With such a single global index of identifiers and correlated location identifiers maintained for such a hierarchical set of federated areas 2566, a search for an object theraamong may start with searching such a global index to determine whether the object is stored within any of the federated areas 2566, and if so, to identify which federated area 2566 in which it is so stored. The search may then proceed to searching within the appropriate one of the databases 2562, 2563, 2564 or 2567 (depicted in FIG. 18E) within that federated area 2566 to retrieve that object. It should be noted that, in performing searches for objects among one or more federated areas 2566 in response to a request made by a particular user (and received by the one or more federated devices 2500), the scope of the search may be limited to cover only the one or more federated areas to which the requesting user has been granted access. This may be done in recognition of the inherent pointlessness of searching for objects that are not permitted to be made accessible to the requesting user.

Turning to FIG. 19B, in an alternate configuration of an index system, a separate index of similar content and/or structure may be generated and maintained for all federated areas along each pathway between the base federated area 2566x and one of the private federated areas 2566m, 2566q and 2566r. Such dividing up of such an index system may be deemed desirable where it is deemed likely that the majority of searches for objects will be limited to a single selected one of such pathways as part of implementing inheritance and/or priority relationships among the federated devices 2566 within each of those pathways. Alternatively or additionally, such dividing up of such an index system may be deemed desirable in recognition of a likelihood that each user may be granted access to only one private federated area 2566 such that a search for objects prompted by a request received from a user may, as discussed above, be limited to the federated areas to which the requesting user has been granted access. Thus, it may be deemed at least highly unlikely that any search performed in response to such a request would ever encompass more than one private federated area.

Figure 20A:
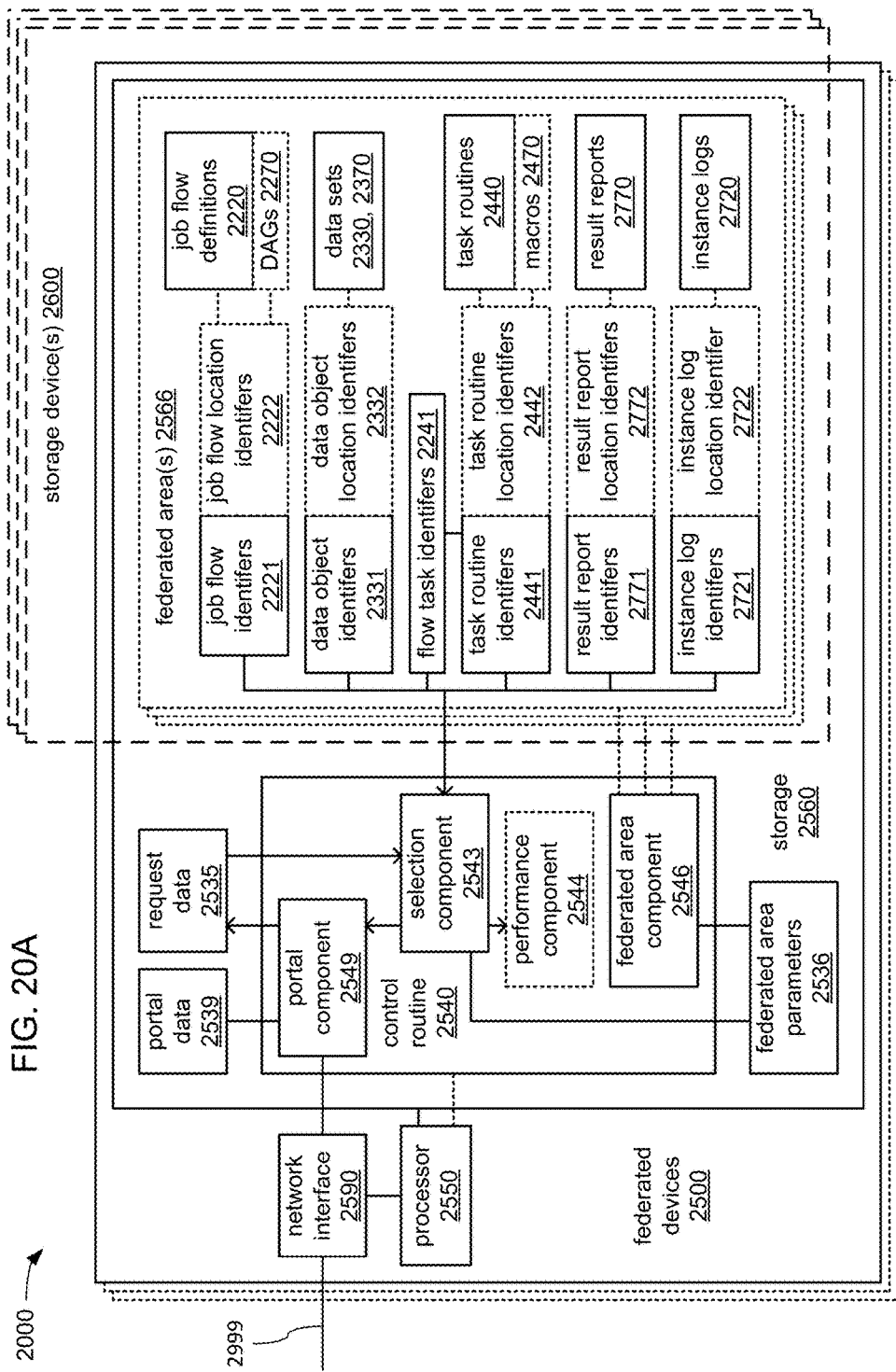
FIGS. 20A and 20B, together, illustrate an example of a federated device retrieving objects from a federated area.
Figure 20B:
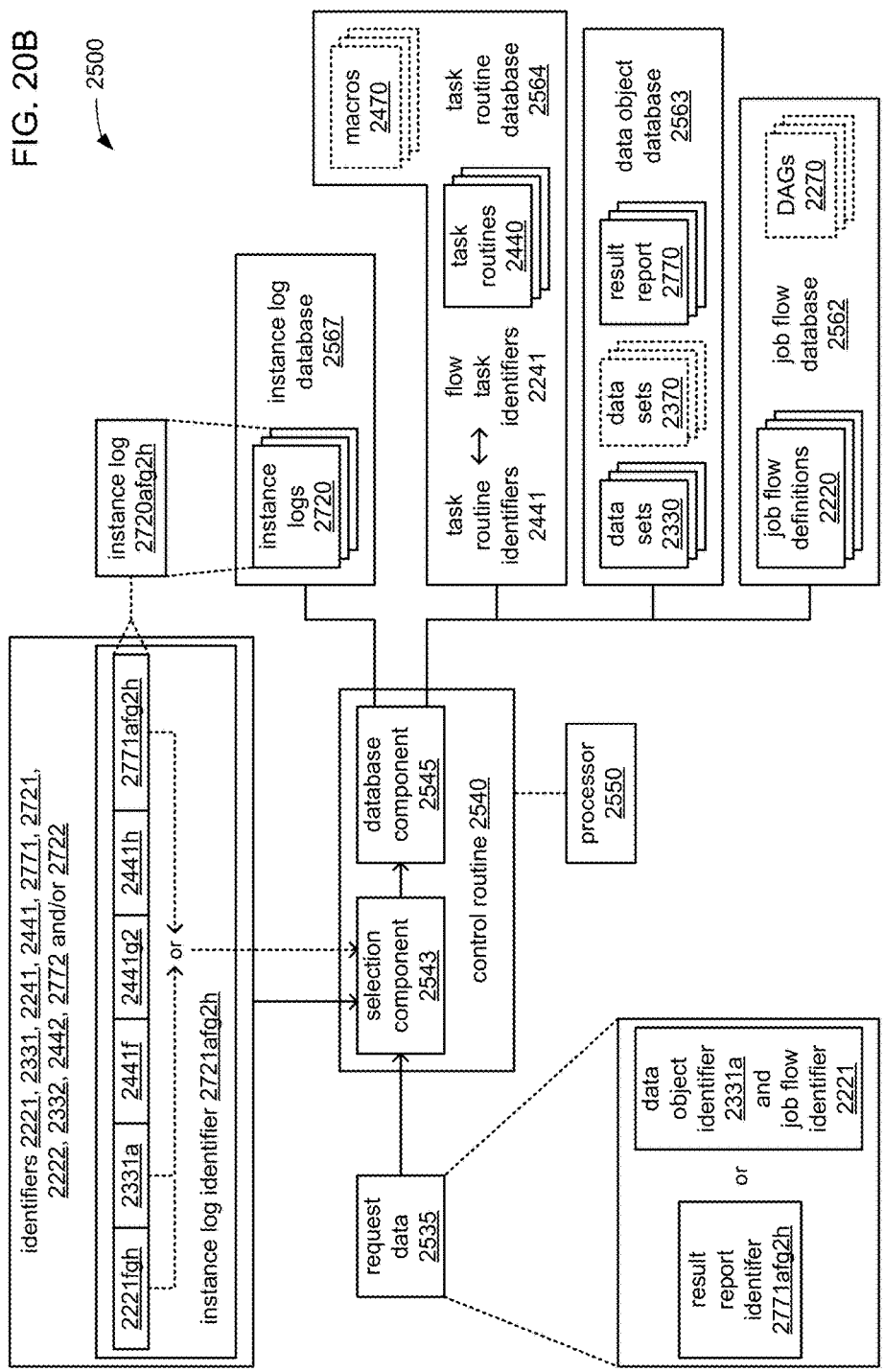

FIGS. 20A and 20B, together, illustrate the manner in which the processor(s) 2550 of the one or more federated devices 2500 selectively locate and retrieve objects from federated area(s) 2566 for transmission to another device and/or for use in directly performing a job flow. FIG. 20A illustrates aspects of selective retrieval of objects from one or more federated areas 2566 in response to requests received from one or more of the reviewing devices 2800, and FIG. 20B illustrates aspects of the use of identifiers assigned to objects to locate objects within one or more federated areas 2566 and/or to identify object associations.

Turning to FIG. 20A, one of the reviewing devices 2800 may be operated to transmit a request to the one or more federated devices 2500 to retrieve one or more objects associated with a job flow from within one or more federated areas 2566. Alternatively the request may be to use one or more objects associated with a job flow to perform the job flow to provide results of an analysis for viewing or other uses at the reviewing device 2800, or to repeat a previous performance of a job flow for purposes of reviewing aspects of that previous performance. In some embodiments, the processor(s) 2550 may be caused to queue such requests as request data 2535 to enable out-of-order handling of requests, and/or other approaches to increase the efficiency with which requests are responded to. As previously discussed in connection with at least FIG. 18A, the processor(s) 2550 of the one or more federated devices 2500 that receive the request may be caused by execution of the portal component 2549 to restrict access to the one or more federated areas 2566 for any of such requests to only authorized users, and may restrict the types of requests that may be granted to only those for which each user is authorized based on indications of such authorized users and/or types of granted access within the portal data 2539. Also, as depicted, the control routine 2540 may also include a selection component 2543 to employ one or more identifiers provided in a request and/or one or more rules to locate, select and retrieve objects associated with a job flow from the one or more federated areas 2566. The control routine 2540 may further include a performance component 2544 to perform a job flow or to repeat a previous performance of a job flow based on objects that the processor(s) 2550 are caused to retrieve from the one or more federated areas 2566 by the selection component 2543.

It should be noted that the granting of access to the one or more federated areas 2566 to retrieve one or more objects for transmission to a reviewing device 2800, and/or to transmit to a reviewing device 2800 one or more objects generated during a performance of a job flow by the one or more federated devices 2500, may lead to a parallel transfer of portions of one or more objects via the network 2999 from and/or to a grid of devices. This may be deemed desirable for the transfer of larger objects, such as result reports 2770 that include data set(s) that may be quite large in size. More precisely, in embodiments in which the reviewing device 2800 that transmitted a request that includes being provided with one or more objects is operated as part of a group or grid of multiple ones of the reviewing devices 2800, the granting of the request may result in multiple ones of the reviewing devices 2800 receiving one or more objects as multiple portions in at least partially parallel transfers. Correspondingly, in embodiments in which the federated device 2500 that received the request is operated as part of a federated device grid 2005, multiple ones of the federated devices 2500 may transmit one or more objects as portions and at least partially in parallel.

In executing the selection component 2543, the processor(s) 2550 may be caused to use one or more identifiers of objects that may be provided in a granted request to directly retrieve those one or more objects from one or more federated areas 2566. By way of example, a request may be received for the retrieval and transmission to the requesting device of a particular data set 2330, and the request may include the data object identifier 2331 of the particular data set 2330. In response to the request, the processor(s) 2550 may be caused by the selection component 2543 to employ the provided data object identifier 2331 (and maybe to do so along with one or more correlated data object location identifiers 2332, as previously discussed in reference to FIGS. 18A-E and/or 19A-B) to search for the particular data set 2330 within one or more federated areas 2566, to then retrieve the particular data set 2330 from the federated area 2566 in which it is found, and to transmit it to the requesting device 2800.

However, other requests may be for the retrieval of objects from one or more federated areas 2566 where the identifiers of the requested objects may not be provided within the requests. Instead, such requests may employ other identifiers that provide an indirect reference to the requested objects.

In one example use of an indirect reference to objects, a request may be received for the retrieval and transmission to a reviewing device 2800 of a task routine that performs a particular task, and the request may include the flow task identifier 2241 of the particular task instead of any task routine identifier 2441 for any particular task routine 2440. The processor(s) 2550 may be caused by the selection component 2543 to employ the flow task identifier 2241 provided in the request to search within one or more federated areas 2566 for such task routines 2440. As has been previously discussed, the search may entail correlating the flow task identifiers 2241 to one or more task routine identifiers 2441 of the corresponding one or more task routines 2440 that may perform the task identified by the flow task identifier 2241. In embodiments in which the task routines 2440 have been organized into a task routine database 2564 within each federated area 2566 as depicted as an example in FIG. 18E (or other searchable data structure), the search may entail searches within such a database or other data structure within each federated area 2566 in which such a task routine 2440 is identified as stored. The result of such a search may be an indication from such a database or other data structure within one or more of such federated areas 2566 that there is more than one task routine 2440 that is able to perform the task identified by the flow task identifier 2241 provided in the request. As previously discussed, such an indication may be in the form of a list of the task routine identifiers 2441 for the task routines 2440 that are able to perform the specified task. Additionally, and as also previously discussed, such a list may be ordered to provide an indication of which of those task routines 2440 stored within a federated area 2566 is the newest. Again, it may be deemed desirable to favor the use of the newest version of a task routine 2440 that performs a particular task where there is more than one task routine 2440 stored within one or more federated areas 2566 that is able to do so. Thus, the processor 2550 may be caused by the selection component 2543 to impose a requirement that, unless there is to be a repetition of a previous performance in which particular task routines 2440 were used, newest versions of task routines 2440 to perform each task are to be selected by default. Therefore, in response to the request, the processor(s) 2550 may be caused to select the newest task routine 2440 indicated among all of the one or more of such lists retrieved within each of one or more federated areas 2566 to perform the task specified in the request by the flow task identifier 2241, and to transmit that newest version to the requesting device. Through such automatic selection and retrieval of the newest versions of task routines 2440, individuals and/or entities that may be developing new analyses may be encouraged to use the newest versions.

In another example use of an indirect reference to objects, a request may be received by the one or more federated devices 2500 to repeat a previous performance of a specified job flow with one or more specified data objects as inputs (e.g., one or more of the data sets 2330), or to provide the requesting device with the objects needed to repeat the previous performance of the job flow, itself. Thus, the request may include the job flow identifier 2221 of the job flow definition 2220 for the job flow, and may include one or more data object identifiers 2331 of the one or more data sets 2330 to be employed as inputs to the previous performance of that job flow sought to be repeated, but may not include identifiers for any other object associated with that previous performance.

The processor(s) 2550 may be caused by the selection component 2543 to employ the job flow identifier 2221 and the one or more data objects identifiers 2331 provided in the request to search one or more federated areas 2566 for all instance logs 2720 that provide an indication of a past performance of the specified job flow with the specified one or more input data objects. In embodiments in which the instance logs 2720 have been organized into an instance log database 2567 as depicted as an example in FIG. 18E (or other searchable data structure), the search may be within such a database or other data structure, and may be limited to the instance log identifiers 2721. More specifically, in embodiments in which the instance log identifiers 2721 were each generated by concatenating the identifiers of objects associated with a corresponding previous performance, the instance log identifiers 2721, themselves, may be analyzed to determine whether the identifiers provided in the request for particular objects are included within any of the instance log identifiers 2721. Thus, the processor(s) 2550 may be caused to search each instance log identifier 2721 to determine whether there are any instance log identifiers 2721 that include the job flow identifier 2221 and all of the data object identifiers 2331 provided in the request. If such an instance log identifier 2721 is found, then it is an indication that the instance log 2720 that was assigned that instance log identifier 2721 is associated with a previous performance of that job flow associated with the one or more data sets 2330 specified in the request.

It should be noted, however, that a situation may arise in which more than one of such instance log identifiers 2721 may be found, indicating that there has been more than one past performance of the job flow with the one or more data sets. In response to such a situation, the processor(s) 2550 may be caused to transmit an indication of the multiple previous performances to the requesting device along with a request for a selection to be made from among those previous performances. The processor(s) 2550 may then await a response from the requesting device that provides an indication of a selection from among the multiple previous performances. As an alternative to such an exchange with the requesting device, or in response to a predetermined period of time having elapsed since requesting a selection without an indication of a selection having been received by the one or more federated devices 2500, the processor(s) 2550 may be caused by the selection component 2543 to, as a default, select the most recent one of the previous performances.

After the finding of a single previous performance, or after the selection of one of multiple previous performances, the processor(s) 2550 may then be caused by the selection component 2543 to retrieve the task routine identifiers 2441 specified within the corresponding instance log 2720 of the particular task routines 2440 used in the previous performance. The processor(s) 2550 may then employ those task routine identifiers 2441 to retrieve the particular task routines 2440 associated with the previous performance from one or more federated areas 2566. The processor(s) 2550 may also be caused to retrieve the result report identifier 2771 specified within the instance log 2720 of the result report that was generated in the previous performance. The processor(s) 2550 may be further caused to retrieve any data object identifiers 2331 that may be present within the instance log 2720 that specify one or more data sets 2370 that may have been generated as a mechanism to exchange data between task routines 2440 during the performance of a job flow.

If the request was for the provision of objects to the requesting device, then the processor(s) 2550 may be caused by the selection component 2543 to transmit, to the requesting device, the job flow definition 2220 and the one or more data sets 2330 specified by the job flow identifier 2221 and the one or more data object identifiers 2331, respectively, in the request. The processor 2550 may also be caused to transmit the instance log 2720 generated in the previous performance, and the result report 2770 specified by the result report identifier 2771 retrieved from the instance log 2720. If any data sets 2370 were indicated in the instance log 2720 as having been generated in the previous performance, then the processor(s) 2550 may be further caused to transmit such data set(s) 2370 to the requesting device. Thus, based on a request that provided only identifiers for a job flow definition 2220 and one or more data objects used as inputs to a previous performance of the job flow, a full set of objects may be automatically selected and transmitted to the requesting device to enable an independent performance of the job flow as part of a review of that previous performance.

However, if the request was for a repeat of the previous performance of the job flow by the one or more federated devices 2500, then instead of (or in addition to) transmitting the objects needed to repeat the previous performance to the requesting device, the processor(s) 2550 may be caused by execution of the performance component 2544 to use those objects to repeat the previous performance within a federated area 2566 in which at least one of the objects is stored and/or to which the user associated with the request has been granted access. In some embodiments, the federated area 2566 in which the previous performance took place may be selected, by default, to be the federated area 2566 in which to repeat the performance. Indeed, repeating the performance within the same federated area 2566 may be deemed a requirement to truly reproduce the conditions under which the previous performance occurred. More specifically, the processor(s) 2550 may be caused to execute the task routines 2440 specified in the instance log 2720, in the order specified in the job flow definition 2220 specified in the request, and using the one or more data sets 2330 specified in the request as input data objects. In some embodiments, where multiple ones of the federated devices 2500 are operated together as the federated device grid 2005, the processor(s) 2550 of the multiple ones of the federated devices 2500 may be caused by the performance component 2544 to cooperate to divide the execution of one or more of the tasks thereamong. Such a division of one or more of the tasks may be deemed desirable where one or more of the data objects associated with the job flow is of relatively large size. Regardless of the quantity of the federated devices 2500 involved in repeating the previous performance of the job flow, upon completion of the repeat performance, the processor(s) 2550 may be further caused by the performance component 2544 to transmit the newly regenerated result report 2770 to the requesting device. Alternatively or additionally, the processor(s) 2550 may perform a comparison between the newly regenerated result report 2770 and the result report 2770 previously generated in the previous performance to determine if there are any differences, and may transmit an indication of the results of that comparison to the requesting device. Thus, based on a request that provided only identifiers for a job flow definition 2220 and one or more data objects used as inputs to the job flow, a previous performance of a job flow may be repeated and the results thereof transmitted to the requesting device as part of a review of the previous performance.

In still another example use of an indirect reference to objects, a request may be received by the one or more federated devices 2500 to perform a specified job flow with one or more specified data objects as inputs (e.g., one or more of the data sets 2330). Thus, the request may include the job flow identifier 2221 of the job flow definition 2220 for the job flow, and may include one or more data object identifiers 2331 of the one or more data sets 2330 to be employed as input data objects, but may not include any identifiers for any other objects needed for the performance.

The processor(s) 2550 may be caused by the selection component 2543 to employ the job flow identifier 2221 provided in the request to retrieve the job flow definition 2220 for the job flow to be performed. The processor(s) 2550 may then be caused to retrieve the flow task identifiers 2241 from the job flow definition 2220 that specify the tasks to be performed, and may employ the flow task identifiers 2241 to retrieve the newest version of task routine 2440 within one or more federated areas 2566 (e.g., within the task routine database 2564 within each of one or more federated areas 2566) for each task. The processor(s) 2550 may also be caused by the selection component 2543 to employ the job flow identifier 2221 and the one or more data objects identifiers 2331 to search the one or more federated areas 2566 for any instance logs 2720 that provide an indication of a past performance of the specified job flow with the specified one or more input data objects.

If no such instance log identifier 2721 is found, then it is an indication that there is no record within the one or more federated areas of any previous performance of the specified job flow with the one or more specified data sets 2330. In response, the processor(s) 2550 may be caused by execution of the performance component 2544 to execute the retrieved newest version of each of the task routines 2440 to perform the tasks of the job flow in the order specified in the job flow definition 2220 specified in the request, and using the one or more data sets 2330 specified in the request as input data objects. Again, in embodiments in which multiple ones of the federated devices 2500 are operated together as the federated device grid 2005, the processor(s) 2550 may be caused by the performance component 2544 to cooperate to divide the execution of one or more of the tasks thereamong. Upon completion of the performance of the job flow, the processor(s) 2550 may be further caused by the performance component 2544 to transmit the result report 2770 generated in the performance of the job flow to the requesting device. Thus, based on a request that provided only identifiers for a job flow definition 2220 and one or more data objects used as inputs to the job flow, a performance of a job flow is caused to occur using the newest available versions of task routines 2440 to perform each task.

However, if such an instance log identifier 2721 is found, then it is an indication that there was a previous performance of the job flow specified in the request where the one or more data sets 2330 specified in the request were used as input data objects. If a situation should occur where multiple ones of such instance log identifiers 2721 are found, then it is an indication that there have been multiple previous performances of the job flow, and the processor(s) 2550 may be caused by the selection component 2543 to select the most recent one of the multiple previous performances, by default. After the finding of a single previous performance, or after the selection of the most recent one of multiple previous performances, the processor(s) 2550 may then be caused by the selection component 2543 to retrieve the task routine identifiers 2441 specified within the corresponding instance log 2720 of the particular task routines 2440 used in the previous performance. The processor(s) 2550 may then employ those task routine identifiers 2441 to retrieve the particular task routines 2440 associated with the previous performance from one or more federated areas 2566. The processor 2550 may then compare each of the task routines 2440 specified in the instance log 2720 to the newest task routines 2440 retrieved for each task specified in the job flow definition 2220 to determine whether all of the task routines 2440 specified in the instance log 2720 are the newest versions thereof. If so, then the result report 2770 generated in the previous performance associated with the instance log 2720 was generated using the most recent versions of each of the task routines 2440 needed to perform the tasks of the job flow. The processor(s) 2550 may then entirely forego performing the job flow, may employ the result report identifier 2771 provided in the instance log 2720 to retrieve the result report 2770 generated in the earlier performance, and may transmit that result report 2770 to the requesting device. In this way, a form of caching is provided by which the previously generated result report 2770 is able to be recognized as reusable, and the use of processing resources of the one or more federated devices 2500 to repeat a previous performance of the job flow is avoided.

It should be noted, however, that a situation may arise in which one or more of the task routines 2440 specified in the instance log 2720 are the newest versions thereof, while one or more others of the task routines 2440 specified in the instance log 2720 are not. In response to such a situation, the processor(s) 2550 may be caused by the selection routine 2543 to check whether at least the task routine 2440 specified in the instance log 2720 as performing the first task in the order of tasks specified in the job flow definition 2220 is the newest version of task routine 2440 able to perform that task. If not, then the processor(s) 2550 may be caused by the performance component 2544 to employ all of the newest versions of the task routines 2440 to perform the entire job flow, just as the processor(s) 2550 would be caused to do so if there had been no previous performance of the job flow, at all. However, if the first task in the previous performance of the job flow was performed with the newest version of task routine 2440 able to perform that first task, then the processor(s) 2550 may iterate through each task in the order of tasks specified in job flow definition 2720 to determine which were performed with the newest version of task routine 2440. The processor(s) 2550 would start with the first task in the specified order of tasks, and stop wherever in the specified order of tasks the processor(s) 2550 determine that a task routine 2440 was used that is not the newest version thereof. In this way, the processor(s) 2550 may identify an initial portion of the order of tasks specified in the job flow definition 2220 that may not need to be performed again as they were already performed using the newest versions of their respective task routines 2440. As a result, only the remainder of the tasks that follow the initial portion in the order of tasks may need to be performed again, but using the newest versions of their respective task routines 2440 for all of those remaining tasks. In this way, a form of partial caching is provided by which an initial portion of a previous performance of a job flow is able to be reused such that not all of the job flow needs to be performed again to generate a result report 2770 to be transmitted to the requesting device.

FIG. 20B illustrates two examples of searching for objects using one or more identifiers that provide an indirect reference to those objects in greater detail. More specifically, FIG. 20B depicts two different searches for objects that each employ the example instance log identifier 2721*afg2h* associated with the 2720*afg2h* instance log of the example performance of the job flow 2200*fgh* of FIGS. 17A-E.

In one example search, and referring to both FIGS. 20A and 20B, a request may be received (and stored as part of the request data 2535) for the retrieval of objects associated with, and/or for a repetition of, the example performance 2700*afg2h* that resulted in the generation of the result report 2770*afg2h*. In so doing, the request may use the result report identifier 2771*afg2h* to refer to the result report 2770*afg2h*, while providing no other identifier for any other object associated with the performance 2700*afg2h*. In response, the processor(s) 2550 may be caused by the selection component 2543 to cooperate with the database component 2545 to search the instance log identifiers 2721 of the instance log database 2567 within one or more federated areas 2566 to locate the one of the multiple instance log identifiers 2721 that includes the result report identifier 2771*afg2h*. As depicted, the instance log identifier 2721*afg2h* is the one of the multiple instance log identifiers 2721 that contains the result report identifier 2771*afg2h*. With the instance log identifier 2721*afg2h* having been found, the processor(s) 2550 may then be caused by the selection component 2543 to retrieve, from the instance log 2720*afg2h*, the identifiers of the various objects requested to be transmitted to the requesting device and/or needed to repeat the example performance 2700*afg2h*.

In another example search, a request may be received for a repetition of a previous performance of a specific job flow with a specific data object used as input. In so doing, the request may refer to the example job flow 2200*fgh* of FIGS. 17A-E by using the job flow identifier 2221*fgh* of the job flow definition 2220*fgh* that defines the example job flow 2200*fgh*, and may refer to the data set 2330*a* by using the data object identifier 2331*a*. In response, the processor(s) 2550 may be caused by the selection component 2543 to cooperate with the database component 2545 to search the instance log identifiers 2721 of the instance log database 2567 within one or more federated areas 2566 to locate any of the multiple instance log identifiers 2721 that includes the both the job flow identifier 2221*fgh* and the data object identifier 2331*a*. As depicted, the instance log identifier 2721*afg2h* is the one of the multiple instance log identifiers 2721 that contains both of these identifiers 2221*fgh* and 2331*a*. With the instance log identifier 2721*afg2h* having been found, the processor(s) 2550 may then be caused by the selection component 2543 to retrieve, from the instance log 2720*afg2h*, the identifiers of the various objects needed to repeat the example performance 2700*afg2h*. The processor(s) 2550 may then be caused by execution of the performance component 2544 to perform the example job flow 2200*fgh* with the data set 2330*a* as the input data object.

Figure 21A:
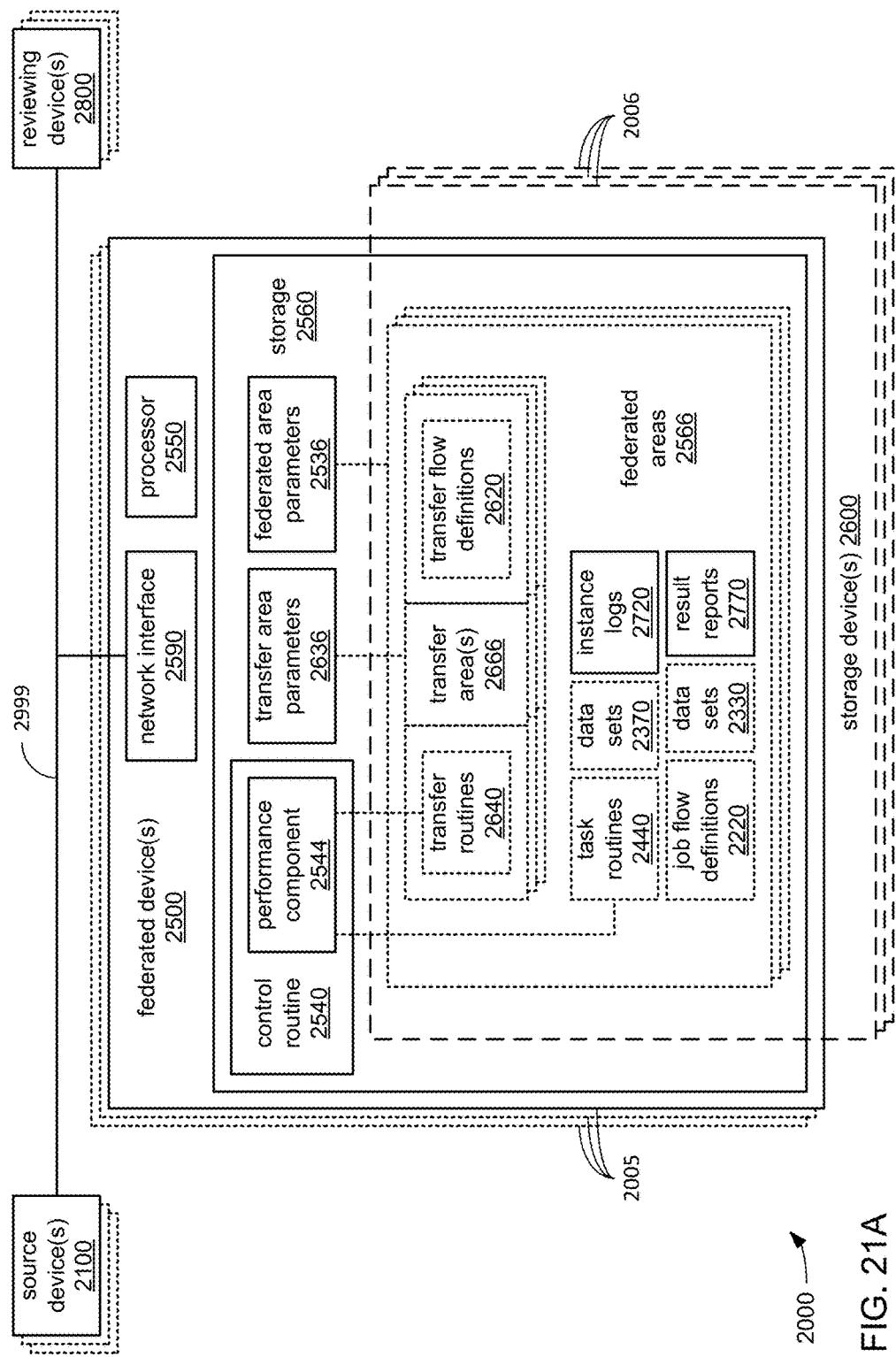
Figure 21C:
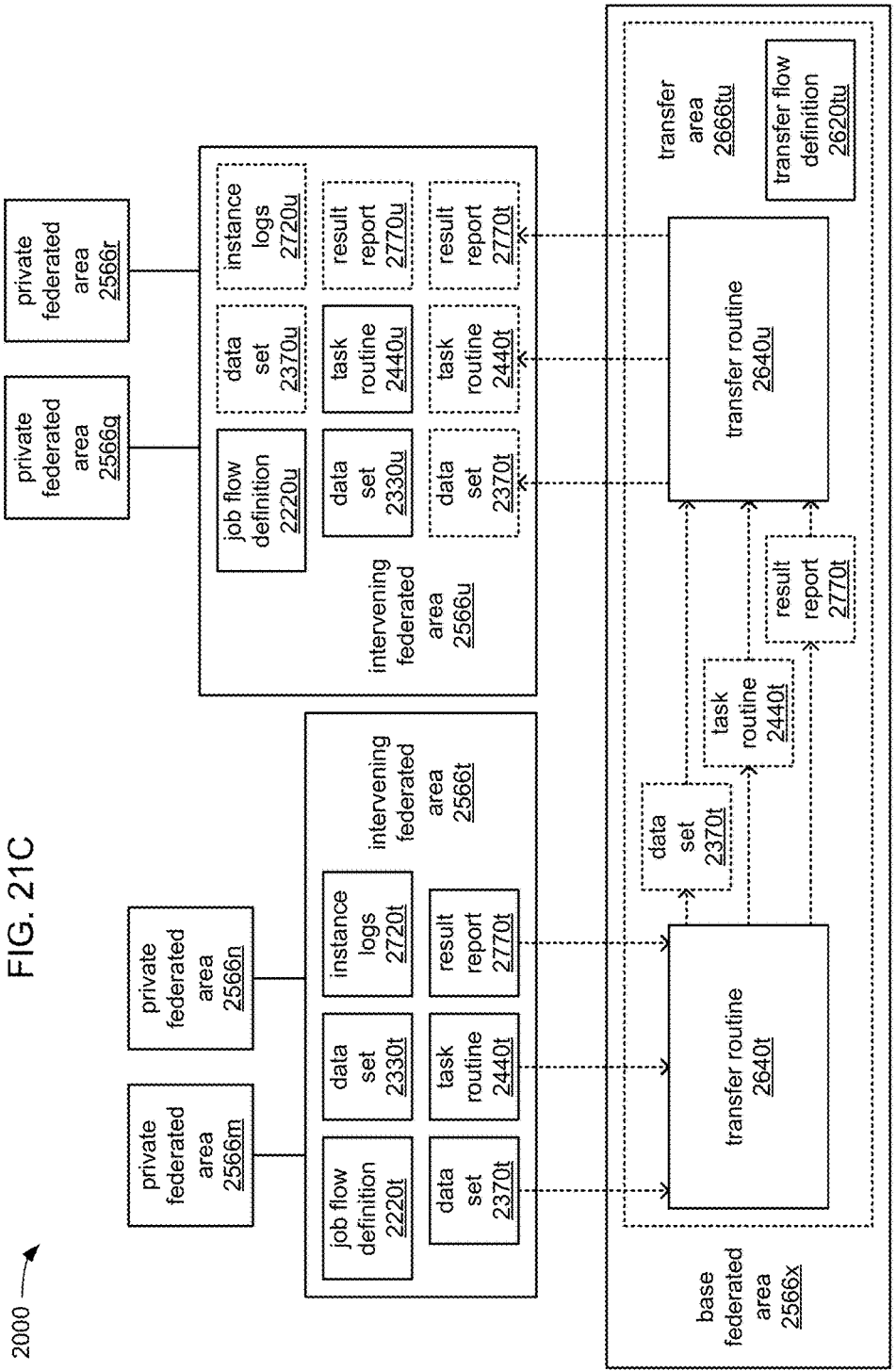

FIGS. 21A, 21B and 21C, together, illustrate aspects of an automated transfer relationship that may be put in place between two or more federated areas 2566 in which one or more objects may be automatically copied from one federated area to another through a transfer area 2666 in response to a specified condition being met. FIG. 21A depicts aspects of the configuration of transfer areas 2666 and corresponding automated transfers of copies of objects, FIG. 21B depicts an example of generating a transfer area 2666 as overlapping portions of two federated areas 2566 involved in such transfers, and FIG. 21C depicts an example of generating a transfer area 2666 within a base federated area from which each of the two federated areas 2566 involved in such transfers branch.

Unlike the earlier described inheritance, priority and dependency relationships that each extend among two or more federated areas 2566 along a pathway within a single hierarchy of levels of access restriction of federated areas, either within a linear hierarchy (as introduced in FIG. 15A) or within a branch of a hierarchical tree (as introduced in FIG. 15B), the automated transfer relationship in which copies of one or more objects are automatically transferred from one federated area 2566 to another may be put in place among two or more federated areas 2566 that are within different branches of a hierarchical tree. Therefore, unlike the earlier described inheritance, priority and dependency relationships that must follow such hierarchical pathways, the automated transfer relationship is not restricted to following such pathways. This enables one or more automated transfer relationships to be put in place within a hierarchical tree on a temporary basis for only so long as they are needed. Stated differently, while the inheritance, priority and dependency relationships are tied to the structure of a hierarchy formed among multiple federated areas such that making changes to such relationships may necessarily be coordinated changes in pathways within hierarchical structures, the automated transfer relationships can be put in place, modified and/or removed without regard to such pathways.

There may be any of a variety of scenarios that serve as the basis for putting in place such a automated transfer relationship. By way of example users and/or groups of users associated with private and/or intervening federated areas 2566 within different branches of a hierarchical tree may choose to collaborate on the development of one or more objects as part of a larger project or other undertaking where, otherwise, these users and/or groups of users would normally have little or no need to share objects thereamong beyond the reusing of objects that may be stored within the single base federated area 2566 from which each of their private and/or intervening federated areas 2566 branch. As such a collaboration may be temporary in nature such that it may cease when the goal of the collaboration is achieved, the automated transfer relationship that is created among such users may be caused to exist only for the duration of that collaboration.

Turning to FIG. 21A, as depicted there may be one or multiple transfer areas 2666 created among multiple federated areas 2566 to implement one or more automated transfer relationships thereamong. More specifically, within a single hierarchical tree of federated areas 2566, there may be multiple transfer areas 2666 that each serve to transfer copies of objects from one federated area to another. As will be discussed in greater detail, a single transfer relationship may involve the use of a single transfer area 2666 to support the automated transfer of copies of objects from one federated area to another. However, it may also be that a single transfer relationship may extend among a chain of more than two federated areas, and therefore, may include multiple transfer areas 2666 to support automated transfers of copies of objects from one federated area to another, and then to another, and so on, along such a chain.

Many of the characteristics of a transfer relationship may be defined by a corresponding transfer flow definition 2620 that may function in many ways that are similar to the earlier discussed job flow definitions 2220. More specifically, as with the performance of a job flow 2200 of a job flow definition 2220 through execution of one or more selected task routines 2440 by one or more processors 2550 under the control of the performance component 2544, a transfer relationship may be similarly defined by a transfer flow definition 2620 to include the execution of one or more transfer routines 2640 by the one or more processors 2550 under the control of the performance component 2544. Each transfer flow definition 2620 may identify the specific two or more federated areas 2566 among which the corresponding automated transfer relationship is to be put in place, and may specify the order and/or direction(s) of the automated transfers among those specified federated areas 2566. Each transfer flow definition 2620 may also identify each of the transfer routines 2640 that may be stored and executed within each of the specified federated areas 2566 to repeatedly check for when a specified condition to trigger a transfer has been met, and to then perform at least part of an automated transfer from one of the specified federated areas 2566 to another through a specified transfer area 2666. Such a condition may be specified within the transfer flow definition 2620 or may be specified within the transfer routine 2640 that is executed to repeatedly check for whether that condition has been met.

Indications of what transfer relationships are in place may be maintained by the one or more federated devices 2500 as part of transfer area parameters 2636. The processor(s) 2550 of the one or more federated devices 2500 may update the transfer area parameters 2636 as each transfer relationship is put in place and/or is removed.

Turning to FIG. 21B, as depicted, a relatively simple transfer relationship between two intervening federated areas 2566*t* and 2566*u* within a hierarchical tree of federated areas may be put in place with a corresponding single transfer area 2666*tu* being formed where portions of the two federated areas 2566*t* and 2566*u* overlap. More precisely, in setting up the depicted transfer relationship between the federated areas 2566*t* and 2566*u*, the processor(s) 2550 of the one or more federated devices 2500 may be caused (e.g., by the federated area component 2546) to manipulate the locations of one or both of the federated areas 2566*t* and 2566*u* to form a storage area at which portions of both federated areas 2566*t* and 2566*u* overlap, which may then be defined as the transfer area 2666*tu*.

Also as part of putting in place the depicted transfer relationship, a transfer routine 2640*t* may be stored within the intervening federated area 2566*t*, and a transfer routine 2640*u* may be stored within the intervening federated area 2566*u*. Further, the transfer flow definition 2620*tu* may be stored within the base federated area 2566*x* at which it may be made accessible from both of the federated areas 2566*t* and 2566*u* through use of inheritance relationships. Alternatively, the transfer flow definition 2620*tu* may be stored within a portion of the storage area at which portions of the federated areas 2566*t* and 2566*u* overlap, either alongside or within the transfer area 2666*tu*.

As has been discussed, processor(s) 2550 of the one or more federated devices 2500 may be caused by the performance component 2544 to execute one or more task routines 2440 within each federated area 2566 in response to requests to perform the tasks defined in various job flows 2200 by corresponding job flow definitions 2220. As a job flow 2200 is so performed within a federated area 2566, a transfer routine 2640 of an automated transfer relationship that includes that federated area 2566 may also be executed to determine if the performance of that job flow 2200 has caused a specified condition to be met that triggers the transfer of a copy of one or more objects from that federated area 2566 to another federated area 2566 through a corresponding transfer area 2666. More specifically, and by way of the example presented in FIG. 21B, at a time when the depicted task routine 2440*t* is executed within the intervening federated area 2566*t* as part of performing a job flow defined by the depicted job flow definition 2220*t*, the transfer routine 2640*t* may also be executed to determine whether the results of the execution of the task routine 2440*t* has caused a specified condition to be met.

The specified condition may include any of a variety of required events, outcomes of comparisons of values, quantities of iterations of a performance, etc. By way of example, a specified condition may simply be that a particular data set has been generated by a performance of a job flow 2200, and the processor(s) 2550 may be caused by the transfer routine 2640 to simply repeatedly check whether the performance of the job flow 2200 has caused the generation of the specified data set. Alternatively, a specified condition may include a requirement that one or more data values within such a generated data set must fall within one or more specified ranges of data values, and the processor(s) 2550 may be caused by the transfer routine 2640 to check for both the generation of a specified data set and for whether the one or more specified data values thereof do fall within the specified one or more ranges of data values. Regardless of what the specified condition may be, upon a determination that the specified condition has been met, the processor(s) 2550 may be caused by execution of the transfer routine 2640 to transfer a copy of each of one or more objects from one federated area 2566 to a transfer area 2666 as part of transferring the one or more copies to another federated area 2566. More specifically, and continuing with the example presented in FIG. 21B, upon determining that a specified condition has been met, execution of the transfer routine 2640*t* within the intervening federated area 2566*t* may cause the processor(s) 2550 to perform a transfer of copies of a data set 2370*t*, the task routine 2440*t* and/or a corresponding result report 2770*t* to the transfer area 2666*tu*.

Another transfer routine 2640 associated with the same automated transfer relationship may be executed within the other federated area 2566 to monitor the transfer area 2666 for the occurrence of the transfer of the one or more copies of objects thereto. In response to determining that the one or more copies of objects have been so transferred into the transfer area 2666, the processor(s) 2550 may be caused by further execution of the other transfer routine 2640 to transfer the one or more copies of objects from the transfer area 2666 and into the other federated area 2566. In so doing, the one or more copies of objects become available within the other federated area 2566 for use in a performance of another job flow 2200 specified by another job flow definition 2220. More specifically, and continuing with the example presented in FIG. 21B, upon determining that copies of the data set 2370*t*, the task routine 2440*t* and/or the result report 2770*t* have been transferred into the transfer area 2666*tu*, execution of the transfer routine 2640*u* within the intervening federated area 2566*u* may cause the processor(s) 2550 to perform a transfer of those copies from the transfer area 2666*tu*, and into the intervening federated area 2566*u*. As depicted, with those copies so transferred into the intervening federated area 2566*u*, those copies may be employed in a performance of a different job flow defined by the depicted job flow definition 2220*u*, and which may entail the execution of the depicted task routine 2440*u*.

Turning to FIG. 21C, as an alternative to the example of FIG. 21B, a relatively simple transfer relationship between two intervening federated areas 2566*t* and 2566*u* within the same hierarchical tree of federated areas may be put in place with a corresponding single transfer area 2666*tu* being formed within the base transfer area 2566*x* from which both of the federated areas 2566*t* and 2566*u* branch. More precisely, in setting up the depicted transfer relationship between the federated areas 2566*t* and 2566*u*, the processor(s) 2550 of the one or more federated devices 2500 may be caused (e.g., by the federated area component 2546) to instantiate the transfer area 2666*tu* within the base federated area 2566*x*. It should be noted that this example of a transfer relationship between the intervening federated areas 2566*t* and 2566*u* may rely on each of the intervening federated areas 2566*t* and 2566*u* having at least an inheritance relationship with the base federated area 2566*x*

Also as part of putting in place the depicted transfer relationship, the transfer routines 2640*t* and 2640*u* may be stored within the intervening federated areas 2566*t* and 2566*u*, respectively, or may both be stored within the transfer area 2666*tu* instantiated within the based federated area 2566*x*, as depicted. Further, he transfer flow definition 2620*tu* may be stored within the base federated area 2566*x* at which it may be made accessible from both of the federated areas 2566*t* and 2566*u*, as depicted, either alongside or within the transfer area 2666*tu*.

Again, processor(s) 2550 of the one or more federated devices 2500 may be caused by the performance component 2544 to execute one or more task routines 2440*t* within the federated area 2566*t* in response to requests to perform the tasks defined in a job flow 2200 by the job flow definition 2220*t*. As that job flow 2200 is so performed, the transfer routine 2640*t* may also be executed to determine if the performance of that job flow 2200 has caused a specified condition to be met that triggers the transfer of a copy of one or more objects from the intervening federated area 2566*t* to the intervening federated area 2566*u* through the transfer area 2666*tu*.

Again, regardless of what the specified condition may be, upon determining that the specified condition has been met, execution of the transfer routine 2640*t* within the intervening federated area 2566*t* or within the base federated area 2566*x* (as depicted) may cause the processor(s) 2550 to perform a transfer of copies of the data set 2370*t*, the task routine 2440*t* and/or the result report 2770*t* to the transfer area 2666*tu*.

Again, the transfer routine 2640*u* may be executed within the intervening federated area 2566*u* or within the base federated area 2566*x* (as depicted) to monitor the transfer area 2666*tu* for the occurrence of the transfer of copies of the data set 2370*t*, the task routine 2440*t* and/or the result report 2770*t* thereto, such that those copies become available within the transfer area 2666*tu*. In response to determining that those copies have been so transferred into the transfer area 2666*tu*, the processor(s) 2550 may be caused by further execution of the other transfer routine 2640*u* to transfer those copies from the transfer area 2666*tu* and into the intervening federated area 2566*u*. In so doing, the copies of the data set 2370*t*, the task routine 2440*t* and/or the result report 2770*t* become available within the intervening federated area 2566*u* for use in a performance of another job flow 2200 specified by the job flow definition 2220*u*, and which may entail the execution of the depicted task routine 2440*u*.

Figure 22A:
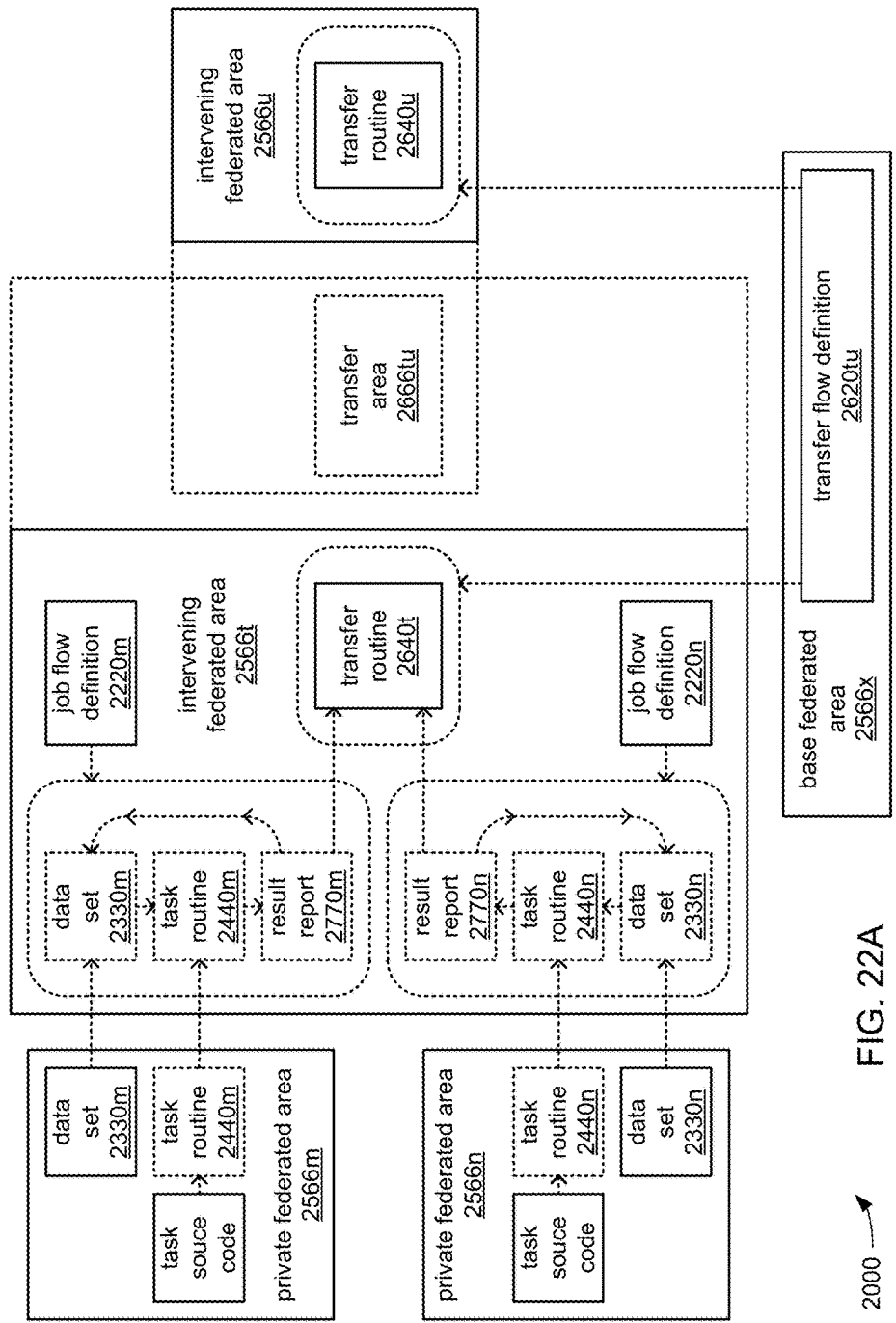
FIGS. 22A, 22B and 22C, together, illustrate an example of an automated transfer of task routines.
Figure 22B:
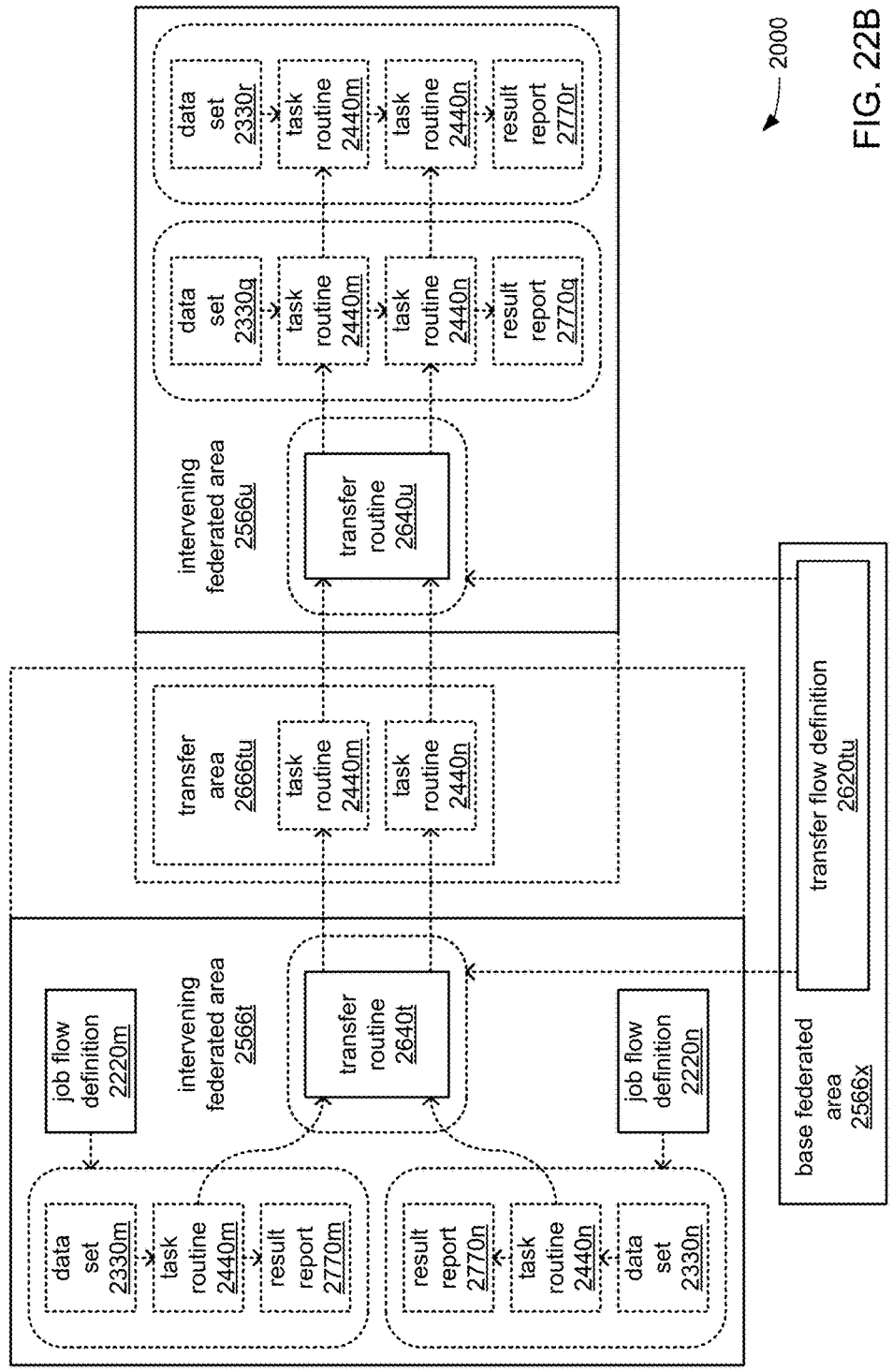
Figure 22C:
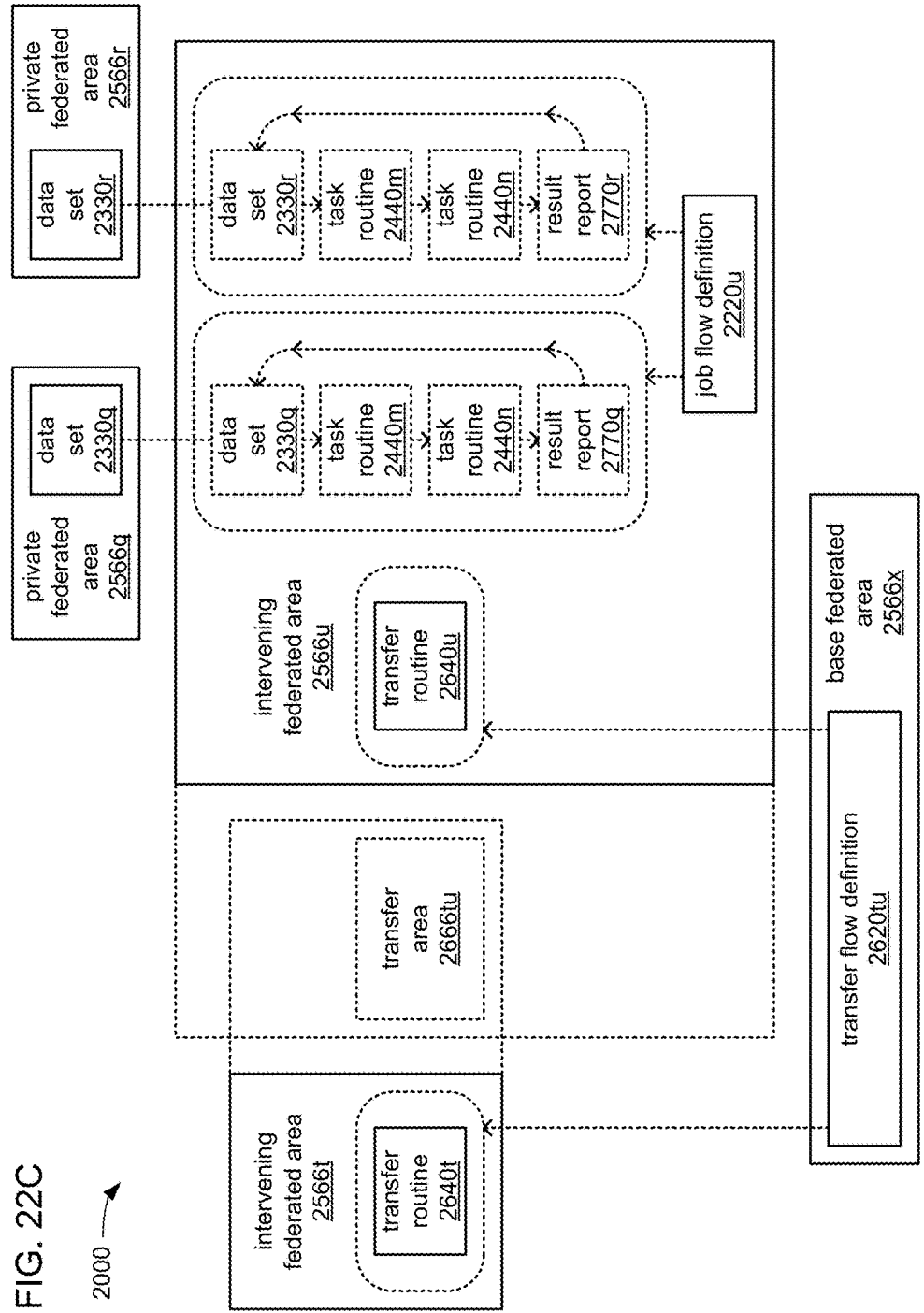

FIGS. 22A, 22B and 22C, together, illustrate in greater detail the manner in which an example automatic transfer relationship may be configured by an example transfer flow definition 2620*tu*. FIGS. 22A-C, together, also illustrate in greater detail the manner in which example transfers of example task routines 2440*m* and 2440*n* may be performed as per the example transfer flow definition 2620*tu*. For sake of ease of discussion and understanding, the same hierarchical tree introduced in FIGS. 21B and 21C is used in this example of FIGS. 22A-D. Also, this example automatic transfer relationship and associated conditions are deliberately simplified for purposes of illustration, and should not be taken as limiting what is described and claimed herein to such relatively simple embodiments.

In this depicted example, an automatic transfer relationship is defined in the transfer flow definition 2620*tu* between the intervening federated areas 2566*t* and 2566*u* in which copies of the task routines 2440*m* and/or 2440*n* are to be transferred from the intervening federated area 2566*t*, through the transfer area 2666*tu*, and into intervening federated area 2566*u*, when at least one specific condition is determined to have been met within the intervening federated area 2566*t*. As depicted, the transfer area 2666*tu* has been instantiated in a manner similar to what was earlier depicted and discussed in reference to FIG. 21B, in which the intervening federated areas 2566*t* and 2566*u* have been manipulated to create a storage space at which these intervening federated areas overlap. However, at least as was depicted and discussed in reference to FIG. 21C, the transfer area 2666*tu* may be instantiated within any of a variety of other forms of storage space, including within the storage space of the base federated area 2566*x* from which both of the intervening federated areas 2566*t* and 2566*u* may branch and/or have at least inheritance relationships with.

It may be that this example automatic transfer relationship between the intervening federated areas 2566*t* and 2566*u* was created to enable users with access to the intervening federated area 2566*t* to do the work of creating the task routines 2440*m* and 2440*n*, and to enable users with access to the intervening federated area 2566*u* to be automatically granted access to copies of the task routines 2440*m* and/or 2440*n* when one or more conditions are met. Once granted access to such copies of the task routines 2440*m* and/or 2440*n*, users with access to the intervening federated area 2566*u* would then be able to perform tests thereof and/or add the task routines 2440*m* and/or 2440*n* to a larger set of objects as part of performing any of a variety of other job flows 2200.

Turning more specifically to FIG. 22A, a user with access to the private federated area 2566*m* may generate the task routine 2440*m* from task source code, and/or may generate a data set 2330*m*. It may be that this particular user may be a developer of task routines and may generate the task routine 2440*m* by compiling the depicted task source code. The user with access to the private federated area 2566*m* may then transfer the task routine 2440*m* (or a copy thereof) to the intervening federated area 2566*t*. In some embodiments, this may be done to add the task routine 2440*m* to a larger development environment. By way of example, this user may thereby add the task routine 2440*m* to larger set of routines that are to be linked together in any of a variety of ways, such as a set of routines that form a piece of software, such as an application, a device driver, a software utility, an operating system, etc. Prior to such a transfer, the hierarchical tree structure by which the private federated area 2566m is related to the intervening federated area 2566t and the base federated area 2566x may allow the user with access to the private federated area 2566m to independently develop the task routine 2440m without risk of causing disruption to the collective work of the multiple users with access to the intervening federated area 2566t as by not allowing access by at least some of those multiple users to the task routine 2440m while it remains solely within the private federated area 2566m. Alternatively or additionally, this may also prevent at least a subset of the users with access to the intervening federated area 2566t from accessing the task source code from which the task routine 2440m is generated, which may be deemed to include trade secrets and/or other forms of information and/or intellectual property that is deemed undesirable to share more widely. When the task routine 2440m (or a copy thereof) is subsequently transferred into the intervening federated area 2566t, the act of doing so may cause the task routine 2440m to replace an earlier version of task routine (not shown) that may perform the same task as the task routine 2440m. Stated differently, the task routine 2440m may be deemed to be an improved version of a previous task routine that was relied upon to perform a task that the task routine 2440m is intended to now be used to perform.

Regardless of what exactly the task routine 2440m is, or what task it is meant to perform, or other circumstances surrounding its transfer into the intervening federated area 2566t, as depicted, the task routine 2440m may then be subjected to being used to perform its task through multiple performances of a job flow defined by a job flow definition 2220m. This may be part of an initial testing regime to confirm basic functionality of the task routine 2440m. With each performance of this job flow, an iteration of a result report 2770m may be an output that is generated by the execution of the task routine 2440m by the processor(s) 2550 of the one or more federated devices 2500. As a result of execution of the transfer routine 2640t, the processor(s) 2550 may also be caused to analyze each such iteration of the result report 2770m to determine whether or not a condition has been met that may trigger the transfer of a copy of the task routine 2440m to the intervening federated area 2566u via the transfer area 2666tu. In this example, the condition may include a requirement that at least a specified number of iterations of the job flow defined by the job flow definition 2220m have been performed such that iterations of the result report 2770m have been successfully generated at least the specified number of times. Alternatively or additionally, the condition may include a requirement that one or more data values in at least one iteration of the result report 2770m exhibit one or more specific characteristics. Any of a variety of other conditions may be alternatively or additionally specified that entail an analysis of iterations of the result report 2770m to determine whether a copy of the task routine 2440m is to be transferred to the intervening federated area 2566u.

Similarly, it may be that a user with access to the private federated area 2566n may similarly generate the task routine 2440n from other task source code, and/or may generate a data set 2330n. Like the user with access to the private federated area 2566m, the user with access to the private federated area 2566n may also be a developer of task routines and may generate the task routine 2440n by compiling the other depicted task source code, and may then transfer the task routine 2440n (or a copy thereof) to the intervening federated area 2566t. As with the task routine 2440m, this may be done to add the task routine 2440n to a larger development environment, and such a larger development may the same one to which the task routine 2440m is added. As with the task routine 2440m, addition of the task routine 2440n (or a copy thereof) into the intervening federated area 2566t may cause the task routine 2440n to replace an earlier version of task routine (not shown) that may perform the same task as the task routine 2440n.

In a manner similar to the task routine 2440m, the task routine 2440n may also be subjected to being used to perform its task through multiple performances of a job flow defined by a job flow definition 2220n. Again, this may be part of an initial testing regime to confirm basic functionality of the task routine 2440n. With each performance of this job flow, an iteration of a result report 2770n may be an output that is generated by the execution of the task routine 2440n by the processor(s) 2550 of the one or more federated devices 2500. As a result of execution of the transfer routine 2640t, the processor(s) 2550 may also be caused to also analyze each such iteration of the result report 2770n to determine whether or not a condition has been met that may trigger the transfer of a copy of the task routine 2440n to the intervening federated area 2566u via the transfer area 2666tu. As with the task routine 2440m, any of a variety of conditions may be specified that entail an analysis of iterations of the result report 2770n to determine whether a copy of the task routine 2440n is to be transferred to the intervening federated area 2566u.

FIG. 22B more specifically depicts such a transfer of copies of the task routines 2440m and/or 2440n from the intervening federated area 2566t to the transfer area 2666tu by the transfer routine 2640t, and then the transfer of those copies from the transfer area 2666tu to the intervening federated area 2566u by transfer routine 2640u. The processor(s) 2550 may be caused by execution of the transfer routine 2640u to repeatedly check the transfer area 2666tu to determine whether copies of the task routines 2440m and/or 2440n have been transferred thereto (e.g., stored therein) as a result of execution of the transfer routine 2640t. Upon determining that copies of the task routines 2440m and/or 2440n have been so transferred into the transfer area 2666tu, the processor(s) 2550 of the one or more federated devices 2500 may be caused by the transfer routine 2640u to transfer those copies therefrom and into the intervening federated area 2566u.

Turning more specifically to FIG. 22C, with the copies of the task routines 2440m and 2440n transferred into the intervening federated area 2566u, as depicted, these task routines 2440m and 2440n may both be utilized in performing tasks in repetitive performances of a job flow defined by a job flow definition 2220u. More specifically, both a user granted access to the private federated area 2566q and a user granted access to the private area 2566r may separately generate data sets 2330q and 2330r, respectively, that may each be employed as inputs into separate repeated performances of the job flow defined by the job flow definition 2220u, which may result in the generation of multiple iterations of result reports 2770q and 2770r, respectively. Such inclusion of the task routines 2440m and 2440n in such side-by-side repeated performances with differing data sets may be part of a testing regime performed by the users with access to each of the private federated areas 2566q and 2566r in which the task routines 2440m and 2440n are tested together to further confirm their functionality and/or worthiness for release to a wider number of users. It may be that, following success in such a testing regime, the task routines 2440*m* and/or 2440*n* may be transferred to the base federated area 2566*x* where they may become more generally accessible.

FIGS. 23A, 23B, 23C, 23D and 23E, together, illustrate in greater detail the manner in which another example automatic transfer relationship may be configured by another example transfer flow definition 2620*tuv*. FIGS. 23A-E, together, also illustrate in greater detail the manner in which example transfers of example data sets 2370*t* and 2370*u* may be performed as per the example transfer flow definition 2620*tuv*. For sake of ease of discussion and understanding, the same hierarchical tree introduced in FIGS. 21B and 21C is again used in this example of FIGS. 23A-E, though with the addition of a third intervening federated area 2566*v* and a second transfer area 2666*uv*. Again, this example automatic transfer relationship and associated conditions are deliberately simplified for purposes of illustration, and should not be taken as limiting what is described and claimed herein to such relatively simple embodiments.

In this depicted example, an automatic transfer relationship is defined in the transfer flow definition 2620*tuv* among the intervening federated areas 2566*t*, 2566*u* and 2566*v* in which a copy of the data set 2370*t* is to be transferred from the intervening federated area 2566*t* and into the intervening federated area 2566*u* through the transfer area 2666*tu* based on at least a first condition. Also, in this automatic transfer relationship, a copy of the data set 2370*u* is to be transferred from the intervening federated area 2566*u* and into either the intervening federated area 2566*t* through the transfer area 2666*tu*, or into the intervening federated area 2566*v* through a transfer area 2666*uv*, based on at least a second condition. As with the example automatic transfer relationship of FIGS. 22A-C, the transfer areas 2666*tu* and 2666*uv* have each been instantiated in a manner similar to what was earlier depicted and discussed in reference to FIG. 21B, in which the intervening federated areas 2566*t*, 2566*u* and 2566*v* have been manipulated to create storage spaces at which there is overlap. Again, however, each of the transfer areas 2666*tu* and/or 2666*uv* may be instantiated within any of a variety of other forms of storage space, including within the storage space of the base federated area 2566*x* from which each of the intervening federated areas 2566*t*, 2566*u* and 2566*v* may branch, and/or with which each may have at least an inheritance relationship.

It may be that this example automatic transfer relationship between the intervening federated areas 2566*t*, 2566*u* and 2566*v* was created to enable users with access to each of these federated areas to collaborate in the development of a neural network defined by weights and biases applied to a set of emulated neurons interconnected as nodes in a network. Users with access to the intervening federated area 2566*t* may do the work of creating at least an initial version of the neural network through a training process performed within the intervening federated area 2566*t*. Users with access to the intervening federated area 2566*u* may subsequently test one or more characteristics of at least the initial version of the neural network within the intervening federated area 2566*u*. Then, users with access to the intervening federated area 2566*v* may subsequently employ at least a refined version of the neural network in experimental use scenarios within the intervening federated area 2566*v* to determine readiness for wider release to other users within the base federated area 2566*x*. As will be explained in greater detail, the performances of each of these different phases in the development of the neural network may be controlled and enabled by the transfer of the data sets 2370*t* and 2370*u* among the intervening federated areas 2566*t*, 2566*u* and 2566*v*.

Figure 23A:
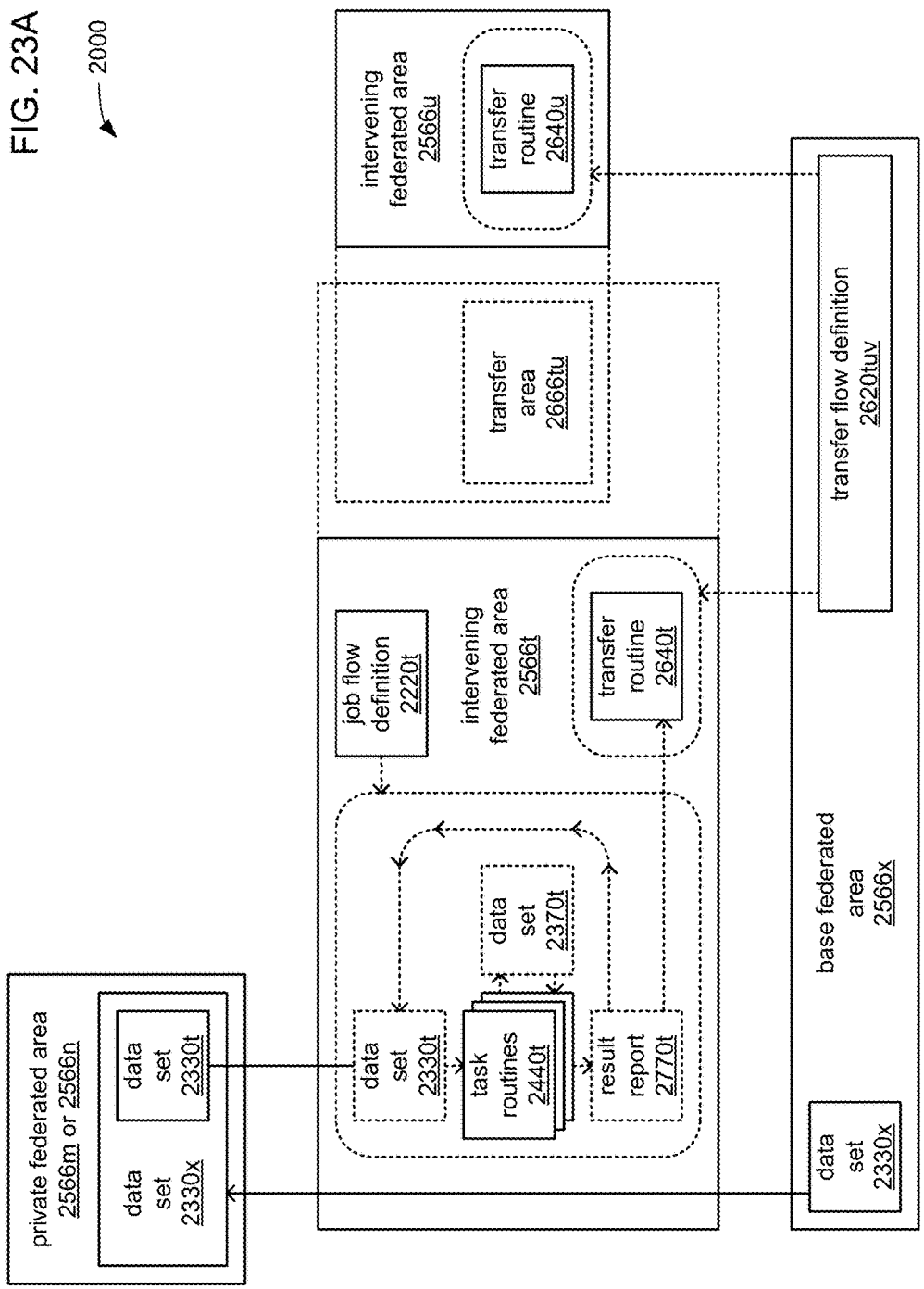
FIGS. 23A, 23B, 23C, 23D and 23E, together, illustrate examples of automated transfers of data sets defining a neural network.

Turning more specifically to FIG. 23A, a user with access to the private federated area 2566*m* or 2566*n* may generate a training data set 2330*t* from a larger data set 2330*x* that may be stored within the base federated area 2566*x*. The data set 2330*x* may include indications of a great many instances of inputs to a system that begat desired outputs in embodiments in which the neural network is being developed to exhibit the behavior of that system. In creating the training data set 2330*t* for such training purposes, this user may employ any of a variety of statistical processes to derive the data set 2330*t* to have characteristics that are at least partially representative of characteristics of the larger data set 2330*x* to make the data set 2330*t* appropriate for use in training a set of emulated neurons interconnected as nodes of a network to function cooperatively in a manner that defines a neural network that is effective at performing one or more selected functions. As will be familiar to those skilled in the art, this may entail random sampling of the larger data set 2330*x* to generate the training data set 2330*t*, and/or selectively emphasizing and/or de-emphasizing the degree to which the training data set 2330*t* exhibits one or more characteristics exhibited by the larger data set 2330*x*.

As will be familiar to those skilled in the art of developing neural networks, with the training data set 2330*t* so generated, the training data set 2330*t* (or at least differing portions thereof) may be employed through one or more training operations to derive at least an initial version of a neural network. As depicted, in this example, this may entail repeated performances of a job flow defined by the job flow definition 2220*t* during which each iteration of training may be performed. More specifically, one or more instances of task routine(s) 2440*t* may be repeatedly executed to repeatedly emulate individual and/or interconnected sets of neurons, and with at least portions of the training data set 2330*t* used in each iteration, to generate iterations of the result report 2770*t*. Each iteration of the result report 2770*t* generated by each such performance may provide indications of how successful the developing neural network is becoming at performing the one or more selected functions. Alternatively or additionally, each iteration of the result report 2770*t* may be employed alongside the training data set 2330*t* as an input to each subsequent performance as part of further developing the neural network. With each such performance, a definition of the developing neural network may be stored as a set of weights and biases indicated within the data set 2370*t* such that the data set 2370*t* is caused to define the neural network that is so created.

As a result of execution of the transfer routine 2640*t*, the processor(s) 2550 may also be caused to analyze each resulting iteration of the result report 2770*t* to determine whether or not a condition has been met that may trigger the transfer of a copy of the data set 2370*t* to the intervening federated area 2566*u* via the transfer area 2666*tu*. In this example, the condition may include a requirement that at least a specified degree of accuracy or other similar measure of performance of the developing neural network is achieved based on the analysis of each successive iteration of the result report 2770*t*.

Figure 23B:
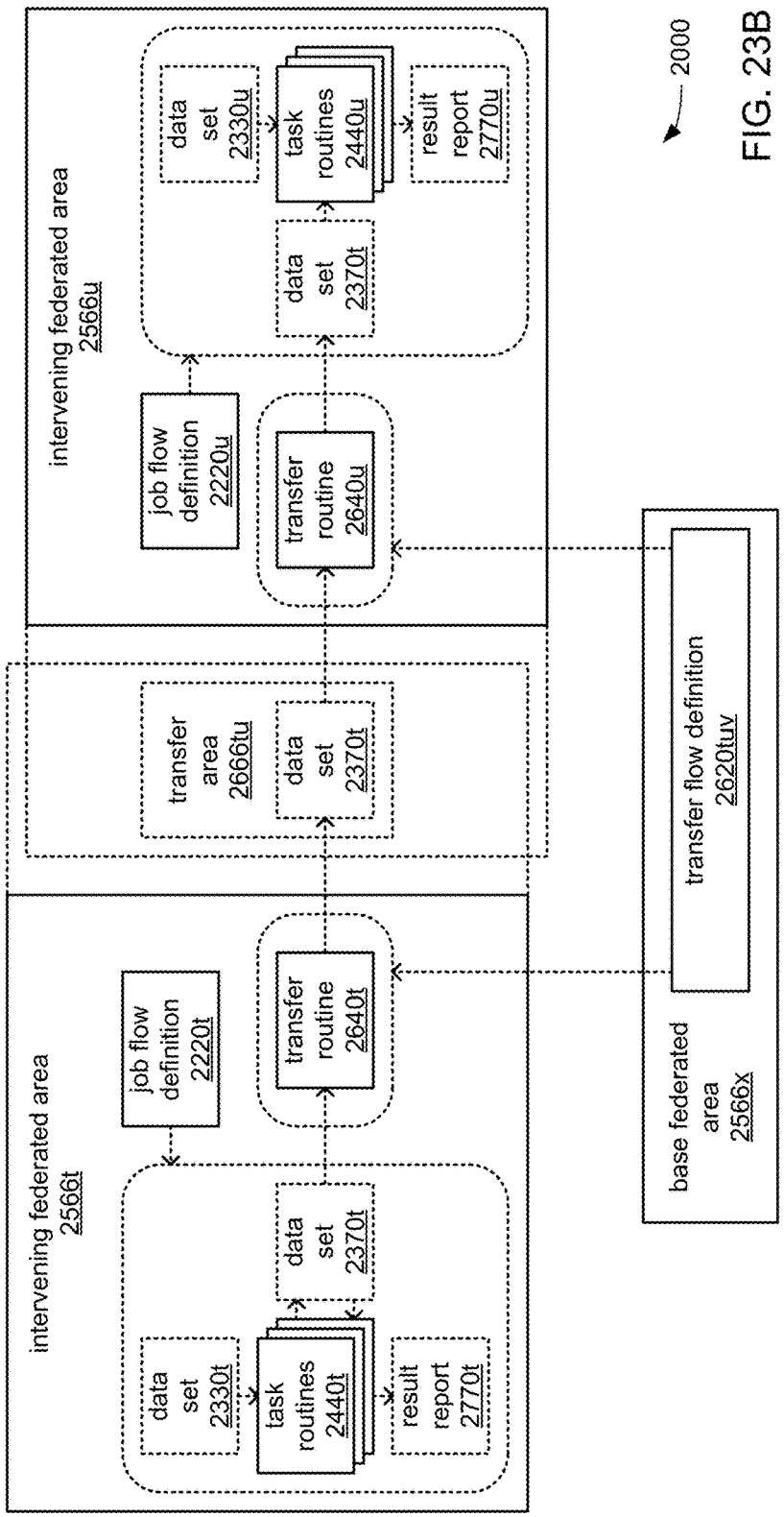

FIG. 23B more specifically depicts such a transfer of a copy of the data set 2370*t* from the intervening federated area 2566*t* to the transfer area 2666*tu* by the transfer routine 2640*t*, and then the transfer of that copy from the transfer area 2666*tu* to the intervening federated area 2566*u* by transfer routine 2640*u*. As with the example of FIGS.

22A-C, the processor(s) 2550 may be caused by execution of the transfer routine 2640*u* to repeatedly check the transfer area 2666*tu* to determine whether a copy of the data set 2370*t* has been transferred thereto (e.g., stored therein) as a result of execution of the transfer routine 2640*t*. Upon determining that such a copy has been so transferred into the transfer area 2666*tu*, the processor(s) 2550 of the one or more federated devices 2500 may be caused by the transfer routine 2640*u* to transfer that copy therefrom and into the intervening federated area 2566*u*.

Figure 23C:
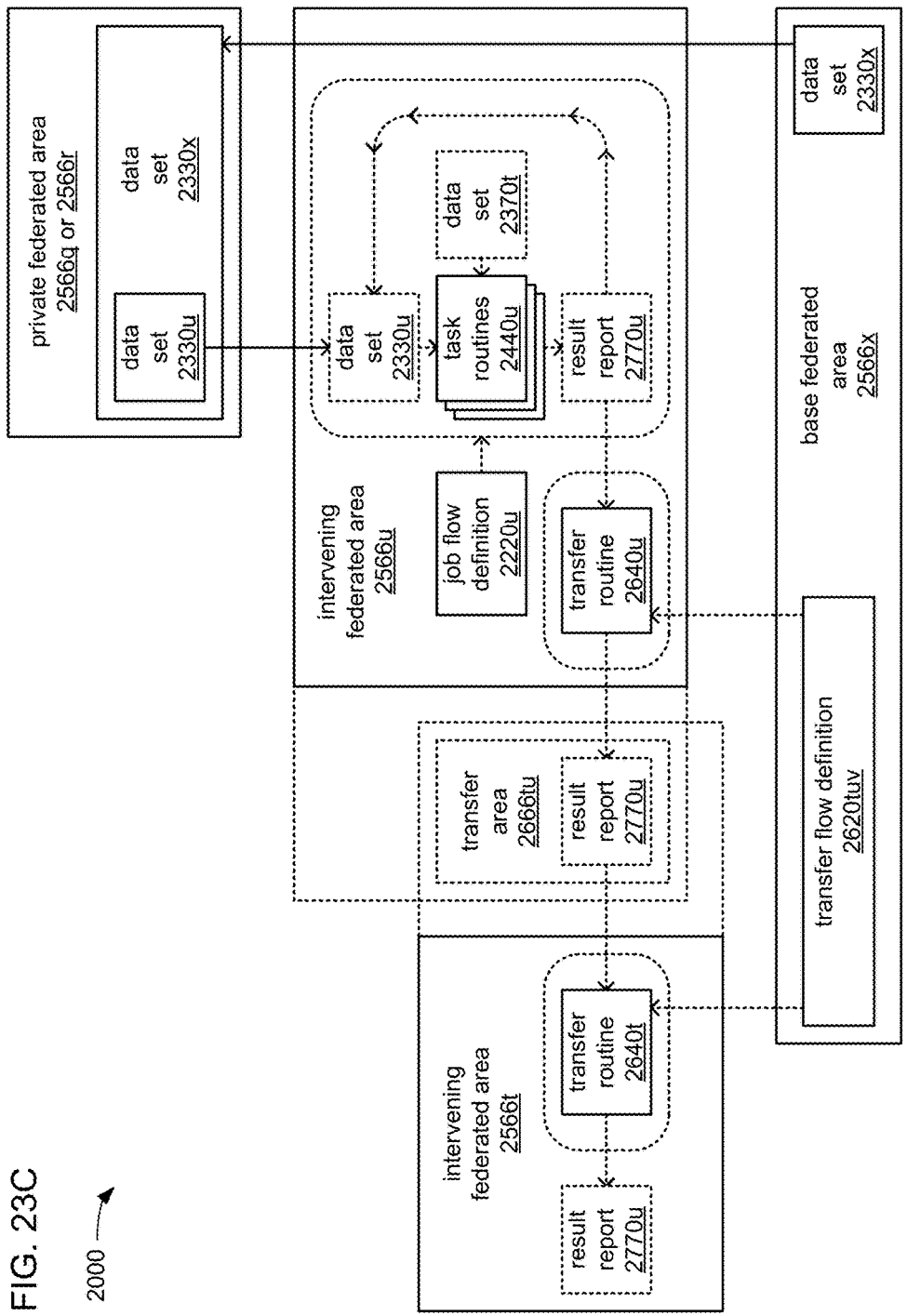

Turning more specifically to FIG. 23C in addition to FIG. 23B, as depicted, with the copy of the data set 2370*t* transferred into the intervening federated area 2566*u*, the data set 2370*t* may be utilized in one or more performances of a job flow defined by the job flow definition 2220*u* to test the neural network defined by the weights and biases for individual neurons and/or for point-to-point connections between neurons indicated within the data set 2370*t*. More specifically, a user granted access to the private federated area 2566*q* or 2566*r* may generate a testing data set 2330*u* from the larger data set 2330*x* for use in the repeated testing of the neural network, where at least a portion of the testing data set 2330*u* is used as an input to the execution of one or more task routines 2440*u* during each such performance. Again, in so creating the testing data set 2330*u*, this user may employ any of a variety of statistical processes to cause the testing data set 2330*u* to have characteristics that are at least partially representative of characteristics of the larger data set 2330*x*, and/or to selectively emphasize and/or de-emphasize one or more characteristics thereof. The weights and biases for neurons and/or point-to-point connections between neurons may enable the recreation of the neural network developed within the intervening federated area 2566*t* for each such performance within the intervening federated area 2566*u*. The task routines 2440*u* may employ the data set 2370*t* as an input, during their execution by the processor(s) 2550, to generate the emulations of individual and/or connected sets of neurons within the neural network. With each such performance, the results of the tests performed may be indicated in corresponding iterations of the result report 2770*u*.

In some embodiments, the processor(s) 2550 may be caused by further execution of the transfer routine 2640*u* to analyze each iteration of the result report 2770*u* to determine whether or not a condition has been met that may trigger the transfer of a copy of at least one iteration of the result report 2770*u* back to the intervening federated area 2566*t* via the transfer area 2666*tu*. In this example, the condition may include a requirement that at least one iteration of the result report 2770*u* provide an indication of the neural network defined by the data set 2370*t* failing to reach a specific target level of accuracy or other measure of performance based on the testing performed within the intervening federated area 2566*u*. FIG. 23C more specifically depicts such transfer of a copy of at least one iteration of the result report 2770*u* from the intervening federated area 2566*u* to the transfer area 2666*tu* by the transfer routine 2640*u*, and then the transfer of that copy from the transfer area 2666*tu* to the intervening federated area 2566*t* by transfer routine 2640*t*. In such embodiments, the processor(s) 2550 may be caused by further execution of the transfer routine 2640*t* to repeatedly check the transfer area 2666*tu* to determine whether a copy of at least one iteration of the result report 2770*u* has been transferred thereto (e.g., stored therein) as a result of execution of the transfer routine 2640*u*. Upon determining that such a copy has been so transferred into the transfer area 2666*tu*, the processor(s) 2550 of the one or more federated devices 2500 may be caused by the transfer routine 2640*t* to transfer that copy therefrom and into the intervening federated area 2566*t*. In this way, indications of one or more characteristics of the failure of the previously generated neural network is automatically communicated to the users granted access to the intervening federated area 2566*t* as an aid to generating an improved version of the neural network.

Figure 23D:
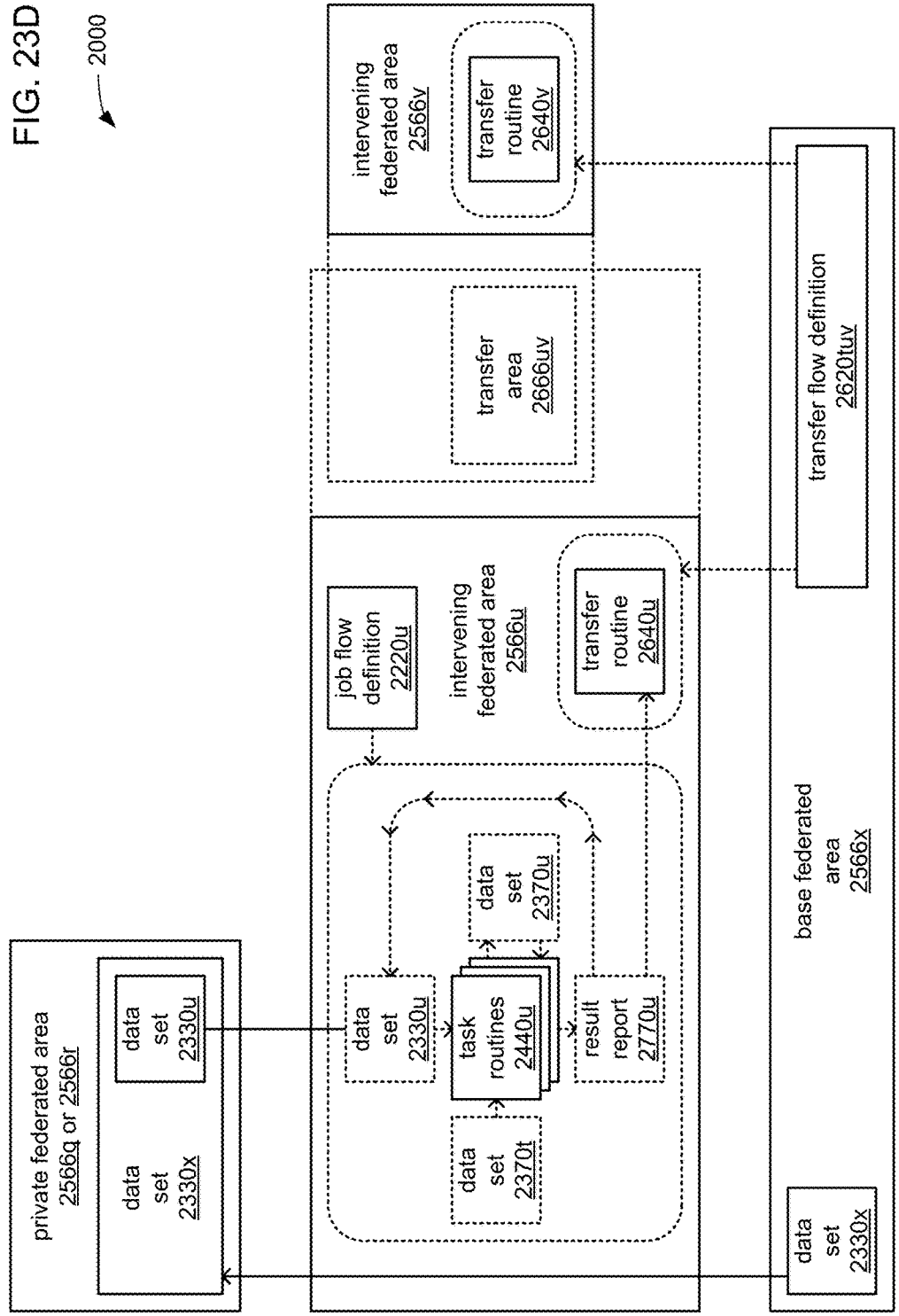

Turning to FIG. 23D, in some embodiments, the results of the testing performed with the testing data set 2330*u* may additionally be used to generate a refined version of the neural network that may be defined by values for weights and biases indicated within a data set 2370*u* that may be generated and/or augmented with each iteration of such testing. More specifically, indications of degree of failure indicated within iterations of the result report 2770*u* may be employed as corrective feedback input used to derive refinements to the weights and/or biases of the neural network. Thus, the data set 2370*t* may serve to provide a starting point for weights and biases defining the neural network generated within the intervening federated area 2566*t*, and a definition of a refined version of that neural network may be derived with the definition thereof stored as refined weights and biases stored within the data set 2370*u*. In such embodiments, the processor(s) 2550 may also be caused by further execution of the transfer routine 2640*u* to analyze each resulting iteration of the result report 2770*u* to determine whether or not a condition has been met that may trigger the transfer of a copy of the data set 2370*u* to the intervening federated area 2566*v* via the transfer area 2666*uv*. Similar to the automated transfer of a copy of the data set 2370*t*, the condition for such an automated transfer of a copy of the data set 2370*u* may include a requirement that at least a specified degree of accuracy or other similar measure of performance of the refined neural network is achieved based on the analysis of each successive iteration of the result report 2770*u*.

Figure 23E:
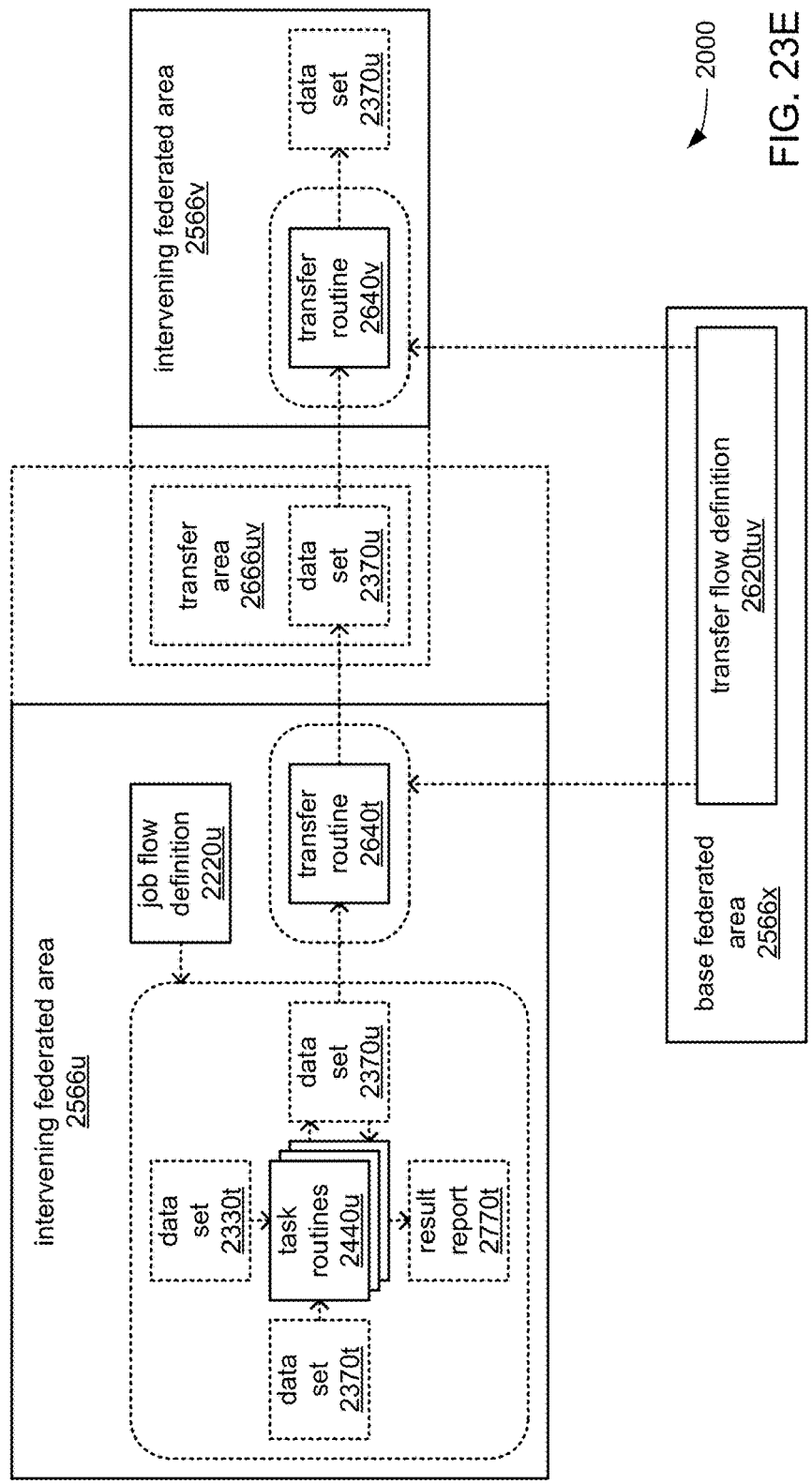

FIG. 23E more specifically depicts such a transfer of a copy of the data set 2370*u* from the intervening federated area 2566*u* to the transfer area 2666*uv* by the transfer routine 2640*u*, and then the transfer of that copy from the transfer area 2666*uv* to the intervening federated area 2566*v* by transfer routine 2640*v*. As with the transfer routine 2640*u* in the transfer of a copy of the data set 2370*t* out of the transfer area 2666*tu*, the processor(s) 2550 may be caused by execution of the transfer routine 2640*v* to repeatedly check the transfer area 2666*uv* to determine whether a copy of the data set 2370*u* has been transferred thereto (e.g., stored therein) as a result of execution of the transfer routine 2640*u*. Upon determining that such a copy has been so transferred into the transfer area 2666*uv*, the processor(s) 2550 of the one or more federated devices 2500 may be caused by the transfer routine 2640*v* to transfer that copy therefrom and into the intervening federated area 2566*v*.

With the copy of the data set 2370*u* transferred into the intervening federated area 2566*v*, the data set 2370*u* may be utilized in experimental use cases as part of further testing of the now refined neural network to determine readiness for release to a larger number of users. It may be that, following success in such an experimental use testing regime, the data set 2370*u* may be transferred to the base federated area 2566*x* where it may become more generally accessible.

It should be noted that, as an alternative to the generation of the data set 2370*u* including weights and biases for a refined version of the neural network, the testing performed within the intervening federated area 2566*u* may not, in alternate embodiments, be used to test the functionality of the neural network defined by the weights and biases included within the data set 2370*t* without generating such refinements. Instead, the transfer routine 2640*u* may analyze each iteration of the result report 2770*u* generated during each iteration of such testing to determine whether or not a condition has been met for the transfer of a copy of the data set 2370*t* to the intervening federated area 2566*v* for experimental use testing.

Figure 24A:
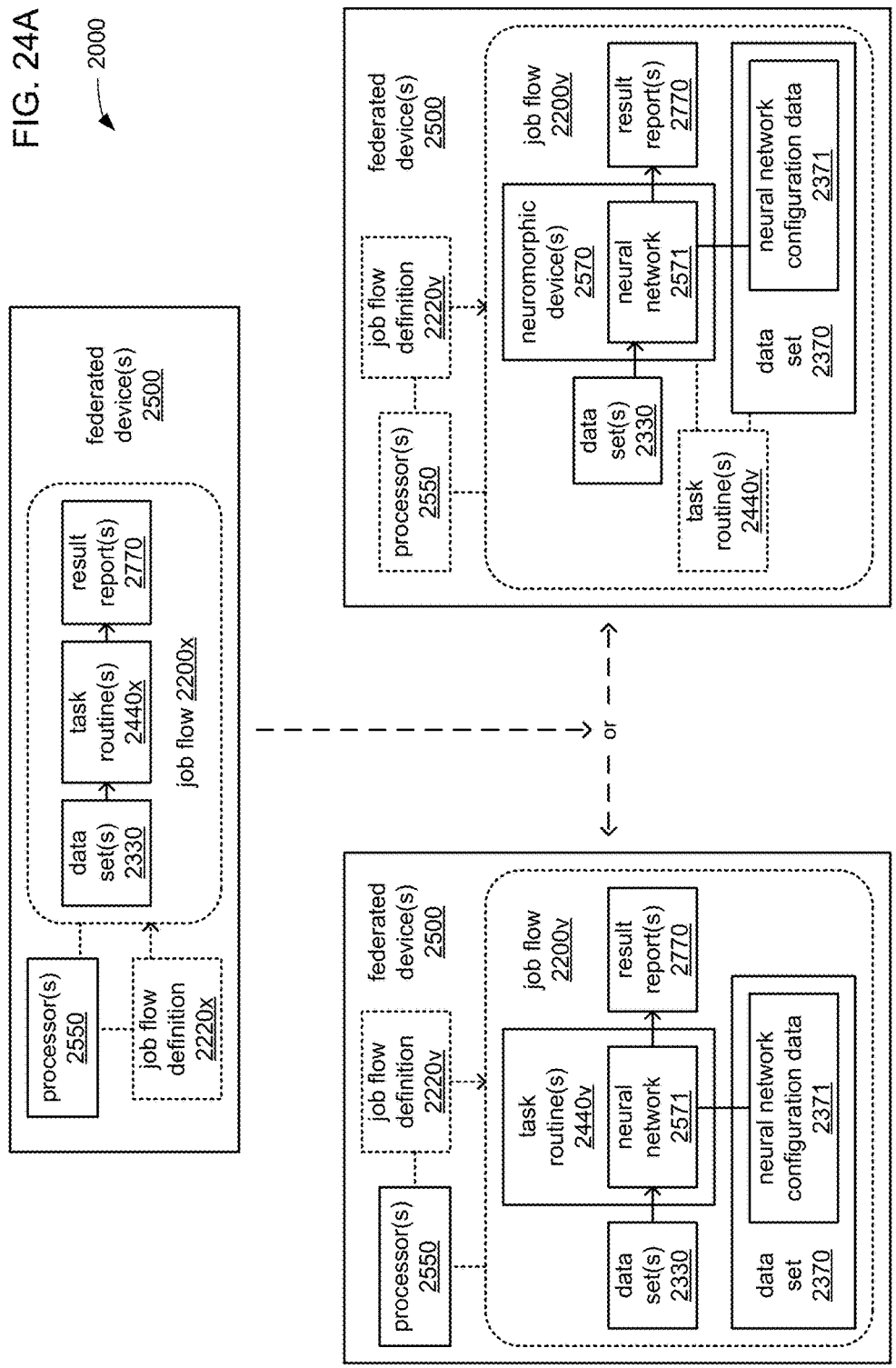

FIGS. 24A, 24B and 24C, together, illustrate aspects of the manner in which a non-neuromorphic implementation of an analytical function may be replaced by a neuromorphic implementation. More specifically, FIGS. 24A, 24B and 24C illustrate the manner in which an existing job flow that employs non-neuromorphic processing to perform an analytical function may be used to train a neural network employed as part of the neuromorphic processing of a new job flow to perform the same analytical function much more quickly. FIG. 24A provides an overall depiction of the manner in which such a change from non-neuromorphic to neuromorphic processing may be implemented, FIG. 24B depicts aspects of an example neural network that may be employed in making such a change, and FIG. 24C depicts aspects of an example artificial neuron of such a neural network. It should be noted that this example, as well as other examples presented throughout this present application, concerning aspects of replacing a non-neuromorphic implementation of an analytical function with a neuromorphic implementation have been deliberately simplified for purposes of illustration, and should not be taken as limiting what is described and claimed herein to such relatively simple embodiments.

FIG. 24A depicts a performance of a job flow 2200*x* by one or more federated devices 2500 to perform an analytical function that employs one or more data sets 2330 as data input and provides one or more result reports 2770 as data output. The job flow 2200*x*, as defined by a corresponding job flow definition 2220*x*, does not employ a neural network such that performances of the job flow 2200*x* do not entail neuromorphic processing. Instead, the job flow 2200*x* may employ just instruction-based processing in which the processor(s) 2550 of the one or more federated devices 2500 execute a stored set of executable instructions that specify, step-by-step, the manner in which the analytical function is to be performed. As will be familiar to those skilled in the art, and as has been described in great detail throughout this present application, such execution of instructions may involve just sequential instruction execution by a single core of a single processor, or may involve at least one or more instances of parallel instruction execution by multiple cores of one or more processors.

However, FIG. 24A also depicts a selection between one of two different implementations of another job flow 2200*v*, also performed by one or more of the federated devices 2500, to perform the same analytical function as the job flow 2200*x*. In contrast to the job flow 2200*x*, the job flow 2200*v* is defined by a corresponding job flow definition 2220*v* to employ a neural network 2571 such that performances of the job flow 2200*v* do entail neuromorphic processing. Thus, a performance of the job flow 2200*v* entails the instantiation of the neural network 2571 based on neural network configuration data 2371 that defines the neural network 2571, including its behavior. Among the two depicted implementations of the job flow 2200*v*, one implementation employs one or more task routines 2440*v* to implement the neural network 2571 in a software simulation thereof, and the other implementation employs one or more neuromorphic devices 2570 to implement the neural network 2571 using hardware components.

In either implementation of the job flow 2200*v*, and as has been previously discussed, the neural network configuration data 2371 may be incorporated into and/or otherwise stored in a federated area 2566 as a data set 2370. As such, the neural network configuration data 2371 may be accessed and retrieved from such storage for use in a performance of either implementation of the job flow 2200*v* in a manner very much like the one or more data sets 2330 that are employed as an input to the analytical function that the job flow 2200*v* performs. As previously discussed, such treatment of the neural network configuration data 2371 as a data set 2370 (or as part of a data set 2370) enables the preservation of the neural network configuration data 2371 within a federated area 2566 such that it is able to be reliably retrieved alongside the job flow definition 2220*v*, the task routine(s) 2440*v* and data set(s) 2330 to be used as input.

In some embodiments in which the neural network 2571 is implemented in a software simulation, such an implementation may entail the parallel execution of multiple copies of one or more of the task routines 2440*v* by one or more cores of each of one or more of the processors 2550 across one or more of the federated devices 2500. This may be the case especially where the neural network 2571 incorporates a large quantity of artificial neurons and/or multiple interconnected layers of artificial neurons, and where the one or more processors 2550 that are so employed are central processing units (CPUs) that each incorporate a relatively small quantity of processing cores (e.g., less than a hundred processing cores per CPU). Alternatively, in other embodiments in which the neural network 2571 is implemented in a software simulation, such an implementation may entail such parallel execution by a larger quantity of processing cores of just one or a relatively small quantity of the processors 2550 within a single federated device 2500, especially where each processor 2500 is a graphics processing unit (GPU) that each incorporate a relatively large quantity of processing cores (e.g., thousands of processing cores per GPU).

However, in still other embodiments in which the neural network 2571 is implemented using the one or more of the neuromorphic devices 2570, such an implementation may entail the configuration of multiple hardware-implemented artificial neurons within each of the one or more neuromorphic devices 2570 to cooperate to form and behave as the neural network 2571. While the use of a software simulation of the neural network 2571 may beget a neuromorphic implementation of the analytical function that is able to be performed much faster than a non-neuromorphic implementation (e.g., one or more orders of magnitude faster than a non-neuromorphic implementation), the use of hardware-based artificial neurons in implementing the neural network 2571 may beget a neuromorphic implementation that performs the analytical function even more quickly (e.g., multiple orders of magnitude faster than a non-neuromorphic implementation).

Referring to both FIGS. 24A and 24B, each of the one or more processors 2550, regardless of whether it is a CPU or a GPU, is an example of instruction-based processing resource, i.e., a processor that executes a series of instructions to perform a function that those instructions explicitly describe the steps for performing. As will be familiar to those skilled in the art, although such processors are able to execute instructions to provide a simulation of one or more artificial neurons, this approach scales poorly as the quantity of artificial neurons within a neural network increases. Separate parameters must be maintained for each artificial neuron that define what is usually unique behavior for each artificial neuron in terms of when and how to respond to signals received by each artificial neuron. Also, the usually high quantity and complexity of connections among the artificial neurons in a neural network usually means that the firing of one neuron sends signals out to multiple other neurons, and each of those neurons is usually also receiving signals sent to each of them by still other neurons. Stated more simply, as the quantity of artificial neurons within a neural network increases, the complexity of simulating their collective behavior as a neural network becomes exponentially more difficult. It is often not long before the processors employed to execute the instructions to provide the simulation of the artificial neurons in a neural network become saturated with context switching and repetitive accesses to storage to store and retrieve parameter values and indications of the current states of individual artificial neurons. Thus, although such instruction-based processing resources as CPUs and GPUs (as well as other varieties of processing devices that execute instructions) are able to be used in this manner, doing so can easily become at least impractical.

Each of the one or more neuromorphic devices 2570 is an example of a neuromorphic processing resource, i.e., a processing device that provides a hardware-based implementation of each artificial neuron, including hardware-based local storage of the parameters that define the behavior of the artificial neuron so implemented. In contrast to instruction-based processing resources, such as CPU and/or GPU forms of each of the one or more processors 2550, while instruction-based processing resources can be used to execute instructions to perform a function either with neuromorphic processing (i.e., using a software-based implementation of a neural network) or without neuromorphic processing (i.e., executing instructions that explicitly define steps of a function), neuromorphic processing resources such as the one or more neuromorphic devices 2570 are usually not capable of executing instructions.

FIG. 24B depicts aspects of example implementations of the neural network 2571. As again depicted, the neural network 2571 may be implemented either as a software simulation through the execution of one or more of the task routines 2440$v$ or using hardware-based artificial neurons 2577 of the one or more neuromorphic devices 2570. As additionally depicted in FIG. 24B, where one or more neuromorphic devices 2570 are used to implement the neural network 2571, at least one of the one or more neuromorphic devices 2570 may incorporate a storage interface 2579 by which the neural network configuration data 2371 may be provided. Where more than one of the neuromorphic devices 2570 are used, a single one of the neuromorphic devices 2570 may relay some or all of the neural network configuration data 2371 to the others, or each of the neuromorphic devices 2570 may be directly provided with at least a portion of the neural network configuration data 2371.

Regardless of whether the neural network 2571 is implemented with the one or more neuromorphic devices 2570 or a software-based simulation, as depicted, the neural network 2571 may be defined to be a multi-layer feedforward form of artificial neural network (ANN). In being defined as a multi-layer ANN, the neural network 2571 may be defined as having multiple inputs 2572$i$ and multiple outputs 2572$o$ between which numerous ones of the artificial neurons 2577 are organized into three or more layers that include an input layer 2573$i$, an output layer 2573$o$, and at least one hidden layer 2573$h$ between the input layer 2573$i$ and the output layer 2573$o$. In being defined as a feedforward ANN, the artificial neurons 2577 may be interconnected with a set of connections 2575 that are defined to convey information solely between adjacent layers 2573 in a direction extending generally from the input layer 2573$i$ and toward the output layer 2573$o$, without any connections between artificial neurons 2577 that are within the same layer 2573, and without any connections that convey information in the reverse direction extending generally from the outputs 2572$o$ and the output layer 2573$o$, and back toward the input layer 2573$i$ and the inputs 2572$i$. More simply, all connections among the artificial neurons 2577 are defined as conveying information in the "forward" direction from the inputs 2572$i$ and the input layer 2573$i$, and toward the output layer 2573$o$ and the outputs 2572$o$, without any "crosstalk" flow of information within any of the layers 2573, and without any "feedback" flow of information. Such a configuration of layers 2573 of artificial neurons 2577 and of connections 2575 between the layers 2573 is based on observations of the manner in which real neurons appear to interact within the brains of human beings and various animals, and have been used with some degree of success in mimicking the function of parts of the human brain, including the human visual system (HVS) where ANNs have been used to implement visual recognition systems. However, despite this specific depiction of the neural network 2571 as a multi-layer feedforward form of ANN, other embodiments are possible in which the neural network 2571 may be defined as having a different structure in which the artificial neurons 2577 may be organized differently and/or in which the connections 2575 may be defined to extend among the artificial neurons 2577 in a different configuration.

The neural network configuration data 2371 may include various hyperparameters that define various structural features of the neural network 2571. By way of example, hyperparameters in the neural network configuration data 2371 may define the neural network 2571 as a multi-layer feedforward form of ANN, may specify the total quantity of artificial neurons 2577 included therein, may specify the quantity of layers 2573, may specify which artificial neurons 2577 are connected, and/or the direction in which information is conveyed through those connections 2575.

FIG. 24C depicts aspects of an example internal architecture for the artificial neurons 2577. Again, the neural network 2571 may be implemented either as a software simulation through the execution of one or more of the task routines 2440$v$ or using hardware-based artificial neurons 2577 of the one or more neuromorphic devices 2570. Therefore, accordingly, each of the artificial neurons 2577 may be implemented as a software-based simulation or using hardware components.

As depicted, each of the artificial neurons 2577 may incorporate multiple memristors 2578 (or software-based equivalent simulations thereof) with each memristor 2578 receiving an input from outside the artificial neuron 2577. Where the depicted artificial neuron 2577 is incorporated into the output layer 2573$o$ or into a hidden layer 2573$h$, each of these inputs may be received from another artificial neuron 2577 of another layer 2573. However, where the depicted artificial neuron 2577 is incorporated into the input layer 2573$i$, each of these inputs may be one of the external inputs 2572$i$ to the neural network 2571. It should be noted that, where the depicted artificial neuron 2577 is incorporated into the input layer 2573$i$, the depicted artificial neuron 2577 may alternatively receive just one of the external inputs 2572$i$ to the neural network 2571. The neural network configuration data 2371 may define weights and/or biases for each memristor 2578 to control such factors as what type and/or magnitude of input each memristor 2578 responds to and/or the sensitivity of each memristor 2578 to the input it receives. Alternatively or additionally, the neural network configuration data 2371 may define input patterns that may serve to trigger the depicted artificial neuron 2577, and/or the manner in which a cumulative quantity, magnitude and/or frequency of input received by each memristor 2578 may serve to trigger the depicted artificial neuron 2577. Regardless of what weights, biases, patterns and/or other input response parameters may be defined for each memristor 2578 within the neural network configuration data 2371, each memristor 2578 may function at least partially as a memory storage device into which such parameters may be directly stored. Where each memristor 2578 is implemented as a software-based simulation, such local storage of such parameters may also be simulated.

As will be familiar to those skilled in the art, the internal architecture of artificial neurons is a subject of ongoing research and development, and so other internal architectures of artificial neurons are possible. Thus, as additionally depicted in FIG. 24C, the depicted artificial neuron 2577 may employ any of a variety of forms of internal logic to combine, sum or otherwise aggregate the inputs received from other artificial neurons 2577 or as external input(s) 2572$i$ to the neural network 2571. As depicted in this example internal architecture, the depicted artificial neuron 2577 may incorporate a relatively simple summation node to perform such a combining or other aggregation.

As also additionally depicted in FIG. 24C, the depicted artificial neuron 2577 may incorporate still one or more additional memristors 2578 (or software-based equivalent simulations thereof), with each such additional memristor 2578 providing an output from within the artificial neuron 2577 upon triggering of the artificial neuron. Where the depicted artificial neuron 2577 is incorporated into the input layer 2573$i$ or into a hidden layer 2573$h$, each of these outputs may be to another artificial neuron 2577 of another layer 2573. However, where the depicted artificial neuron 2577 is incorporated into the output layer 2573$o$, each of these outputs may be one of the external outputs 2572$o$ from the neural network 2571. It should be noted that, where the depicted artificial neuron 2577 is incorporated into the output layer 2573$i$, the depicted artificial neuron 2577 may alternatively provide just one of the external outputs 2572$o$ of the neural network 2571. The neural network configuration data 2371 may define such factors as what type, magnitude, frequency and/or duration of output each such additional memristor 2578 may provide when the depicted artificial neuron 2577 is triggered. Again, each such additional memristor 2578 may function at least partially as a memory storage device into which such parameters may be directly stored.

It should again be noted that the depiction of an internal architecture for the artificial neurons 2577 is but one example of such an architecture, and that other internal architectures are possible in other embodiments. Additionally, the various variations of this depicted architecture that have been discussed herein are but a few examples of such variations, and other internal architectures are possible in other embodiments. By way of example, other internal architectures are possible that incorporate more or fewer memristors; incorporate alternative components to memristors; incorporate any of a variety of aggregating, combining and/or summation components; and/or incorporate any of a variety of differing quantities of inputs and outputs.

Figure 25A:
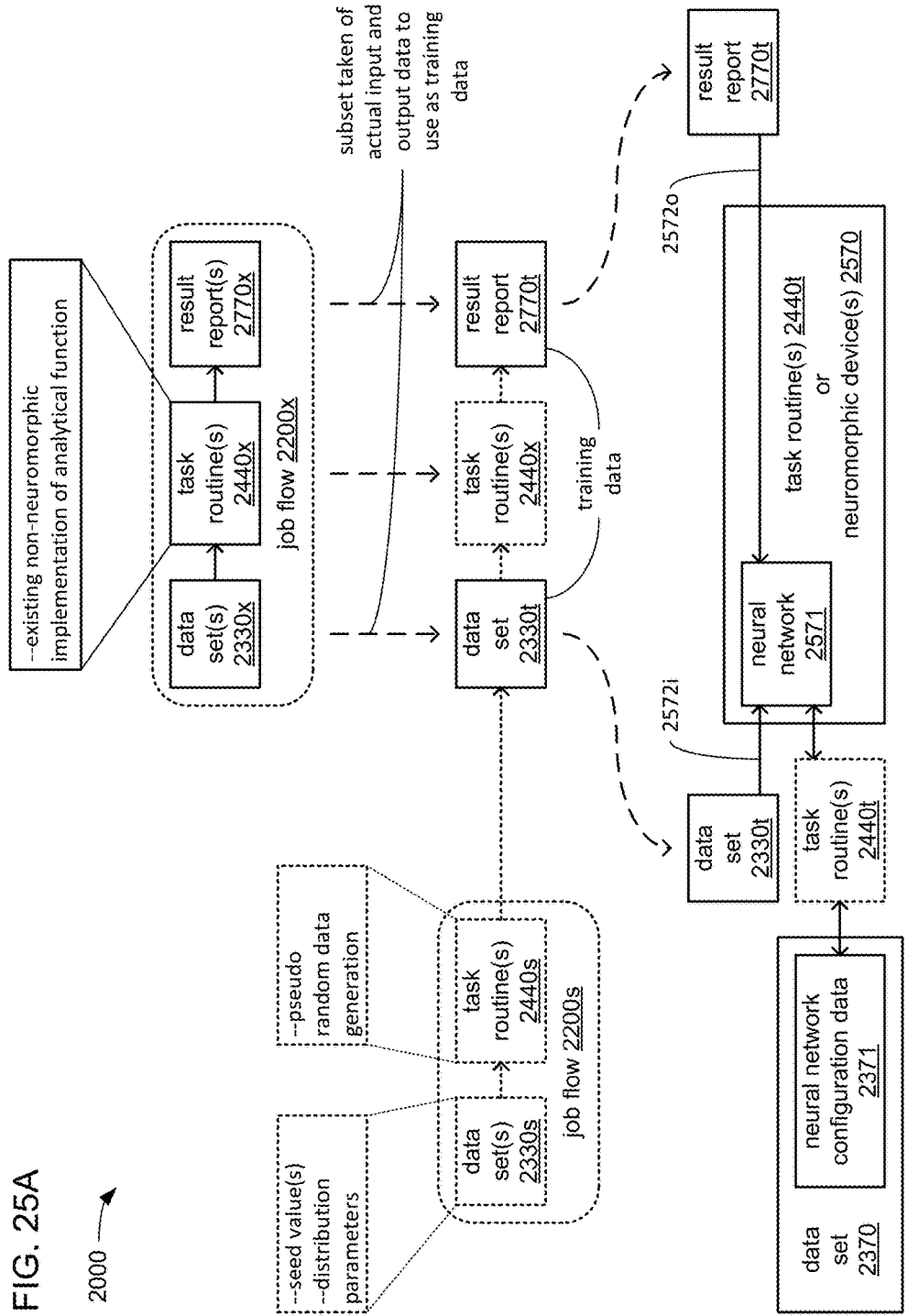
FIGS. 25A, 25B and 25C, together, illustrate an example of training a neural network to perform an analytical function as part of a transition to neuromorphic processing.
Figure 25B:
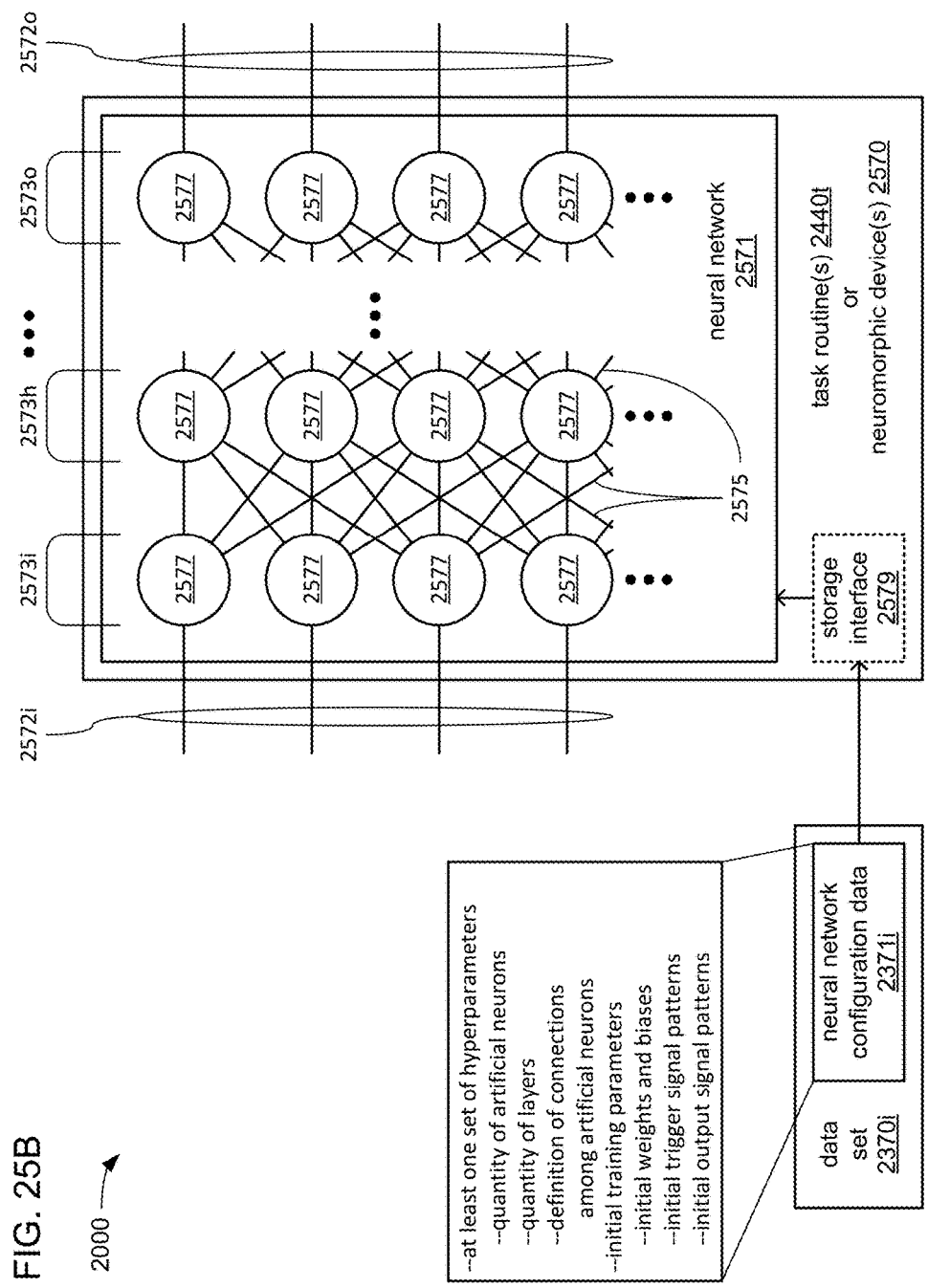
Figure 25C:
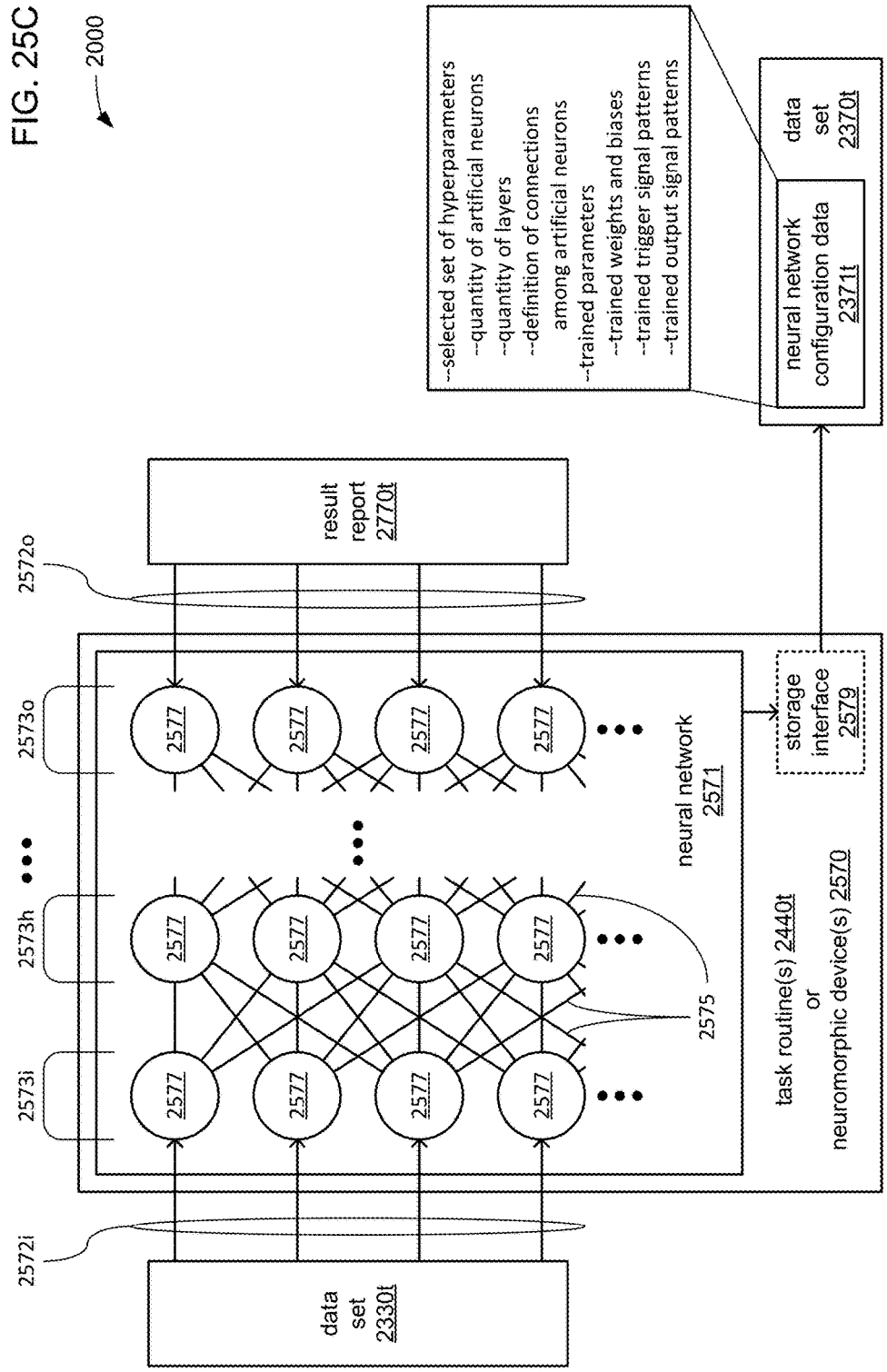

FIGS. 25A, 25B and 25C, together, illustrate aspects of training a neural network to perform an analytical function as part of transitioning the implementation of the analytical function from a non-neuromorphic processing implementation to a neuromorphic processing implementation. More specifically, FIGS. 25A, 25B and 25C illustrate the manner in which data sets associated with performances of an existing non-neuromorphic implementation of the analytical function may be used to provide training data to train such a neural network. FIG. 25A provides an overall depiction of the manner in which training data may be provided, FIG. 25B depicts aspects of preparing the neural network for training, and FIG. 25C depicts aspects of the performance of such training. For sake of simplicity of reference and understanding, the same example job flows and components thereof that were introduced in FIGS. 24A-C are used again in this example of training a neural network to perform an analytical function.

FIG. 25A depicts the provision of training data for use in training the neural network 2571 implemented either by one or more of the neuromorphic devices 2570 or by one or more of the task routines 2440$t$ to perform the analytical function already being performed in a non-neuromorphic manner in performances of the job flow 2200$x$. More specifically, the neural network 2571 is trained using training data made up of matched sets of inputs (e.g., the depicted data set(s) 2330$t$) and outputs (e.g., the depicted corresponding result report(s) 2770$t$) of the analytical function to enable the neural network 2571 to learn the analytical function through inference in a manner often referred to as "supervised learning." Stated differently, the neural network 2571 is presented with many example sets of input data and corresponding example sets output data generated by an existing implementation of the analytical function that is known to function correctly (e.g., the job flow 2200$x$) to enable the neural network 2571 to learn to perform the analytical function from those example sets.

Such training of a neural network from such training data is often referred to as creating the "decision space" that defines what response the neural network is to provide to each possible input. However, as those skilled in the art will readily recognize, a neural network that is trained in such a manner usually performs the function it was trained to perform with some degree of inaccuracy. At least in theory, a neural network could be trained to perform a function perfectly if it is trained with training data that includes every possible combination of inputs and outputs, thereby completely filling the decision space. However, the quantity of every possible combination of inputs and outputs may simply be so large that it is simply not be possible or practical to perform such comprehensive training. Thus, the use of a neural network to perform a particular function usually requires an acceptance that training cannot include every possible combination of inputs and outputs such that not every point within the decision space is filled, and thus, there will be some degree of inaccuracy in the performance of the particular function, at least where an input is encountered for which no corresponding output was provided in the training data.

Since training to a degree that begets a perfectly performing neuromorphic implementation of a function may not be possible or practical, efforts are often made to minimize the degree of inaccuracy. One approach to minimizing inaccuracy may be to use training data that includes a large enough quantity of matched sets of inputs and outputs that are sufficiently varied as achieve coverage of the decision space that is thorough and dense enough to at least minimize occurrences of relatively large regions within the decision space that are not covered by any matched set of inputs and outputs in the training data. As depicted in FIG. 25A, obtaining such large and thorough training data may be done by performing a job flow 2200s in which one or more task routines 2440s may employ one or more data sets 2330s that specify one or more parameters for the random generation of sets of input values, thereby generating the data set 2330t that forms part of the training data. The job flow 2200x may then be performed such that the task routine(s) 2440x that provide a non-neuromorphic implementation of the analytical function are used to generate a corresponding set of output values for each set of input values of the data set 2330t, thereby generating a corresponding result report 2770t that also forms part of the training data.

However, it should be noted that, depending on the nature of the function being performed, there may be one or more sets or ranges of sets of input values that may be theoretically possible, but which are not expected to ever actually be encountered while actually using the analytical function. Thus, there may be one or more regions in the decision space that need not be covered by the training data as doing so may be deemed to be pointless. One approach to minimizing inaccuracy while also avoiding generating training data that covers situations that are expected to never be encountered may be to generate the training data from a subset of the sets of input values actually encountered during actual use of the non-neuromorphic implementation of the analytical function, as well as the sets of output values that are generated by that non-neuromorphic implementation from those sets of input values. More specifically, as depicted in FIG. 25A, a subset of the sets of input values of one or more of the data sets 2330x and the corresponding subset of the sets of output values of the corresponding one or more result reports 2770x may be used to form the data set 2330t and corresponding result report 2770t, respectively, of training data.

Regardless of the exact manner in which the data set 2330t and the result report 2770t are generated to form training data for the training of the neural network 2571, training of the neural network 2571 may entail the performance of another job flow in which the neural network 2571 is instantiated and placed into a training mode, followed by the use of corresponding sets of input and output values of the data set 2330t and of the result report 2770t, respectively, to train the neural network 2571. FIG. 25B depicts aspects of such preparations for training the neural network 2571. Specifically, the neural network 2571 may be instantiated with an initial form of neural network configuration data 2371i that may include at least one set of hyperparameters that define structural aspects of the neural network 2571, as well as various initial parameter values that at least place the neural network 2571 in a known initial state in preparation for training. Such a known initial state may include initial parameters for storage and use by each memristor 2578 within each artificial neuron 2577 that is to be included in the neural network 2571.

FIG. 25C depicts aspects of the training of the neural network 2571 following such preparations. More specifically, the data set 2330t is presented, one set of input values at a time, to the inputs 2572i while corresponding ones of the sets of output values of the result report 2770t are presented, one set of output values at a time, to the outputs 2572o. As previously discussed, the neural network 2571 may be defined as a multi-layer feedforward ANN in which information flows generally in a single direction therethrough from the inputs 2572i and the input layer 2573i toward the output layer 2573o and the outputs 2572o during use of the neural network 2571. However, during training of the neural network 2571, as depicted, the outputs 2572o serve as additional inputs and information associated with the result report 2770t also flows in the reverse direction from the outputs 2572o and the output layer 2573o toward the input layer 2573i in a part of the neural network training often referred to as "backpropagation."

Following such training of the neural network 2571, a trained form of the neural network configuration data 2371t may be retrieved from the neural network 2571 and stored in a federated area 2566 as (or as part of) the data set 2370t. The neural network configuration data 2371t defines the neural network 2571 as trained. In addition to a set of hyperparameters that define structural aspects of the neural network 2571 as trained, the neural network configuration data 2371t may include various trained parameters such as weighting and/or bias values, and/or indications of type, magnitude, duration and/or frequency of signals that trigger each artificial neuron 2577 of the neural network 2571, as trained. Such storage of the neural network configuration data 2371t within a federated area 2566 may serve to ensure its available for subsequent use in performing the analytical function using neuromorphic processing.

Figure 26A:
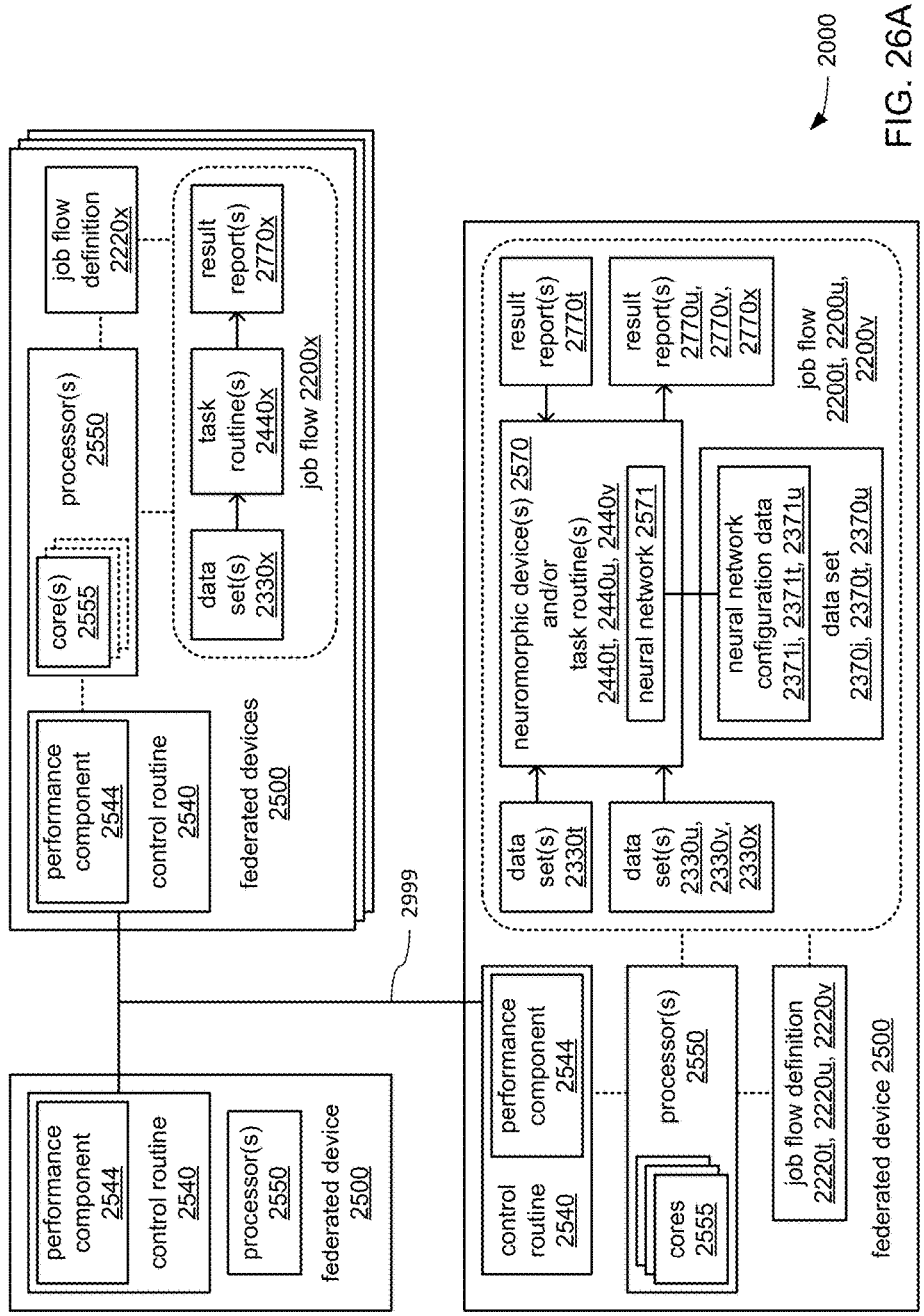
FIGS. 26A and 26B each illustrate an example of transitioning from use of a non-neuromorphic implementation of an analytical function to a neuromorphic implementation.
Figure 26B:
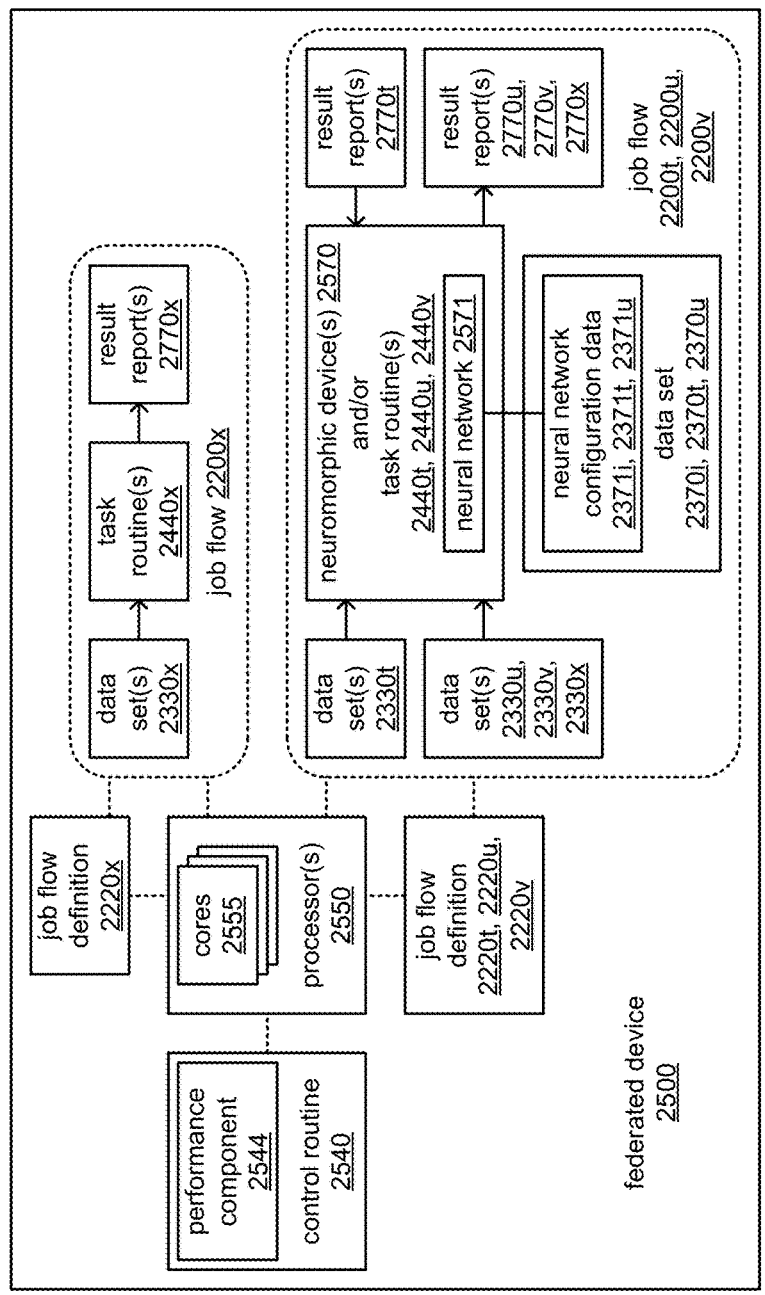

FIGS. 26A and 26B, together, illustrate aspects of performing a staged transition from the use of non-neuromorphic processing to neuromorphic processing in performing an analytical function. More specifically, FIGS. 26A and 26B illustrate the manner in which different stages of testing may be used to effect the replacement of a non-neuromorphic implementation of an analytical function with a neuromorphic implementation based on degrees of inaccuracy in the performance by the neuromorphic implementation. FIG. 26A provides an overall depiction of such a staged transition in an example where performances are carried out by one or more federated devices 2500 in a grid 2005 of federated devices, and FIG. 26B provides an overall depiction of such a staged transition in an example where performances are carried out entirely within a single federated device 2500. For sake of simplicity of reference and understanding, some of the same example job flows and components thereof that were introduced in FIGS. 24A-C, and that were used in FIGS. 25A-C, are used again in these examples.

As depicted in FIG. 26A, one or more federated devices 2500 of a grid 2005 of federated devices may be employed in performing the non-neuromorphic implementation of the analytical function provided by the job flow 2200x. Such performances may entail the execution of the task routine(s) 2440x of the job flow 2200x by various differing quantities and/or configurations of one or more processing cores 2555 of one or more processors 2550 across on or more federated devices 2500. By way of example, multiple instances of one or more task routine(s) 2440x may be executed by thousands of processing course 2555 of a single GPU form of processor 2500 within a single federated device 2500. As will be familiar to those skilled in the art, a subset of common processing operations may be quite amenable to being performed in a highly parallelized manner across the thousands of relatively simple processing cores 2555 that are currently commonly available in GPUs offered by a wide variety of vendors. By way of another example, multiple instances of one or more task routine(s) 2440x may be executed by one or more of the processing course 2555 within each of multiple ones of a CPU form of processor 2500 available within multiple federated devices 2500. As will be familiar to those skilled in the art, many processing operations are amenable to being performed at least partially in parallel across multiple relatively complex processing cores 2555 that are currently commonly available in CPUs offered by a wide variety of vendors.

As will also be familiar to those skilled in the art, an increasing variety of more recently available GPUs are being provided with processing cores that are increasingly optimized for use in supporting the provision of software-based simulations of neural networks. Indeed, such recent improvements to GPU processing cores now routinely enable a software-based simulation of a neural network using a GPU to perform a particular function multiple orders of magnitude faster than is achievable using multiple CPUs to support an implementation of the same particular function in which no neural network is used. However, despite such improvements in GPUs, neuromorphic devices that incorporate hardware components to provide hardware-based implementations of artificial neurons have become more commonplace and have proven capable of supporting neural networks that are able to achieve still greater performance. Thus, as depicted in FIG. 26A, it is entirely possible that a single federated device 2500 (of the same grid 2005 of federated devices) that incorporates one or more GPU forms of processor 2550 and/or one or more neuromorphic devices 2570 to provide a neuromorphic implementation of a particular function that achieves significantly greater performance than multiple other federated devices 2500 employing multiple CPU and/or GPU forms of processor 2500 per federated device 2500 that provide either a neuromorphic or non-neuromorphic implementation of that same particular function.

However, despite such opportunities for performance improvements leading to higher throughput in the performance of a particular function, as previously discussed, a tradeoff of incurring some degree of inaccuracy in the performance of that particular function accompanies such performance gains. As also previously discussed, various measures may be taken to reduce the degree of inaccuracy. To minimize such inaccuracies while effecting a transition from a non-neuromorphic implementation of a particular function to a neuromorphic implementation, the transition may be automated in a manner that includes multiple steps that each require a proven degree of accuracy for the transition to be allowed to progress. Thus, as depicted, and as will be explained in still greater detail, the depicted single federated device 2500 with which the neuromorphic implementation of the analytical function is to be implemented may be configured to perform each of multiple different job flows at different stages of the transition. Also, through at least a majority of these stages, there may be at least partially parallel performances of the non-neuromorphic and neuromorphic implementations of the analytical function, with just the neuromorphic implementation being performed at a final stage.

More specifically, and as depicted, the job flow 2200t in which training of the neural network 2571 may be performed (as described in reference to FIGS. 25A-C) within the depicted single federated device 2500 at least partially in parallel with the ongoing performance of the non-neuromorphic implementation by the other multiple depicted federated devices 2500. An advantage of such at least partially parallel performance may be that, as more of such non-neuromorphic performances occur, more data sets 2330x and corresponding result reports 2770x are created, thereby providing more matched sets of input values and corresponding output values that may be used to create more training data (i.e., more data sets 2330t and corresponding result reports 2770t used to train the neural network 2571). Such training may continue in at least partially in parallel with the non-neuromorphic performances of the analytical function until one or more conditions have been reached for such training to cease. In various embodiments, such conditions may include one or more of a predetermined quantity of matched sets of input values and output values having been used in training, and/or the results of a recurring regression analysis on the matched sets of input values and output values so used in training having brought about a predetermined degree of density and/or thoroughness of coverage of the decision space.

Regardless of the exact conditions that serve as a trigger for the conclusion of performances of the job flow 2200t to train the neural network 2571, such conditions may also serve as the trigger for the commencement of a first stage of testing of the neural network 2571 in which the neural network 2571 may be operated to perform the analytical function at least partially in parallel with the continuing performances of the non-neuromorphic implementation of the analytical function provided by the job flow 2500x. More specifically, with each performance of the job flow 2200x by the depicted multiple federated devices 2500 with sets of input values of the data set 2330x, a corresponding performance of the job flow 2200u may be performed with at least a subset of the data set 2330x (i.e., the data set 2330u). As part of each such performance of the job flow 2200u, the output values generated from the subset of input sets that are performed using both job flows 2200x and 2200u may be compared to test the accuracy of the neural network 2571.

If such testing reveals that the neural network 2571 is achieving a degree of accuracy that is less than a predetermined minimum threshold of accuracy for testing to continue, then further performances of the job flow 2200u to test the neural network 2571 may cease, and performances of the job flow 2200t to retrain the neural network 2571 may occur. Further, such retraining may be performed using a different selection of hyperparameters than were used in the previous performances of the job flow 2200t to train the neural network 2571. As those skilled in the art will readily recognize, different structural configurations of a neural network that include differing quantities of artificial neurons and/or different quantities of layers may perform a particular function with differing degrees of accuracy. Thus, a change in the hyperparameters during a retraining of the neural network 2571 may beget improved accuracy.

However, if the testing of the performances of the job flow 2200u reveals that the neural network 2571 is achieving a degree of accuracy that is greater than the predetermined minimal threshold for testing to continue, but is less than a predetermined higher threshold of accuracy for usage to begin, then further performances of the job flow 2200u may occur in which further training of the neural network 2571 that maintains its current hyperparameters, and that serves to refine the neural network 2571, rather than to restart the training from the beginning with different hyperparameters. Once such further training has been completed, further performances of the job flow 2200u may occur in which the earlier testing of the neural network 2571 is resumed to again assess the degree of accuracy.

If the testing or resumed testing of the performances of the job flow 2200u reveals that the neural network 2571 is achieving a degree of accuracy that is greater than the predetermined higher threshold of accuracy for usage to begin, then conditions of the at least partially parallel performances of non-neuromorphic and neuromorphic implementations of the analytical function may change such that the neuromorphic implementation begins to replace the non-neuromorphic implementation, and the non-neuromorphic implementation is relegated to being used to spot check the output of the neuromorphic implementation. More specifically, and presuming that the neuromorphic implementation is able to achieve higher throughput than the non-neuromorphic implementation, a job flow 2200v may begin to be performed with all sets of input values of the data sets 2330x to generate all corresponding sets of output values of the results reports 2770x. And, at least partially in parallel with the performances of the job flow 2200v, the job flow 2200x based on the presumably slower performing non-neuromorphic implementation may be performed with a subset of the sets of input values of the data sets 2330x, and the outputs of these performances of the job flow 2200x may be compared to corresponding outputs of the job flow 2200v as part of a final stage of testing of the neural network 2571.

If such further testing reveals that the degree of accuracy of the neural network 2571 continues to be greater than the higher threshold of accuracy for a predetermined amount of such further testing, then the further performances of the job flow 2200x as part of such further testing may cease. In some embodiments, such a cessation of performances of the job flow 2200x may be caused to occur in a gradual manner in which the performances of the job flow 2200x become less frequent as the degree of accuracy continues to be greater than the higher threshold such that the allocation of processing resources of the grid 2005 of federated devices 2500 is gradually reduced over that time. In some of such embodiments, such a gradual transition may be implemented by prioritizing the assignment of processing resources between the non-neuromorphic and neuromorphic implementations.

By way of example, initially, the non-neuromorphic implementation may be provisioned with whatever processing resources to a degree intended to ensure that there are sufficient processing resources to perform the non-neuromorphic implementation in a manner that meets or exceeds a predetermined throughput level or other measurement of performance Whatever remains in the way of processing resources, if sufficient to fully implement the neural network of the neuromorphic implementation, may then be allocated to the neuromorphic implementation. However, as the transition is made to using the neuromorphic implementation (e.g., as a result of the degree accuracy exceeding the higher threshold of accuracy), the neuromorphic implementation may then be given priority in the allocation of processing resources over the non-neuromorphic implementation. It should be noted that, where neuromorphic processing resources (e.g., the one or more neuromorphic devices 2570) are available alongside instruction-based processing resources (e.g., the one or more processors 2550), the neuromorphic implementation may prove to have an advantage in being allocated processing resources. This may arise from the fact that a neural network can be implemented using either instruction-based or neuromorphic processing resources, while the execution of a series of instructions to perform a function in a non-neuromorphic manner (i.e., in a manner not using a neural network), must be performed using instruction-based processing resources.

FIG. 26B depicts aspects of a similar multiple-stage transition, but conducted entirely within a single federated device 2500. More specifically, in some embodiments, it may be that the one or more processors 2500 (whether of CPU or GPU form) are employed in performances of the non-neuromorphic implementation that is transitioned from while the one or more neuromorphic devices 2570 are employed in performances of the neuromorphic implementation that is transitioned to. Alternatively, in other embodiments it may be that the neuromorphic implementation is performed employing numerous processing cores 2555 of a GPU form of at least one processor 2550. It should be noted that, beyond such differences between FIGS. 26A and 26B in the quantities of federated devices 2500 and/or the components thereof that are involved in these performances, what is otherwise depicted in FIGS. 26A and 26B is substantially similar.

FIGS. 27A, 27B, 27C, 27D, 27E, 27F, 27G and 27H, together, illustrate in greater detail another example of automated exchanges of objects associated with the training and testing of a neural network among different federated areas as various stages of the training and testing are begun and/or are completed. For sake of ease of discussion and understanding, the same hierarchical tree introduced in FIGS. 23A-E is used again in FIGS. 27A-H. Similar to what was depicted in FIGS. 23A-E, an automatic transfer relationship may be defined in the transfer flow definition 2620*tuv* among the intervening federated areas 2566*t*, 2566*u* and 2566*v* in which copies of various objects may be transferred depending on various conditions. Again, this example automatic transfer relationship and associated conditions are deliberately simplified for purposes of illustration, and should not be taken as limiting what is described and claimed herein to such relatively simple embodiments.

It may be that this example of an automatic transfer relationship among the intervening federated areas 2566*t*, 2566*u* and 2566*v* was created as part of implementing aspects of the provision of training data described in reference to FIG. 25, as well as aspects of the staged transition from the use of a non-neuromorphic implementation of an analytical function to a neuromorphic implementation described in reference to FIGS. 26A-B. Through this example automatic transfer relationship, users having access to different ones of these intervening federated areas may be able to collaborate as such a staged development of a neural network automatically proceeds. More specifically, users with access to the intervening federated area 2566*t* may oversee the training and/or retraining of the neural network 2571 performed at least partly within the intervening federated area 2566*t*. Also, users with access to the intervening federated area 2566*u* may subsequently oversee the testing of the neural network 2571 performed at least partly within the intervening federated area 2566*u*. Further, users with access to the intervening federated area 2566*v* may subsequently oversee the usage of the neural network 2571 performed at least partly within the intervening federated area 2566*v*.

Turning to FIG. 27A, a user with access to the private federated area 2566*m* or 2566*n* may generate the data set 2330*t* and the corresponding result report 2770*t* from the data set 2330*x* and the result report 2770*x*, respectively, that may be stored within the base federated area 2566*x* as a result of earlier performances of the non-neuromorphic implementation of the analytical function of the job flow 2200*x*. As discussed in reference to FIG. 25A, the data set 2330*t* and the corresponding result report 2770*t* may, together, form training data that includes multiple matched sets of input values and output values by which the neural network 2571 may be trained to perform the analytical function. Again, any of a variety of approaches may be used in selecting which sets of input values and corresponding output values from the data set 2330*x* and the result report 2770*x*, respectively, are to be included in the training data, including random sampling in which there may be some degree of emphasizing and/or de-emphasizing various characteristics.

Figure 27B:
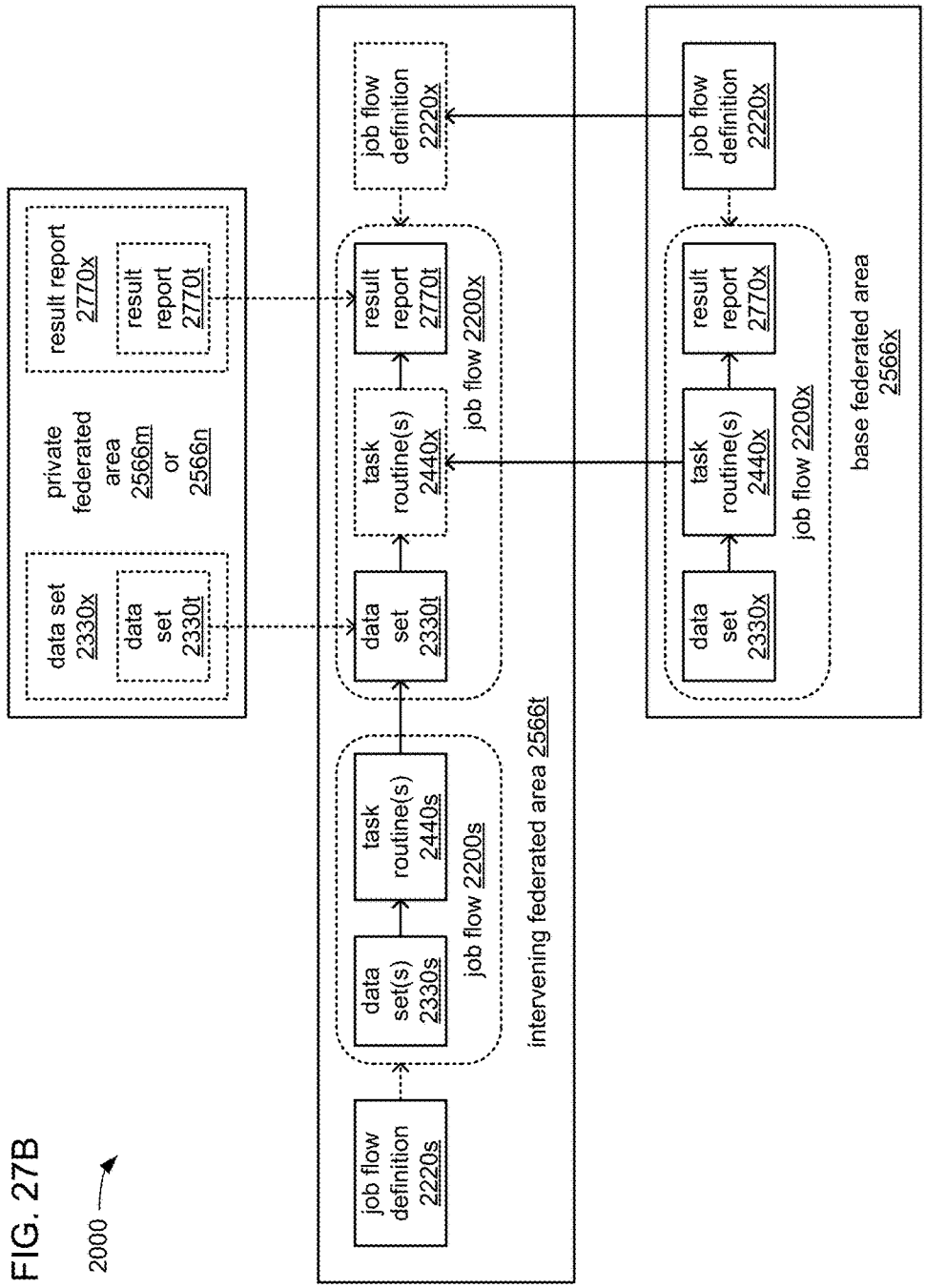

Alternatively, and turning to FIG. 27B, either in lieu of, or in addition to, such use of the data set 2330*x* and the corresponding result report 2770*x*, at least a subset of the sets of input values within the data set 2330t may be randomly generated through performance(s) of the job flow 2200s introduced in FIG. 15A. Again, following such random generation of sets of input data, the job flow 2200x may then be performed at least partly within the intervening federated area 2566t to use the non-neuromorphic implementation of the analytical function thereof to generate corresponding sets of output values of the result report 2770t.

Figure 27C:
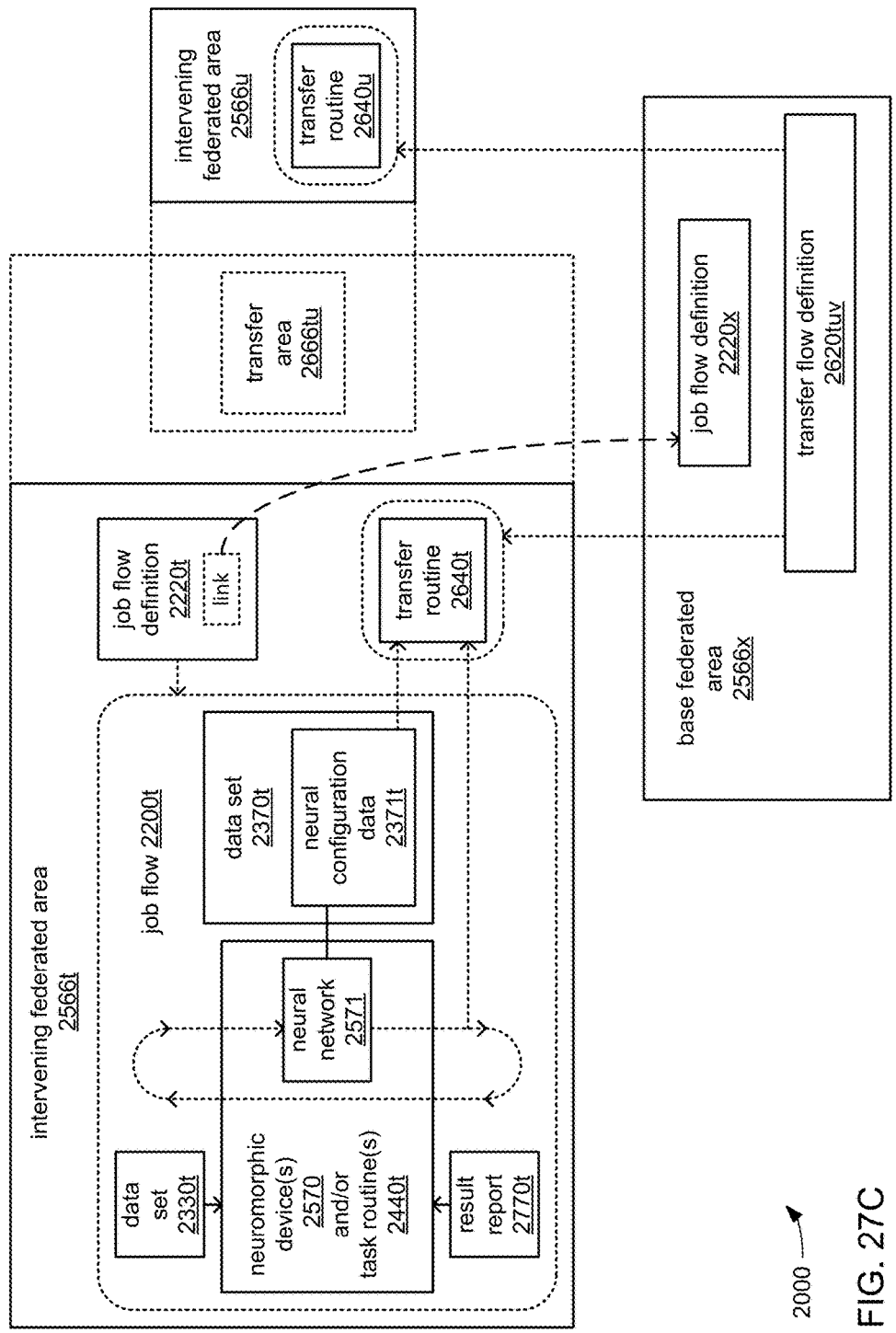

Turning to FIG. 27C, with the data set 2330t and corresponding result report 2770t generated (regardless of the exact manner in which they are generated) and stored within the intervening federated area 2566t, the job flow 2200t may be performed to train the neural network 2571 as described in reference to FIGS. 25A-C, using the data set 2330t and corresponding result report 2770t as the training data.

As the job flow 2200t is performed to effect such training, execution of the transfer routine 2640t at least partially in parallel with the task routines 2440(t) of the job flow 2200t may cause a processor 2550 to perform a recurring analysis of one or more aspects of the training of the neural network 2571 to determine whether a condition has been met to cease the training and to begin the testing of the neural network 2571. Again, such a condition may include a determination that a predetermined threshold quantity of matched sets of input values and output values has been used in training the neural network 2571, or that the matched sets of input values and output values are sufficiently varied as to ensure that the resulting decision space of the neural network 2571 is sufficiently defined.

As also depicted in FIG. 27C, and as previously discussed in reference to FIGS. 17A-F, the job flow definition 2220t may include the job flow identifier or other form of reference to the job flow 2200x and/or the job flow definition 2220x that serves as an indication of the neural network 2571 having been derived, to at least some degree, from the job flow 2200x and/or performance(s) thereof. Again, this may serve as an aid to ensuring accountability for various aspects of the development of the neural network 2571 at a later time when the neural network 2571 might be evaluated.

Figure 27D:
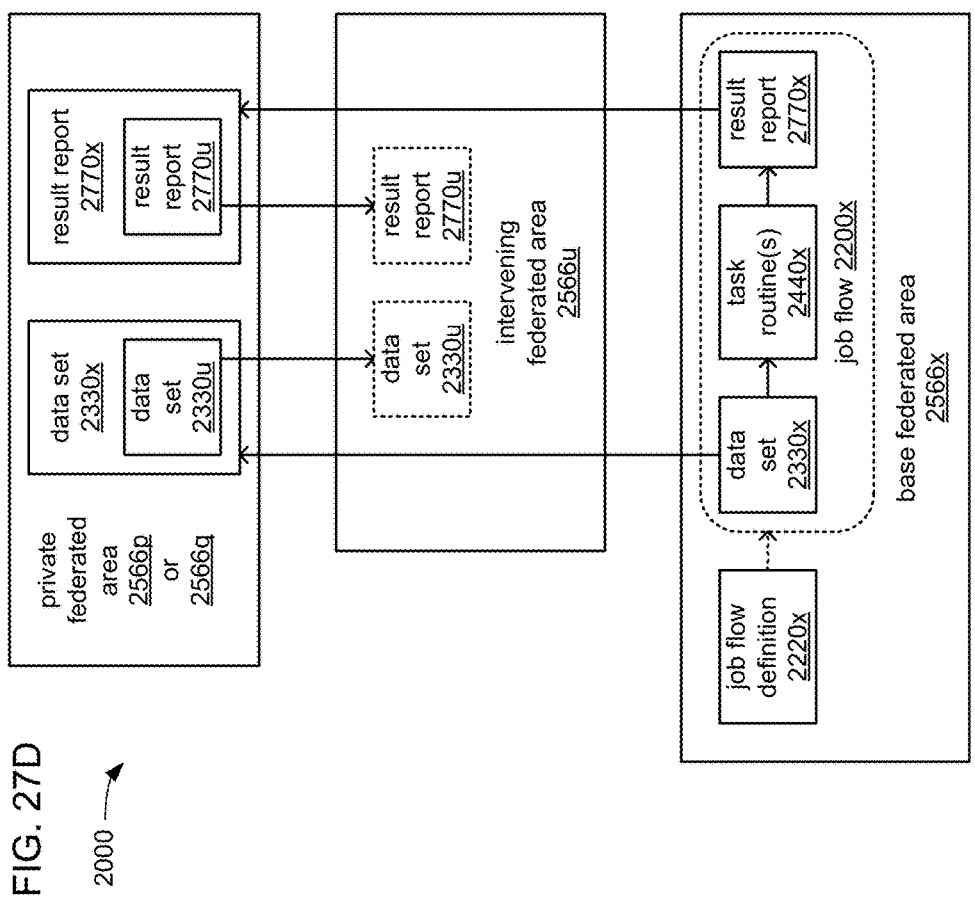

Turning to FIG. 27D, in preparation for the testing of neural network 2571, a user with access to the private federated area 2566p or 2566q may generate the data set 2330u and the corresponding result report 2770u for use in performing such testing from the data set 2330x and the result report 2770x, respectively, generated during earlier performances of the job flow 2200x. Alternatively, as also discussed in reference to FIGS. 26A-B, the data set 2330u and the result report 2770u may be generated from the data set 2330x and the result report 2770x, respectively, as matched sets of input values and output values in the data set 2330x and the result report 2770x, respectively, are being generated in performances of the job flow 2200x that may be caused to occur at least partially in parallel with performances of the job flow 2200u to test the neural network 2571.

Figure 27E:
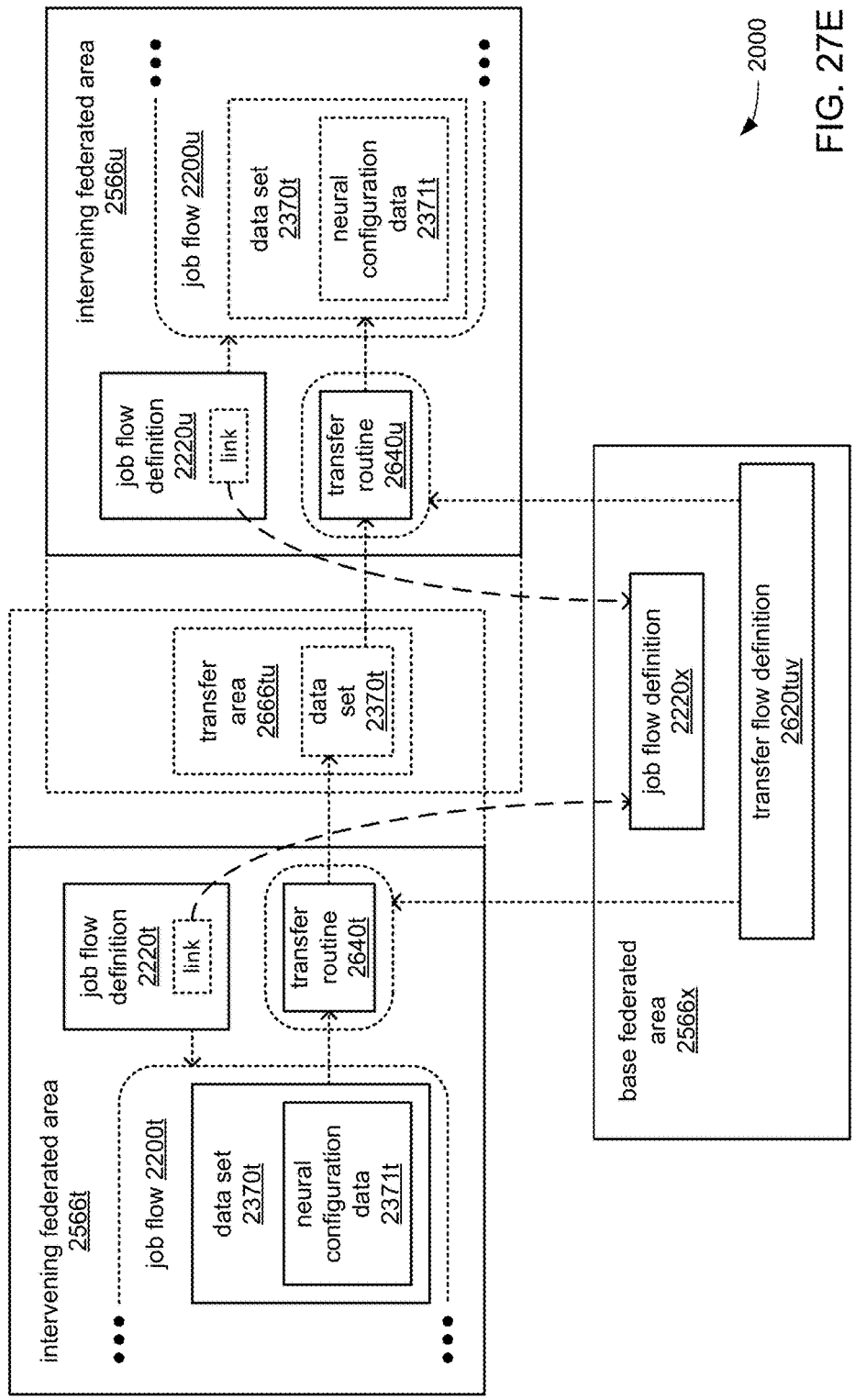

Turning to FIG. 27E, in response to a determination made, as a result of execution of the transfer routine 2640t, that a condition has been met for the cessation of training and the commencement of testing, a transfer of the neural network configuration data 2371t may be performed between the intervening federated areas 2566t and 2566u through the transfer area 2666tu. As previously described in reference to FIGS. 25B-C, the configuration data 2371t may include hyperparameters and trained parameters that provide a definition of the neural network 2571 as trained as a result of performance(s) of the job flow 2200t.

Figure 27F:
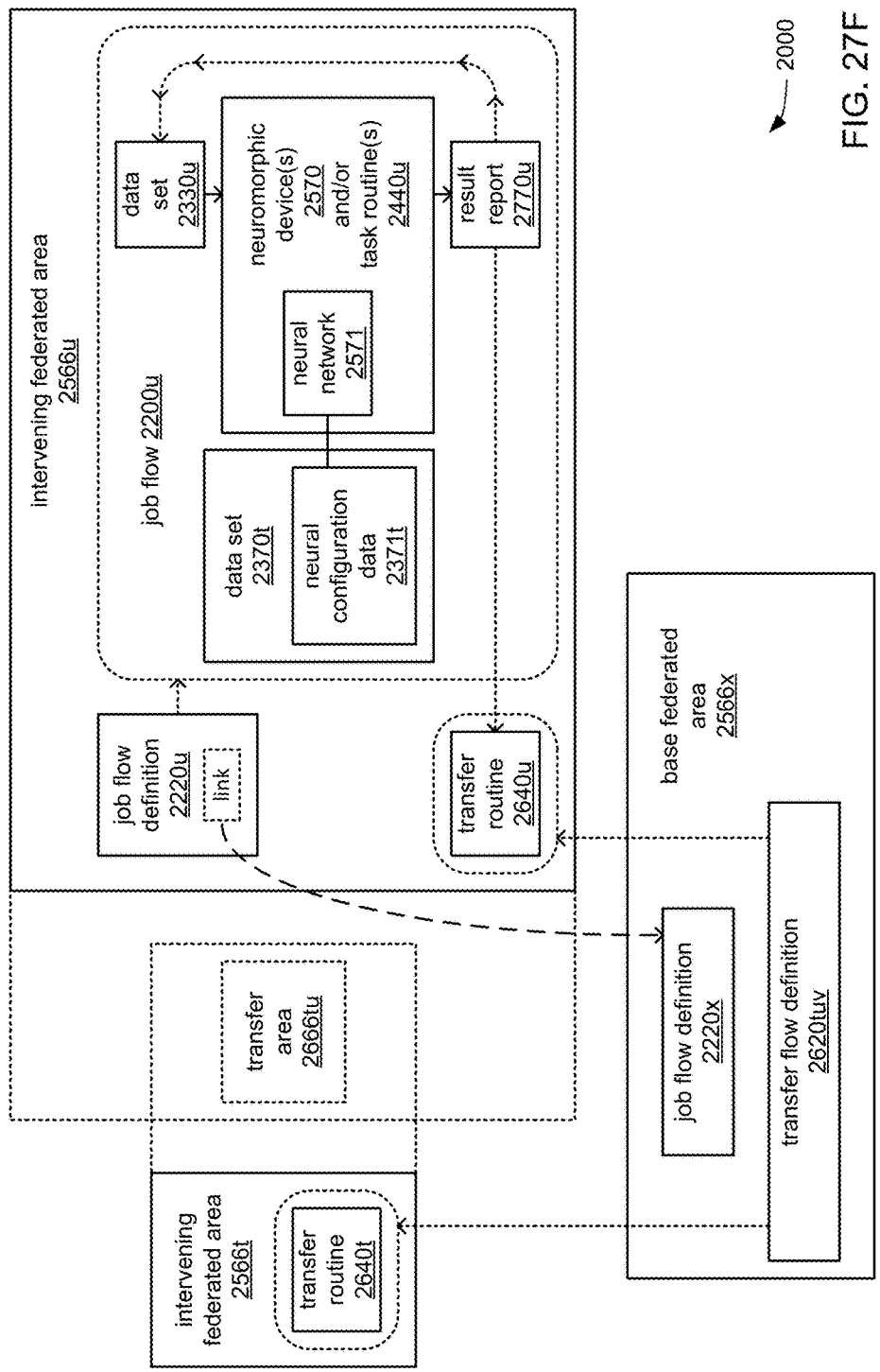

Turning to FIG. 27F, with the data set 2330u and corresponding result report 2770u either having already been generated or being generated on an ongoing basis as the job flow 2200x continues to be performed, the job flow 2200u may be performed to test the neural network 2571 as described in reference to FIGS. 26A-B, using the data set 2330u and corresponding result report 2770u as testing data.

As the job flow 2200u is performed to effect such testing, execution of the transfer routine 2640u at least partially in parallel with the task routine(s) 2440u of the job flow 2200u may cause a processor 2550 to perform a recurring analysis of one or more aspects of the testing of the neural network 2571 to determine whether a condition has been met to cease the testing and to either begin retraining the neural network 2571 or begin usage of the neural network 2571. Again, such a condition may the degree of accuracy of the neural network 2571 in performing the analytical function as determined through analyses of output values of the job flows 2200u and 2200x.

As also depicted in FIG. 27F, and as previously discussed in reference to FIGS. 17A-F, the job flow definition 2220u may include the job flow identifier or other form of reference to the job flow 2200x and/or the job flow definition 2220x that serves as an indication of the job flow 2200x and/or performance(s) thereof having been used to test the neural network 2571. Again, this may serve as an aid to ensuring accountability for various aspects of the testing of the neural network 2571.

Figure 27G:
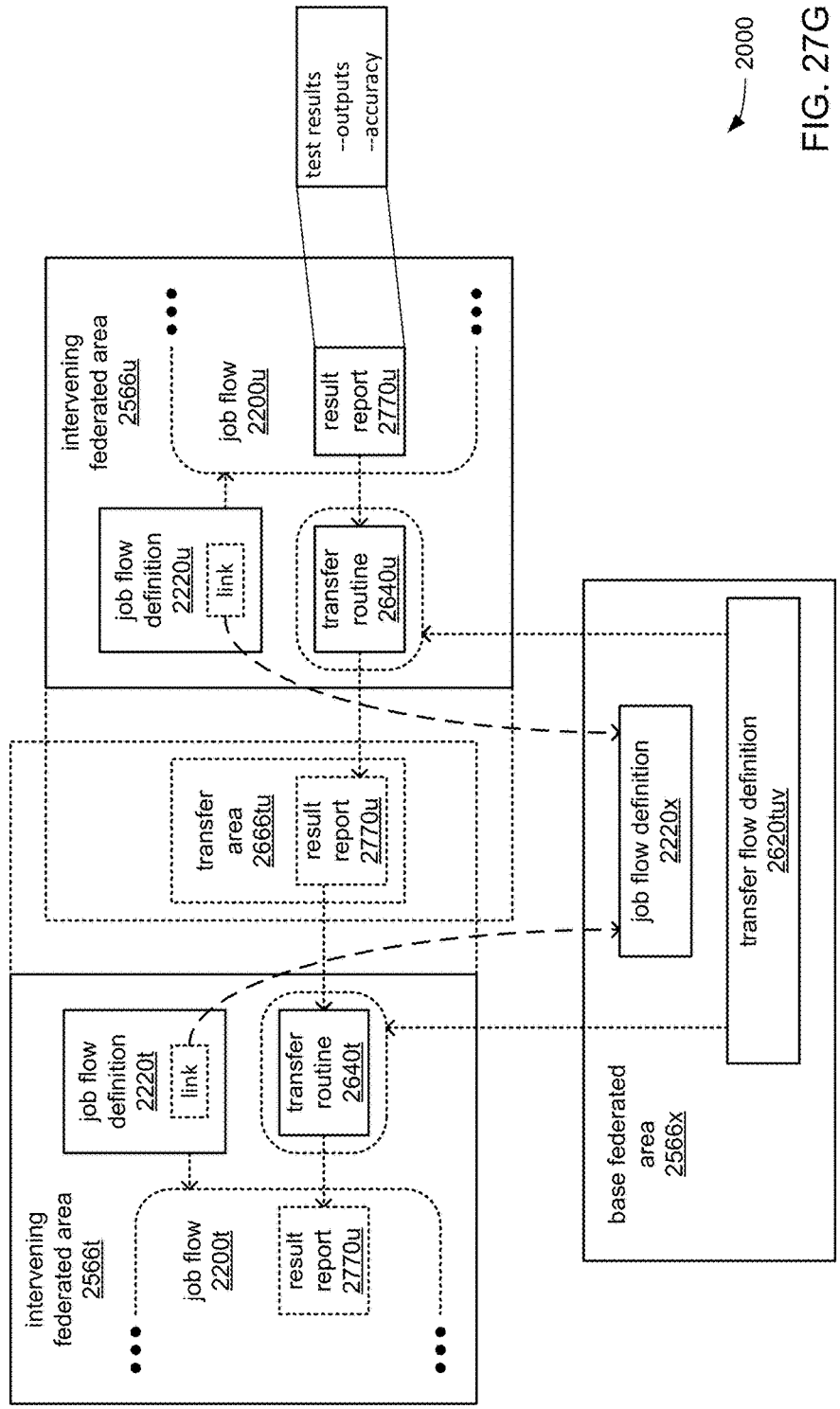

Turning to FIG. 27G, in response to a determination made, as a result of execution of the transfer routine 2640u, that a condition has been met for the cessation of testing and the commencement of retraining, a transfer of the result report 2770u, and/or another data object indicative of the degree of accuracy of the neural network 2571 (and/or indicative of instances where the neural network 2571 has provided inaccurate output) may be performed between the intervening federated areas 2566u and 2566t back through the transfer area 2666tu. As previously described in reference to FIGS. 26A-B, such retraining of the neural network 2571 may entail the use of different hyperparameters in an effort to cause the retrained neural network 2571 to be more accurate.

Figure 27H:
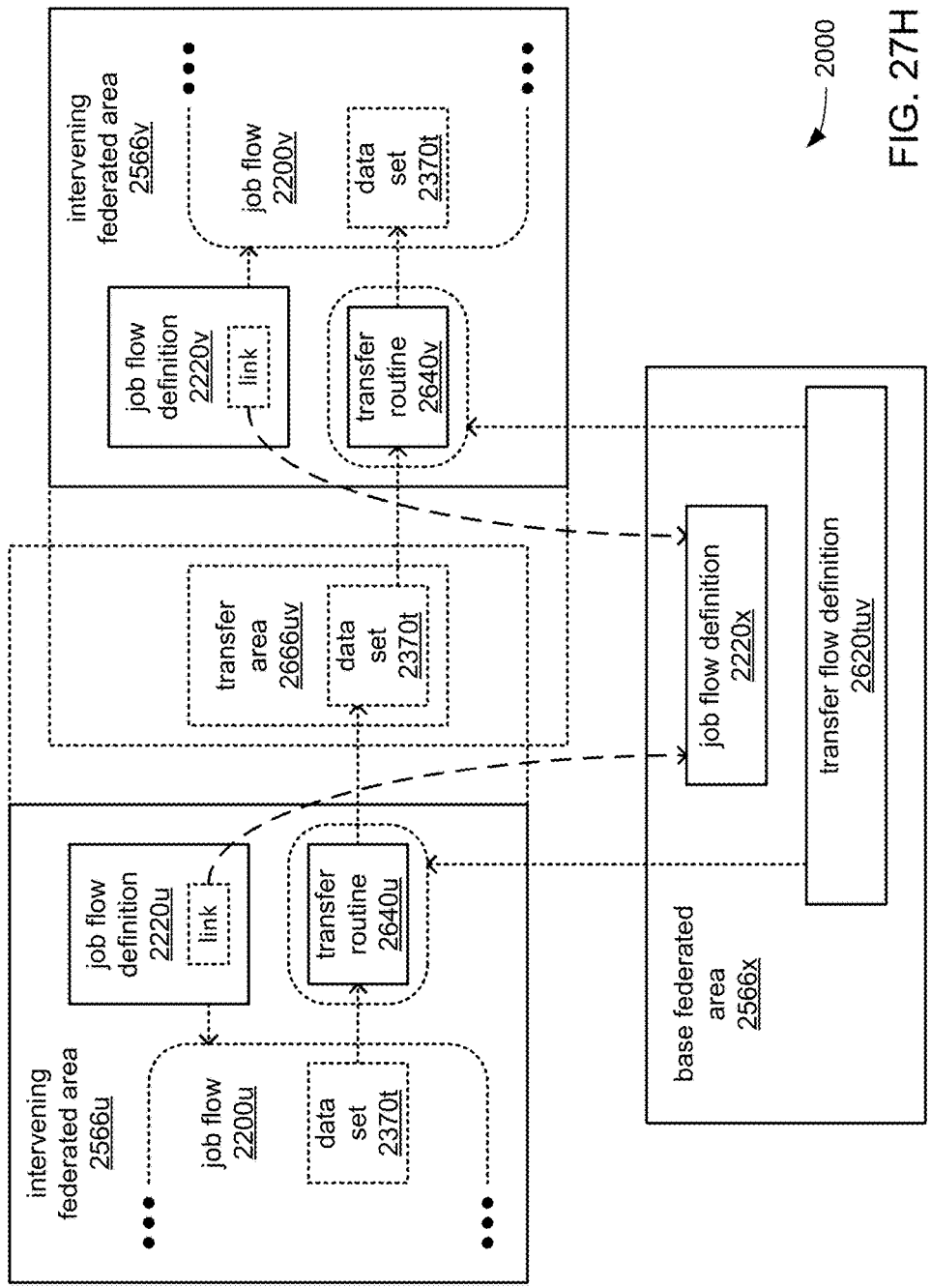
Figure 28A:
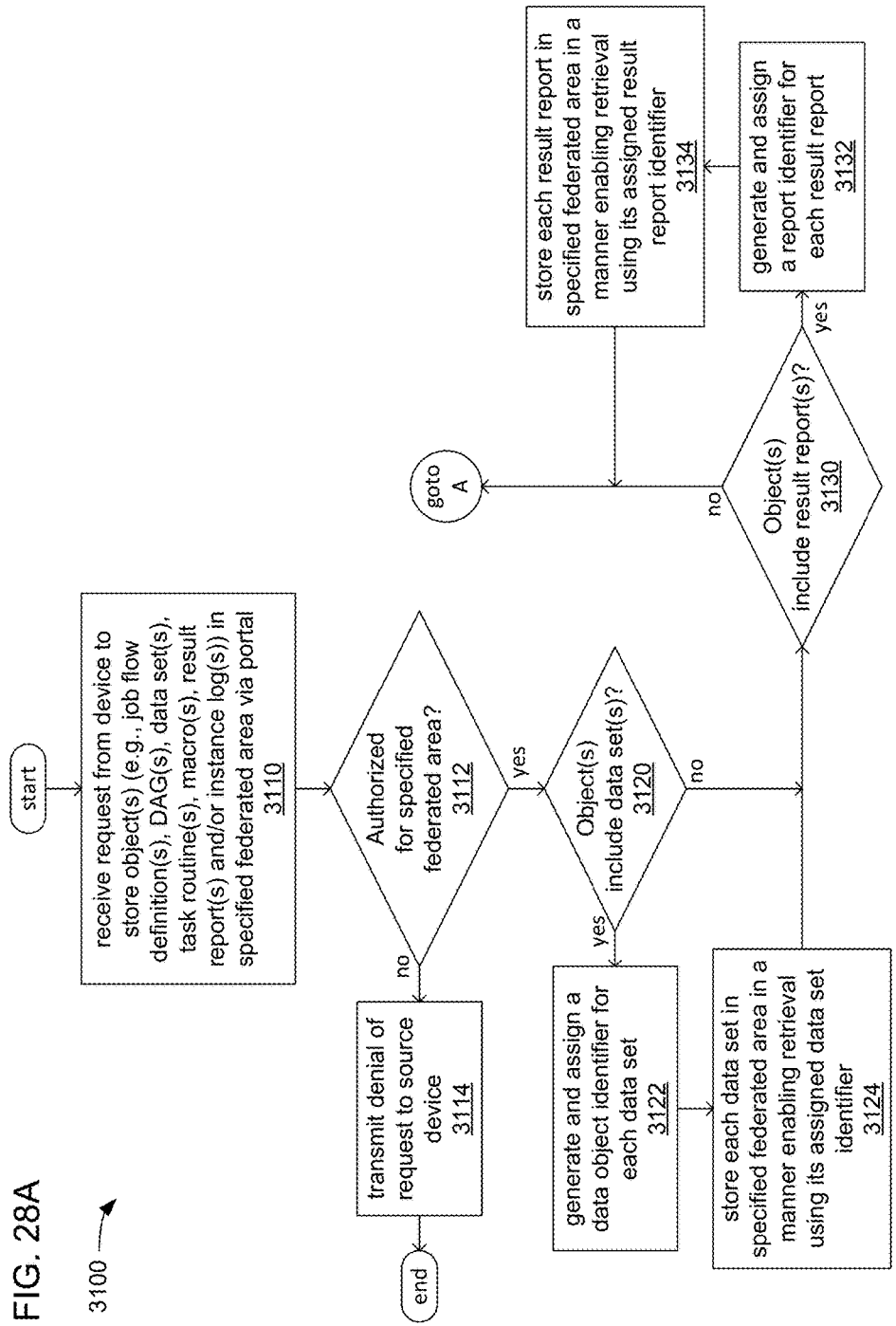
Figure 28C:
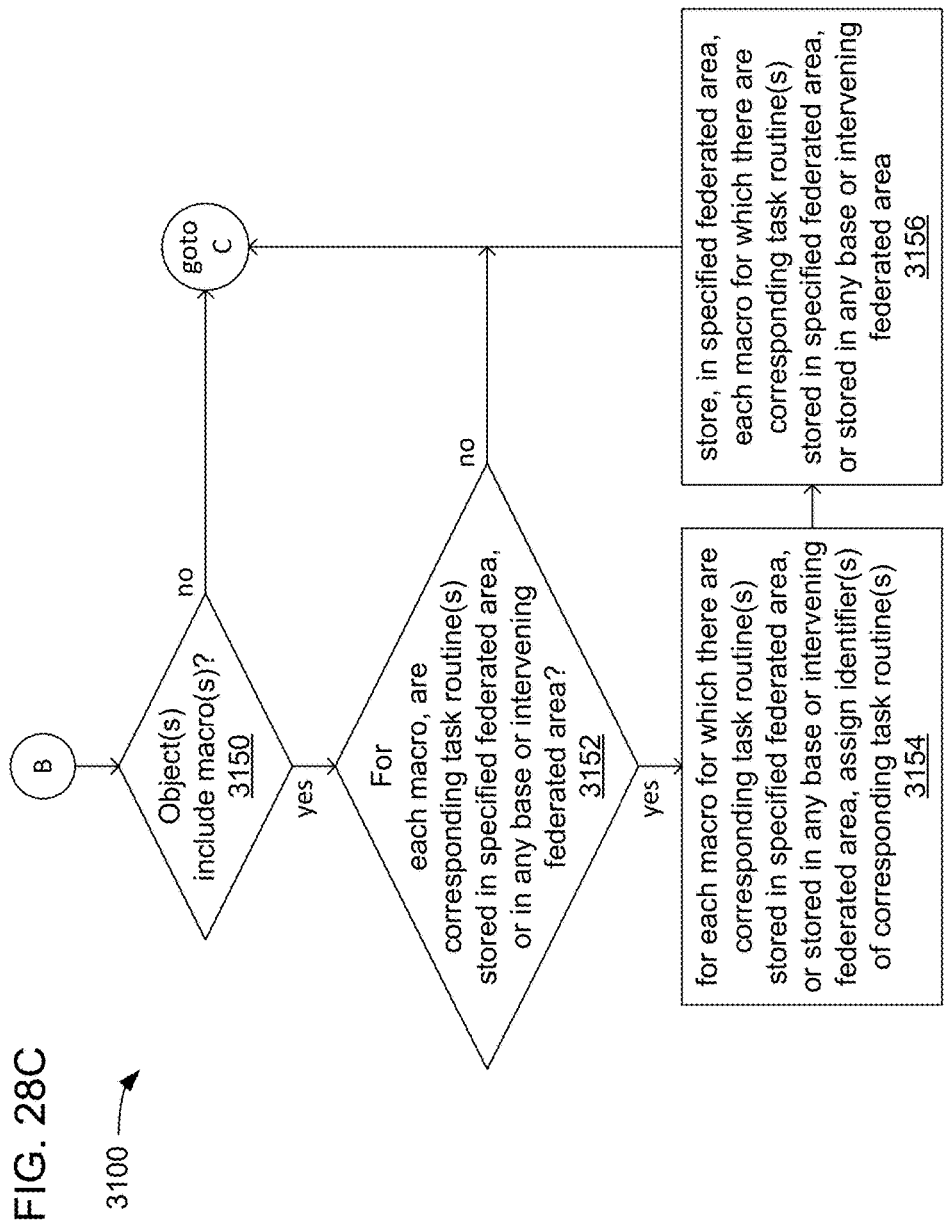
Figure 28E:
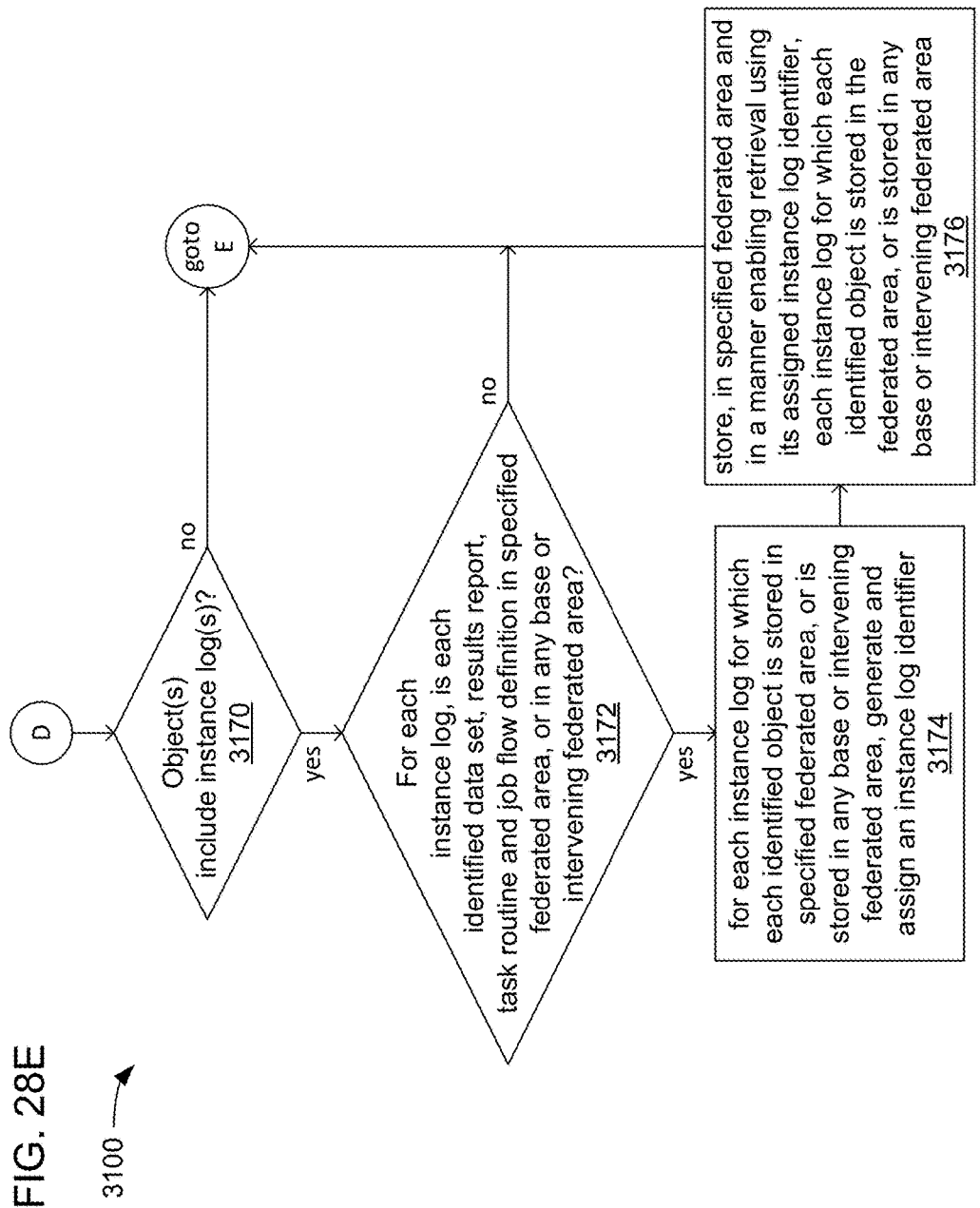

Alternatively, and turning to FIG. 27H, in response to a determination made, as a result of execution of the transfer routine 2640u, that a condition has been met for the cessation of testing and the commencement of usage of the neural network 2571, a transfer of the data set 2370t that defines the neural network (or of a different data object that defines a refined version of the neural network 2571) may be performed between the intervening federated areas 2566u and 2566v through the transfer area 2666uv. As previously described in reference to FIGS. 26A-B, such usage of the neural network 2571 may, at least initially, entail performances of the job flow 2200v to use the neural network 2571 at least partially in parallel with performances of the job flow 2200x to perform some degree of ongoing checks of the accuracy of the neural network 2571 in performing the analytical function.

FIGS. 28A, 28B, 28C, 28D, 28E and 28F, together, illustrate an example embodiment of a logic flow 3100. The logic flow 3100 may be representative of some or all of the operations executed by one or more embodiments described herein. More specifically, the logic flow 3100 may illustrate operations performed by the processor(s) 2550 in executing the control routine 2540, and/or performed by other component(s) of at least one of the federated devices 2500.

At 3110, a processor of a federated device of a distributed processing system (e.g., at least one processor 2550 of one of the federated devices 2500 of the distributed processing system 2000) may receive a request from a device, via a network (e.g., one of the source devices 2100, or one of the reviewing devices 2800, via the network 2999) and through a portal provided by the processor for access to other devices via the network, to store one or more objects (e.g., one or more of the objects 2220, 2270, 2330, 2370, 2440, 2470, 2720 and/or 2770) within a specified federated area (e.g., one of the federated areas 2566). As has been discussed, such a portal may employ any of a variety of protocols and/or handshake mechanisms to enable the receipt of requests for various forms of access to a federated area by other devices, as well as to exchange objects with other devices, via the network.

At 3112, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of the specified federated area, and/or has been granted a level of access that includes the authorization to make such requests. As has been discussed, the processor may require the receipt of one or more security credentials from devices from which requests are received. If, at 3112, the processor determines that the request is not from a device and/or user authorized to make such a request, then the processor may transmit an indication of denial of the request to the device via the network at 3114.

However, if at 3112, the processor determines that the request to store one or more objects within the specified federated area is authorized, then at 3120, the processor may check whether the one or more objects includes one or more data sets (e.g., one or more of the data sets 2330 or 2370). If so, then the processor may generate and assign a data object identifier for each data set that is to be stored (e.g., one or more of the data object identifiers 3331) at 3122. At 3124, the processor may store each of the one or more data sets within the specified federated area.

At 3130, the processor may check whether the one or more objects includes one or more result reports (e.g., one or more of the result reports 2770). If so, then the processor may generate and assign a result report identifier for each result report that is to be stored (e.g., one or more of the result report identifiers 2771) at 3132. At 3134, the processor may store each of the one or more result reports within the specified federated area.

At 3140, the processor may check whether the one or more objects includes one or more task routines (e.g., one or more of the task routines 2440). If so, then the processor may generate and assign a task routine identifier for each task routine that is to be stored (e.g., one or more of the task routine identifiers 2441) at 3142. At 3144, the processor may store each of the one or more task routines within the specified federated area. At 3146, the processor may additionally check whether any of the task routines stored at 3144 have the same flow task identifier as another task routine that was already stored within the specified federated area (or within any base federated area to which the specified federated area is related and/or within any intervening federated area interposed therebetween), such that there is more than one task routine executable to perform the same task. If so, then at 3148 for each newly stored task routine that shares a flow task identifier with at least one other task routine already stored in the specified federated area (or within such a base or intervening federated area), the processor may store an indication of there being multiple task routines with the same flow task identifier, along with an indication of which is the most recent of the task routines for that flow task identifier.

As has been discussed, in embodiments in which task routines are stored in a manner organized into a database or other data structure (e.g., the task routine database 2564 within one or more related federated areas) by which flow task identifiers may be employed as a mechanism to locate task routines, the storage of an indication of there being more than one task routine sharing the same flow task identifier may entail associating more than one task routine with the same flow task identifier so that a subsequent search for task routines using that flow task identifier will beget a result indicating that there is more than one. As has also been discussed, the manner in which one of multiple task routines sharing the same flow task identifier may be indicated as being the most current version may entail ordering the manner in which those task routines are listed within the database (or other data structure) to cause the most current one to be listed at a particular position within that order (e.g., listed first).

At 3150, the processor may check whether the one or more objects includes one or more macros (e.g., one or more of the macros 2470). If so, then at 3152, the processor may additionally check, for each macro, whether there is a corresponding task routine (or corresponding multiple versions of a task routine in embodiments in which a single macro may be based on multiple versions) stored within the specified federated area (or within any base federated area to which the specified federated area is related and/or within any intervening federated area interposed therebetween). If, at 3152, there are any macros requested to be stored for which there is a corresponding task routine (or corresponding multiple versions of a task routine) stored in the specified federated area (or within such a base or intervening federated area), then for each such macro, the processor may assign the job flow identifier (e.g., one or more of the job flow identifiers 2221) of the corresponding task routine (or may assign job flow identifiers of each of the versions of a task routine) at 3154. At 3156, the processor may store each of such macros.

At 3160, the processor may check whether the one or more objects includes one or more job flow definitions (e.g., one or more of the job flow definitions 2220). If so, then at 3162, the processor may additionally check, for each job flow definition, whether that job flow definition defines a job flow that uses a neural network and was trained and/or tested using objects associated with another job flow (and/or performances thereof) that is defined to by its job flow definition to not use a neural network. As previously discussed, the preservation of such links between a neuromorphic job flow and an earlier non-neuromorphic job flow from which the neuromorphic job flow may be in some way derived may be of importance to ensuring accountability during a later evaluation of the neuromorphic job flow. For this reason, it may be deemed important to ensure that objects associated with the other non-neuromorphic job flow have already been stored in federated area(s) where they can be preserved for subsequent retrieval during such an evaluation of the neuromorphic job flow.

Presuming that there are no neuromorphic job flows requested to be stored that were derived from another non-neuromorphic job flow that is not already so stored, then at 3164, the processor may additionally check, for each job flow definition, whether there is at least one task routine stored within the specified federated area (or within any base federated area to which the specified federated area is related and/or within any intervening federated area interposed therebetween) for each task specified by a flow task identifier within the job flow definition. If, at 3164, there are any job flow definitions requested to be stored for which there is at least one task routine stored in the specified federated area (or within such a base or intervening federated area) for each task, then for each of those job flow definitions where there is at least one stored task routine for each task, the processor may generate and assign a job flow identifier (e.g., one or more of the job flow identifiers 2221) at 3166. At 3168, the processor may store each of the one or more job flow definitions for which there was at least one task routine for each task.

At 3170, the processor may check whether the one or more objects includes one or more instance logs (e.g., one or more of the instance logs 2720). If so, then at 3172, the processor may additionally check, for each instance log, whether each object identified in the instance log by its identifier is stored within the specified federated area (or within any base federated area to which the specified federated area is related and/or within any intervening federated area interposed therebetween). If, at 3172, there are any instance logs requested to be stored for which each specified object is stored within the specified federated area (or within such a base or intervening federated area), then for each instance log where each object specified therein is so stored, the processor may generate and assign an instance log identifier (e.g., one or more of the instance log identifiers 2721) at 3174. At 3176, the processor may store each of the one or more instance logs for which each specified object is so stored.

At 3180, the processor may check whether the one or more objects includes one or DAGs (e.g., one or more of the job DAGs 2270). If so, then at 3182, the processor may additionally check, for each DAG, whether there is a corresponding task routine (or corresponding multiple versions of a task routine) for each task graph object (e.g., one of the task graph objects 2984) and whether there is a corresponding data object for each data graph object (e.g., each data graph object 2983 or 2987) stored within the specified federated area (or within any base federated area to which the specified federated area is related and/or within any intervening federated area interposed therebetween). If, at 3182, there are any of such DAGs to be stored in the specified federated area (or within such a base or intervening federated area) for each task, then for each of such DAG, the processor may generate and assign a job flow identifier at 3184 in recognition of the possibility that such a DAG may be used as a new job flow definition. At 3186, the processor may store each of such DAGs.

Figure 29A:
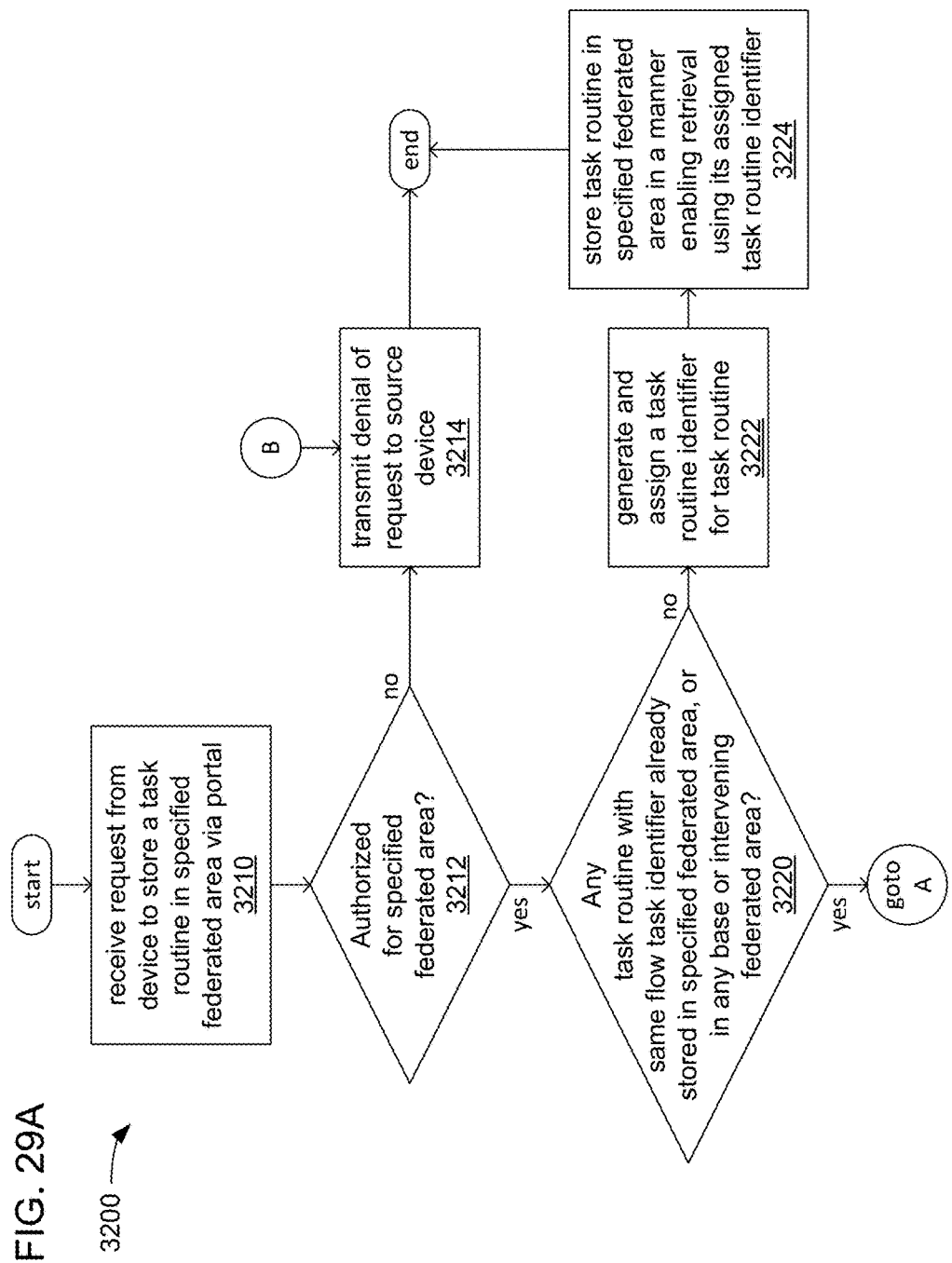
FIGS. 29A and 29B, together, illustrate another example embodiment of a logic flow of a federated device storing objects in a federated area.
Figure 29B:
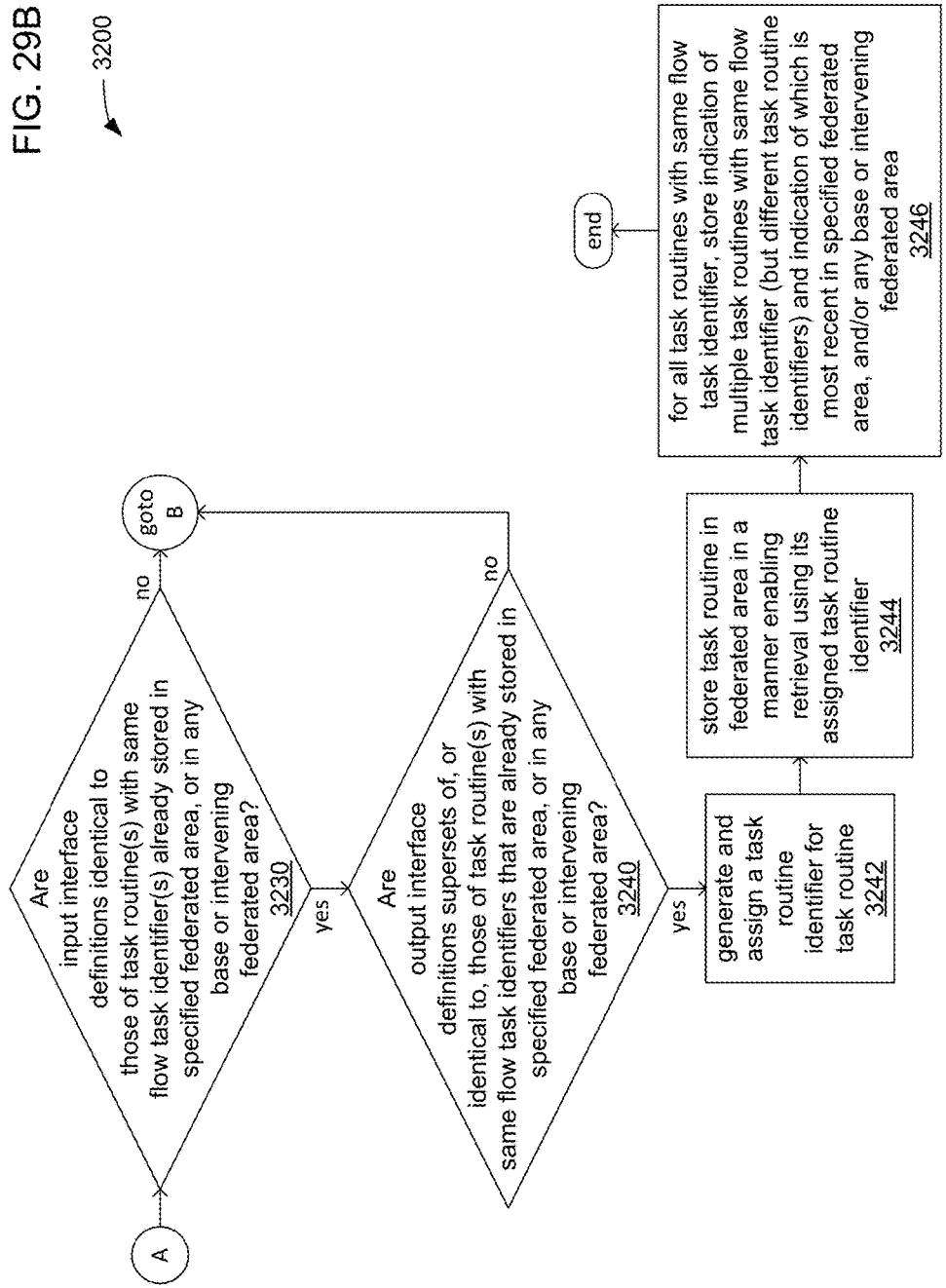

FIGS. 29A and 29B, together, illustrate an example embodiment of a logic flow 3200. The logic flow 3200 may be representative of some or all of the operations executed by one or more embodiments described herein. More specifically, the logic flow 3200 may illustrate operations performed by the processor(s) 2550 in executing the control routine 2540, and/or performed by other component(s) of at least one of the federated devices 2500.

At 3210, a processor of a federated device of a distributed processing system (e.g., at least one processor 2550 of one of the federated devices 2500 of the distributed processing system 2000) may receive a request from a device, via a network (e.g., one of the source devices 2100, or one of the reviewing devices 2800, via the network 2999) and through a portal provided by the processor for access to other devices via the network, to store a task routine (e.g., one of the task routines 2440) within a specified federated area (e.g., one of the federated areas 2566). Again, such a portal may be generated by the processor to employ any of a variety of protocols and/or handshake mechanisms to enable the receipt of requests for various forms of access to the federated area by other devices, as well as to exchange objects with other devices, via the network.

At 3212, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of the specified federated area, and/or has been granted a level of access that includes the authorization to make such requests. As has been discussed, the processor may require the receipt of one or more security credentials from devices from which requests are received. If, at 3212, the processor determines that the request is not from a device and/or user authorized to make such a request, then the processor may transmit an indication of denial of the request to the device via the network at 3214.

However, if at 3212, the processor determines that the request to store a task routine within the specified federated area is authorized, then at 3220, the processor may check whether the task routine has the same flow task identifier as any of the task routines already stored within the specified federated area (or within any base federated area to which the specified federated area is related and/or within any intervening federated area interposed therebetween), such that there is already stored one or more other task routines executable to perform the same task. If not at 3220, then the processor may generate and assign a task routine identifier for the task routine (e.g., one of the task routine identifiers 2441) at 3222. At 3224, the processor may store the task routines within the specified federated area in a manner that enables later retrieval of the task routine by either its identifier or by the flow task identifier of the task that it performs.

However, if at 3220, there is at least one other task routine with the same flow task identifier already stored within the specified federated area (or within such a base or intervening federated area), then the processor may check at 3230 whether the input interfaces (e.g., data interfaces 2443 that receive data from data objects, and/or task interfaces 2444 that receive parameters from another task routine) are implemented in the task routine in a manner that is identical to those of the one or more task routines with the same flow task identifier that are already so stored. Alternatively, and as previously discussed, such a comparison may be made between the implementation of the input interfaces of the task routine and the specifications for the input interfaces within one or more job flow definitions that include the task performed by the task routine. If, at 3230, the input interfaces are not identical, then the processor may transmit a denial of the request to the device via the network at 3214.

However, if at 3230, the input interfaces are identical, then the processor may check at 3240 whether the output interfaces (e.g., data interfaces 2443 that output a data object, and/or task interfaces 2444 that output parameters to another task routine) are implemented in the task routine in a manner that is either identical to or a superset of those of the one or more task routines with the same flow task identifier that are already stored within the federated area (or within such a base or intervening federated area). Alternatively, and as previously discussed, such a comparison may be made between the implementation of the output interfaces of the task routine and the specifications for the output interfaces within one or more job flow definitions that include the task performed by the task routine. If, at 3240, each of the output interfaces of the task routine are neither identical nor a superset, then the processor may transmit a denial of the request to the device via the network at 3214.

However, if at 3240, each of the output interfaces of the task routine is identical to or a superset of the corresponding output interface within other task routine(s) and/or job flow definitions already stored within the federated area (or within such a base or intervening federated area), then the processor may generate and assign a task routine identifier for the task routine at 3242. At 3244, the processor may store the task routine within the specified federated area in a manner that enables later retrieval of the task routine by either its identifier or by the flow task identifier of the task that it performs. At 3246, the processor may also store an indication of there being multiple task routines with the same flow task identifier, along with an indication of which is the most recent of the task routines for that flow task identifier.

Figure 30B:
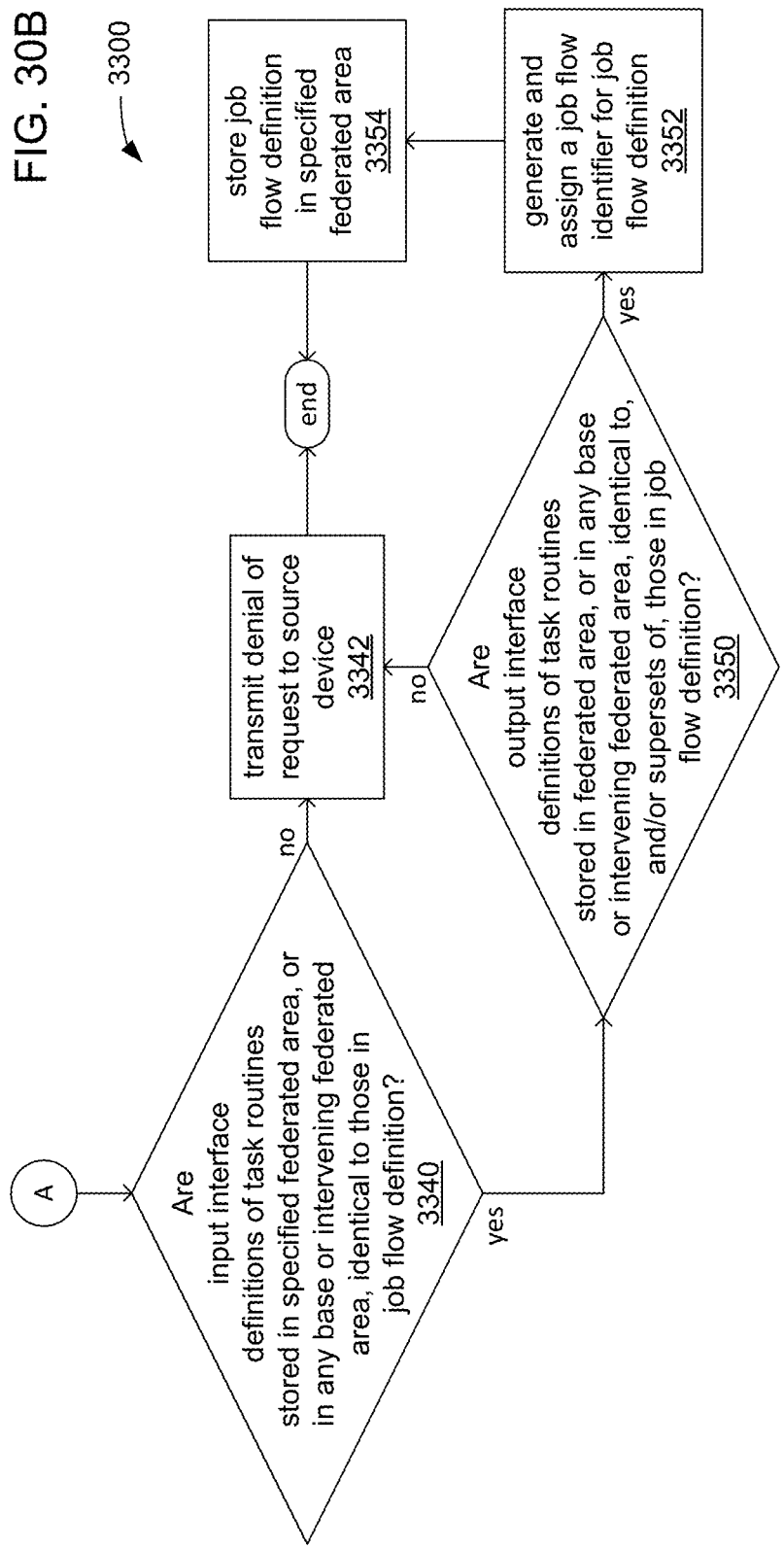
Figure 31A:
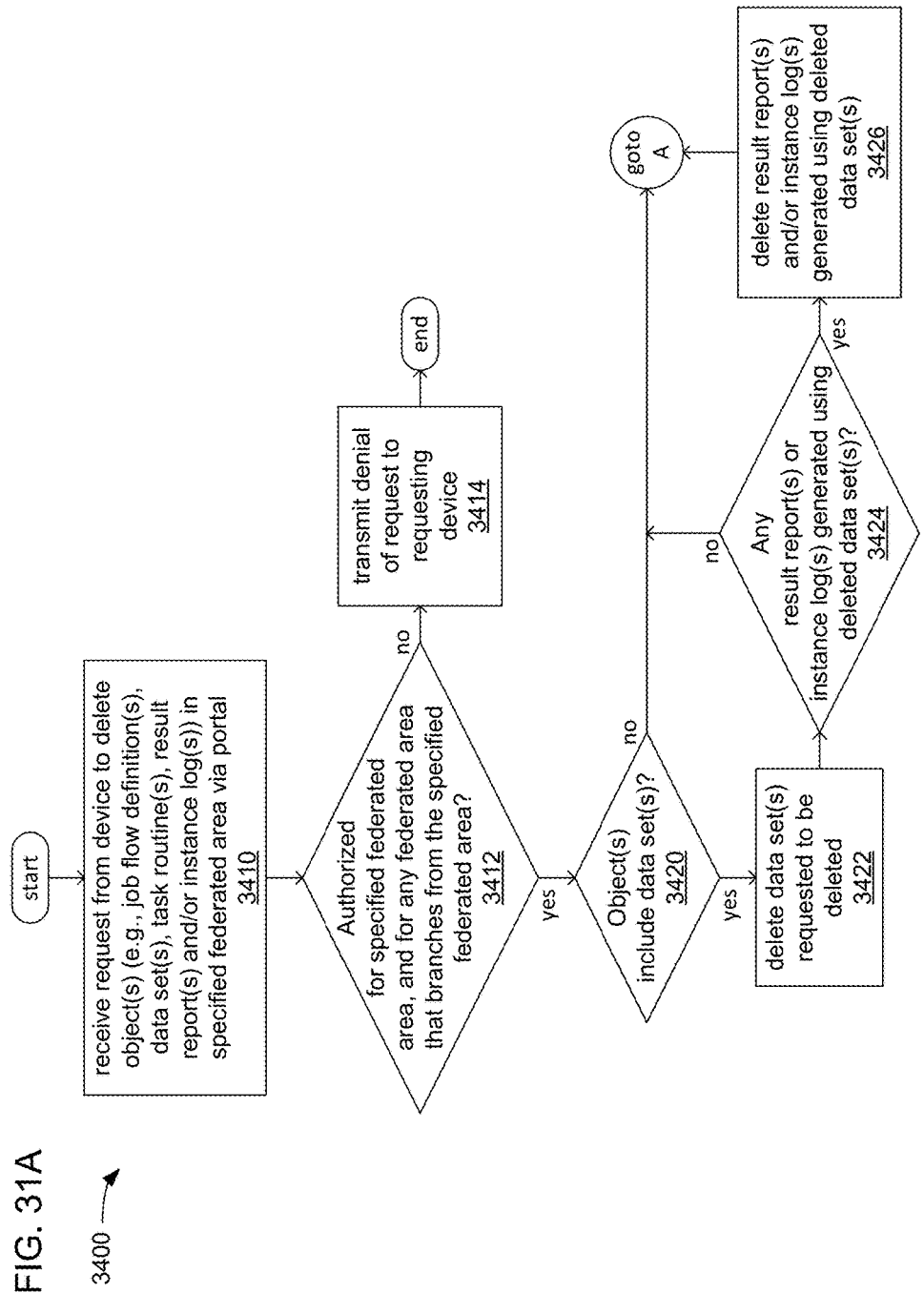
FIGS. 31A, 31B, 31C and 31D, together, illustrate an example embodiment of a logic flow of a federated device deleting objects stored within a federated area.
Figure 31B:
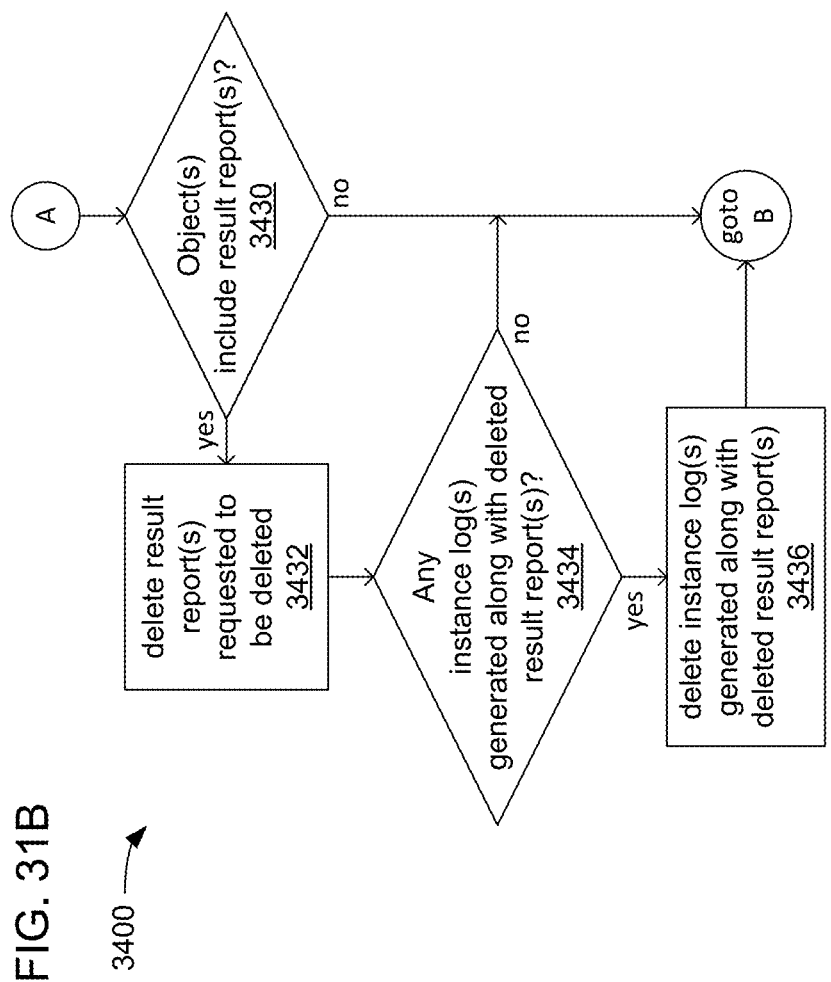
Figure 31C:
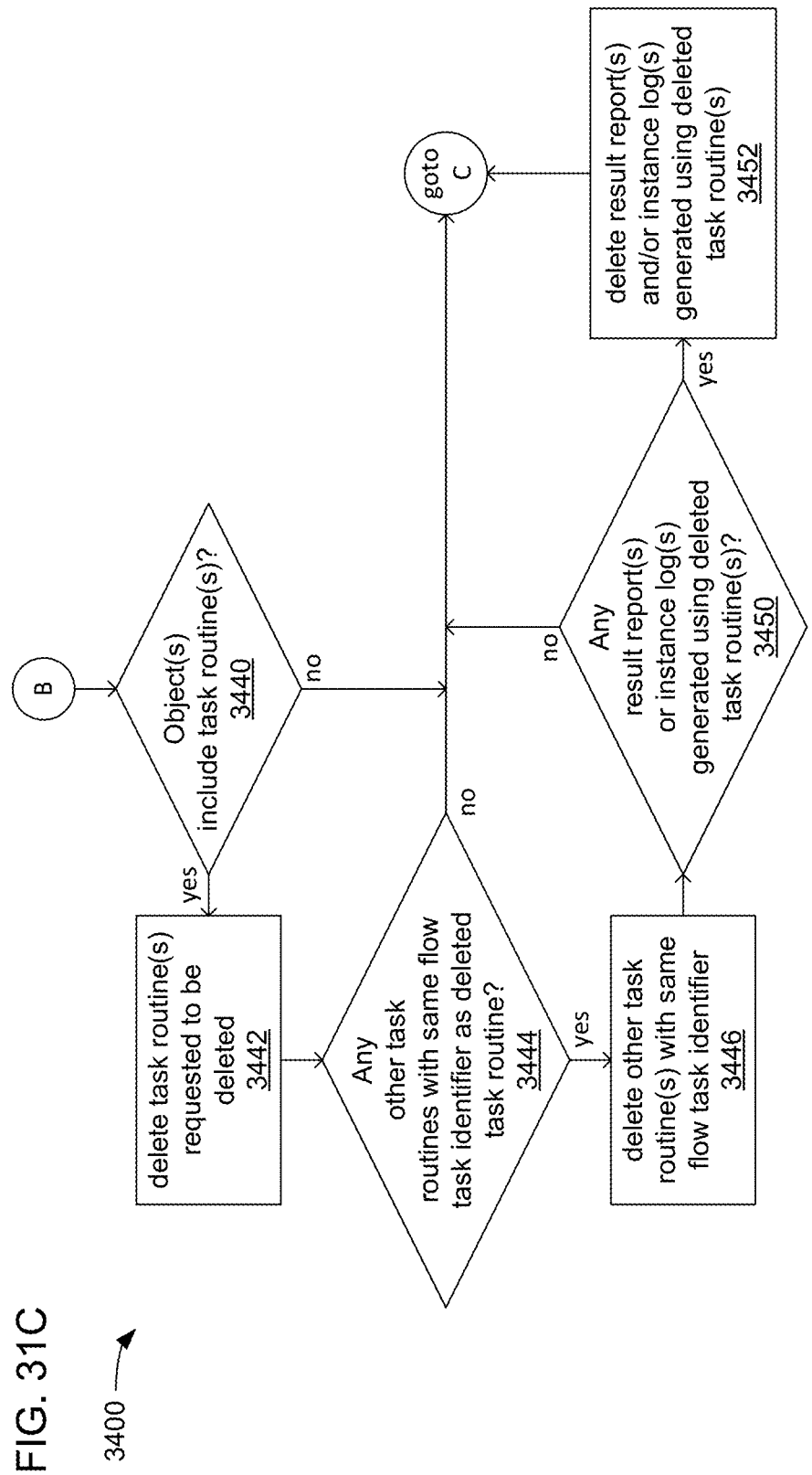
Figure 31D:
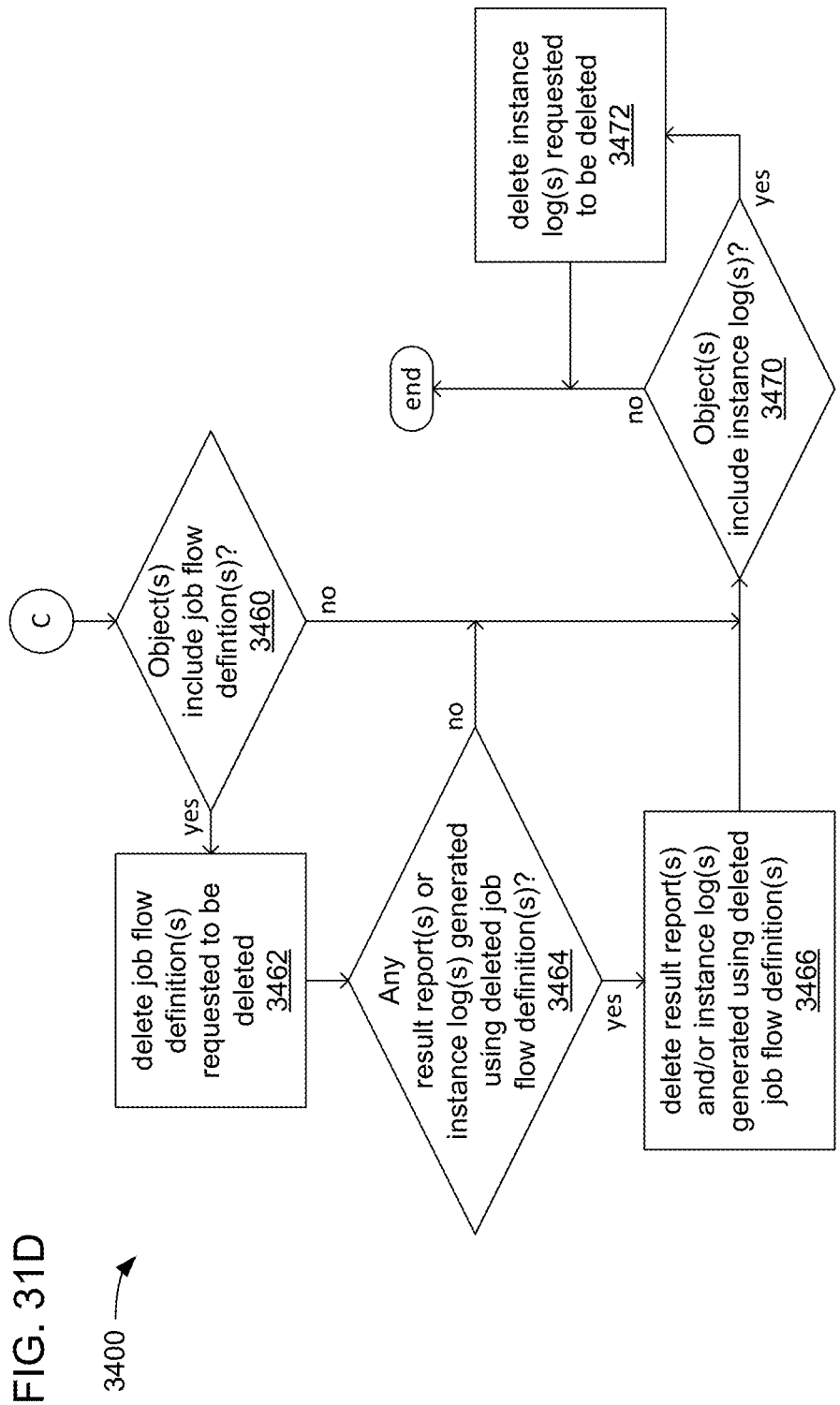

FIGS. 30A and 30B, together, illustrate an example embodiment of a logic flow 3300. The logic flow 3300 may be representative of some or all of the operations executed by one or more embodiments described herein. More specifically, the logic flow 3300 may illustrate operations performed by the processor(s) 2550 in executing the control routine 2540, and/or performed by other component(s) of at least one of the federated devices 2500.

At 3310, a processor of a federated device of a distributed processing system (e.g., at least one processor 2550 of one of the federated devices 2500 of the distributed processing system 2000) may receive a request from a device, via a network (e.g., one of the source devices 2100, or one of the reviewing devices 2800, via the network 2999) and through a portal provided by the processor for access to other devices via the network, to store a job flow definition (e.g., one of the job flow definitions 2220) within a specified federated area (e.g., one of the federated areas 2566).

At 3312, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of the specified federated area, and/or has been granted a level of access that includes the authorization to make such requests. As has been discussed, the processor may require the receipt of one or more security credentials from devices from which requests are received. If, at 3312, the processor determines that the request is not from a device and/or user authorized to make such a request, then the processor may transmit an indication of denial of the request to the device via the network at 3314.

However, if at 3312, the processor determines that the request to store a job flow definition within the specified federated area is authorized, then at 3320, the processor may check whether the job flow of the job flow definition uses a neural network that was trained based on another job flow that does not use a neural network. If so, then at 3322, the processor may check whether at least the job flow definition of the other job flow is stored within the federated area (or within any base federated area to which the specified federated area is related and/or within any intervening federated area interposed therebetween), and if not, may then transmit an indication of denial of the request at 3314.

However, if at 3320, the processor determines that the job flow of the job flow definition does not use a neural network, or if at 3322, the processor determines that the other job flow definition is so stored, then at 3330, the processor may check whether there is at least one task routine stored within the federated area (or within any base federated area to which the specified federated area is related and/or within any intervening federated area interposed therebetween) for each task specified by a flow task identifier within the job flow definition. If, at 3330, there are no task routines stored within the federated area (or within such a base or intervening federated area) for one or more of the tasks specified by the job flow, then the processor may transmit a denial of the request to the device via the network at 3314.

However, if at 3330, there is at least one task routine stored in the federated area (or within such a base or intervening federated area) for each task specified in the job flow, then the processor may check whether the input interfaces (e.g., data interfaces 2443 that receive data from data objects, and/or task interfaces 2444 that receive parameters from another task routine) that are implemented in the task routines stored in the federated area (or within such a base or intervening federated area) are identical to those specified in the job flow definition at 3340. If, at 3340, the input interfaces are not identical, then the processor may transmit a denial of the request to the device via the network at 3342.

However, if at 3340, the input interfaces are identical, then the processor may check at 3350 whether the output interfaces (e.g., data interfaces 2443 that output a data object, and/or task interfaces 2444 that output parameters to another task routine) that are implemented in the task routines that are already stored within the federated area (or within such a base or intervening federated area) are identical to or are supersets of those specified in the job flow definition. If, at 3350, an output interface of one or more of the task routines already so stored is neither identical nor a superset of a corresponding output interface specified in the job flow definition, then the processor may transmit a denial of the request to the source device via the network at 3342.

However, if at 3350, all of the output interfaces of all of the task routines already so stored are either identical to and/or are supersets of corresponding output interfaces specified in the job flow definitions, then the processor may generate and assign a job flow identifier for the task routine at 3352. At 3354, the processor may store the job flow within the specified federated area in a manner that enables later retrieval of the job flow by its identifier.

FIGS. 31A, 31B, 31C and 31D, together, illustrate an example embodiment of a logic flow 3400. The logic flow 3400 may be representative of some or all of the operations executed by one or more embodiments described herein. More specifically, the logic flow 3400 may illustrate operations performed by the processor(s) 2550 in executing the control routine 2540, and/or performed by other component(s) of at least one of the federated devices 2500.

At 3410, a processor of a federated device of a distributed processing system (e.g., at least one processor 2550 of one of the federated devices 2500 of the distributed processing system 2000) may receive a request from a device, via a network (e.g., one of the source devices 2100, or one of the reviewing devices 2800, via the network 2999) and through a portal provided by the processor, to delete one or more objects (e.g., one or more of the objects 2220, 2330, 2370, 2440, 2720 and/or 2770) within a specified federated area (e.g., one of the federated areas 2566).

At 3412, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of the specified federated area, as well as any federated area that may branch from the specified federated area, and/or has been granted a level of access that includes the authorization to make such requests. As has been discussed, the processor may require the receipt of one or more security credentials from devices from which requests are received. If, at 3412, the processor determines that the request is not from a device and/or user authorized to make such a request, then the processor may transmit an indication of denial of the request to the device via the network at 3414.

However, if at 3412, the processor determines that the request to delete one or more objects within the specified federated area is authorized, then at 3420, the processor may check whether the one or more objects includes one or more data sets (e.g., one or more of the data sets 2330 or 2370). If so, then the processor may delete the one or more data sets from the specified federated area at 3422. At 3424, the processor may additionally check whether there are any result reports or instance logs stored in the specified federated area (or within any federated area that branches from the specified federated area) that were generated in a past performance of a job flow in which any of the one or more deleted data sets were used. If so, then at 3426, the processor may delete such result report(s) and/or instance log(s) from the specified federated area and/or from one or more other federated areas that branch from the specified federated area.

As previously discussed, it may be deemed desirable for reasons of maintaining repeatability to avoid a situation in which there is an instance log that specifies one or more objects, such as data sets, as being associated with a performance of a job flow where the one or more objects are not present within any accessible federated area such that the performance of the job flow cannot be repeated. It is for this reason that the deletion of a data set from the specified federated area is only to be performed if a check can be made within federated areas that branch from the specified federated area for such objects as instance logs and/or result reports that have such a dependency on the data set to be deleted. And, it is for this reason that a request for such a deletion may not be deemed to be authorized unless received from a device and/or user that has authorization to access all of the federated areas that branch from the specified federated area.

At 3430, the processor may check whether the one or more objects includes one or more result reports (e.g., one or more of the result reports 2770). If so, then the processor may delete the one or more result reports from the specified federated area at 3432. At 3434, the processor may additionally check whether there are any instance logs stored in the specified federated area (or within any federated area that branches from the specified federated area) that were generated in a past performance of a job flow in which any of the one or more deleted result reports were generated. If so, then at 3436, the processor may delete such instance log(s) from the federated area and/or from the one or more other federated areas that branch from the specified federated area.

At 3440, the processor may check whether the one or more objects includes one or more task routines (e.g., one or more of the task routines 2440). If so, then the processor may delete the one or more task routines from the specified federated area at 3442. At 3444, the processor may additionally check whether there are any other task routines stored in the specified federated area (or within a federated area that branches from the specified federated area) that share the same flow task identifier(s) as any of the deleted task routines. If so, then at 3446, the processor may delete such task routine(s) from the specified federated area and/or from the one or more other federated areas that branch from the specified federated area. At 3450, the processor may additionally check whether there are any result reports or instance logs stored in the specified federated area (or within a federated area that branches from the specified federated area) that were generated in a past performance of a job flow in which any of the one or more deleted task routines were used. If so, then at 3452, the processor may delete such result report(s) and/or instance log(s) from the specified federated area and/or from the one or more other federated areas that branch from the specified federated area.

At 3460, the processor may check whether the one or more objects includes one or more job flow definitions (e.g., one or more of the job flow definitions 2220). If so, then at 3462, the processor may delete the one or more job flow definitions within the specified federated area. At 3464, the processor may additionally check whether there are any result reports or instance logs stored in the specified federated area (or within a federated area that branches from the specified federated area) that were generated in a past performance of a job flow defined by any of the one or more deleted job flow definitions. If so, then at 3466, the processor may delete such result report(s) and/or instance log(s) from the federated area and/or from the one or more other federated areas that branch from the specified federated area.

At 3470, the processor may check whether the one or more objects includes one or more instance logs (e.g., one or more of the instance logs 2720). If so, then at 3472, the processor may delete the one or more instance logs from the specified federated area.

Figure 32A:
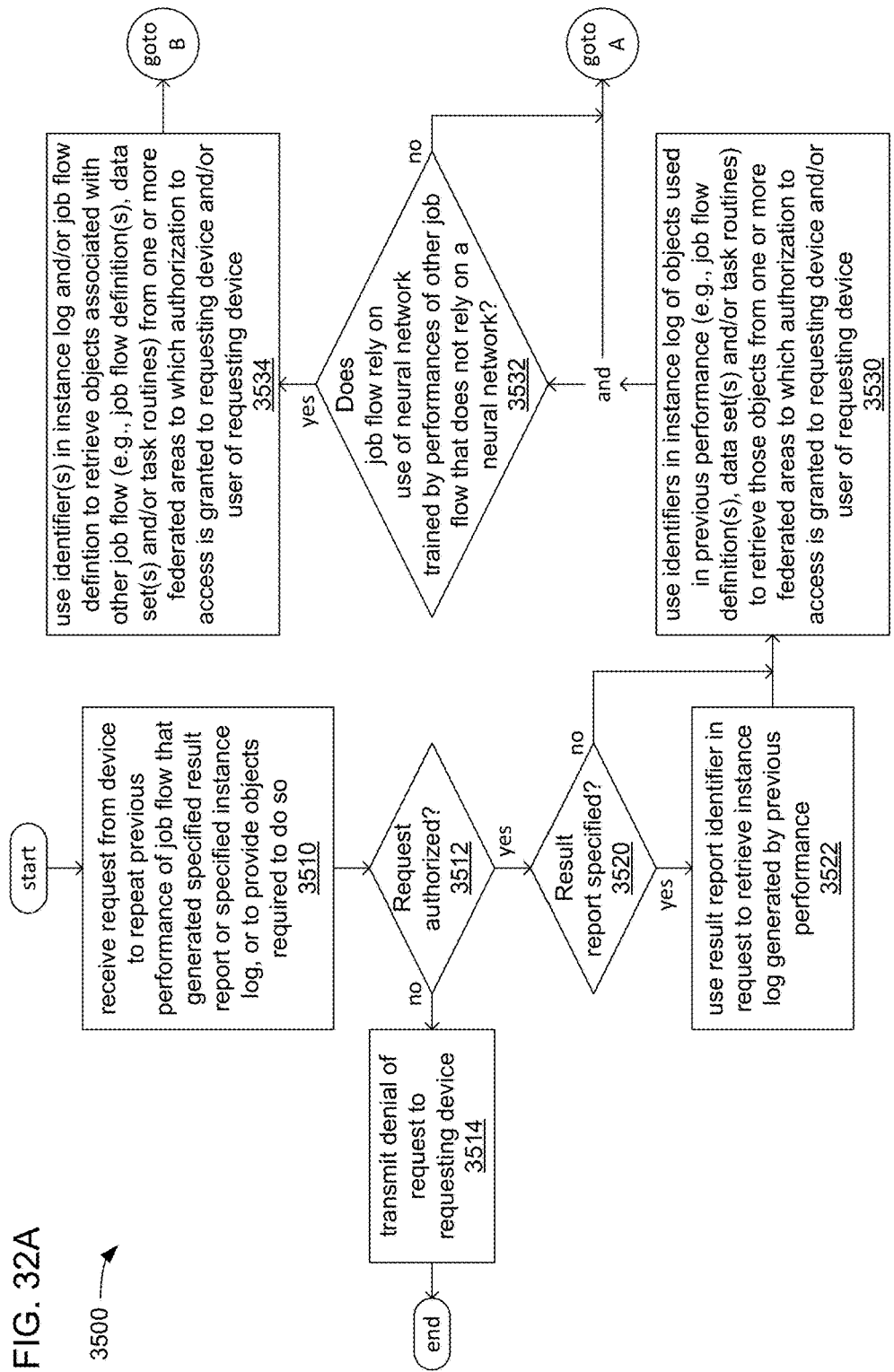
FIGS. 32A and 32B, together, illustrate an example embodiment of a logic flow of a federated device either repeating an earlier performance of a job flow that generated specified result report or instance log, or transmitting objects to enable a requesting device to do so.
Figure 32B:
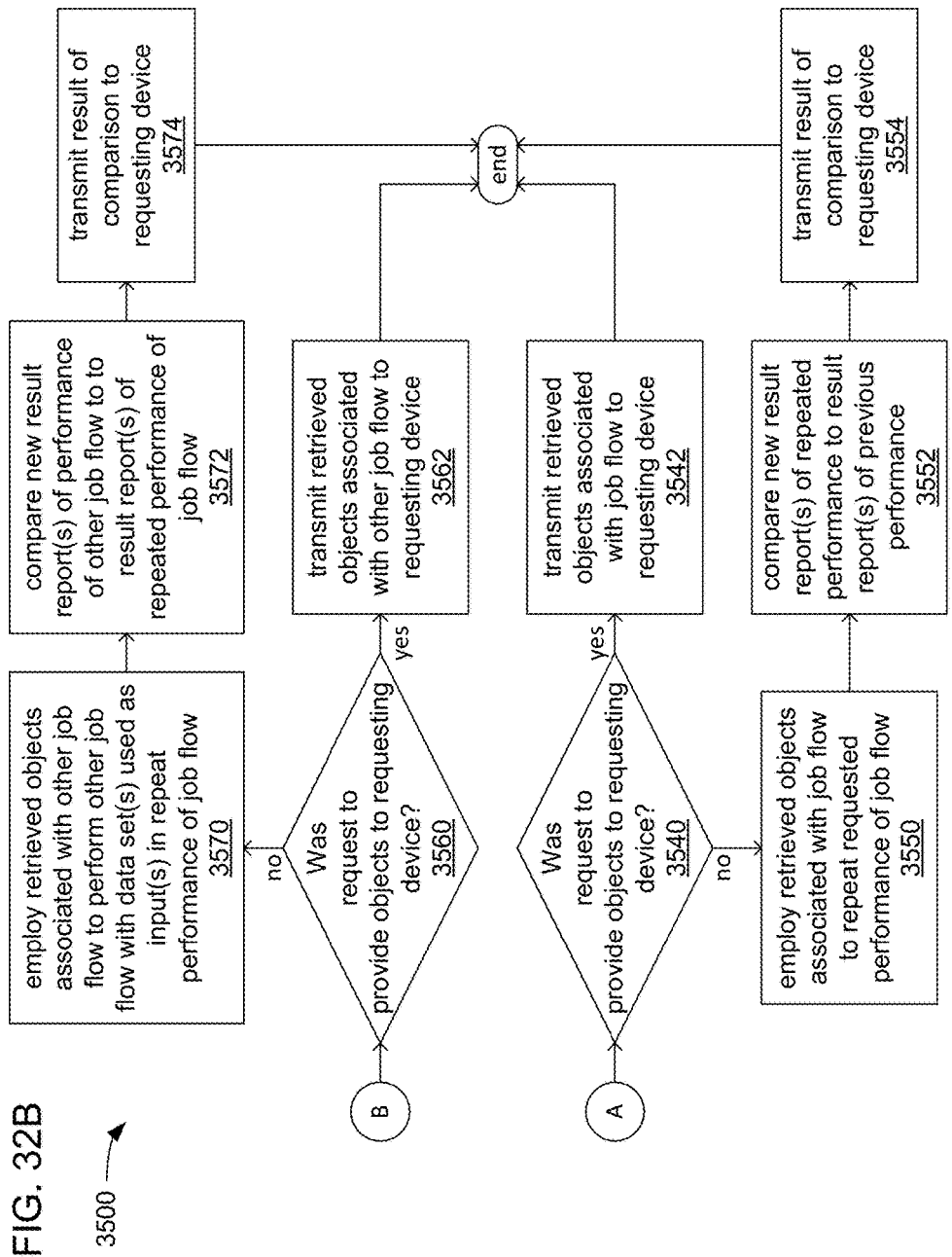

FIGS. 32A and 32B, together, illustrate an example embodiment of a logic flow 3500. The logic flow 3500 may be representative of some or all of the operations executed by one or more embodiments described herein. More specifically, the logic flow 3500 may illustrate operations performed by the processor(s) 2550 in executing the control routine 2540, and/or performed by other component(s) of at least one of the federated devices 2500.

At 3510, a processor of a federated device of a distributed processing system (e.g., at least one processor 2550 of one of the federated devices 2500 of the distributed processing system 2000) may receive a request from a device, via a network (e.g., one of the reviewing devices 2800 via the network 2999) and through a portal provided by the processor, to repeat a previous performance of a job flow that generated either a result report or an instance log (e.g., one of the result reports 2770 or one of the instance logs 2720) specified in the request (e.g., with a result report identifier 2771 or an instance log identifier 2721), or to provide the device with the objects (e.g., one or more of the objects 2220, 2330, 2370, 2440, 2720 and/or 2770) needed to enable the requesting device to do so. As previously discussed, persons and/or entities involved in peer reviewing and/or other forms of review of analyses may operate a device to make a request for one or more federated devices to repeat a performance of a job flow to verify an earlier performance, or may make a request for the objects needed to allow the persons and/or entities to independently repeat the performance.

At 3512, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of at least one federated area, and/or has been granted a level of access that includes the authorization to make such requests. As has been discussed, the processor may require the receipt of one or more security credentials from devices from which requests are received. If, at 3512, the processor determines that the request is not from a device and/or user authorized to make such a request, then the processor may transmit an indication of denial of the request to the device via the network at 3514.

However, if at 3512, the processor determines that the request either for a result report regenerated from a repeat performance of a job flow or for the objects needed from one or more federated areas to independently repeat the previous performance is authorized, then at 3520, if the a result report was specified for the previous performance in the request, instead of the instance log, then at 3522, the processor may the use the result report identifier provided in the request for the result report to retrieve the instance log for the previous performance.

At 3530, the processor may use the identifiers specified in the instance log for the objects associated with the previous performance to retrieve each of those objects. It should be noted that, as has been previously discussed, searches for objects to fulfill such a request received from a particular device may be limited to the one or more federated areas to which that requesting device and/or a user operating the requesting device has been granted access (e.g., a particular private or intervening federated area, as well as any base federated area and/or any other intervening federated area interposed therebetween). Therefore, the retrieval of objects needed to independently regenerate the result report may necessarily be limited to such authorized federated area(s).

At 3532, the processor may check whether the job flow relies on the use of a neural network that was trained using one or more performances of another job flow that does not relay on the use of a neural network. If so, then at 3534, the processor may use an identifier in either of the job flow definition or instance log retrieved for the previous performance that provides a link to the job flow definition or instance log of the other job flow to retrieve objects associated with the other job flow and/or one or more performances of the other job flow.

Regardless of whether the job flow of the previous performance referred to in the request relies on the use of a neural network, if, at 3540, the request was to provide the objects needed to enable an independent repeat of the previous performance of the job flow referred to in the request, then at 3542, the processor may transmit the retrieved objects associated with that previous performance to the requesting device to so enable such an independent repeat performance. As previously discussed, the regenerated result report may be compared at the requesting device to the result report that was previously generated during the previous performance to verify one or more aspects of the previous performance. However, if at 3540, the request received was not to so provide the retrieved objects, but instead, was for one or more federated devices to repeat the previous performance of the job flow, then the processor may employ the objects retrieved at 3530 to repeat the previous performance, and thereby regenerate the result report. As previously discussed, in some embodiments, including embodiments in which one or more of the data sets associated with the previous performance is relatively large in size, the processor of the federated device may cooperate with the processors of multiple other federated devices (e.g., operate as the federated device grid 1005) to portions of the repeat performance among multiple federate devices to be carried out at least partially in parallel. At 3552, the processor may compare the regenerated result report to the result report previously generated in the previous performance of the job flow. The processor may then transmit the results of that comparison to the requesting device at 3554.

However, if, at 3532, the job flow of the previous performance referred to in the request does rely on the use of a neural network, then, in addition to retrieving objects associated with the other job flow at 3534, the processor may check at 3560 whether the request was to provide the objects needed to enable an independent repeat of the previous performance. If so, then at 3562, the processor may transmit the retrieved objects associated with that other job flow to the requesting device to enable aspects of the other job flow and/or one or more performances thereof to also be evaluated. However, if at 3560, the request received was not to so provide the retrieved objects, but instead, was for one or more federated devices to repeat the previous performance of the job flow, then at 3570, the processor may employ the objects retrieved at 3534 to perform the other job flow, and do so with the data set(s) associated with the previous performance of the job flow referred to in the request. At 3572, the processor may compare the result report(s) generated by the performance of the other job flow to the corresponding result reports regenerated from the repetition at 3550 of the previous performance of the job flow referred to in the request. The processor may then transmit the results of that comparison to the requesting device at 3574.

Figure 33A:
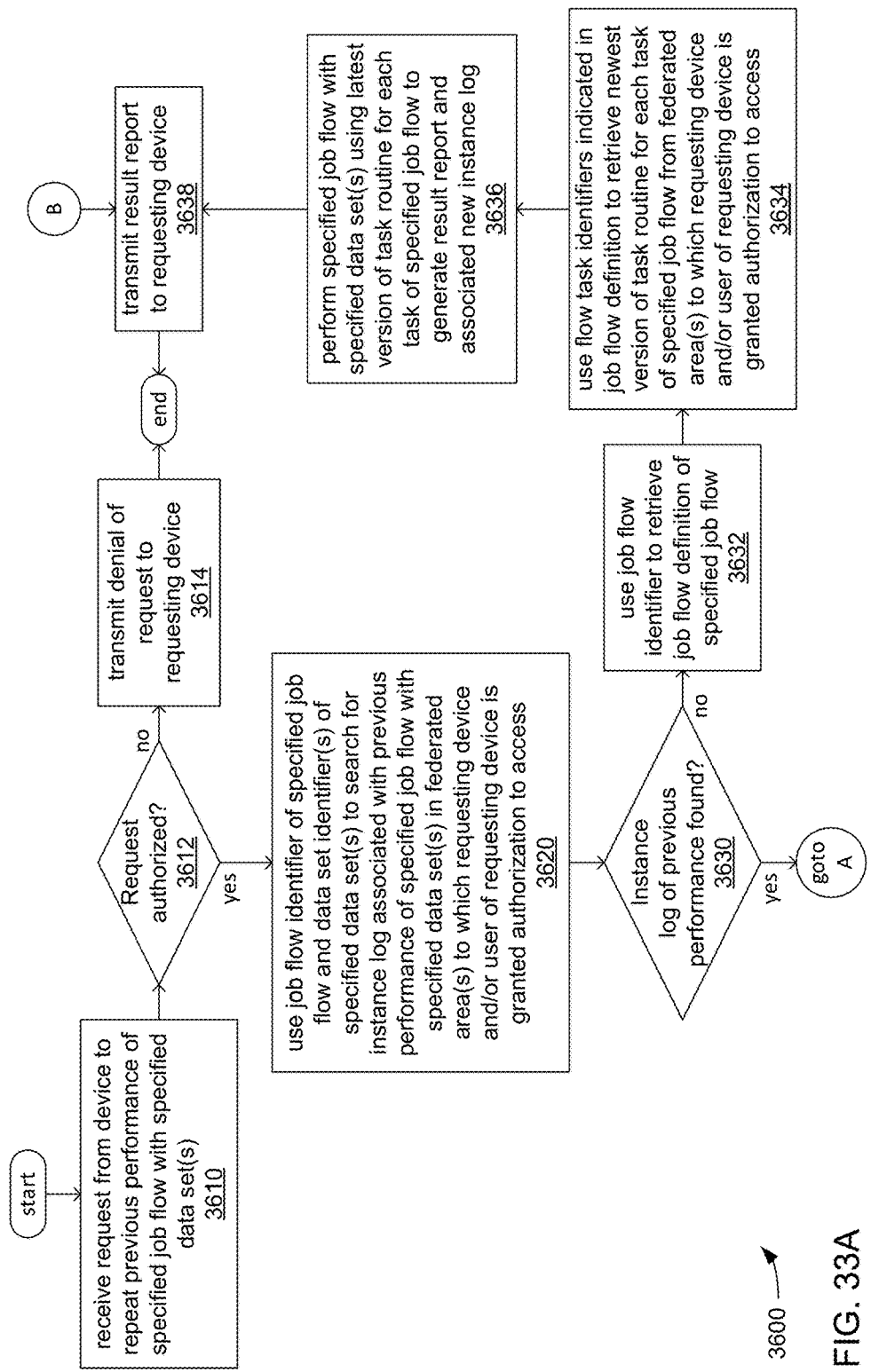

FIGS. 33A and 33B, together, illustrate an example embodiment of a logic flow 3600. The logic flow 3600 may be representative of some or all of the operations executed by one or more embodiments described herein. More specifically, the logic flow 3600 may illustrate operations performed by the processor(s) 2550 in executing the control routine 2540, and/or performed by other component(s) of at least one of the federated devices 2500.

At 3610, a processor of a federated device of a distributed processing system (e.g., at least one processor 2550 of one of the federated devices 2500 of the distributed processing system 2000) may receive a request from a device, via a network (e.g., one of the reviewing devices 2800 via the network 2999) and through a portal provided by the processor, to repeat a previous performance a job flow with one or more data sets (e.g. one or more of the data sets 2330) specified in the request by a job flow identifier and one or more data object identifiers (e.g., one of the job flow identifiers 2221, and one or more of the data object identifiers 2331). As previously discussed, persons and/or entities involved either in consuming results of analyses or in reviewing past performances of analyses may operate a device to make a request for one or more federated devices to repeat a performance of a job flow.

At 3612, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of at least one federated area, and/or has been granted a level of access that includes the authorization to make such requests. As has been discussed, the processor may require the receipt of one or more security credentials from devices from which requests are received. If, at 3612, the processor determines that the request is not from a device and/or user authorized to make such a request, then the processor may transmit an indication of denial of the request to the device via the network at 3614.

However, if at 3612, the processor determines that the request for a repeat of a performance of the specified job flow with the specified one or more data sets is authorized, then at 3620, the processor may the use the combination of the job flow identifier and the one or more data object identifiers to search within one or more federated areas to which the requesting device and/or a user of the requesting device has been granted access for an instance log associated with a previous performance of the job flow with the one or more data sets.

It should be noted that, as has been previously discussed, searches for objects to fulfill such a request received from a particular device may be limited to the one or more federated areas to which that requesting device and/or a user operating the requesting device has been granted access (e.g., a particular private or intervening federated area, as well as any base federated area and/or any other intervening federated area interposed therebetween). Therefore, the retrieval of objects needed to repeat a previous performance of a job flow may necessarily be limited to such authorized federated area(s).

If, at 3630, the processor determines, as a result of the search at 3620, that there is no such instance log, then at 3632, the processor may retrieve the job flow definition specified by the job flow identifier provided in the request (e.g., one of the job flow definitions 2220) from the one or more federated areas for which authorization to access has been granted to the requesting device and/or the user of the requesting device. At 3634, the processor may then retrieve the most recent version of task routine for each task specified in the job flow definition by a flow task identifier (e.g., one or more of the task routines 2440, each specified by a flow task identifiers 2241) from the one or more federated areas to which access has been granted. At 3636, the processor may retrieve each of the one or more data sets specified by the one or more data object identifiers from the one or more federated areas to which access has been granted, and may then use the retrieved job flow definition, the retrieved newest versions of task routines, and the retrieved one or more data sets to perform the job flow as requested. At 3638, the processor may transmit the results of the performance to the requesting device. As an alternative to (or in addition to) performing the job flow with the most recent versions of the task routines, the processor may transmit an indication to the requesting device that no record has been found of a previous performance in the one or more federated areas to which access has been granted.

However, if at 3630, the processor successfully locates (during the search at 3620) such an instance log, then the processor may additionally determine at 3640 whether there is more than one such instance log, each of which is associated with a different performance of the job flow with the one or more data sets specified in the request. If, at 3640, only one such instance log was located during the search at 3620, then at 3650, the processor may then retrieve the versions specified in the instance log of each of the task routines specified in the job flow definition for each task by a flow task identifier from the one or more federated areas to which access has been granted. At 3652, the processor may retrieve each of the one or more data sets specified by the one or more data object identifiers from the one or more federated areas to which access has been granted, and may then use the retrieved job flow definition, the retrieved specified versions of task routines, and the retrieved one or more data sets to perform the job flow as requested. At 3654, the processor may additionally retrieve the result report generated in the previous performance of the job flow from the one or more federated areas to which access has been granted, and may compare the retrieved result report to the new result report generated in the new performance of the job flow at 3656. At 3658, the processor may transmit the results of the comparison of result reports to the requesting device, and may transmit the new result report, itself, to the requesting device at 3658.

However, if at 3640, there is more than one such instance log located found during the search at 3620, then the processor may transmit an indication of the available selection of the multiple previous performances that correspond to the multiple located instance logs to the requesting device at 3642 with a request that one of the multiple previous performances be selected as the one from which the instance log will be used. The processor may then await receipt of an indication of a selection of one of the multiple previous performances at 3644 before proceeding to retrieve specific versions of task routines at 3650.

Figure 34A:
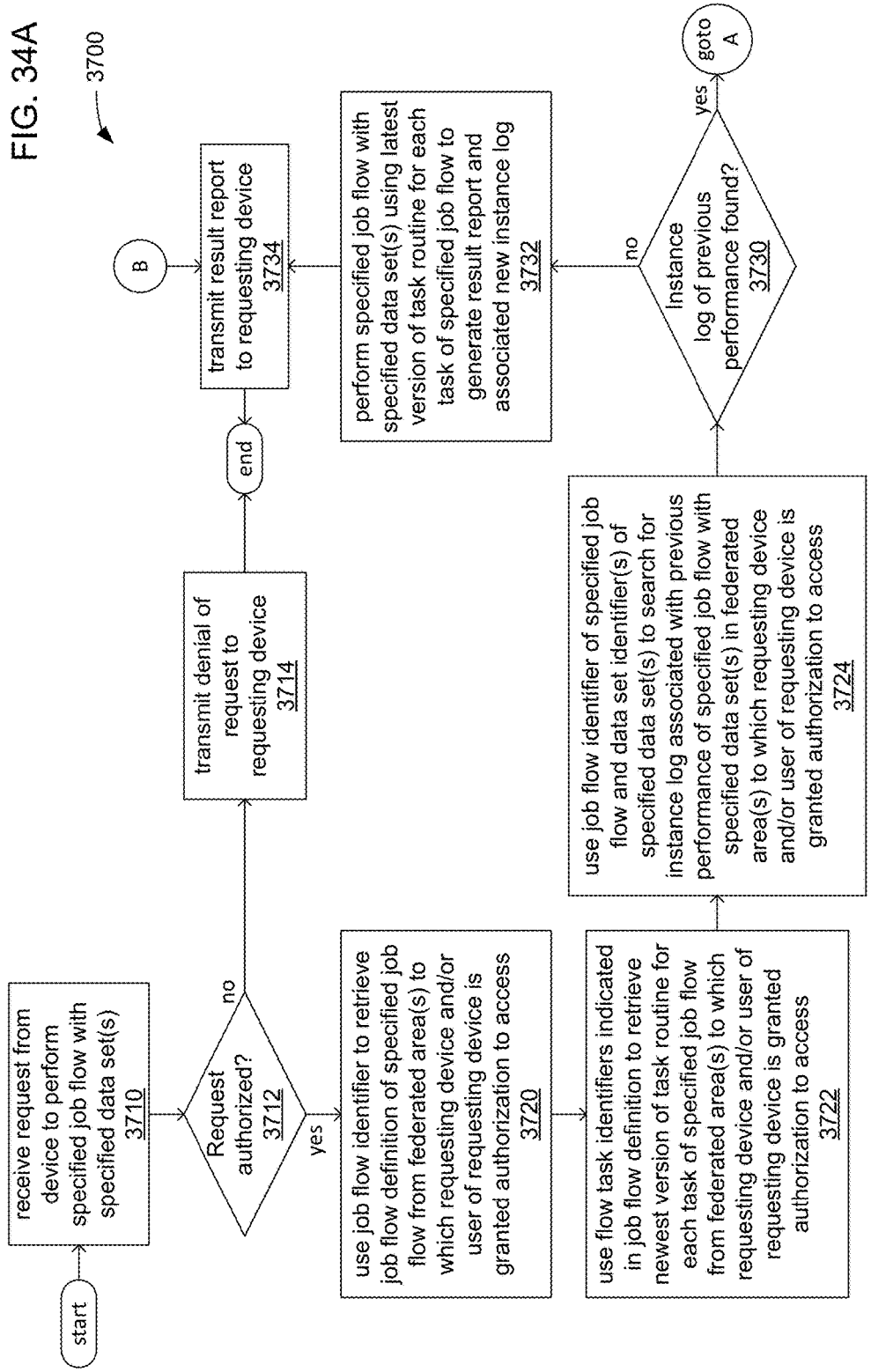
FIGS. 34A and 34B, together, illustrate another example embodiment of a logic flow of a federated device performing a job flow.
Figure 34B:
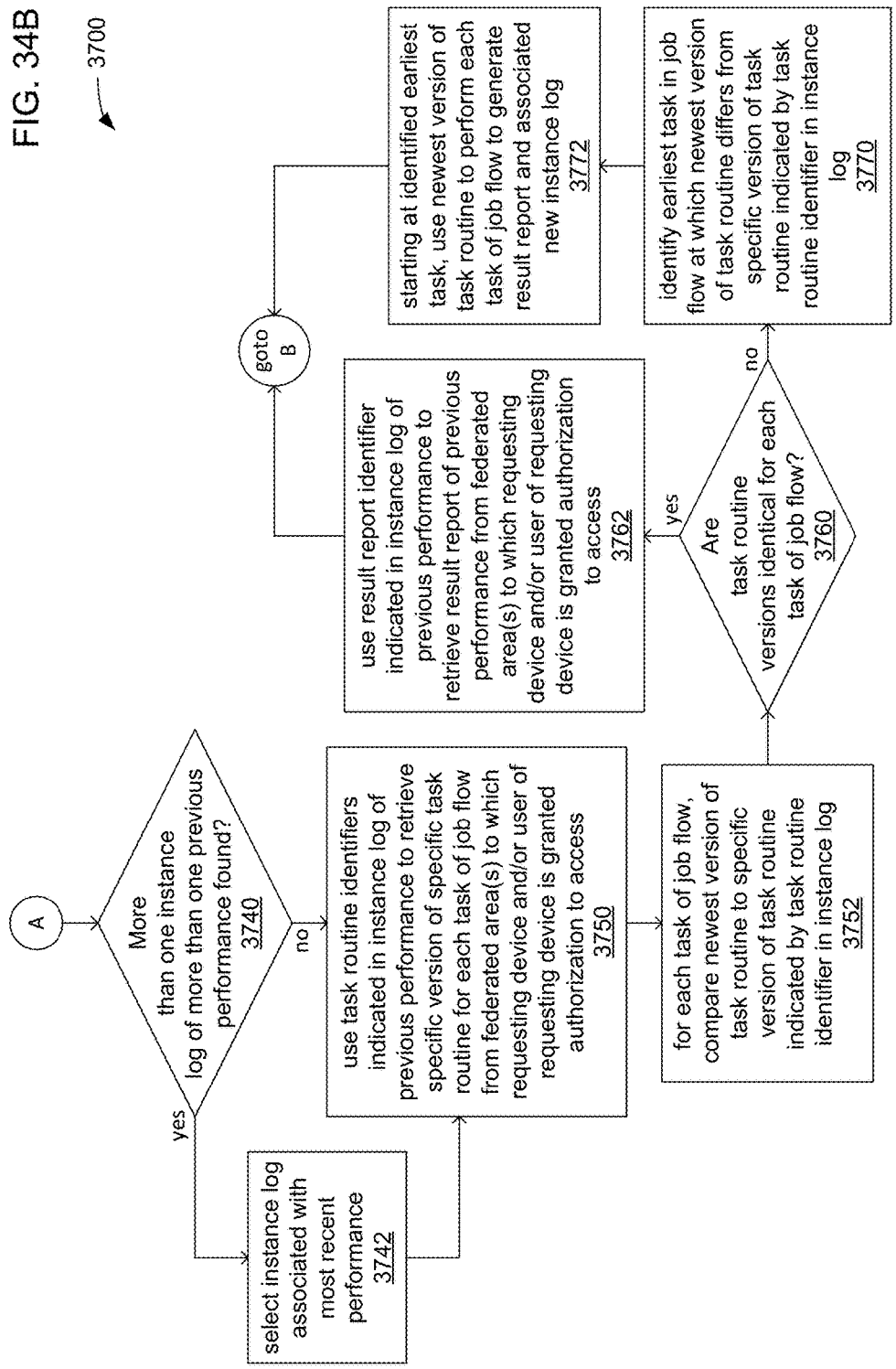

FIGS. 34A and 34B, together, illustrate an example embodiment of a logic flow 3700. The logic flow 3700 may be representative of some or all of the operations executed by one or more embodiments described herein. More specifically, the logic flow 3700 may illustrate operations performed by the processor(s) 2550 in executing the control routine 2540, and/or performed by other component(s) of at least one of the federated devices 2500.

At 3710, a processor of a federated device of a distributed processing system (e.g., at least one processor 2550 of one of the federated devices 2500 of the distributed processing system 2000) may receive a request from a device, via a network (e.g., one of the reviewing devices 2800 via the network 2999) and through a portal provided by the processor, to perform a job flow with one or more data sets (e.g. one or more of the data sets 2330) specified in the request by a job flow identifier and one or more data object identifiers (e.g., one of the job flow identifiers 2221, and one or more of the data object identifiers 2331).

At 3712, in embodiments in which the federated device(s) that provide federated area(s) also control access thereto, the processor may perform a check of whether the request is from an authorized device and/or from an authorized person or entity (e.g., scholastic, governmental or business entity) operating the device that is an authorized user of at least one federated area, and/or has been granted a level of access that includes the authorization to make such requests. As has been discussed, the processor may require the receipt of one or more security credentials from devices from which requests are received. If, at 3712, the processor determines that the request is not from a device and/or user authorized to make such a request, then the processor may transmit an indication of denial of the request to the device via the network at 3714.

However, if at 3712, the processor determines that the request for a performance of the specified job flow with the specified one or more data sets is authorized, then at 3720, the processor may the use the job flow identifier provided in the request to retrieve the corresponding job flow definition (e.g., one of the job flow definitions 2220) from within one or more federated areas to which the requesting device and/or a user of the requesting device has been granted access. At 3722, the processor may then retrieve the most recent version of task routine for each task specified in the job flow definition by a flow task identifier (e.g., one or more of the task routines 1440, each specified by a flow task identifiers 1241) that is stored within the one or more federated areas to which the requesting device and/or a user of the requesting device has been granted access.

It should be noted that, as has been previously discussed, searches for objects to fulfill such a request received from a particular device may be limited to the one or more federated areas to which that requesting device and/or a user operating the requesting device has been granted access (e.g., a particular private or intervening federated area, as well as any base federated area and/or any other intervening federated area interposed therebetween). Therefore, the retrieval of objects needed to perform a specified job flow may necessarily be limited to such authorized federated area(s).

At 3724, the processor may use the combination of the job flow identifier and the one or more data object identifiers to search for an instance log associated with a previous performance of the job flow with the one or more data sets within the one or more federated areas to which the requesting device and/or a user of the requesting device has been granted access. If, at 3730, the processor determines (during the search at 3724) that there is no such instance log, then at 3732, the processor may retrieve each of the one or more data sets specified by the one or more data object identifiers from the one or more federated areas to which the requesting device and/or a user of the requesting device has been granted access, and may then use the retrieved job flow definition, the retrieved newest versions of task routines, and the retrieved one or more data sets to perform the job flow as requested. At 3734, the processor may transmit the results of the performance to the requesting device.

However, if at 3730, the processor successfully locates such an instance log (during the search at 3724), then the processor may additionally determine at 3740 whether there is more than one such instance log, each of which is associated with a different performance of the job flow with the one or more data sets specified in the request. If only one such instance log is located at 3740, then at 3750, the processor may then retrieve the versions specified in the instance log of each of the task routines for each task specified in the job flow definition by a flow task identifier from the one or more federated areas to which the requesting device and/or a user of the requesting device has been granted access. However, if at 3740, there is more than one such instance log located, then the processor may analyze the multiple instance logs to identify and select the instance log from among the multiple instance logs that is associated with the most recent performance of the job flow at 3742, before proceeding to retrieve specified versions task routines for each task of the job flow at 3750.

At 3752, for each task specified in the job flow definition, the processor may compare the retrieved version of the task routine identified in the instance log to the newest version stored within the one or more federated areas to which the requesting device and/or a user of the requesting device has been granted access to determine whether each of the retrieved task routines is the newest version. At 3760, if each of the retrieved task routines is the newest version thereof, then there is no need to perform the job flow anew, as the most recent previous performance (or the only previous performance) already used the newest version of each task routine such that the result report generated is already the most up to date form of the result report, possible. Thus, at 3762, the processor may retrieve the result report of that previous performance using the result report identifier specified by the instance log from the one or more federated areas to which the requesting device and/or a user of the requesting device has been granted access, and may then transmit the result report to the requesting device at 3734.

However, if at 3760, one or more of the task routines specified in the instance log and retrieved from the one or more federated areas to which the requesting device and/or a user of the requesting device has been granted access is not the newest version thereof, then at 3770, the processor may parse the job flow set forth in the job flow definition to identify the earliest task within the job flow at which the version of the task routine so retrieved is not the newest version. At 3772, starting at that earliest task, the processor may use the newest version of task routine for that task and for each later task in the job flow to perform that task and each of the later tasks, thereby taking advantage of the one or more earlier tasks of job flow at which the newest version of task routine was used in the most recent previous performance (or the only previous performance). The processor may then transmit the result report generated in such a partial performance of the job flow to the requesting device at 3734.

Figure 35:
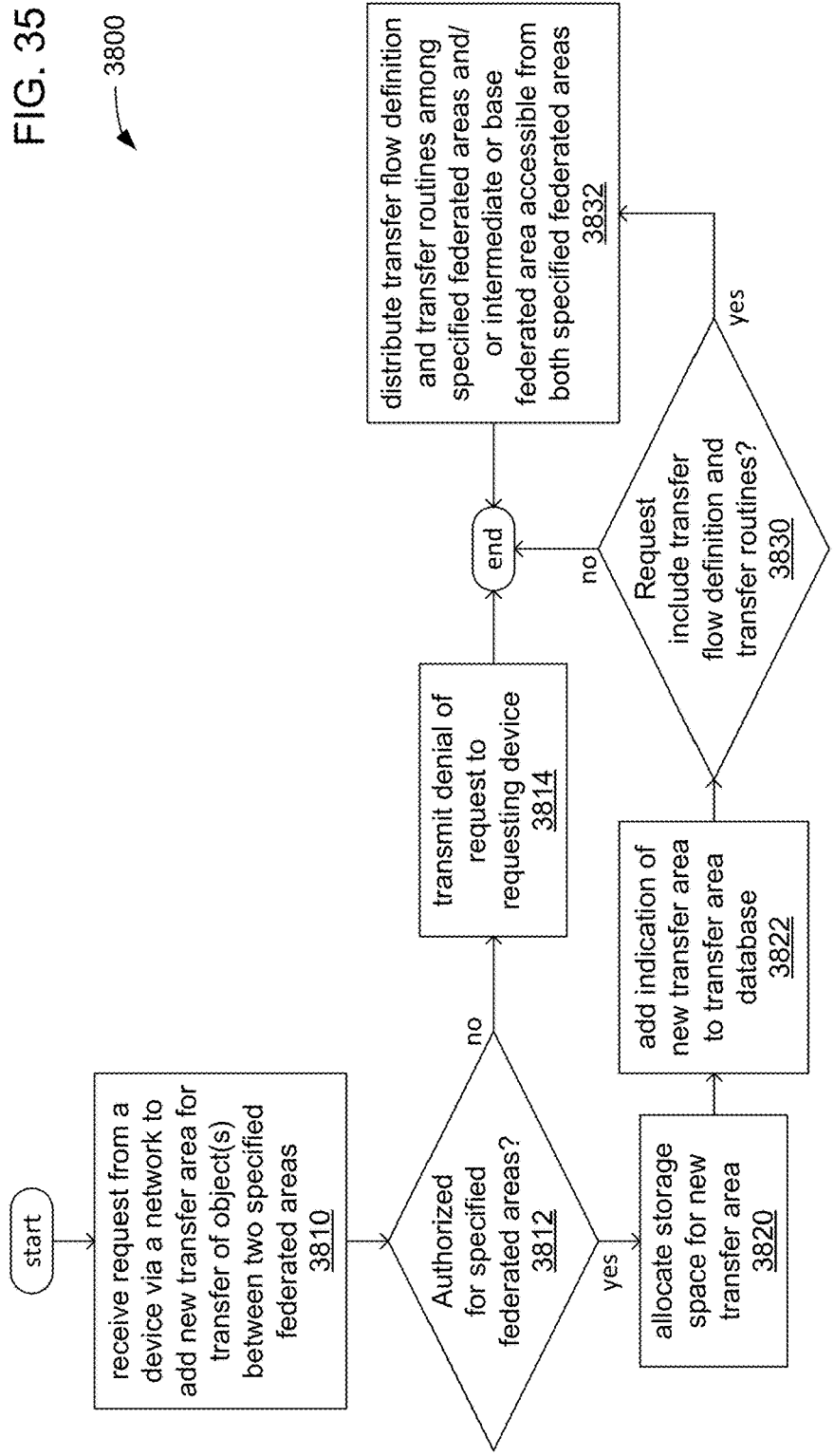
FIG. 35 illustrates an example embodiment of a logic flow of instantiation of a transfer area for the automated transfer of object(s) between two federated areas.

FIG. 35 illustrates an example embodiment of a logic flow 3800. The logic flow 3800 may be representative of some or all of the operations executed by one or more embodiments described herein. More specifically, the logic flow 3800 may illustrate operations performed by the processor(s) 2550 in executing the control routine 2540, and/or performed by other component(s) of at least one of the federated devices 2500.

At 3810, a processor of a federated device of a distributed processing system (e.g., at least one processor 2550 of one of the federated devices 2500 of the distributed processing system 2000) may receive a request from a device, via a network (e.g., one of the source devices 2100, or one of the reviewing devices 2800, via the network 2999) and through a portal provided by the processor for access to other devices via the network, to instantiate a transfer area (e.g., one of the transfer areas 2666) for use in transferring one or more objects between two federated areas specified in the request (e.g., two of the federated areas 2566). As has been discussed, such an automated transfer relationship making such use of a transfer area may be put in place between any two federated areas within a set of related federated areas, such as between federated areas in different branches of a hierarchical tree of federated areas.

At 3812, in embodiments in which the federated device(s) that provide federated area(s) also control access to thereto, the processor may perform a check of whether the request is from an authorized device and/or from an authorized person or entity (e.g., scholastic, governmental or business entity) operating the device that is an authorized user of the specified federated areas (as well as for any related base federated area and/or any related intervening federated area), and/or has been granted a level of access that includes the authorization to make such requests. If, at 3812, the processor determines that the request is not from an authorized device and/or is not from a person and/or entity authorized as a user with sufficient access to make such a request, then the processor may transmit an indication of denial of the request to the device from which the request is received via the network at 3814.

However, if at 3812, the processor determines that the request is authorized, then at 3820, the processor may allocate storage space for the requested new transfer area. As previously discussed, the allocation of storage space for a new transfer area may entail manipulating the two federated areas between which object(s) are to be transferred through the new transfer area to create a storage area where the two federated areas overlap, and positioning the new transfer area within that overlapping storage area. However, as also previously discussed, the allocation of storage space for a new transfer area may entail positioning the new transfer area within a base federated area or an intervening federated area to which the two federated areas between which object(s) are to be transferred are both related (e.g., from which the two federated areas both branch). At 3822, the processor may add an indication of the creation of the requested new transfer area, as well as indications of the two specified federated areas between which object(s) are to be transferred through the new transfer area, to a transfer area database (e.g., within the transfer area parameters 2636).

At 3830, the processor may check whether a transfer flow definition and transfer routine(s) (e.g., one of the transfer flow definitions 2620, and one or more of the transfer routines 2640) were received with the request from the requesting device. As has been discussed, various aspects of the automated transfers of one or more objects that are to be performed using a transfer area may be specified in a transfer flow definition such that the transfer flow definition, including and not limited to, identifiers of the transfer routine(s) to be executed to effect such automated transfers, indications of what object(s) are to be automatically transferred when one or more conditions are met, and/or the one or more conditions that may trigger such automated transfer(s).

If, at 3830, a transfer flow definition and transfer routine(s) were received with the request, then at 3832, the processor may distribute the transfer flow definition and transfer routine(s) among the two specified federated areas and/or among any base federated area and/or intervening federated area to which both of the specified federated areas are related within the set of related federated areas of which the two specified federated areas belong. As has been discussed, a transfer flow definition may be stored within its associated transfer area, may be stored alongside its associated transfer area within the storage space that falls within an overlap of the two federated areas between which transfers are to be performed, or within a base federated area or an intermediate federated area from which branch the two federated areas between which transfers are to be performed. As has also been discussed, transfer routine(s) may be stored within one or both of the two federated areas between which transfers are to be performed, and/or within a base federated area or an intermediate federated area from which branch the two federated areas between which transfers are to be performed.

FIG. 36 illustrates an example embodiment of a logic flow 3900. The logic flow 3900 may be representative of some or all of the operations executed by one or more embodiments described herein. More specifically, the logic flow 3900 may illustrate operations performed by the processor(s) 2550 in executing the control routine 2540, and/or performed by other component(s) of at least one of the federated devices 2500.

At 3910, a processor of a federated device of a distributed processing system (e.g., at least one processor 2550 of one of the federated devices 2500 of the distributed processing system 2000) may perform a first job flow in accordance with a first job flow definition (e.g., one of the job flow definitions 2220) with first data set(s) and/or first task routine(s) (e.g., with one or more of the data sets 2330 and/or 2370, and/or with one or more of the task routines 2440) at least partially within a first federated area (e.g., within one of the federated areas 2566) of a set of related federated areas provided by at least the one federated device.

At 3920, the processor may perform a first part of a transfer flow defined by a transfer flow definition (e.g., one of the transfer flow definitions 2620) by executing a first transfer routine (e.g., one of the transfer routines 2640) that causes the processor to analyze one or more objects generated by the performance of the first job flow. As has been discussed, an automated transfer of object(s) of a transfer flow is conditioned on one or more specified conditions being met, as determined by an analysis of one or more objects that may be generated by the performance of a job flow. As has also been discussed, the execution of the first transfer routine may be within the first federated area. In so executing the first transfer routine, the processor may check at 3922 whether a condition has been met to trigger the automated transfer of copies of one or more objects from the first federated area and into a transfer area associated with the transfer flow. If, at 3922, the processor determines that the condition has not been met, then at 3930, if there is to be another performance of the first job flow, then the processor may again so perform the first job flow at 3910.

However, if at 3922, the processor determines that the condition has been met, then the processor may perform a second part of the transfer flow defined by the transfer flow definition by performing the transfer of copies of the one or more objects from the first federated area and into the transfer area at 3940. At 3942, the processor (or another processor of the same federated device or of a different federated device of the distributed processing system) may continue the performance of the second part of the transfer flow by retrieving the copies of the one or more objects from the transfer area, and storing the copies of the one or more objects into a second federated area of the set of related federated areas. As has been discussed, effecting such retrieval of copies of objects from a transfer area may entail a processor of the same or different federated device executing a second transfer routine within the second federated area. In so executing the second transfer routine, such a processor may be caused to recurringly check the transfer area to determine whether the copies of the one or more objects have been transferred thereto from the first federated area, and may be triggered to so retrieve them upon determining that they have been so transferred thereto.

At 3950, the processor (or another processor of the same federated device or of a different federated device of the distributed processing system) may perform a second job flow in accordance with a second job flow definition with the copies of the one or more transferred objects, second data set(s) and/or second task routine(s) at least partially within the second federated area.

FIGS. 37A and 37B, together, illustrate an example embodiment of a logic flow 4000. The logic flow 4000 may be representative of some or all of the operations executed by one or more embodiments described herein. More specifically, the logic flow 4000 may illustrate operations performed by the processor(s) 2550 in executing the control routine 2540, and/or performed by other component(s) of at least one of the federated devices 2500.

At 4010, a training data set may be generated from a larger data set (e.g., the training data set 2330*t* generated from the larger data set 2330*x*). As was also discussed in reference to FIG. 23A, such a training data set may be generated through any of a variety of automated statistical analyses (e.g., using one or more processors of one or more federated devices) that generates the training data set to have one or more characteristics that are representative of the larger data set, and/or to emphasize and/or de-emphasize one or more characteristics of the larger data set in preparation for training a neural network.

At 4012, a processor of a federated device of a distributed processing system (e.g., at least one processor 2550 of one of the federated devices 2500 of the distributed processing system 2000) may perform multiple iterations of a training job flow in accordance with a training job flow definition (e.g., the job flow definition 2220*t*) with the training data set and one or more training task routines (e.g., with one or more of the task routines 2440*t*) at least partially within a first federated area (e.g., within the federated area 2566*t*) of a set of related federated areas provided by at least the one federated device.

At 4020, the processor may perform a first part of a transfer flow defined by a transfer flow definition (e.g., the transfer flow definition 2620*tuv*) by executing a first transfer routine (e.g., the transfer routine 2640*t*) that causes the processor to analyze an iteration of a result report generated by an iteration of performance of the training job flow (e.g., the an iteration of the result report 2770*t*), where each iteration of that result report may be indicative of the degree to which the neural network has been successfully trained. In executing the first transfer routine, the processor may check at 4022 whether a condition has been met to trigger the automated transfer of a copy of the data set of neural net weights and biases from the first federated area and into a first transfer area associated with the transfer flow. As discussed, such a condition may be a threshold degree to which the neural network has been successfully trained and/or a minimum number of iterations of performance of the training job flow. If, at 4022, the processor determines that the condition has not been met, then at 4030, if there is to be another performance of the training job flow, then the processor may perform another of the multiple iterations of the training job flow at 4012.

However, if at 4022, the processor determines that the condition has been met, then the processor may perform a second part of the transfer flow defined by the transfer flow definition by performing the transfer into the first transfer area, at 4040, of a copy of a data set that includes values for weights and biases of the neural net being trained through the repeated performances of the training job flow, and which has been generated by those repeated performances. At 4042, the processor (or another processor of the same federated device or of a different federated device of the distributed processing system) may continue the performance of the second part of the transfer flow by retrieving the copy of the data set of neural net weights and biases from the first transfer area, and storing the copy into a second federated area of the set of related federated areas. As has been discussed, effecting such retrieval of copies of objects from a transfer area may entail a processor of the same or different federated device executing a second transfer routine within the second federated area. In so executing the second transfer routine, such a processor may be caused to recurringly check the first transfer area to determine whether the copy of the data set of neural net weights and biases has been transferred thereto from the first federated area, and may be triggered to so retrieve it upon determining that it has been so transferred thereto.

At 4050, a testing data set may be generated from the larger data set (e.g., the testing data set 2330*u* generated from the larger data set 2330*x*). As previously discussed, like the training data set, such a testing data set may be generated through any of a variety of automated statistical analyses (e.g., using one or more processors of one or more federated devices) that generates the testing data set to have one or more characteristics that are representative of the larger data set, and/or to emphasize and/or de-emphasize one or more characteristics of the larger data set in preparation for testing the neural network defined by the data set of neural net weights and biases.

At 4052, the processor (or another processor of the same federated device or of a different federated device of the distributed processing system) may perform multiple iterations of a testing job flow in accordance with a testing job flow definition (e.g., the job flow definition 2220*u*) with the copy of the data set of neural net weights and biases, the testing data set and one or more testing task routines (e.g., with one or more of the task routines 2440*u*) at least partially within the second federated area (e.g., within the federated area 2566*u*) of a set of related federated areas provided by at least the one federated device.

At 4060, the processor (or other processor of the same or different federated device) may perform a third part of the transfer flow by further executing the second transfer routine, thereby causing such a processor to analyze an iteration of a result report generated by an iteration of performance of the testing job flow (e.g., the an iteration of the result report 2770*u*), where each iteration of that result report may be indicative of the degree to which the neural network has been tested and/or found to perform its function successfully. In executing the second transfer routine, the processor may check at 4062 whether a condition has been met to trigger the automated transfer of a copy of the data set of neural net weights and biases from the second federated area and into a second transfer area associated with the transfer flow. As discussed, such a condition may be a threshold degree to which the neural network has been tested and/or found to perform its function successfully, and/or a minimum number of iterations of performance of the testing job flow. If, at 4062, the processor (or other processor of the same or different federated device) determines that the condition has not been met, then at 4070, if there is to be another performance of the testing job flow, then such a processor may perform another of the multiple iterations of the testing job flow at 4052.

However, if at 4062, the processor determines that the condition has been met, then the processor may perform a fourth part of the transfer flow defined by the transfer flow definition by performing the transfer into the second transfer area, at 4080, of a copy of a data set of neural net weights and biases. At 4082, the processor (or another processor of the same federated device or of a different federated device of the distributed processing system) may continue the performance of the fourth part of the transfer flow by retrieving the copy of the data set of neural net weights and biases from the second transfer area, and storing the copy into a third federated area of the set of related federated areas. Again, effecting such retrieval of copies of objects from a transfer area may entail a processor of the same or different federated device executing a third transfer routine within the third federated area. In so executing the third transfer routine, such a processor may be caused to recurringly check the second transfer area to determine whether the copy of the data set of neural net weights and biases has been transferred thereto from the second federated area, and may be triggered to so retrieve it upon determining that it has been so transferred thereto.

At 4090, the processor (or another processor of the same federated device or of a different federated device of the distributed processing system) may perform commence multiple iterations of performances of experimental use of the neural network through the performance of multiple iterations of experimental use job flows with the data set of neural net weights and biases and/or another portion of the larger data set.

Figure 38:
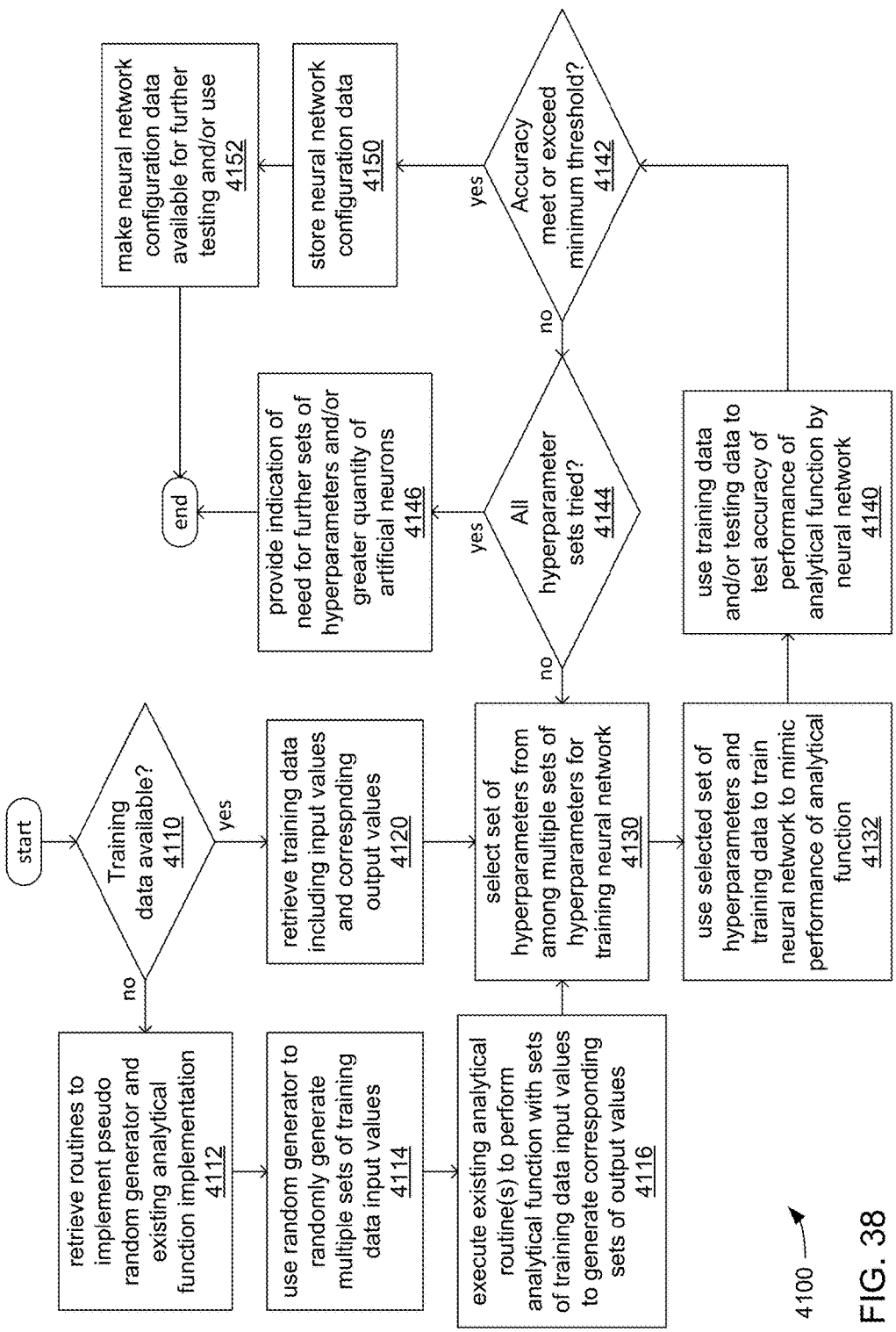
FIG. 38 illustrates an example embodiment of a logic flow of training a neural network.

FIG. 38 illustrates an example embodiment of a logic flow 4100. The logic flow 4100 may be representative of some or all of the operations executed by one or more embodiments described herein. More specifically, the logic flow 4100 may illustrate operations performed by the processor(s) 2550 in executing the control routine 2540, and/or performed by other component(s) of at least one of the federated devices 2500.

At 4110, a processor of a federated device of a distributed processing system (e.g., at least one processor 2550 of one of the federated devices 2500 of the distributed processing system 2000) may check whether training data to train a neural network (e.g., the neural network 2571) to perform an analytical function is available that includes sets of input values along with corresponding sets of output values (e.g., the data set 2330$t$ and corresponding result report 2770$t$). As has been discussed, such paired sets of input values and output values, if available, may be drawn from data sets and corresponding result reports from past performances of a non-neuromorphic implementation of an analytical function, and used to train a neural network for a neuromorphic implementation of the same analytical function. If, at 4110, such training data is available, then at 4120, the processor may retrieve it.

However, if at 4110, such training data is not available, then at 4112, the processor may retrieve one or more routines needed to implement a pseudo random generator (e.g., the one or more task routines 2440$s$) to generate sets of input values for inclusion in training data (e.g., to become the data set 2330$t$). The processor may also retrieve one or more routines needed to perform the existing non-neuromorphic implementation of the analytical function (e.g., the one or more task routines 2440$x$) with the randomly generated sets of input values as input to generate corresponding sets of output values for inclusion in the training data (e.g., to generate the result report 2770$t$). At 4114, the processor may execute the one or more routines of the random generator to so generate the sets of input values. Then, at 4116, the processor may execute the one or more routines of the non-neuromorphic implementation of the analytical function to so use the randomly generated sets of input values as inputs to generate the corresponding sets of output values.

Regardless of whether the training data is retrieved or must be generated, at 4130, the processor may then select a set of hyperparameters that define structural features of the neural network from among multiple sets of hyperparameters in preparation for the training of the neural network. At 4132, the processor may use the selected set of hyperparameters and the training data to train the neural network. At 4140, the processor may use additional training data and/or testing data (e.g., the data set 2330$u$ and corresponding result report 2770$u$) to test the degree of accuracy with which the neural network performs the analytical function.

If, at 4142, the degree of accuracy does not at least meet a predetermined minimum threshold of accuracy, then at 4144, the processor may check whether there is another set of hyperparameters for structural features of the neural network that have not yet been tried. If so, then the processor may select another set of hyperparameters at 4130 in preparation for retraining the neural network. As has been discussed, the use of different sets of hyperparameters in defining structural features of a neural network, including the quantity of artificial neurons therein, can have an effect on its degree of accuracy in performing a particular function. However, if at 4144, there are no more sets of hyperparameters that have not yet been tried, then the processor may provide an indication at 4146 of a need for more sets of hyperparameters to try and/or a need for a larger quantity of artificial neurons to be made available for implementing the neural network.

However, if at 4142, the degree of accuracy of the neural network does at least meet the predetermined minimum threshold of accuracy, then the processor may store the neural network configuration data created as a result of the training (e.g., the data set 2370$t$) to enable that trained neural network configuration data to be made available at later time at 4152 for further testing and/or use of the neural network.

FIG. 39 illustrates an example embodiment of a logic flow 4200. The logic flow 4200 may be representative of some or all of the operations executed by one or more embodiments described herein. More specifically, the logic flow 4200 may illustrate operations performed by the processor(s) 2550 in executing the control routine 2540, and/or performed by other component(s) of at least one of the federated devices 2500.

At 4210, a processor of a federated device of a distributed processing system (e.g., at least one processor 2550 of one of the federated devices 2500 of the distributed processing system 2000) may retrieve one or more existing routines of a non-neuromorphic implementation of an analytical function (e.g., the one or more task routines 2440$x$). At 4212, the processor may also retrieve neural network configuration data that defines a neural network that has been trained to perform the same analytical function (e.g., the data set 2370$t$). At 4214, the processor may further retrieve a data set for use as input to performances of the analytical function (e.g., the data set 2330$u$, 2330$v$ or 2330$x$).

At 4220, the processor, possibly in cooperation with one or more other processors among multiple federated devices of the distributed processing system, executes the one or more routines of the non-neuromorphic implementation of the analytical function, and operates the neural network trained to provide the neuromorphic implementation, to cause both the non-neuromorphic and neuromorphic implementations to be performed at least partially in parallel with the earlier retrieved data set. At 4230, the processor may compare the sets of output values generated by each of the implementations of the analytical function from the same corresponding input values of the retrieved data set to test the degree of accuracy of the neural network in performing the analytical function.

If, at 4240, the degree of accuracy does not at least meet a predetermined minimum threshold of accuracy, then at 4242, the processor may provide an indication of the insufficient degree of accuracy of the neural network in performing the analytical function. However, if at 4240, the degree of accuracy of the neural network does at least meet the predetermined minimum threshold of accuracy, then at 4250, the processor may check whether the degree of accuracy at least meets a midway threshold of accuracy.

If, at 4250, the degree of accuracy does not at least meet the predetermined midway threshold of accuracy, then at 4252, the processor may use the combination of the retrieved data set and the corresponding output values generated by the non-neuromorphic implementation of the analytical function as addition training data to further train the neural network before retrieving still more input data at 4214 in preparation for performing still more testing. However, if at 4250, the degree of accuracy of the neural network does at least meet the predetermined midway threshold of accuracy, then at 4260, the processor may check whether the degree of accuracy at least meets a higher threshold of accuracy.

If, at 4260, the degree of accuracy does not at least meet the predetermined higher threshold of accuracy, then the processor may retrieve still more input data at 4214 in preparation for performing still more testing. However, if at 4260, the degree of accuracy of the neural network does at least meet the predetermined higher threshold of accuracy, then at 4262, the processor may make the neural network configuration data that defines the neural network available for further use without such parallel use of the non-neuromorphic implementation.

Figure 40C:
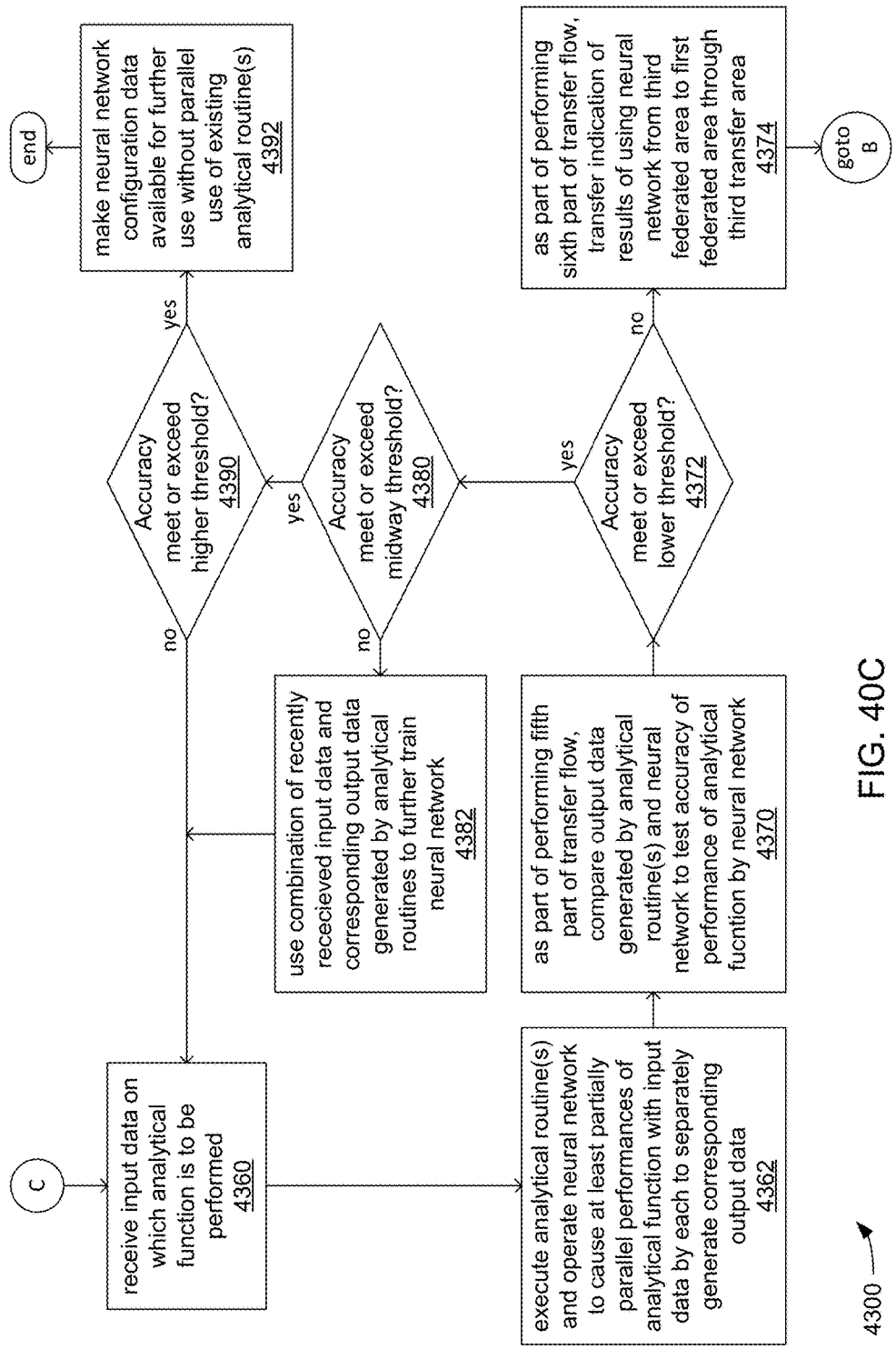

FIGS. 40A, 40B and 40C, together, illustrate an example embodiment of a logic flow 4300. The logic flow 4300 may be representative of some or all of the operations executed by one or more embodiments described herein. More specifically, the logic flow 4300 may illustrate operations performed by the processor(s) 2550 in executing the control routine 2540, and/or performed by other component(s) of at least one of the federated devices 2500.

At 4310, a processor of a federated device of a distributed processing system (e.g., at least one processor 2550 of one of the federated devices 2500 of the distributed processing system 2000) may generate training data (e.g., a combination of the data set 2330t and the corresponding result report 2770t), either from a larger data set and corresponding larger result report associated with previous performances of a non-neuromorphic implementation of an analytical function (e.g., a combination of the data set 2330x and the result report 2770x), or from a randomly generated data set and a corresponding result report generated from the randomly generated data set via the non-neuromorphic implementation of the analytical function.

4312, the processor may then select a set of hyperparameters that define structural features of the neural network from among multiple sets of hyperparameters in preparation for the training of the neural network. At 4314, the processor may perform, at least partly in a first federated area, one or more of iterations of a training job flow (e.g., the training job flow 2200t, which includes the execution of one or more training task routines 2440t) with the selected set of hyperparameters and the training data to train the neural network.

At 4320, the processor may perform a first part of a transfer flow defined by a transfer flow definition (e.g., the transfer flow definition 2620tuv) by executing a first transfer routine (e.g., the transfer routine 2640t) that causes the processor to monitor the progress of the training of the neural network. In executing the first transfer routine, the processor may check at 4322 whether a condition has been met to trigger the automated transfer of a copy of the neural network configuration data (e.g., a copy of the data set 2370t) from the first federated area and into a second federated area. If, at 4322, the processor determines that the condition has not been met, then the processor may perform another one or more iterations of the training job flow at 4314.

However, if at 4322, the processor determines that the condition has been met, then the processor may perform a second part of the transfer flow defined by the transfer flow definition by performing the transfer of the neural network configuration data from the first federated to the second federated area through the first transfer area, at 4324. In so doing, the processor may be caused to cooperate with another processor of a different federated device of the distributed processing system.

At 4330, a testing data set (e.g., the data set 2330u and corresponding result report 2770u) may be generated from the larger data set and corresponding larger result report (e.g., the data set 2330x and corresponding result report 2770x). At 4332, the processor may perform, at least partly in the second federated area, one or more of iterations of a testing job flow (e.g., the testing job flow 2200u, which includes the execution of one or more training task routines 2440u) with the transferred copy of the neural network configuration data and the testing data to test the neural network.

At 4340, a third part of the transfer flow defined by the transfer flow definition may be performed by executing a second transfer routine (e.g., the transfer routine 2640u) that causes monitoring of the progress of the testing of the neural network. In executing the second transfer routine, a check may be made at 4342 of whether a condition has been met to trigger the automated transfer of a copy of the neural network configuration data from the second federated area and into a third federated area. If, at 4342, the condition is determined to have not been met, then a check may be made at 4350 of whether a condition has been met to trigger the automated transfer of an indication of the results of the testing back to first federated area to enable and/or trigger retraining of the neural network. If, at 4350, the condition is determined to have not been met, then another one or more iterations of the testing job flow may be performed at 4332. If, at 4350, the condition is determined to have been met, then the second part of the transfer flow is reversed at 4352 with a transfer of an indication of the results of the testing back to the first federated area through first transfer area, followed by the selection of another set of hyperparameters at 4312 in preparation for retraining the neural network.

However, if at 4342, the condition is determined to have been met, then a fourth part of the transfer flow defined by the transfer flow definition may be performed by performing the transfer of the neural network configuration data from the second federated to the third federated area through the second transfer area, at 4344. In so doing, there may be cooperation with still another processor of still another federated device of the distributed processing system.

At 4360, input data on which the analytical function is to be performed is received (e.g., data set 2330v). At 4362, at least partly within the third federated area, one or more routines of a non-neuromorphic implementation of the analytical function are executed, and the neural network trained to provide the neuromorphic implementation is operated, thereby causing both non-neuromorphic and neuromorphic implementations of the analytical function to be performed at least partially in parallel with the received data set.

At 4370, a fifth part of the transfer flow defined by the transfer flow definition may be performed by executing a third transfer routine (e.g., the transfer routine 2640v) that causes comparisons to be made between the sets of output values generated by each of the implementations of the analytical function from the same corresponding input values of the received data set to test the degree of accuracy of the neural network in performing the analytical function.

If, at 4372, the degree of accuracy does not at least meet a predetermined minimum threshold of accuracy, then at 4374, a sixth part of the transfer flow may be performed with the transfer of an indication of the results of using the neural network being transferred from the third federated area to the first federated area through a third transfer area, followed by the selection of another set of hyperparameters at 4312 in preparation for retraining the neural network. However, if at 4372, the degree of accuracy of the neural network does at least meet the predetermined minimum threshold of accuracy, then at 4380, a check may be made of whether the degree of accuracy at least meets a midway threshold of accuracy.

If, at 4380, the degree of accuracy does not at least meet the predetermined midway threshold of accuracy, then at 4382, the combination of the received data set and the corresponding output values generated by the non-neuromorphic implementation of the analytical function may be used as addition training data to further train the neural network before receiving still more input data at 4360 in preparation for further using the neural network. However, if at 4380, the degree of accuracy of the neural network does at least meet the predetermined midway threshold of accuracy, then at 4390, a check may be made of whether the degree of accuracy at least meets a higher threshold of accuracy.

If, at 4390, the degree of accuracy does not at least meet the predetermined higher threshold of accuracy, then more input data may be received at 4360 in preparation for further use of the neural network. However, if at 4390, the degree of accuracy of the neural network does at least meet the predetermined higher threshold of accuracy, then at 4392, the neural network configuration data that defines the neural network may be made available for further use without such parallel use of the non-neuromorphic implementation.

In various embodiments, each of the processors 2150, 2550 and 2850 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor 2550 of each of the one or more federated devices 1500 may be selected to efficiently perform the analysis of multiple instances of job flows at least partially in parallel. By way of example, the processor 2550 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor 1550 may incorporate multi-threaded capabilities and/or multiple processor cores to enable parallel performances of the tasks of more than job flow.

In various embodiments, each of the control routines 2140, 2540 and 2840, including the components of which each is composed, may be selected to be operative on whatever type of processor or processors that are selected to implement applicable ones of the processors 2150, 2550 and/or 2850 within each one of the devices 2100, 2500 and/or 2800, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2150, 2550 and/or 2850. Where one or more device drivers are included, those device drivers may provide support for any of a variety of other components, whether hardware or software components, of the devices 2100, 2500 and/or 2800.

In various embodiments, each of the storages 2160, 2560 and 2860 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2560 in embodiments in which the one or more of the federated devices 2500 provide federated spaces 2566, or the storage devices 2600 in embodiments in which the one or more storage devices 2600 provide federated spaces 2566, may be implemented with a redundant array of independent discs (RAID) of a RAID level selected to provide fault tolerance to objects stored within the federated spaces 2566.

In various embodiments, each of the input devices 2110 and 2810 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, each of the displays 2180 and 2880 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the displays 2180 and/or 2880 may each be a touchscreen display such that the input devices 2110 and/or 2810, respectively, may be incorporated therein as touch-sensitive components thereof.

In various embodiments, each of the network interfaces 2190, 2590 and 2890 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, one or more of the network interfaces 2190, 2590 and/or 2890 may be implemented with multiple copper-based or fiber-optic based network interface ports to provide redundant and/or parallel pathways in exchanging one or more of the data sets 2330 and/or 2370.

In various embodiments, the division of processing and/or storage resources among the federated devices 1500, and/or the API architectures employed to support communications between the federated devices and other devices may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of portions of the data sets 2330 and/or 2370 are not dependent on, nor constrained by, existing API architectures and/or supporting communications protocols. More broadly, there is nothing in the manner in which the data sets 2330 and/or 2370 may be organized in storage, transmission and/or distribution via the network 2999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:

receive, at a portal, and from a remote device via a network, a request to repeat an earlier performance, described in a first instance log of multiple instance logs stored in one or more federated areas, of a first job flow defined in a first job flow definition of multiple job flow definitions stored in the one or more federated areas, or to provide objects to the remote device to enable the remote device to repeat the earlier performance, wherein:

the portal is provided on the network to control access by the remote device to the one or more federated areas via the network;

the one or more federated areas are maintained within one or more storage devices to store at least the multiple job flow definitions and the multiple instance logs; and the request specifies a first instance log identifier of the first instance log;

use the first instance log identifier to retrieve the first instance log from among the multiple instance logs stored in the one or more federated areas, wherein the first instance log comprises a first job flow identifier of the first job flow definition, a task routine identifier for each task routine used to perform a task specified in the first job flow definition, and a data object identifier for each data object associated with the earlier performance of the first job flow;

analyze the first job flow definition to determine whether performances of the first job flow comprise use of a neural network;

in response to a determination that performances of the first job flow do comprise use of the neural network, analyze an object associated with the first job flow to determine whether the neural network was trained to perform an analytical function using a training data set derived from at least one performance of a second job flow defined by a second job flow definition stored in the one or more federated areas, wherein:

the object associated with the first job flow comprises at least one of the first job flow definition, the first instance log, or a task routine executed during the earlier performance of the first job flow; and performances of the second job flow comprise performances of the analytical function in a manner that does not use any neural network; and in response to the request comprising a request to repeat the earlier performance, in response to a determination that performances of the first job flow do comprise use of the neural network, and in response to a determination that the neural network was trained using the training data set derived from at least one performance of the second job flow, the processor is caused to perform operations comprising:

repeat the earlier performance of the first job flow with one or more data sets associated with the earlier performance of the first job flow, wherein the repetition of the earlier performance of the first job flow comprises execution, by the processor, of each task routine identified by a task routine identifier in the first instance log;

perform the second job flow with the one or more data sets associated with the earlier performance of the first job flow, wherein the performance of the second job flow comprises execution, by the processor, of a most recent version of a task routine to perform each task identified by a flow task identifier in the second job flow definition;

analyze an output of the repetition of the earlier performance of the first job flow relative to a corresponding output of the performance of the second job flow to determine a degree of accuracy of the first job flow in performing the analytical function relative to a predetermined threshold of accuracy to determine whether the second job flow is to be used in place of the first job flow to perform the analytical function; and transmit at least the output of the repetition of the earlier performance of the first job flow and an indication of the degree of accuracy or the results of the comparison to the requesting device.

2. The apparatus of claim 1, wherein the processor is caused to perform operations comprising:

use the first job flow identifier within the first instance log to retrieve the first job flow definition from the one or more federated areas;

for each task routine executed during the earlier performance of the first job flow to perform a corresponding task specified in the first job flow definition, use the corresponding task routine identifier within the first instance log to retrieve the task routine from the one or more federated areas; and for each data object employed as an input to the earlier performance of the first job flow, use the corresponding data object identifier within the first instance log to retrieve the data object from the one or more federated areas.

3. The apparatus of claim 2, wherein the processor is caused to, in response to the request comprising a request to provide objects to the remote device to enable the remote device to repeat the earlier performance, transmit, to the requesting device, at least the first job flow definition, each task routine executed during the earlier performance of the first job flow, and each data object employed as an input to the earlier performance of the first job flow.

4. The apparatus of claim 2, wherein the processor is caused to, in response to the request comprising a request to repeat the earlier performance of the first job flow, perform operations comprising:

for each data object generated during the earlier performance of the first job flow, use the corresponding data object identifier within the first instance log to retrieve the data object from the one or more federated areas, and analyze a corresponding data object generated during the repetition of the earlier performance relative to a corresponding data object generated during the earlier performance; and transmit, to the requesting device, an indication of results of the analysis of at least one data object generated during the repetition of the earlier performance relative to at least one corresponding data object generated during the earlier performance.

5. The apparatus of claim 2, wherein the processor is caused, in response to the determination that performances of the first job flow do comprise use of a neural network, and in response to a determination that the neural network was trained using the training data set derived from at least one performance of the second job flow, to perform operations comprising:

use a second job flow identifier provided within the selected object associated with the first job flow to retrieve the second job flow definition from the one or more federated areas;

for each task specified by a corresponding flow task identifier in the second job flow definition, use the corresponding flow task identifier to retrieve a most recent version of a corresponding task routine from the one or more federated areas; and in response to the request comprising a request to provide objects to the remote device to enable the remote device to repeat the earlier performance, transmit, to the requesting device, at least the second job flow definition and the most recent version of task routine corresponding to each task specified in the second job flow definition.

6. The apparatus of claim 2, wherein the processor is caused, in response to the determination that performances of the first job flow do comprise use of a neural network, and in response to a determination that the neural network was trained using the training data set derived from at least one performance of the second job flow, to perform operations comprising:

use a second instance log identifier provided within the selected object associated with the first job flow to retrieve a second instance log that describes the at least one performance of the second job flow from the one or more federated areas;

use a second job flow identifier provided within the second instance log to retrieve the second job flow definition from the one or more federated areas;

for each task routine executed during the at least one performance of the second job flow to perform a corresponding task specified in the second job flow definition, use the corresponding task routine identifier within the second instance log to retrieve the task routine from the one or more federated areas; and in response to the request comprising a request to provide objects to the remote device to enable the remote device to repeat the earlier performance, transmit, to the requesting device, at least the second job flow definition and each task routine executed during the at least one performance of the second job flow.

7. The apparatus of claim 6, wherein the processor is caused, in response to the request comprising a request to repeat the earlier performance, in response to a determination that performances of the first job flow do comprise use of a neural network, and in response to a determination that the neural network was trained using the training data set derived from at least one performance of the second job flow, to perform operations comprising:

for each data object associated with the at least one performance of the second job flow and that became part of the training data set used to train the neural network of the first job flow, use the corresponding data object identifier within the second instance log to retrieve the data object from the one or more federated areas;

perform a regression analysis of the training data set to identify one or more characteristics of the training data set; and transmit an indication of the identified one or more characteristics to the requesting device.

8. The apparatus of claim 1, wherein the processor is caused, in response to the determination that performances of the first job flow do comprise use of a neural network, to perform operations comprising:

perform a regression analysis with a first one of the one or more data sets associated with the earlier performance of the first job flow that was employed as an input to the earlier performance, and with a second one of the one or more data sets associated with the earlier performance that was generated during the earlier performance to identify one or more characteristics of the combination of the first and second ones of the one or more data sets; and transmit an indication of the identified one or more characteristics to the requesting device.

9. The apparatus of claim 1, wherein:
at least one data set associated with the earlier performance of the first job flow comprises neural network configuration data that comprises at least one of a hyperparameter or a trained parameter; and
in response to the determination that performances of the first job flow do comprise use of a neural network, the processor is caused to transmit the neural network configuration data to the requesting device.

10. The apparatus of claim 1, wherein the processor is caused, in response to a determination that performances of the first job flow do comprise use of a neural network, and in response to a determination that the neural network of the first job flow was trained using the training data set derived from at least one performance of the second job flow, to perform operations comprising:
use a third job flow identifier provided within the selected object associated with the first job flow to retrieve, from the one or more federated areas, a third job flow definition that defines a third job flow to test the neural network or a third instance log identifier that identifies an instance log that describes a performance of the third job flow to test the neural network;
retrieve, from the one or more storage devices, data objects associated with the performance of the third job flow and that became part of a testing data set used to test the neural network; and
transmit, to the requesting device, the testing data set or an indication of one or more characteristics of the testing set that are identified in a regression analysis of the testing data set.

11. A computer-program product tangibly embodied in a non-transitory machine-readable storage medium, the computer-program product including instructions operable to cause a processor to perform operations comprising:
receive, at a portal, and from a remote device via a network, a request to repeat an earlier performance, described in a first instance log of multiple instance logs stored in one or more federated areas, of a first job flow defined in a first job flow definition of multiple job flow definitions stored in the one or more federated areas, or to provide objects to the remote device to enable the remote device to repeat the earlier performance, wherein:
the portal is provided on the network to control access by the remote device to the one or more federated areas via the network;
the one or more federated areas are maintained within one or more storage devices to store at least the multiple job flow definitions and the multiple instance logs; and
the request specifies a first instance log identifier of the first instance log;
use the first instance log identifier to retrieve the first instance log from among the multiple instance logs stored in the one or more federated areas, wherein the first instance log comprises a first job flow identifier of the first job flow definition, a task routine identifier for each task routine used to perform a task specified in the first job flow definition, and a data object identifier for each data object associated with the earlier performance of the first job flow;
analyze the first job flow definition to determine whether performances of the first job flow comprise use of a neural network;
in response to a determination that performances of the first job flow do comprise use of the neural network, analyze an object associated with the first job flow to determine whether the neural network was trained to perform an analytical function using a training data set derived from at least one performance of a second job flow defined by a second job flow definition stored in the one or more federated areas, wherein:
the object associated with the first job flow comprises at least one of the first job flow definition, the first instance log, or a task routine executed during the earlier performance of the first job flow; and
performances of the second job flow comprise performances of the analytical function in a manner that does not use any neural network; and
in response to the request comprising a request to repeat the earlier performance, in response to a determination that performances of the first job flow do comprise use of the neural network, and in response to a determination that the neural network was trained using the training data set derived from at least one performance of the second job flow, the processor is caused to perform operations comprising:
repeat the earlier performance of the first job flow with one or more data sets associated with the earlier performance of the first job flow, wherein the repetition of the earlier performance of the first job flow comprises execution, by the processor, of each task routine identified by a task routine identifier in the first instance log;
perform the second job flow with the one or more data sets associated with the earlier performance of the first job flow, wherein the performance of the second job flow comprises execution, by the processor, of a most recent version of a task routine to perform each task identified by a flow task identifier in the second job flow definition;
analyze an output of the repetition of the earlier performance of the first job flow relative to a corresponding output of the performance of the second job flow to determine a degree of accuracy of the first job flow in performing the analytical function relative to a predetermined threshold of accuracy to determine whether the second job flow is to be used in place of the first job flow to perform the analytical function; and
transmit at least the output of the repetition of the earlier performance of the first job flow and an indication of the degree of accuracy or the results of the comparison to the requesting device.

12. The computer-program product of claim 11, wherein the processor is caused to perform operations comprising:
use the first job flow identifier within the first instance log to retrieve the first job flow definition from the one or more federated areas;
for each task routine executed during the earlier performance of the first job flow to perform a corresponding task specified in the first job flow definition, use the corresponding task routine identifier within the first instance log to retrieve the task routine from the one or more federated areas; and for each data object employed as an input to the earlier performance of the first job flow, use the corresponding data object identifier within the first instance log to retrieve the data object from the one or more federated areas.

13. The computer-program product of claim 12, wherein the processor is caused to, in response to the request comprising a request to provide objects to the remote device to enable the remote device to repeat the earlier performance, transmit, to the requesting device, at least the first job flow definition, each task routine executed during the earlier performance of the first job flow, and each data object employed as an input to the earlier performance of the first job flow.

14. The computer-program product of claim 12, wherein the processor is caused to, in response to the request comprising a request to repeat the earlier performance of the first job flow, perform operations comprising:

for each data object generated during the earlier performance of the first job flow, use the corresponding data object identifier within the first instance log to retrieve the data object from the one or more federated areas, and analyze a corresponding data object generated during the repetition of the earlier performance relative to a corresponding data object generated during the earlier performance; and transmit, to the requesting device, an indication of results of the analysis of at least one data object generated during the repetition of the earlier performance relative to at least one corresponding data object generated during the earlier performance.

15. The computer-program product of claim 12, wherein the processor is caused, in response to the determination that performances of the first job flow do comprise use of a neural network, and in response to a determination that the neural network was trained using the training data set derived from at least one performance of the second job flow, to perform operations comprising:

use a second job flow identifier provided within the selected object associated with the first job flow to retrieve the second job flow definition from the one or more federated areas;

for each task specified by a corresponding flow task identifier in the second job flow definition, use the corresponding flow task identifier to retrieve a most recent version of a corresponding task routine from the one or more federated areas; and in response to the request comprising a request to provide objects to the remote device to enable the remote device to repeat the earlier performance, transmit, to the requesting device, at least the second job flow definition and the most recent version of task routine corresponding to each task specified in the second job flow definition.

16. The computer-program product of claim 12, wherein the processor is caused, in response to the determination that performances of the first job flow do comprise use of a neural network, and in response to a determination that the neural network was trained using the training data set derived from at least one performance of the second job flow, to perform operations comprising:

use a second instance log identifier provided within the selected object associated with the first job flow to retrieve a second instance log that describes the at least one performance of the second job flow from the one or more federated areas;

use a second job flow identifier provided within the second instance log to retrieve the second job flow definition from the one or more federated areas;

for each task routine executed during the at least one performance of the second job flow to perform a corresponding task specified in the second job flow definition, use the corresponding task routine identifier within the second instance log to retrieve the task routine from the one or more federated areas; and in response to the request comprising a request to provide objects to the remote device to enable the remote device to repeat the earlier performance, transmit, to the requesting device, at least the second job flow definition and each task routine executed during the at least one performance of the second job flow.

17. The computer-program product of claim 16, wherein the processor is caused, in response to the request comprising a request to repeat the earlier performance, in response to a determination that performances of the first job flow do comprise use of a neural network, and in response to a determination that the neural network was trained using the training data set derived from at least one performance of the second job flow, to perform operations comprising:

for each data object associated with the at least one performance of the second job flow and that became part of the training data set used to train the neural network of the first job flow, use the corresponding data object identifier within the second instance log to retrieve the data object from the one or more federated areas;

perform a regression analysis of the training data set to identify one or more characteristics of the training data set; and transmit an indication of the identified one or more characteristics to the requesting device.

18. The computer-program product of claim 11, wherein the processor is caused, in response to the determination that performances of the first job flow do comprise use of a neural network, to perform operations comprising:

perform a regression analysis with a first one of the one or more data sets associated with the earlier performance of the first job flow that was employed as an input to the earlier performance, and with a second one of the one or more data sets associated with the earlier performance that was generated during the earlier performance to identify one or more characteristics of the combination of the first and second ones of the one or more data sets; and transmit an indication of the identified one or more characteristics to the requesting device.

19. The computer-program product of claim 11, wherein:

at least one data set associated with the earlier performance of the first job flow comprises neural network configuration data that comprises at least one of a hyperparameter or a trained parameter; and in response to the determination that performances of the first job flow do comprise use of a neural network, the processor is caused to transmit the neural network configuration data to the requesting device.

20. The computer-program product of claim 11, wherein the processor is caused, in response to a determination that performances of the first job flow do comprise use of a neural network, and in response to a determination that the neural network of the first job flow was trained using the training data set derived from at least one performance of the second job flow, to perform operations comprising:
use a third job flow identifier provided within the selected object associated with the first job flow to retrieve, from the one or more federated areas, a third job flow definition that defines a third job flow to test the neural network or a third instance log identifier that identifies an instance log that describes a performance of the third job flow to test the neural network;
retrieve, from the one or more storage devices, data objects associated with the performance of the third job flow and that became part of a testing data set used to test the neural network; and
transmit, to the requesting device, the testing data set or an indication of one or more characteristics of the testing set that are identified in a regression analysis of the testing data set.

21. A computer-implemented method comprising:
receiving, by a processor at a portal, and from a remote device via a network, a request to repeat an earlier performance, described in a first instance log of multiple instance logs stored in one or more federated areas, of a first job flow defined in a first job flow definition of multiple job flow definitions stored in the one or more federated areas, or to provide objects to the remote device to enable the remote device to repeat the earlier performance, wherein:
the portal is provided on the network to control access by the remote device to the one or more federated areas via the network;
the one or more federated areas are maintained within one or more storage devices to store at least the multiple job flow definitions and the multiple instance logs; and
the request specifies a first instance log identifier of the first instance log;
using the first instance log identifier to retrieve the first instance log from among the multiple instance logs stored in the one or more federated areas, wherein the first instance log comprises a first job flow identifier of the first job flow definition, a task routine identifier for each task routine used to perform a task specified in the first job flow definition, and a data object identifier for each data object associated with the earlier performance of the first job flow;
analyzing, by the processor, the first job flow definition to determine whether performances of the first job flow comprise use of a neural network;
in response to a determination that performances of the first job flow do comprise use of the neural network, analyzing, by the processor, an object associated with the first job flow to determine whether the neural network was trained to perform an analytical function using a training data set derived from at least one performance of a second job flow defined by a second job flow definition stored in the one or more federated areas, wherein:
the object associated with the first job flow comprises at least one of the first job flow definition, the first instance log, or a task routine executed during the earlier performance of the first job flow; and
performances of the second job flow comprise performances of the analytical function in a manner that does not use any neural network; or
in response to the request comprising a request to repeat the earlier performance, in response to a determination that performances of the first job flow do comprise use of the neural network, and in response to a determination that the neural network was trained using the training data set derived from at least one performance of the second job flow, performing operations comprising:
repeating, by the processor, the earlier performance of the first job flow with one or more data sets associated with the earlier performance of the first job flow, wherein the repetition of the earlier performance of the first job flow comprises execution, by the processor, of each task routine identified by a task routine identifier in the first instance log;
performing, by the processor, the second job flow with the one or more data sets associated with the earlier performance of the first job flow, wherein the performance of the second job flow comprises execution, by the processor, of a most recent version of a task routine to perform each task identified by a flow task identifier in the second job flow definition;
analyzing, by the processor, an output of the repetition of the earlier performance of the first job flow relative to a corresponding output of the performance of the second job flow to determine a degree of accuracy of the first job flow in performing the analytical function relative to a predetermined threshold of accuracy to determine whether the second job flow is to be used in place of the first job flow to perform the analytical function; and
transmitting, from the processor, at least the output of the repetition of the earlier performance of the first job flow and an indication of the degree of accuracy or the results of the comparison to the requesting device.

22. The computer-implemented method of claim 21, comprising:
using the first job flow identifier within the first instance log to retrieve the first job flow definition from the one or more federated areas;
for each task routine executed during the earlier performance of the first job flow to perform a corresponding task specified in the first job flow definition, using the corresponding task routine identifier within the first instance log to retrieve the task routine from the one or more federated areas; and
for each data object employed as an input to the earlier performance of the first job flow, using the corresponding data object identifier within the first instance log to retrieve the data object from the one or more federated areas.

23. The computer-implemented method of claim 22, comprising, in response to the request comprising a request to provide objects to the remote device to enable the remote device to repeat the earlier performance, transmitting, from the processor and to the requesting device, at least the first job flow definition, each task routine executed during the earlier performance of the first job flow, and each data object employed as an input to the earlier performance of the first job flow.

24. The computer-implemented method of claim 22, comprising, in response to the request comprising a request to repeat the earlier performance of the first job flow, performing operations comprising:
for each data object generated during the earlier performance of the first job flow, using the corresponding data object identifier within the first instance log to retrieve the data object from the one or more federated areas, and analyzing, by the processor, a corresponding data object generated during the repetition of the earlier performance relative to a corresponding data object generated during the earlier performance; and transmitting, from the processor and to the requesting device, an indication of results of the analysis of at least one data object generated during the repetition of the earlier performance relative to at least one corresponding data object generated during the earlier performance.

25. The computer-implemented method of claim 22, comprising, in response to the determination that performances of the first job flow do comprise use of a neural network, and in response to a determination that the neural network was trained using the training data set derived from at least one performance of the second job flow, performing operations comprising:

using a second job flow identifier provided within the selected object associated with the first job flow to retrieve the second job flow definition from the one or more federated areas;

for each task specified by a corresponding flow task identifier in the second job flow definition, using the corresponding flow task identifier to retrieve a most recent version of a corresponding task routine from the one or more federated areas; and in response to the request comprising a request to provide objects to the remote device to enable the remote device to repeat the earlier performance, transmitting, from the processor and to the requesting device, at least the second job flow definition and the most recent version of task routine corresponding to each task specified in the second job flow definition.

26. The computer-implemented method of claim 22, comprising, in response to the determination that performances of the first job flow do comprise use of a neural network, and in response to a determination that the neural network was trained using the training data set derived from at least one performance of the second job flow, performing operations comprising:

using a second instance log identifier provided within the selected object associated with the first job flow to retrieve a second instance log that describes the at least one performance of the second job flow from the one or more federated areas;

using a second job flow identifier provided within the second instance log to retrieve the second job flow definition from the one or more federated areas;

for each task routine executed during the at least one performance of the second job flow to perform a corresponding task specified in the second job flow definition, using the corresponding task routine identifier within the second instance log to retrieve the task routine from the one or more federated areas; and in response to the request comprising a request to provide objects to the remote device to enable the remote device to repeat the earlier performance, transmitting, from the processor and to the requesting device, at least the second job flow definition and each task routine executed during the at least one performance of the second job flow.

27. The computer-implemented method of claim 26, comprising, in response to the request comprising a request to repeat the earlier performance, in response to a determination that performances of the first job flow do comprise use of a neural network, and in response to a determination that the neural network was trained using the training data set derived from at least one performance of the second job flow, performing operations comprising:

for each data object associated with the at least one performance of the second job flow and that became part of the training data set used to train the neural network of the first job flow, using the corresponding data object identifier within the second instance log to retrieve the data object from the one or more federated areas;

performing, by the processor, a regression analysis of the training data set to identify one or more characteristics of the training data set; and transmitting, from the processor, an indication of the identified one or more characteristics to the requesting device.

28. The computer-implemented method of claim 21, comprising, in response to the determination that performances of the first job flow do comprise use of a neural network, performing operations comprising:

performing, by the processor, a regression analysis with a first one of the one or more data sets associated with the earlier performance of the first job flow that was employed as an input to the earlier performance, and with a second one of the one or more data sets associated with the earlier performance that was generated during the earlier performance to identify one or more characteristics of the combination of the first and second ones of the one or more data sets; and transmitting, from the processor, an indication of the identified one or more characteristics to the requesting device.

29. The computer-implemented method of claim 21, wherein:

at least one data set associated with the earlier performance of the first job flow comprises neural network configuration data that comprises at least one of a hyperparameter or a trained parameter; and the method comprises, in response to the determination that performances of the first job flow do comprise use of a neural network, transmitting the neural network configuration data from the processor and to the requesting device.

30. The computer-implemented method of claim 21, comprising, in response to a determination that performances of the first job flow do comprise use of a neural network, and in response to a determination that the neural network of the first job flow was trained using the training data set derived from at least one performance of the second job flow, performing operations comprising:

using a third job flow identifier provided within the selected object associated with the first job flow to retrieve, from the one or more federated areas, a third job flow definition that defines a third job flow to test the neural network or a third instance log identifier that identifies an instance log that describes a performance of the third job flow to test the neural network;

retrieving, from the one or more storage devices, data objects associated with the performance of the third job flow and that became part of a testing data set used to test the neural network; and transmitting, from the processor and to the requesting device, the testing data set or an indication of one or more characteristics of the testing set that are identified in a regression analysis of the testing data set.

* * * * *